(12) United States Patent
Sashima et al.

(10) Patent No.: US 12,386,162 B2
(45) Date of Patent: Aug. 12, 2025

(54) OPTICAL SYSTEM, OPTICAL APPARATUS, AND METHOD OF MANUFACTURING OPTICAL SYSTEM

(71) Applicant: Nikon Corporation, Tokyo (JP)

(72) Inventors: Tomoyuki Sashima, Tokyo (JP); Saburo Masugi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 394 days.

(21) Appl. No.: 17/053,842

(22) PCT Filed: May 18, 2018

(86) PCT No.: PCT/JP2018/019267
§ 371 (c)(1),
(2) Date: Mar. 22, 2021

(87) PCT Pub. No.: WO2019/220616
PCT Pub. Date: Nov. 21, 2019

(65) Prior Publication Data
US 2021/0231928 A1    Jul. 29, 2021

(51) Int. Cl.
*G02B 15/22* (2006.01)
*G02B 15/14* (2006.01)
*G02B 15/20* (2006.01)

(52) U.S. Cl.
CPC ..... *G02B 15/22* (2013.01); *G02B 15/143103* (2019.08); *G02B 15/20* (2013.01)

(58) Field of Classification Search
CPC .......................... G02B 15/22; G02B 15/143103
(Continued)

(56) References Cited

U.S. PATENT DOCUMENTS 4,793,698 A * 12/1988 Hirano ................... G02B 15/22
                                                                          359/745
4,978,204 A    12/1990 Ito
(Continued)

FOREIGN PATENT DOCUMENTS

CN         102645721 A    8/2012
EP           3015897 A    5/2016
(Continued)

OTHER PUBLICATIONS

Office Action issued May 11, 2022, in Chinese Patent Application No. 201880093439.X.
(Continued)

*Primary Examiner* — Zachary W Wilkes
(74) *Attorney, Agent, or Firm* — Potomac Law Group, PLLC

(57) ABSTRACT

An optical system comprises a first lens group having positive refractive power, a second lens group having positive refractive power, and a third lens group having negative refractive power, arranged in order from an object side, wherein, when focusing, the second lens group moves along an optical axis, and the optical system satisfies the conditional expressions $0.100 < BFa/f < 0.500$ and $-5.000 < (-G1R1)/f < 500.000$, where BFa is an air equivalent distance on the optical axis between a lens surface on an image side of a lens disposed closest to an image and the image, f is a focal length of the optical system, and G1R1 is a radius of curvature of a lens surface on the object side for a lens component disposed farthest on the object side in the first lens group.

13 Claims, 95 Drawing Sheets

(58) Field of Classification Search
USPC .................................................. 359/784, 693
See application file for complete search history.

(56) References Cited

U.S. PATENT DOCUMENTS

| | | | |
|---|---|---|---|
| 5,170,294 A | 12/1992 | Haraguchi et al. | |
| 5,233,472 A | 8/1993 | Haraguchi et al. | |
| 5,530,593 A * | 6/1996 | Shibayama | G02B 27/646 |
| | | | 359/554 |
| 5,831,772 A | 11/1998 | Nishio et al. | |
| 8,717,682 B2 * | 5/2014 | Yoshinaga | G02B 13/18 |
| | | | 359/791 |
| 9,297,983 B2 * | 3/2016 | Kubota | G02B 9/60 |
| 9,709,782 B2 * | 7/2017 | Yamada | G02B 15/22 |
| 9,739,976 B2 * | 8/2017 | Sun | G02B 13/02 |
| 10,228,534 B2 * | 3/2019 | Gyoda | G02B 15/24 |
| 10,754,169 B2 * | 8/2020 | Iwamoto | G02B 27/646 |
| 10,802,246 B2 * | 10/2020 | Okuoka | H04N 23/68 |
| 10,935,755 B2 * | 3/2021 | Saito | H04N 23/55 |
| 11,609,410 B2 * | 3/2023 | Kobayashi | G02B 13/20 |
| 2005/0259329 A1 | 11/2005 | Yagyu et al. | |
| 2012/0212842 A1 * | 8/2012 | Hosoi | G02B 15/22 |
| | | | 359/784 |
| 2014/0139931 A1 * | 5/2014 | Kubota | G02B 9/60 |
| | | | 359/740 |
| 2016/0147042 A1 * | 5/2016 | Sun | G02B 9/64 |
| | | | 359/740 |
| 2016/0202495 A1 * | 7/2016 | Hirakawa | G02B 27/646 |
| | | | 359/557 |
| 2017/0351059 A1 * | 12/2017 | Gyoda | G02B 13/02 |
| 2018/0031811 A1 * | 2/2018 | Miwa | G02B 7/04 |
| 2018/0372986 A1 | 12/2018 | Maruyama et al. | |
| 2019/0113711 A1 * | 4/2019 | Okuoka | H04N 23/67 |
| 2020/0026047 A1 * | 1/2020 | Hosoi | G02B 13/02 |

FOREIGN PATENT DOCUMENTS

| | | | |
|---|---|---|---|
| JP | H02-256015 A | | 10/1990 |
| JP | H03-039921 A | | 2/1991 |
| JP | H06-095039 A | | 4/1994 |
| JP | H06-273669 A | | 9/1994 |
| JP | H06-294932 A | | 10/1994 |
| JP | H11-295595 A | | 10/1999 |
| JP | 2005-338143 A | | 12/2005 |
| JP | 2012-181508 A | | 9/2012 |
| JP | 2012234169 A | * | 11/2012 |
| JP | 2013-061547 A | | 4/2013 |
| JP | 2013061570 A | * | 4/2013 |
| JP | 2014-095841 A | | 5/2014 |
| JP | 2014-102358 A | | 6/2014 |
| JP | 2014-235176 A | | 12/2014 |
| JP | 2016-090725 A | | 5/2016 |
| JP | 2016-099552 A | | 5/2016 |
| JP | 2016-161644 A | | 9/2016 |
| JP | 2016-212288 A | | 12/2016 |
| JP | 2017-215491 A | | 12/2017 |
| JP | 2019-200339 A | | 11/2019 |
| WO | WO 2017/130571 A1 | | 8/2017 |

OTHER PUBLICATIONS

Office Action issued Nov. 30, 2022, in Chinese Patent Application No. 201880093439.X.
Office Action issued Dec. 2, 2021, in Chinese Patent Application No. 201880093439.X.
International Search Report from International Patent Application No. PCT/JP2018/019267, Aug. 7, 2018.
Decision of Refusal issued Jul. 26, 2022, in Japanese Patent Application No. 2020-518918.
Decision of Dismissal of Amendment issued Jul. 26, 2022, in Japanese Patent Application No. 2020-518918.
Office Action issued Aug. 10, 2022, in Chinese Patent Application No. 201880093439.X.
International Preliminary Report on Patentability from International Patent Application No. PCT/JP2018/019267, Dec. 3, 2020.
Office Action issued Mar. 15, 2022, in Japanese Patent Application No. 2020-518918.
Office Action issued Sep. 28, 2021, in Japanese Patent Application No. 2020-518918.
Office Action issued May 30, 2023, in Japanese Patent Application No. 2022-142708.
Office Action issued Sep. 5, 2023, in Japanese Patent Application No. 2022-142708.
Office Action issued Dec. 26, 2023, in Japanese Patent Application No. 2022-142708.
Office Action (Decision of Refusal) issued May 21, 2024, in Japanese Patent Application No. 2022-142708.
Office Action (Decision of Dismissal of Amendment) issued May 21, 2024, in Japanese Patent Application No. 2022-142708.
Office Action issued Jun. 3, 2025, in Japanese Patent Application No. 2024-130697.

* cited by examiner

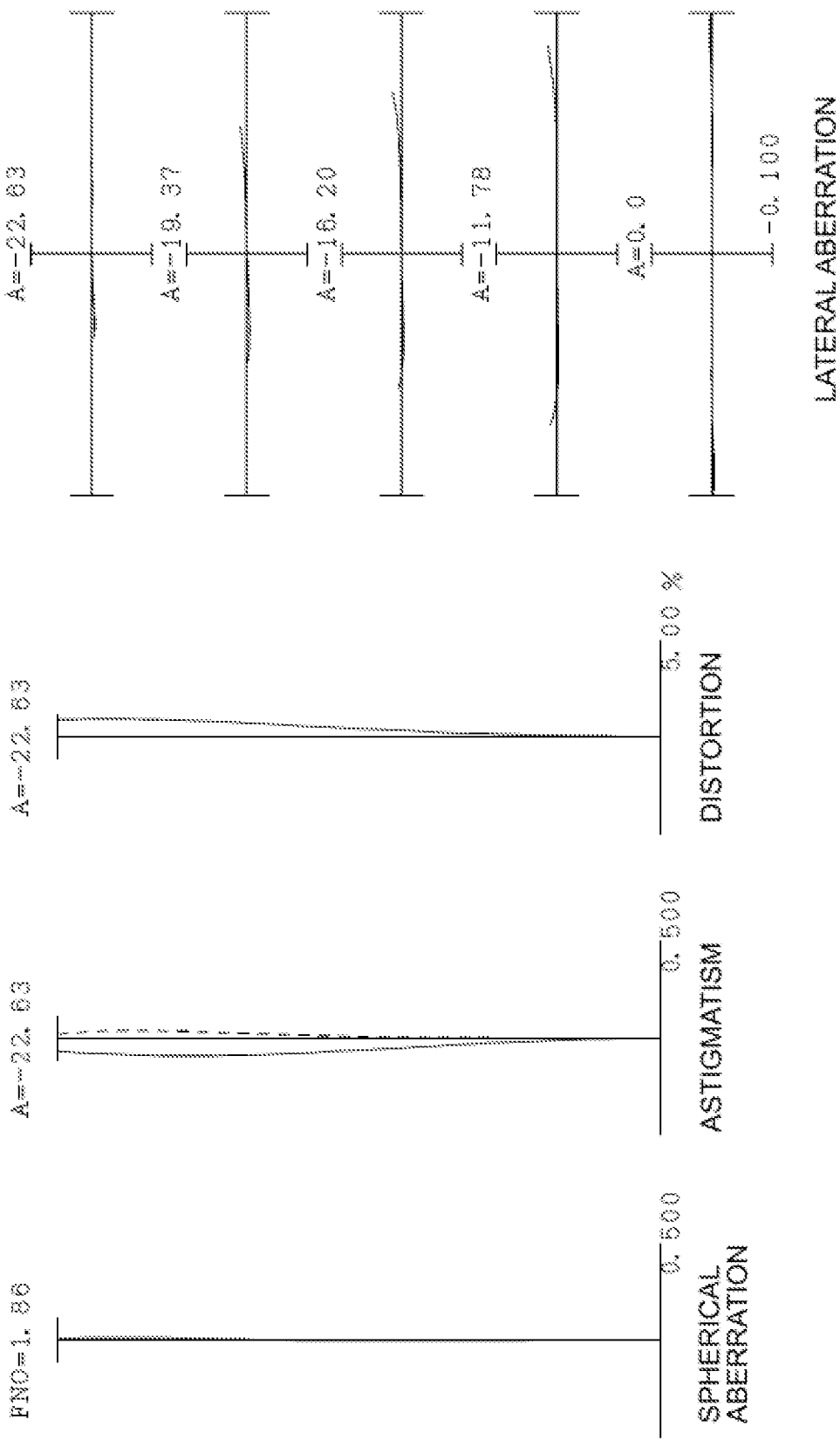

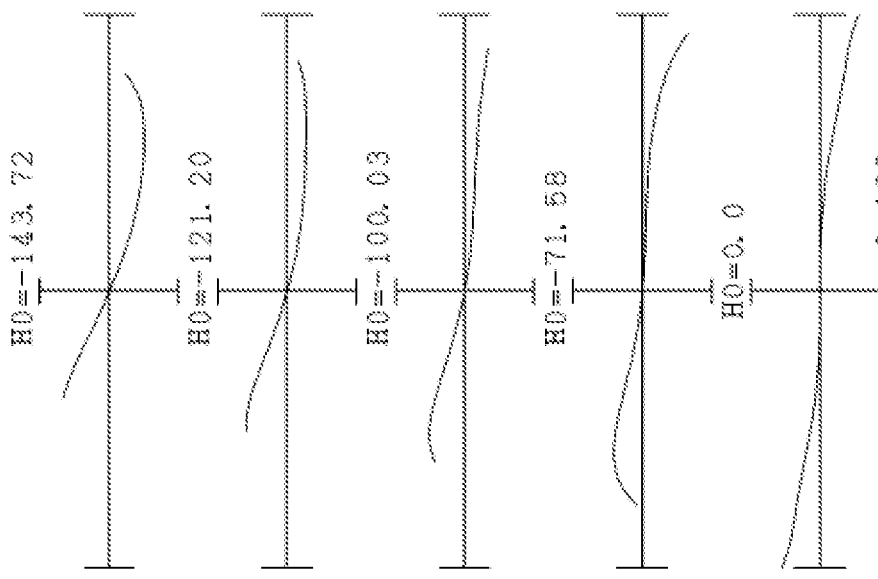
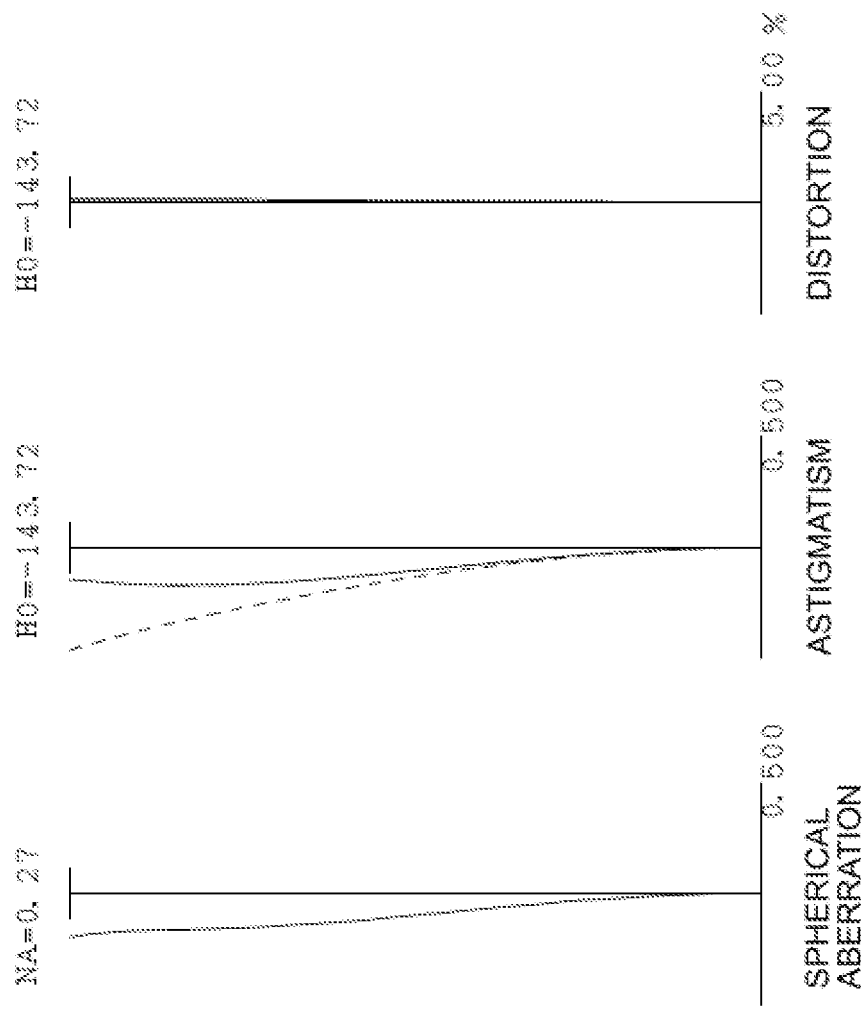
FIG.2B

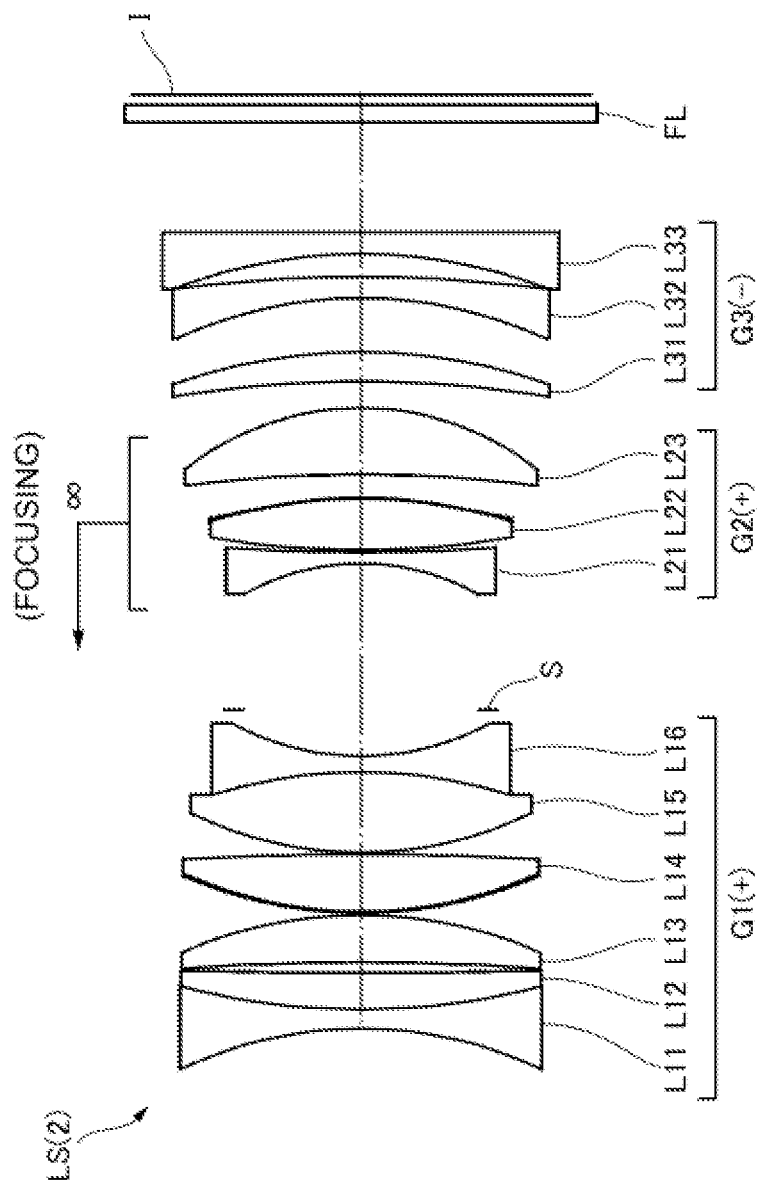

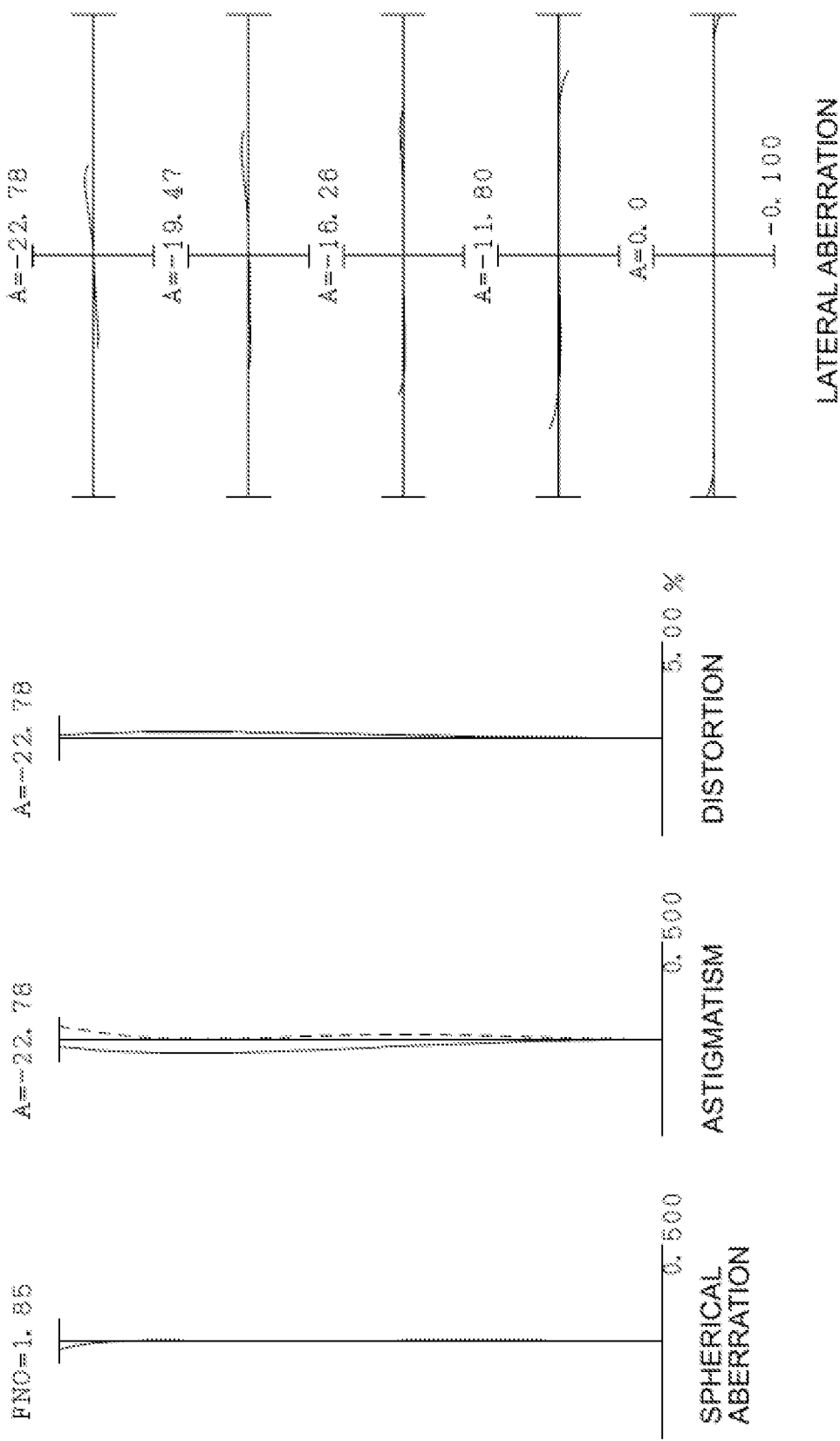

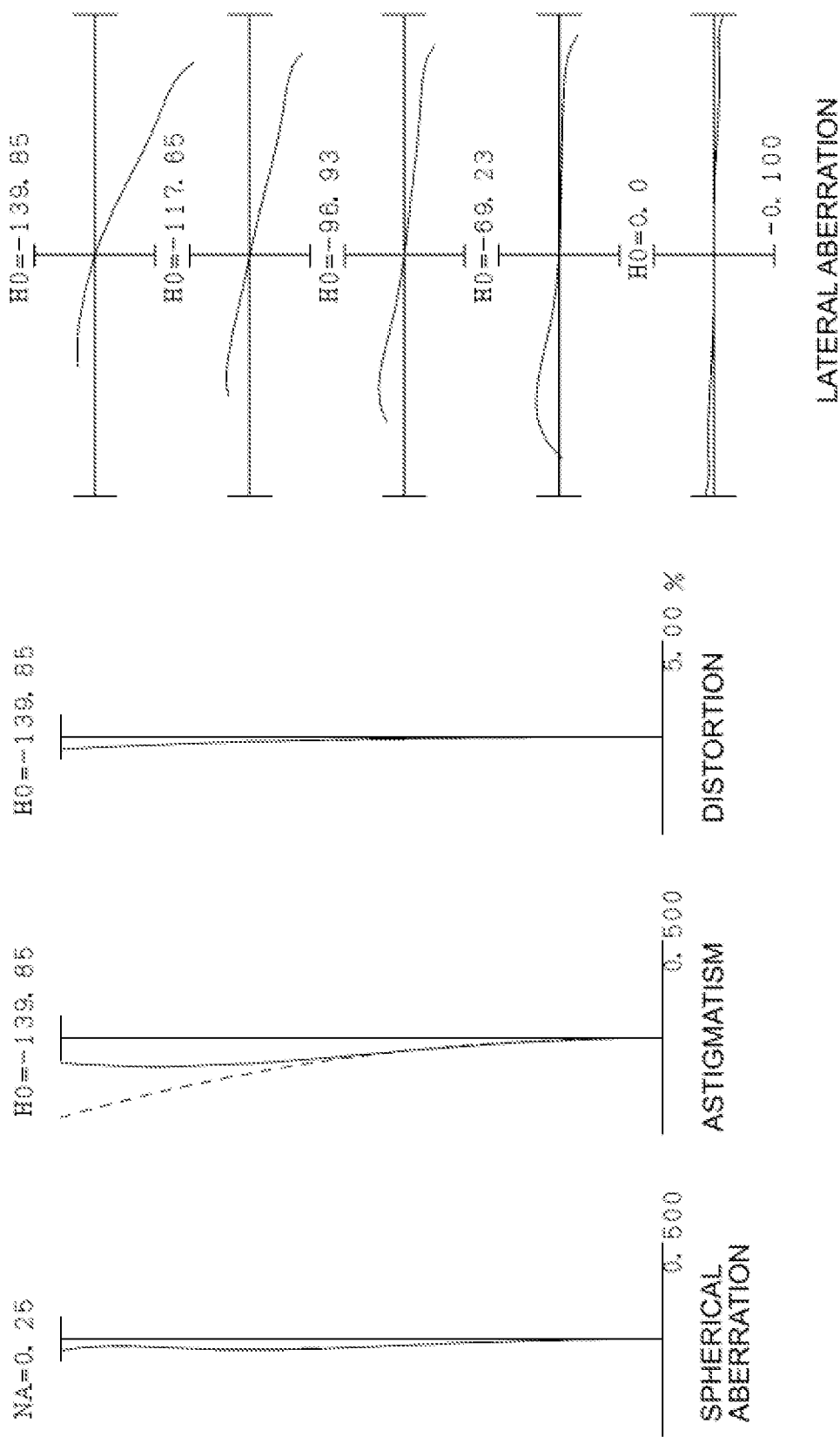

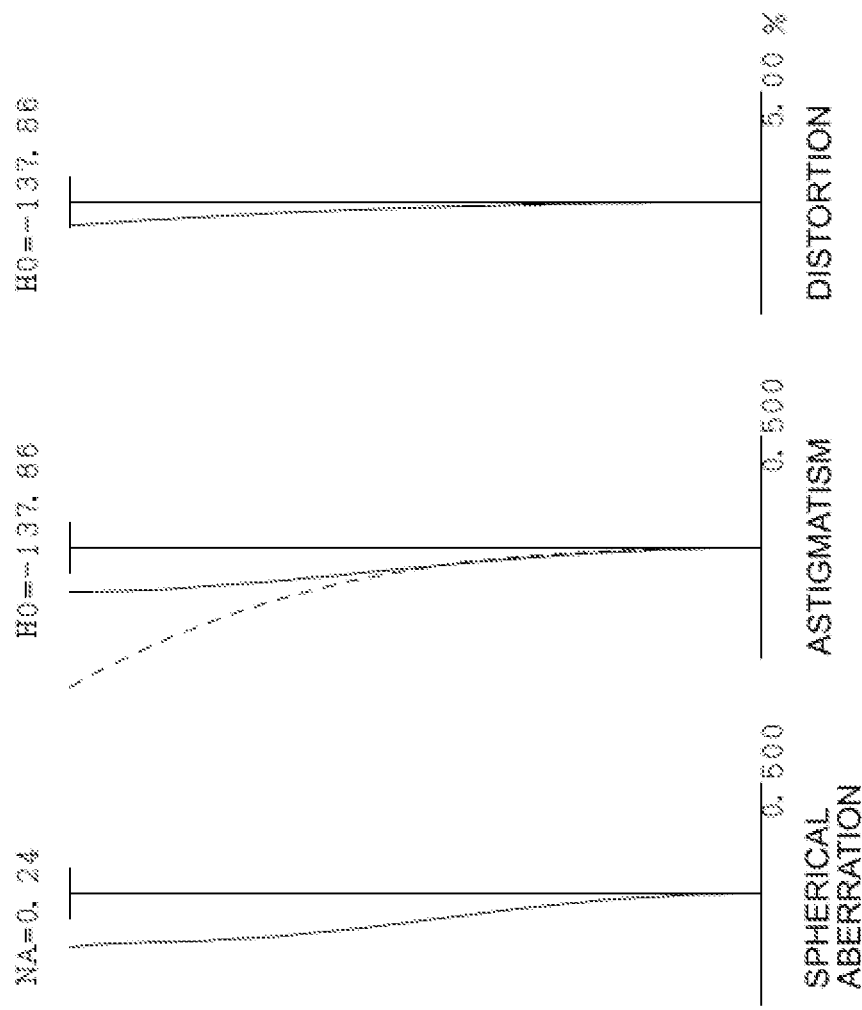

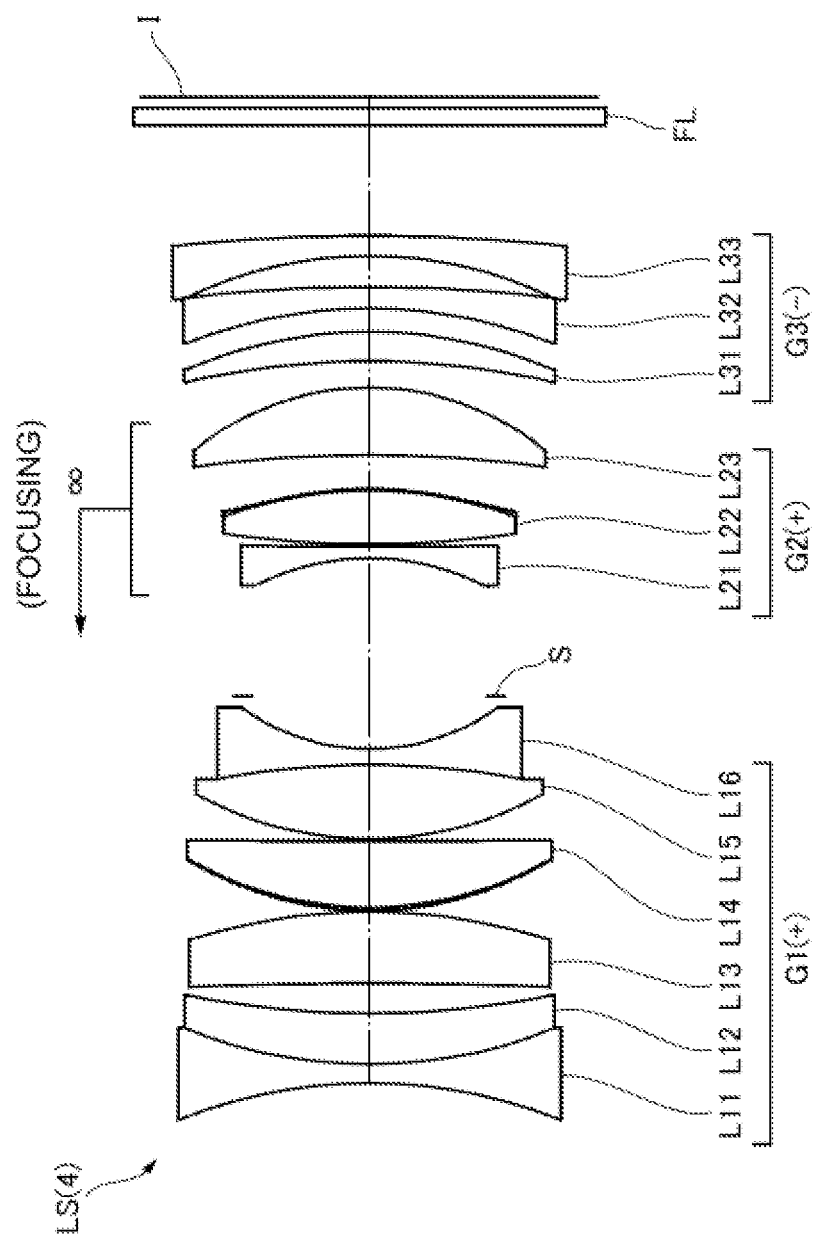

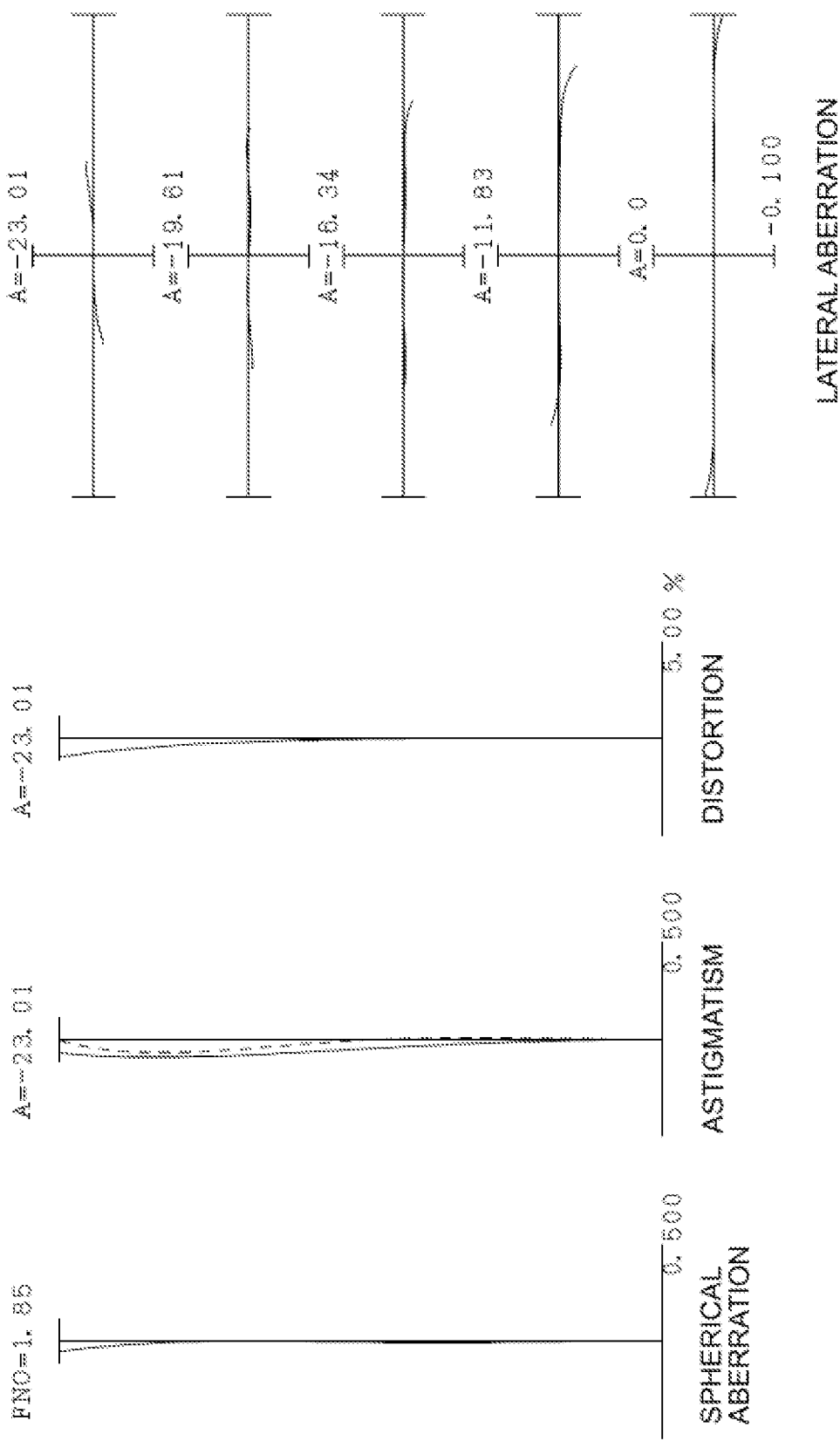

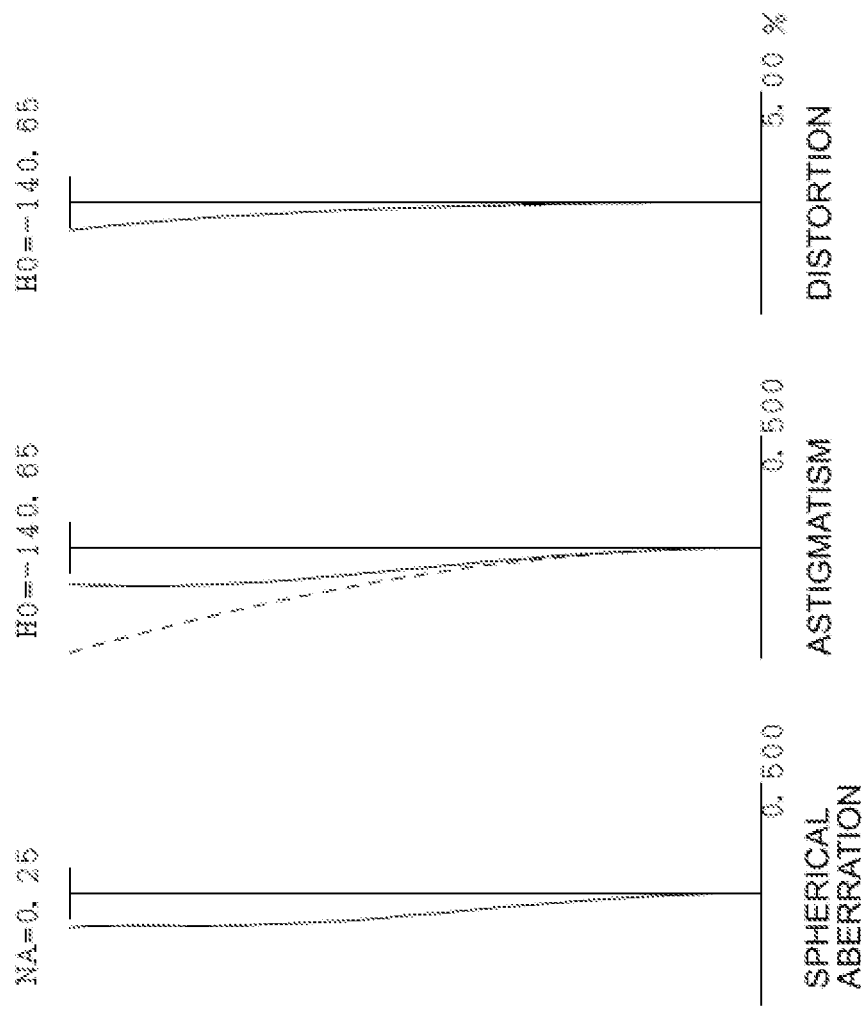

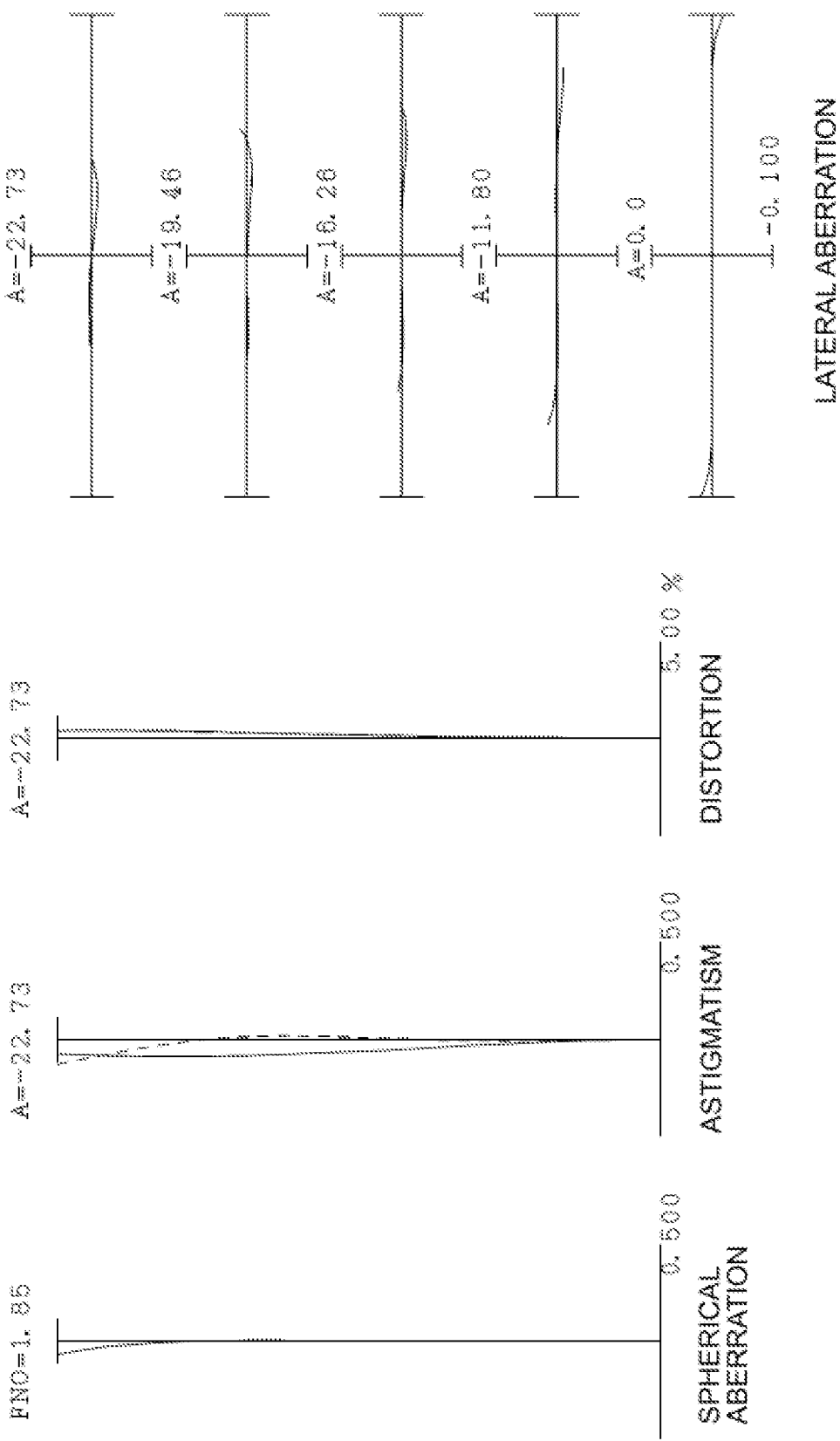

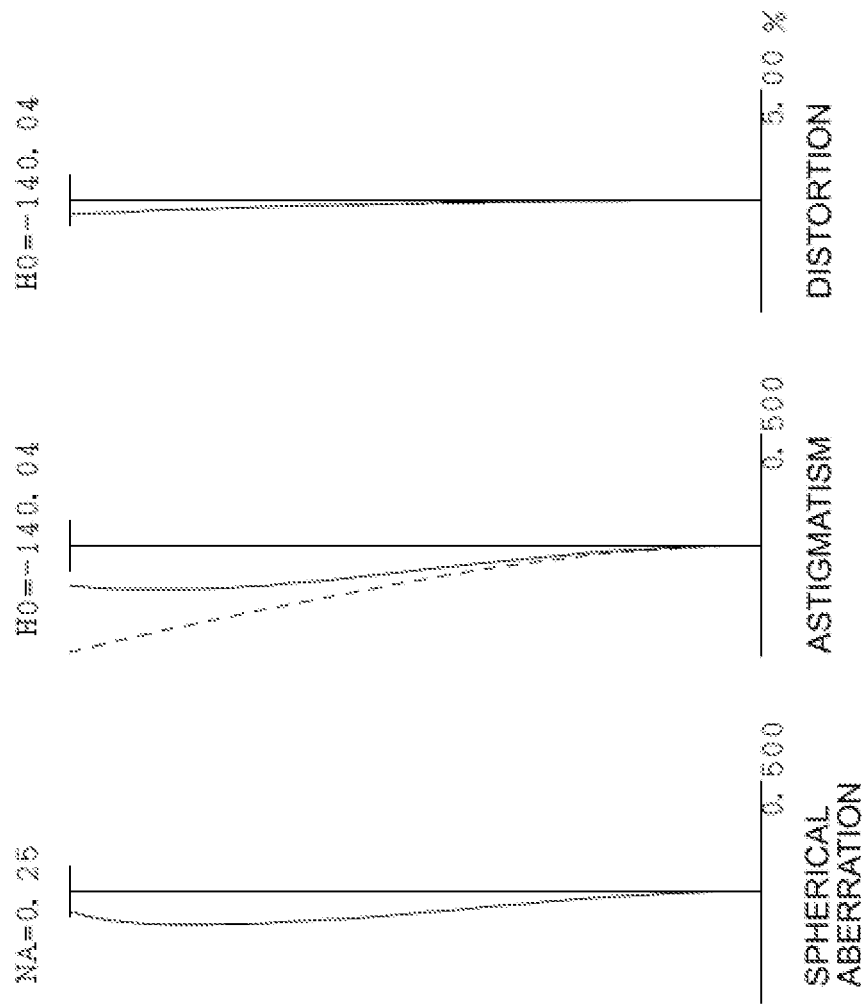

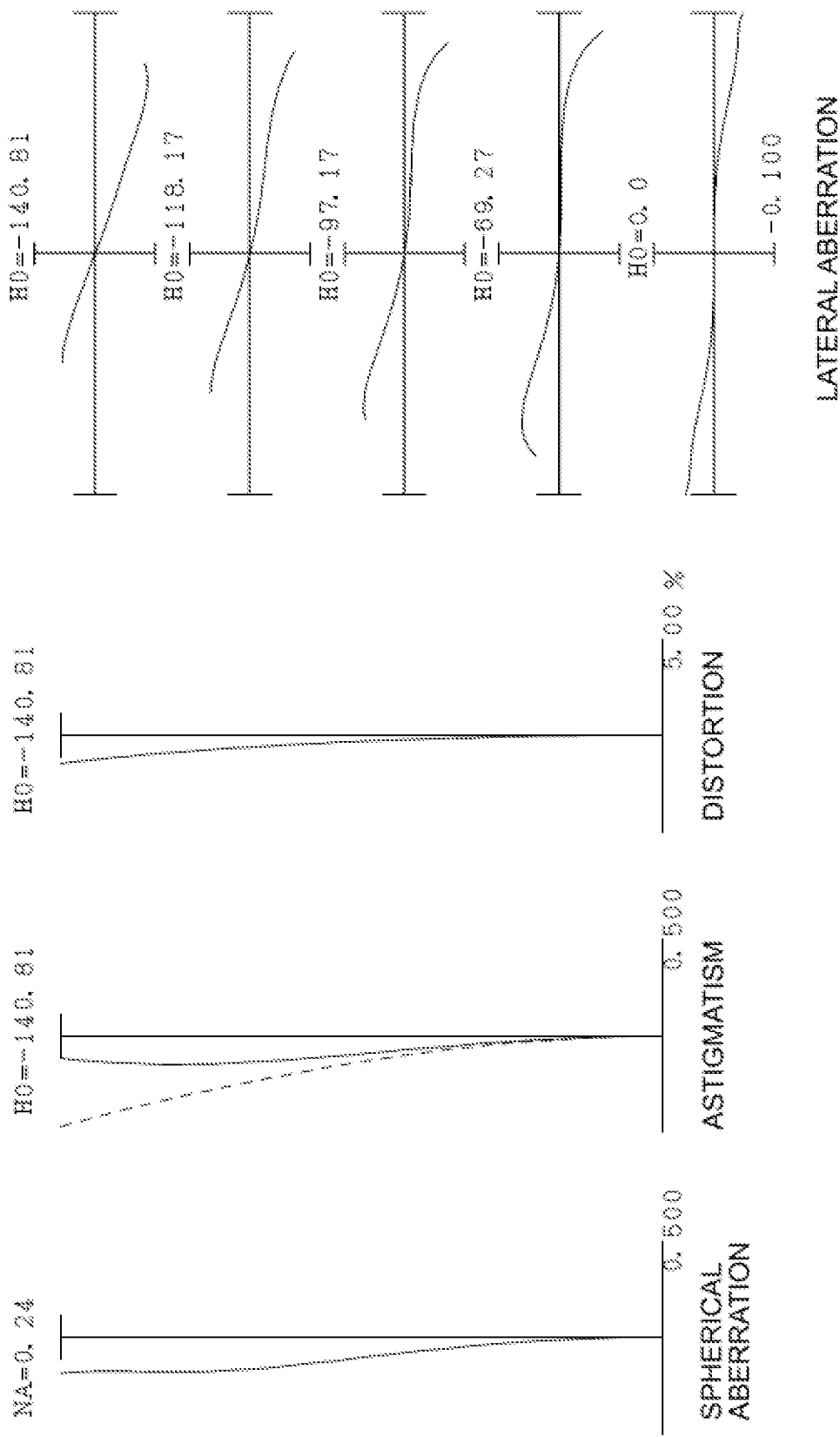

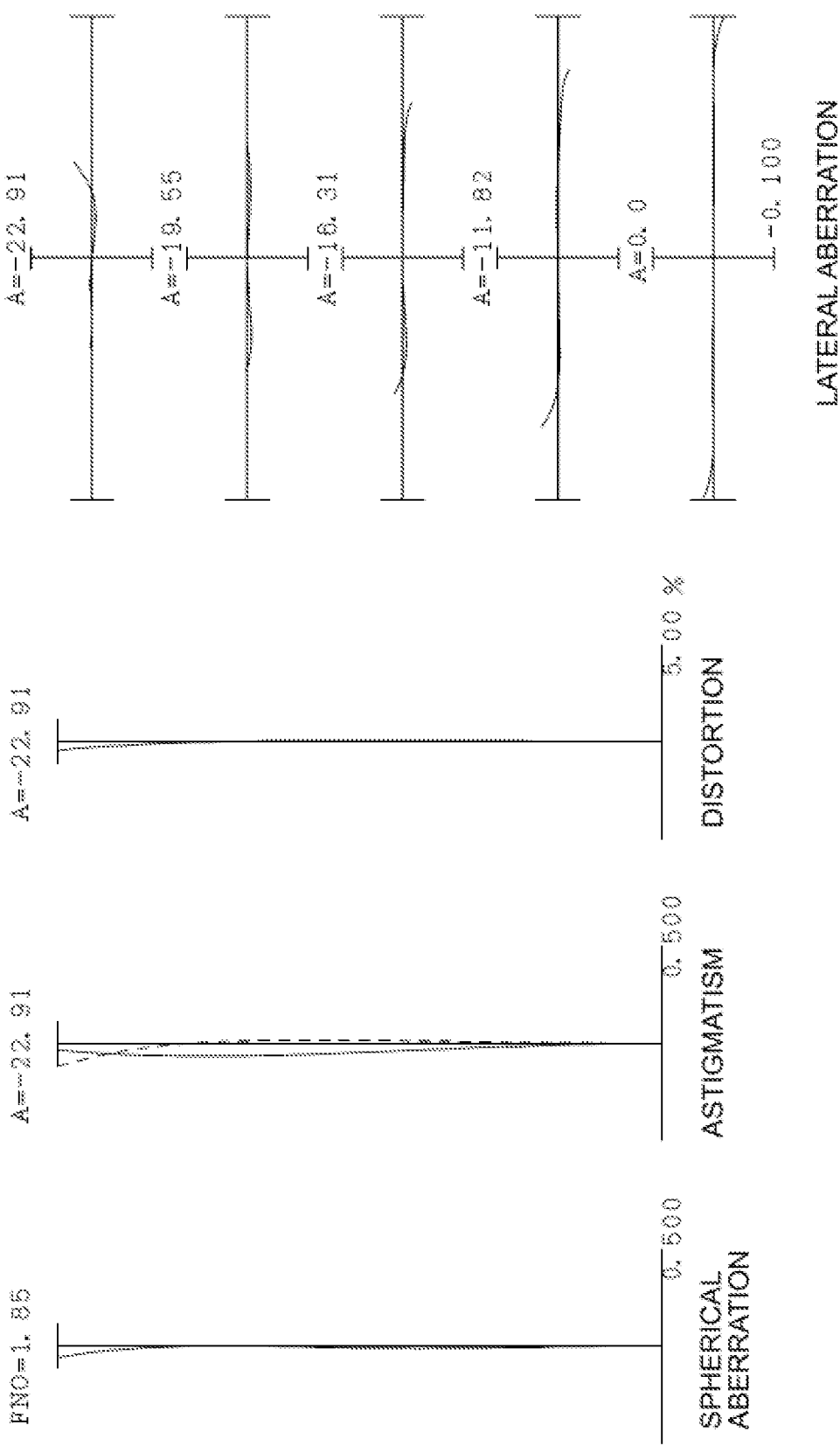

FIG. 16B
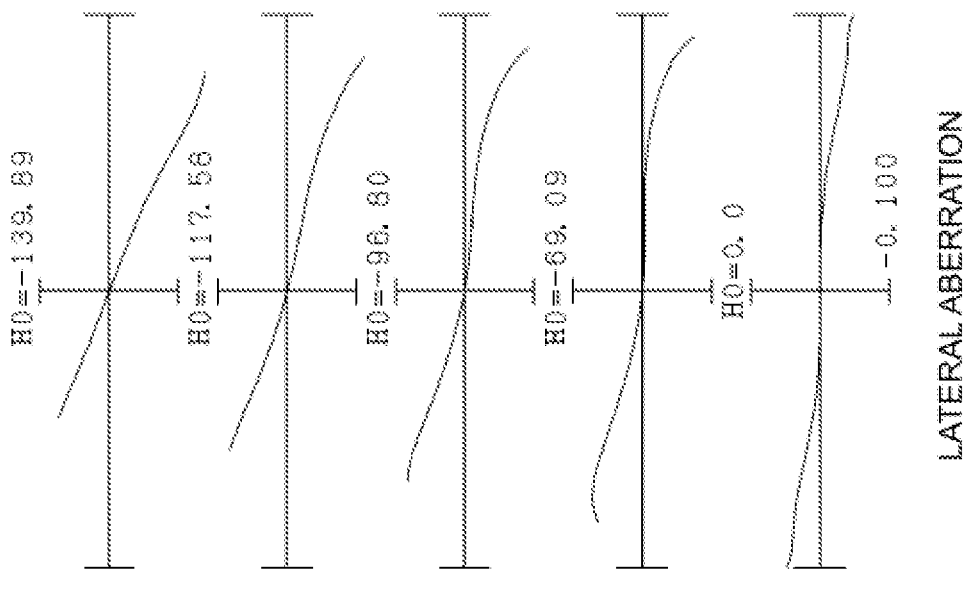
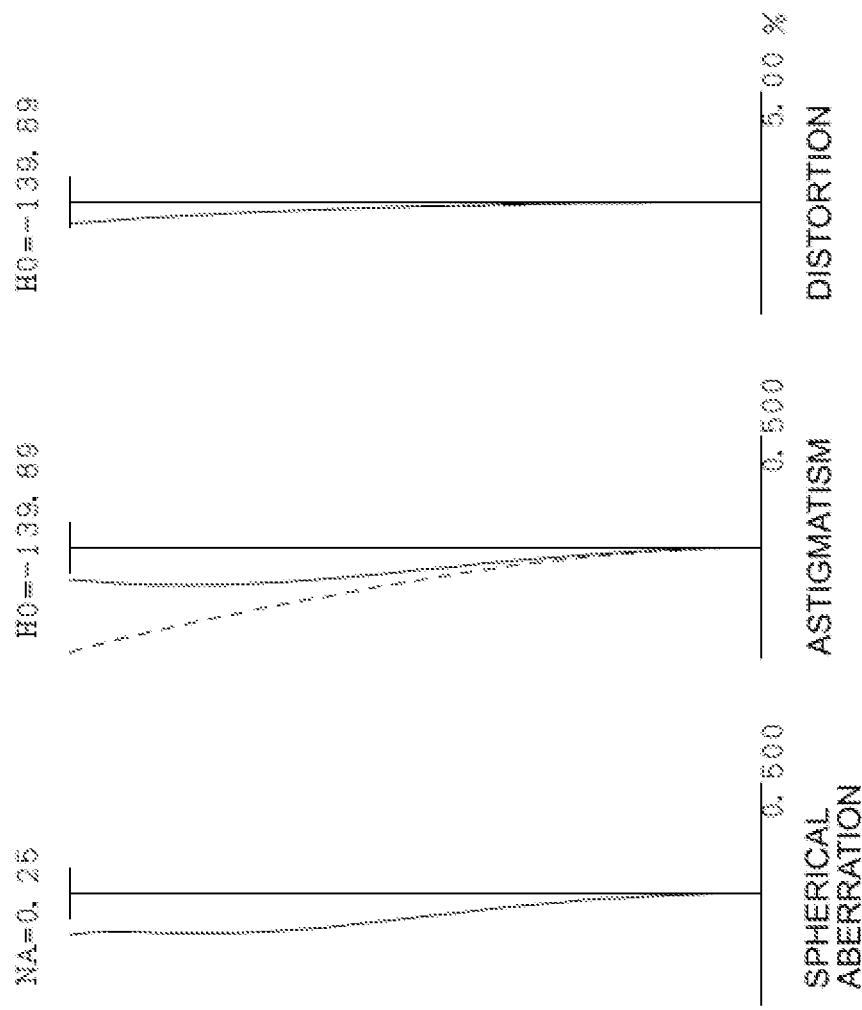

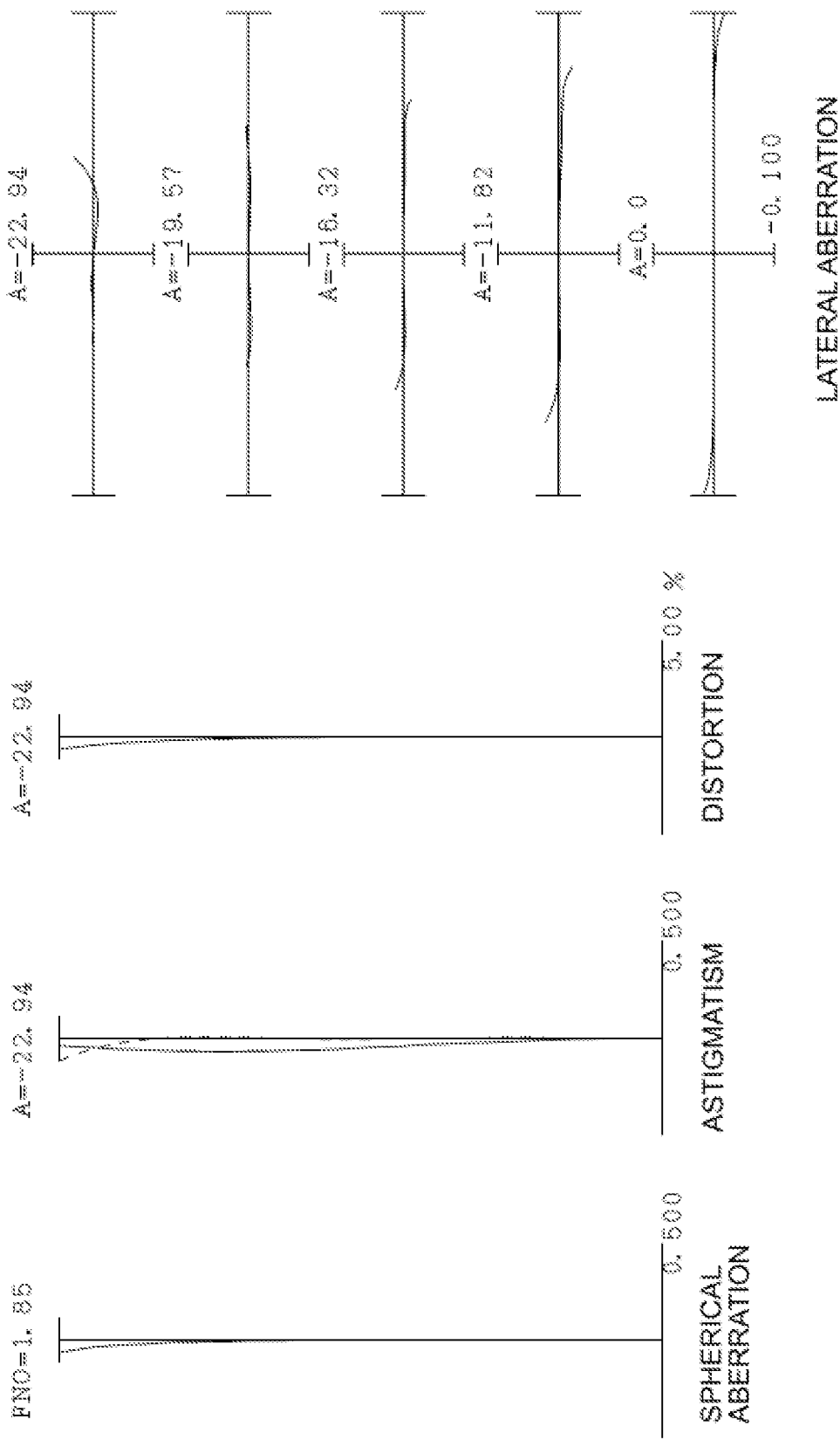

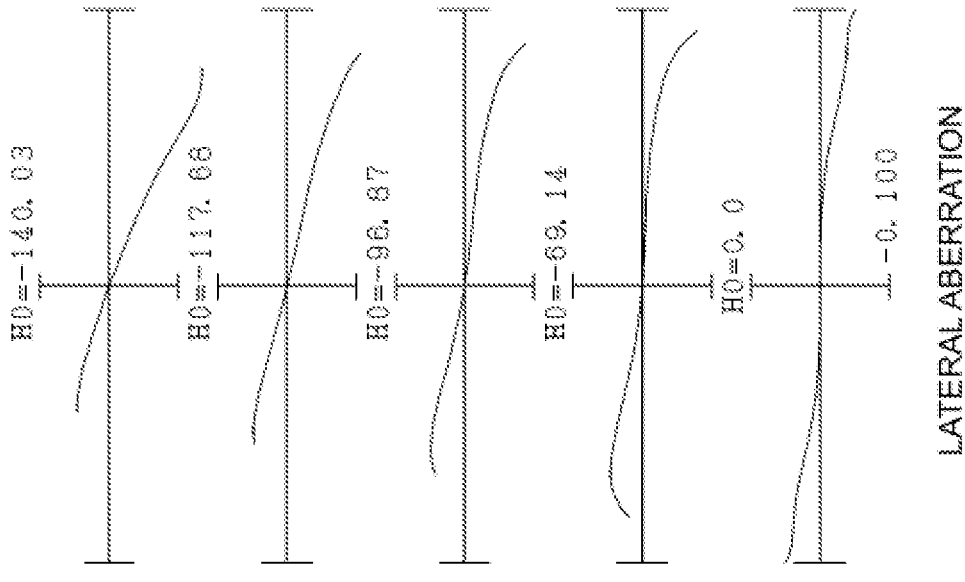
FIG.18B
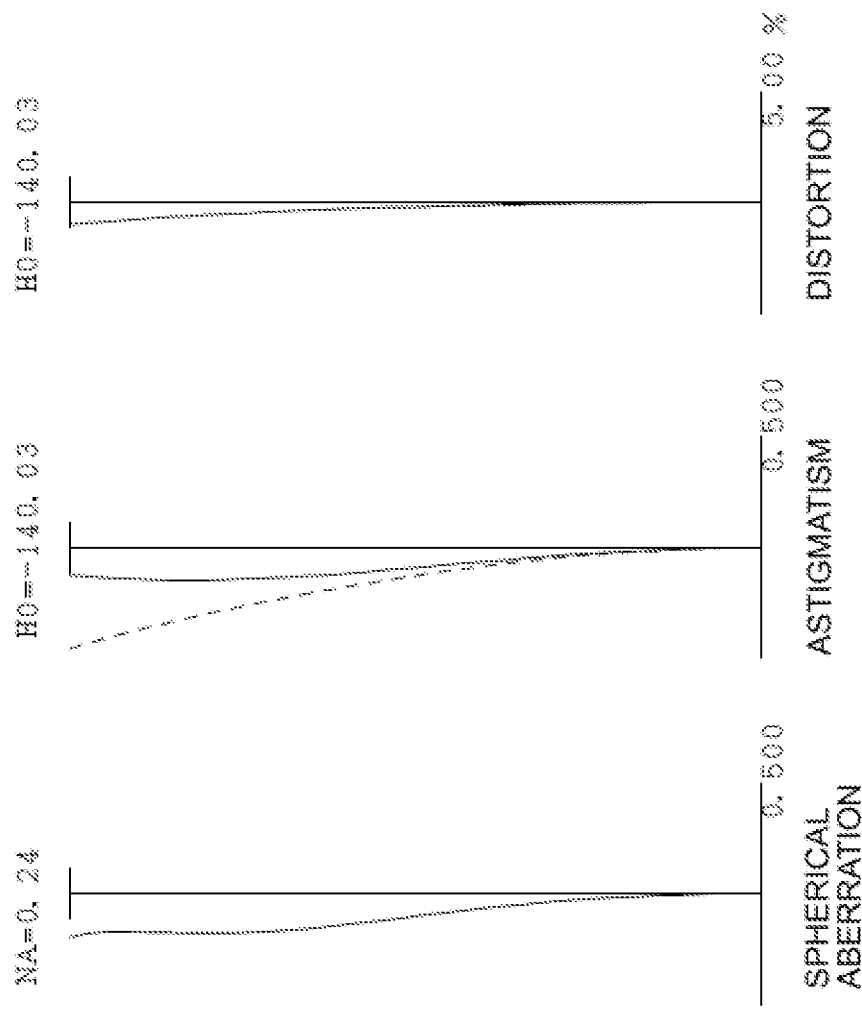

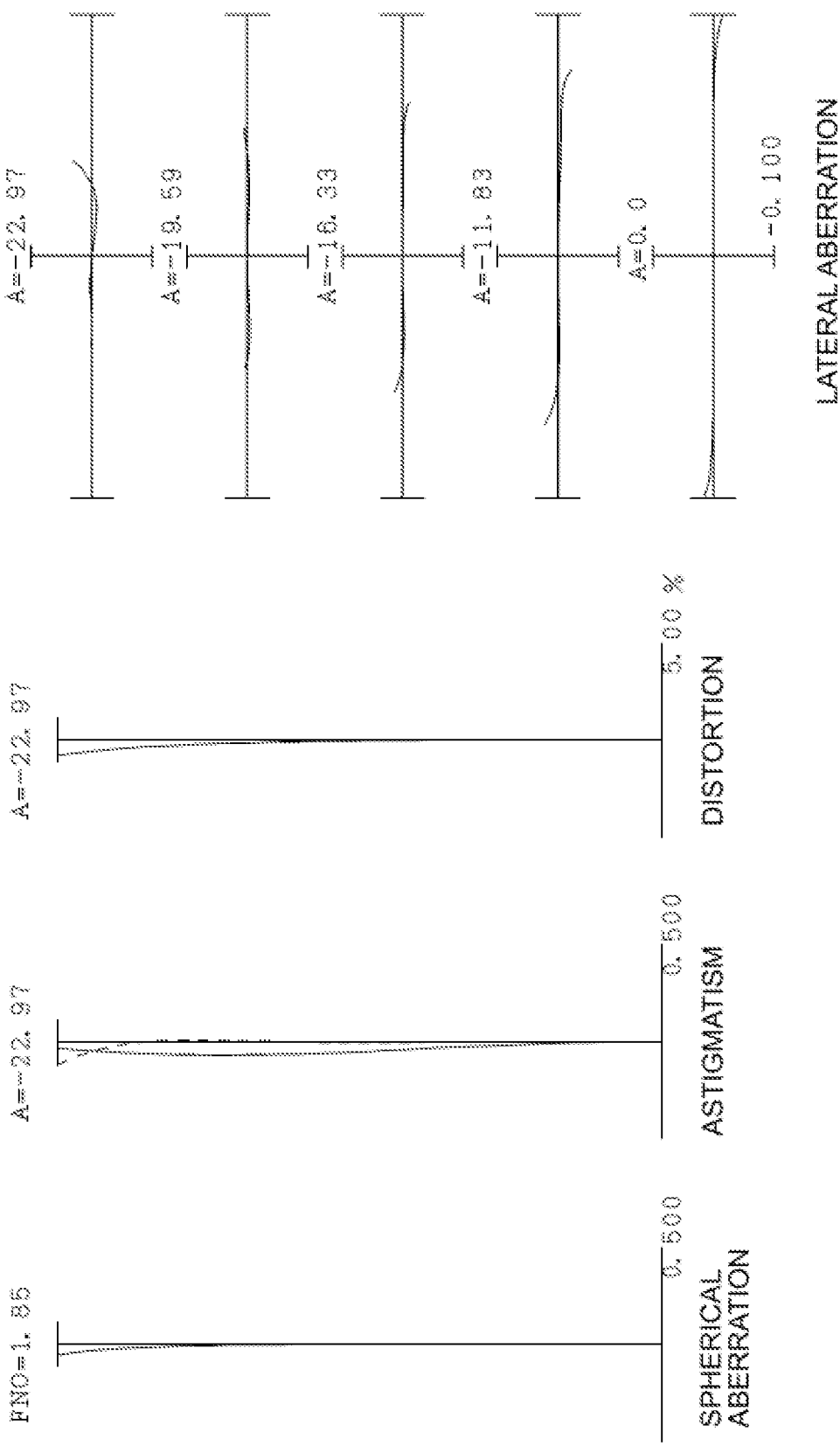

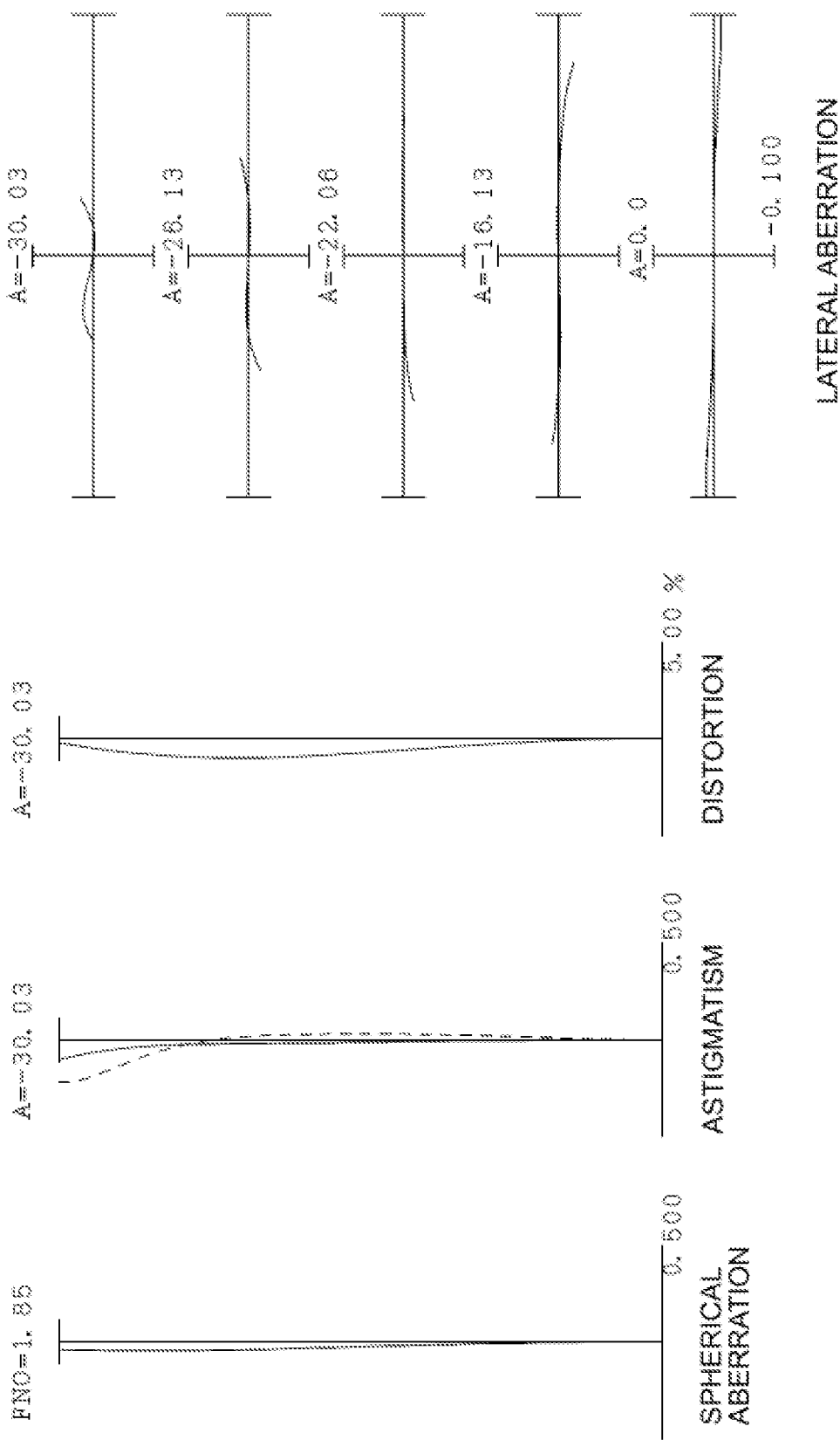

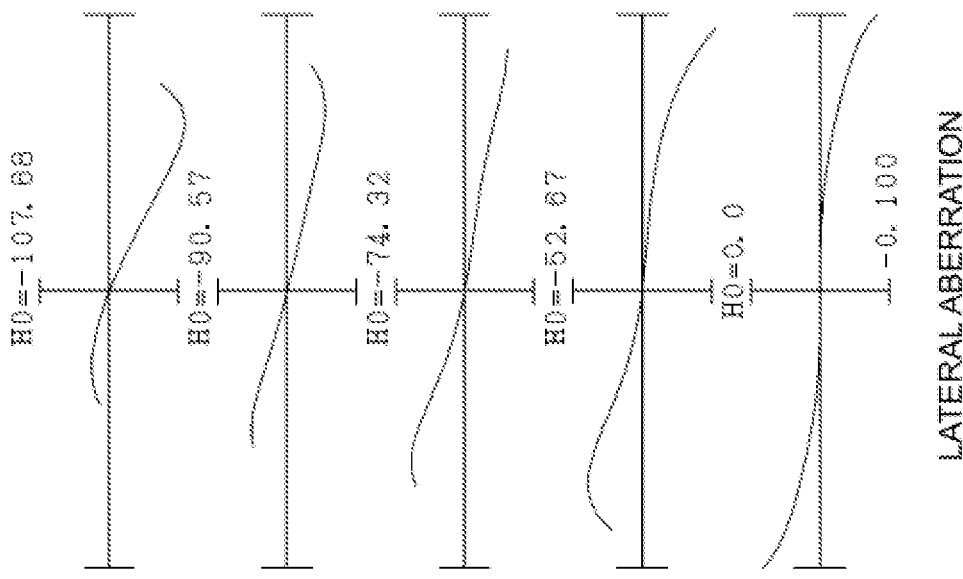
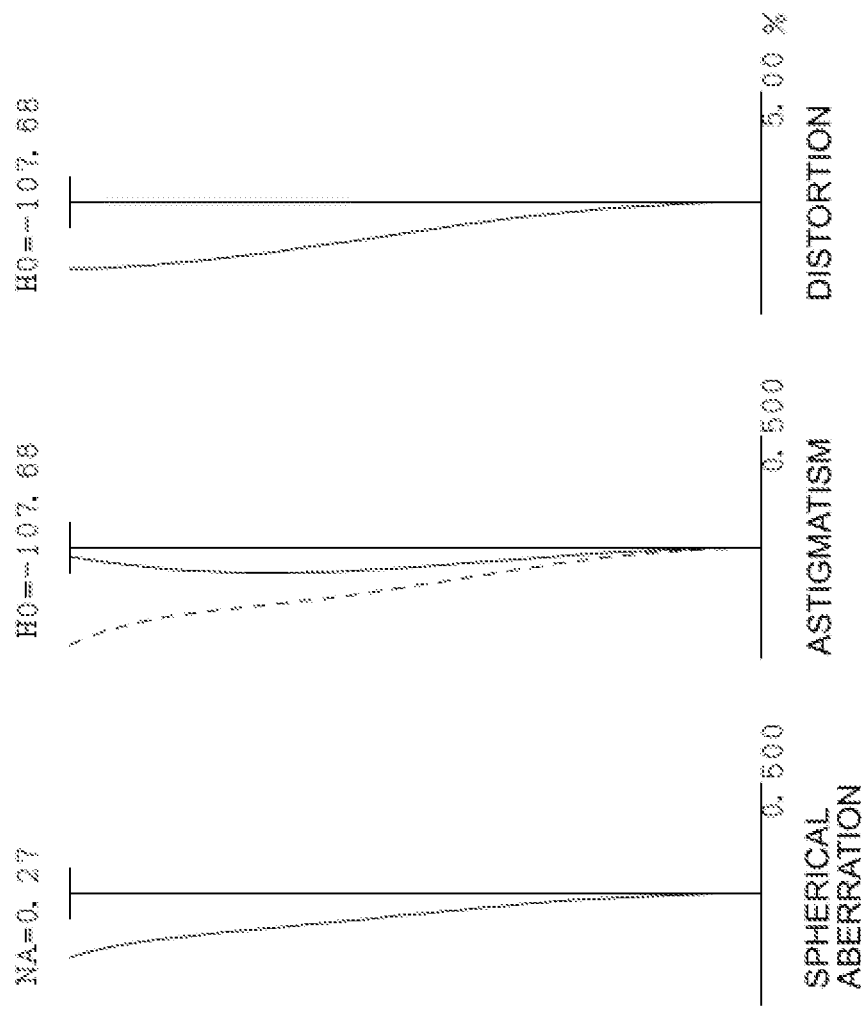
FIG.22B

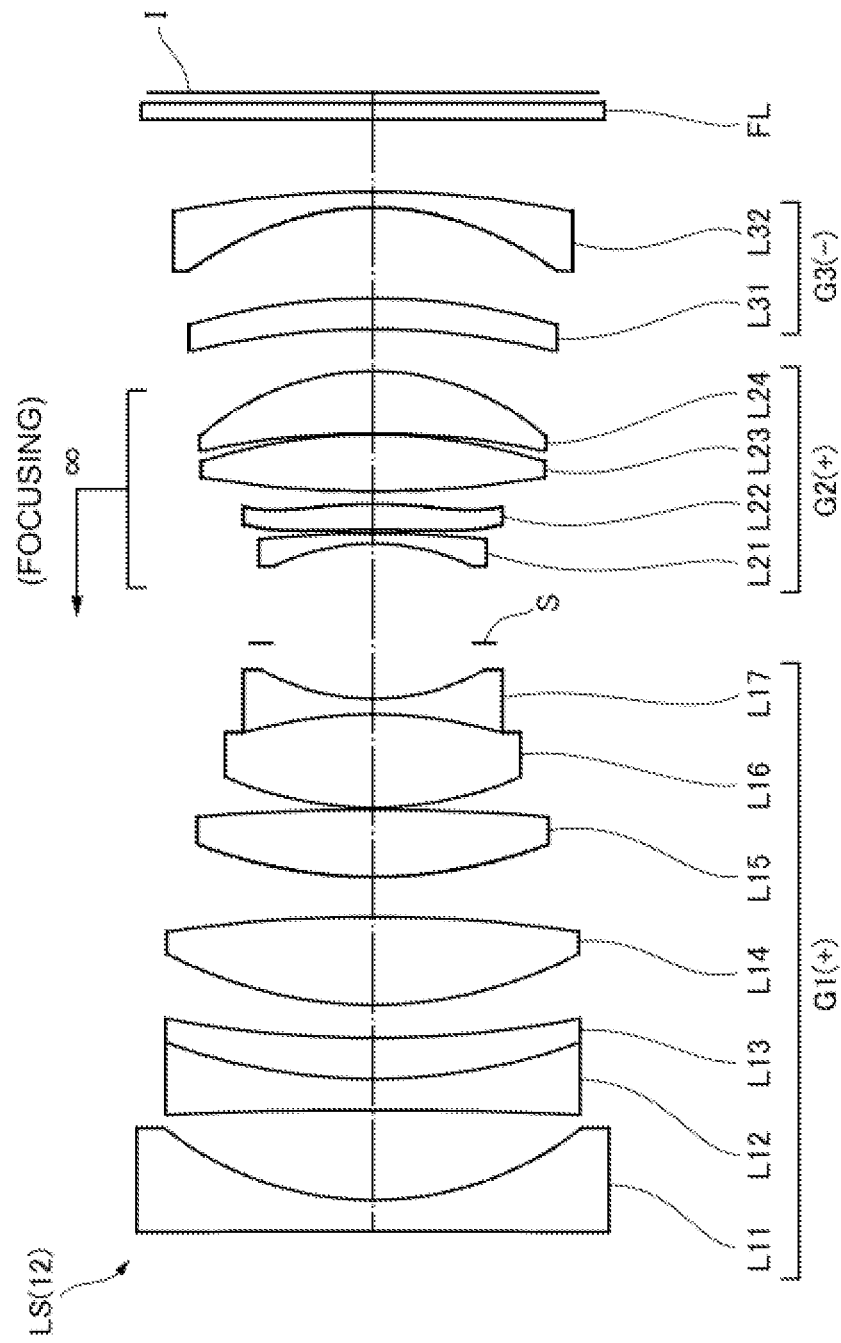

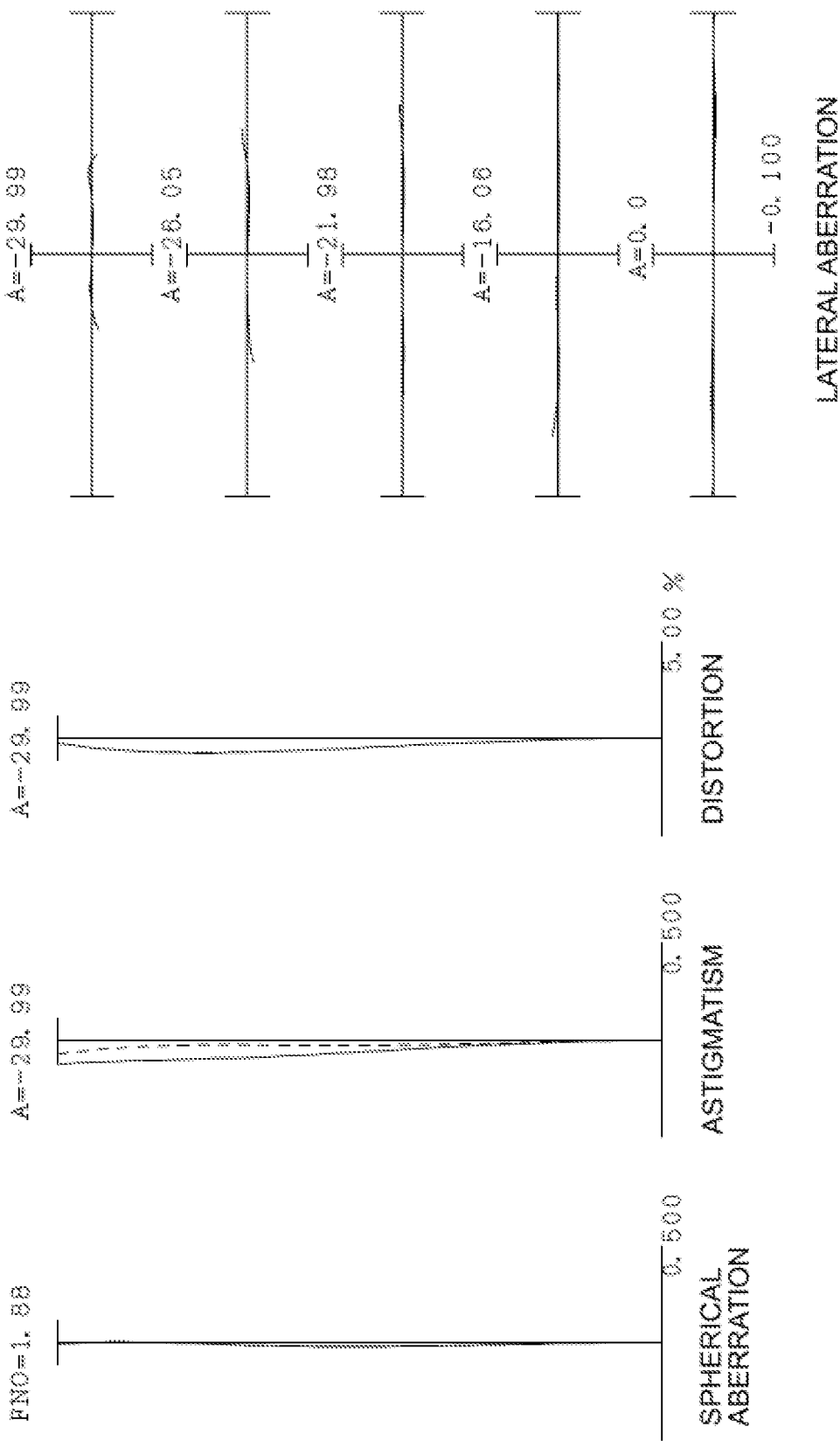

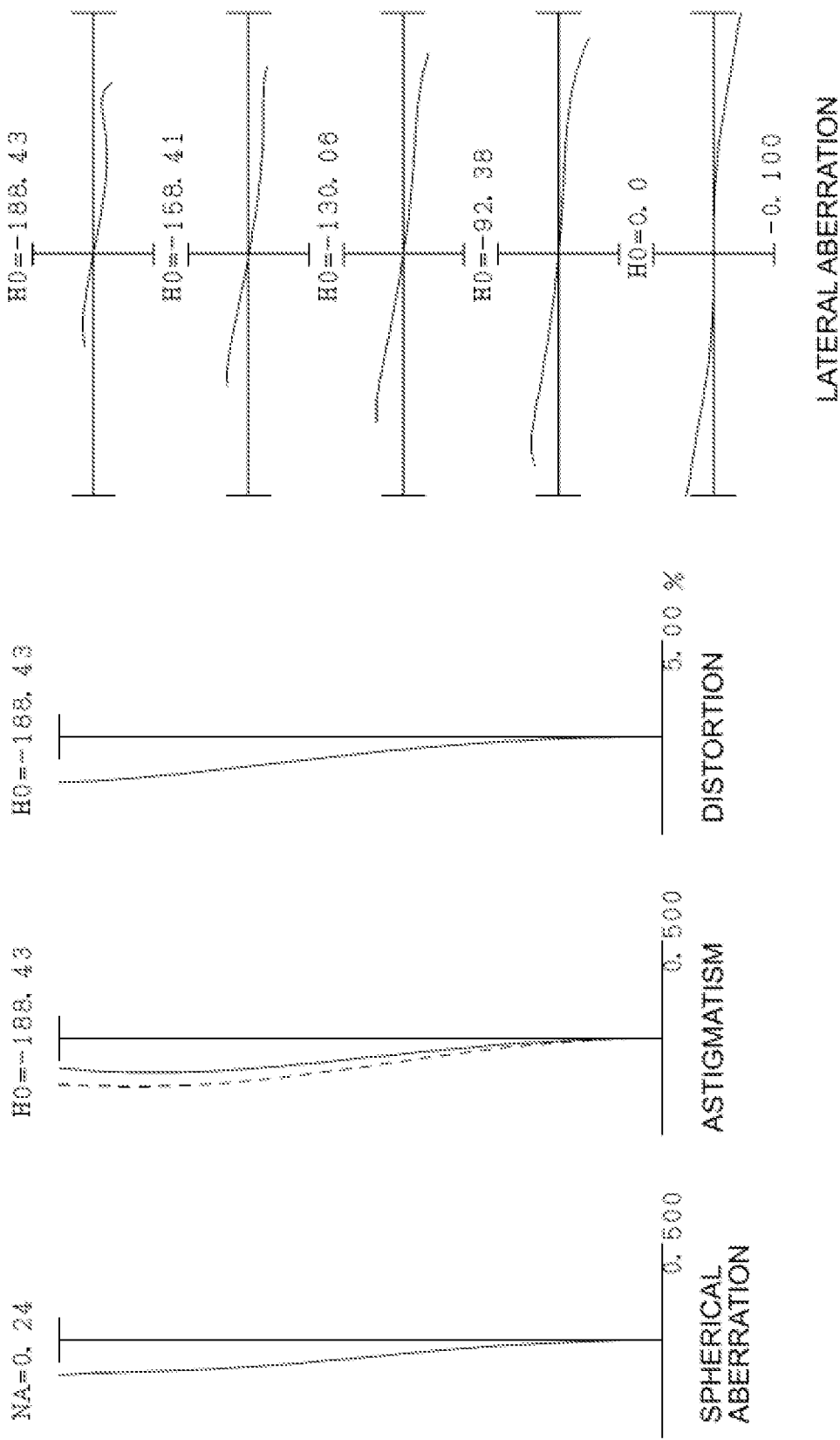

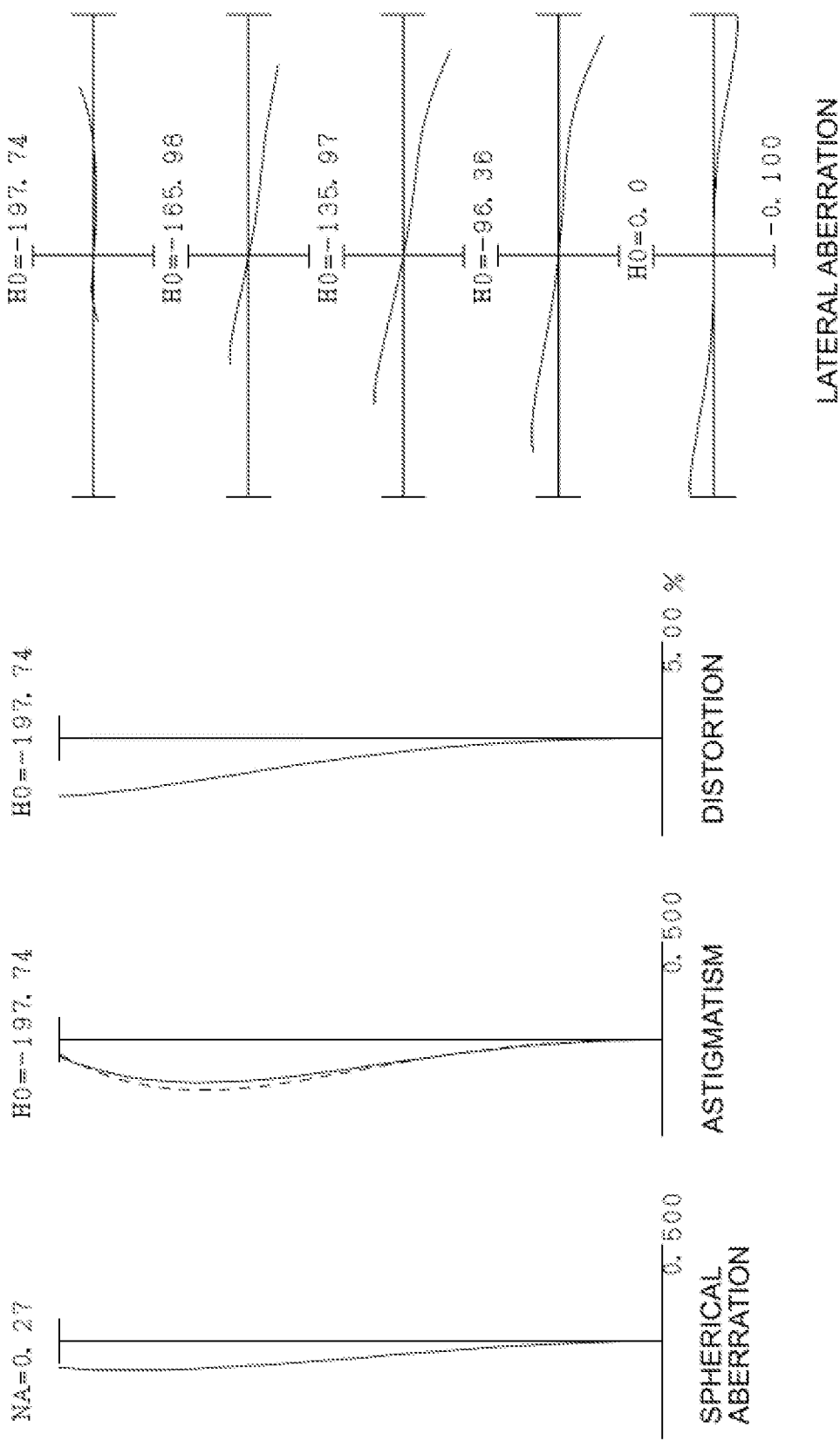

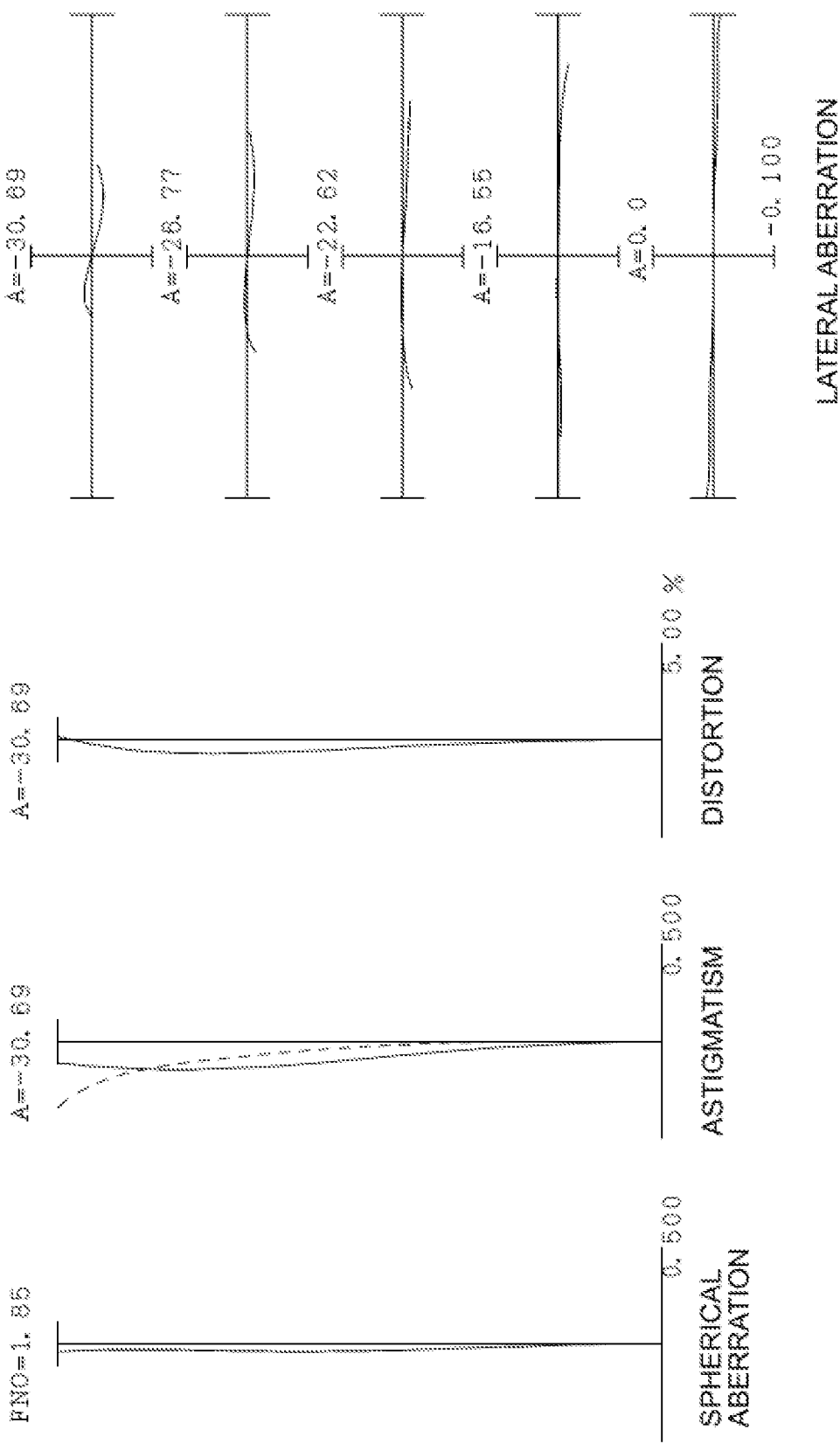

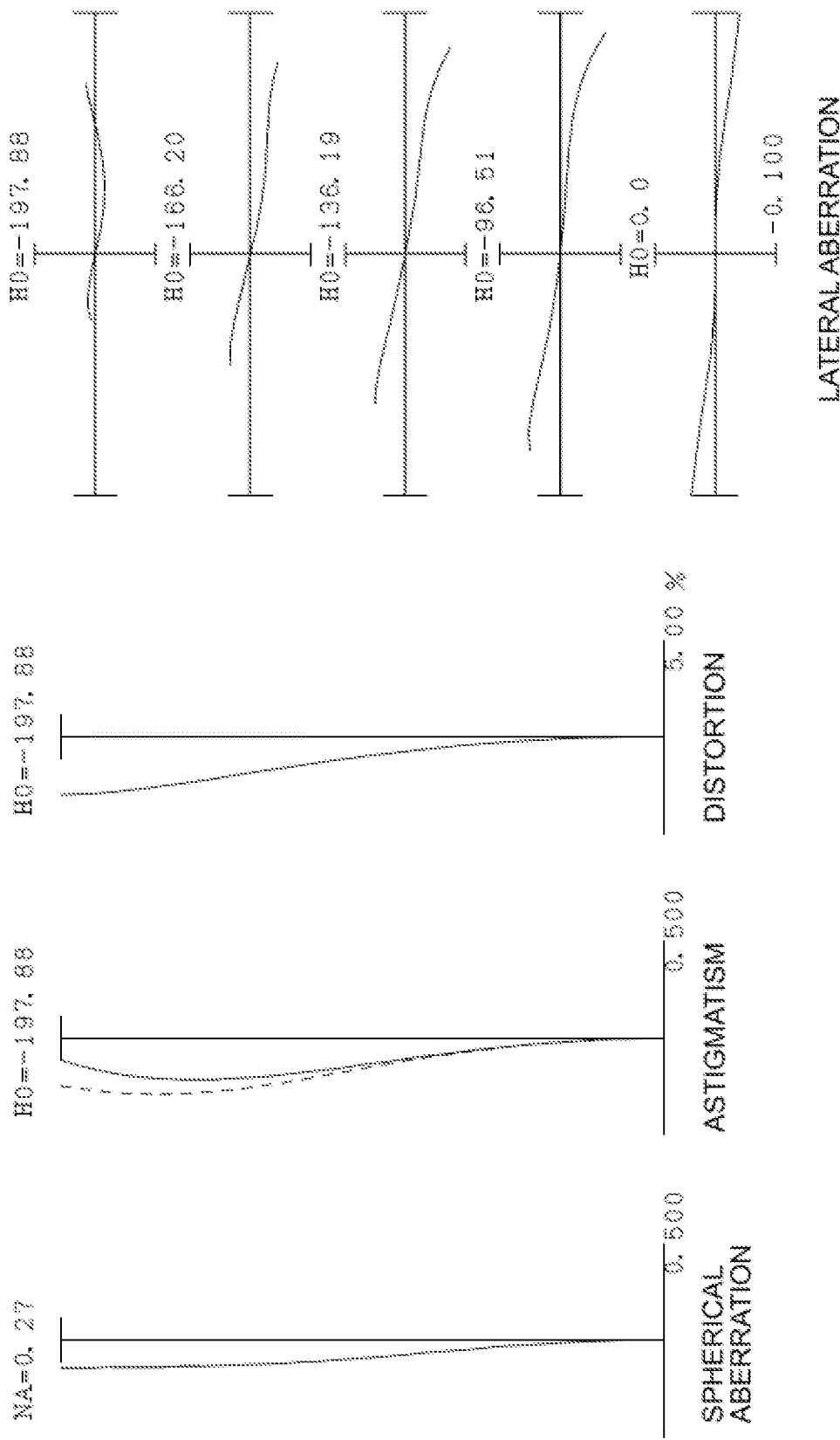

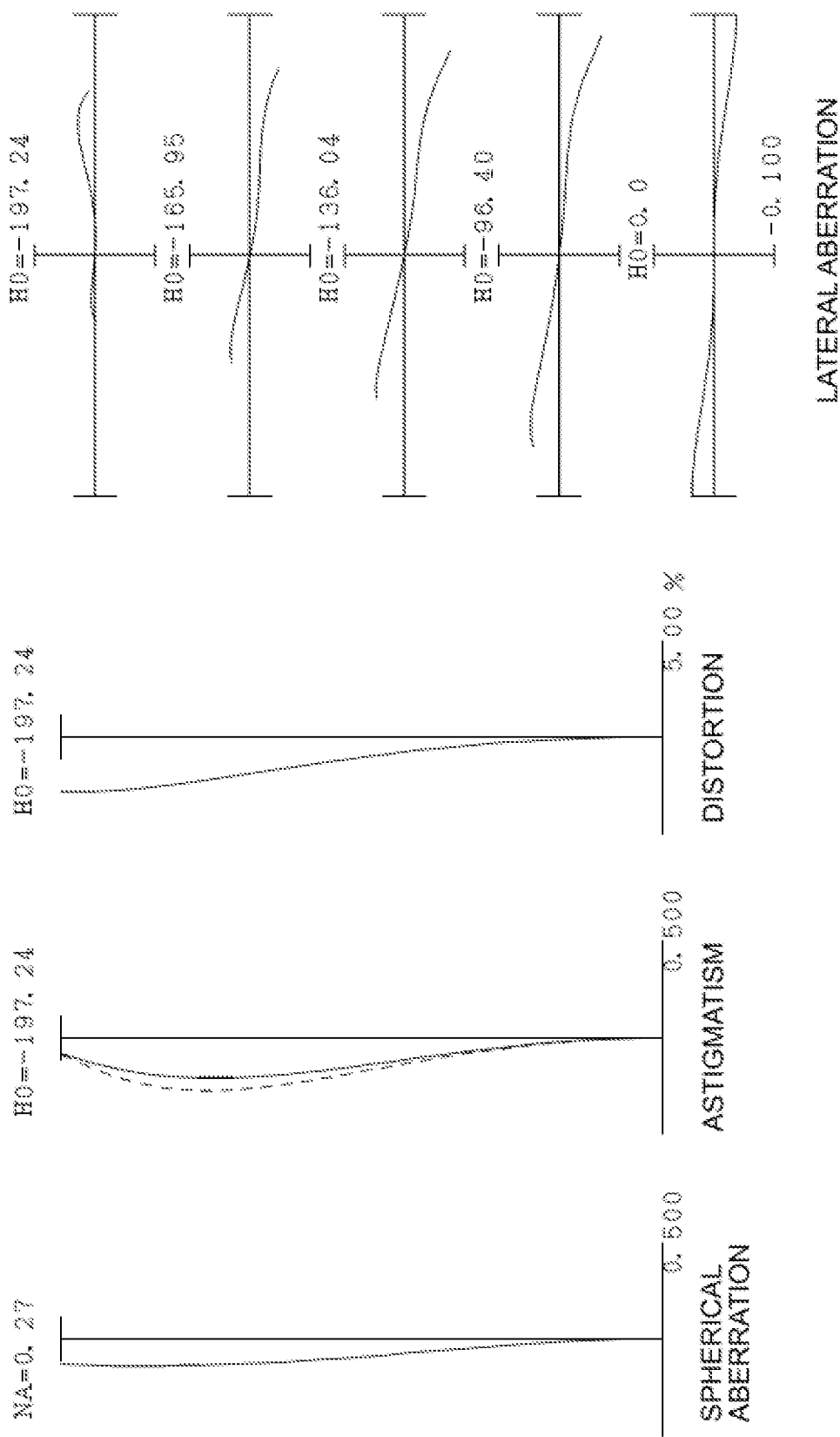

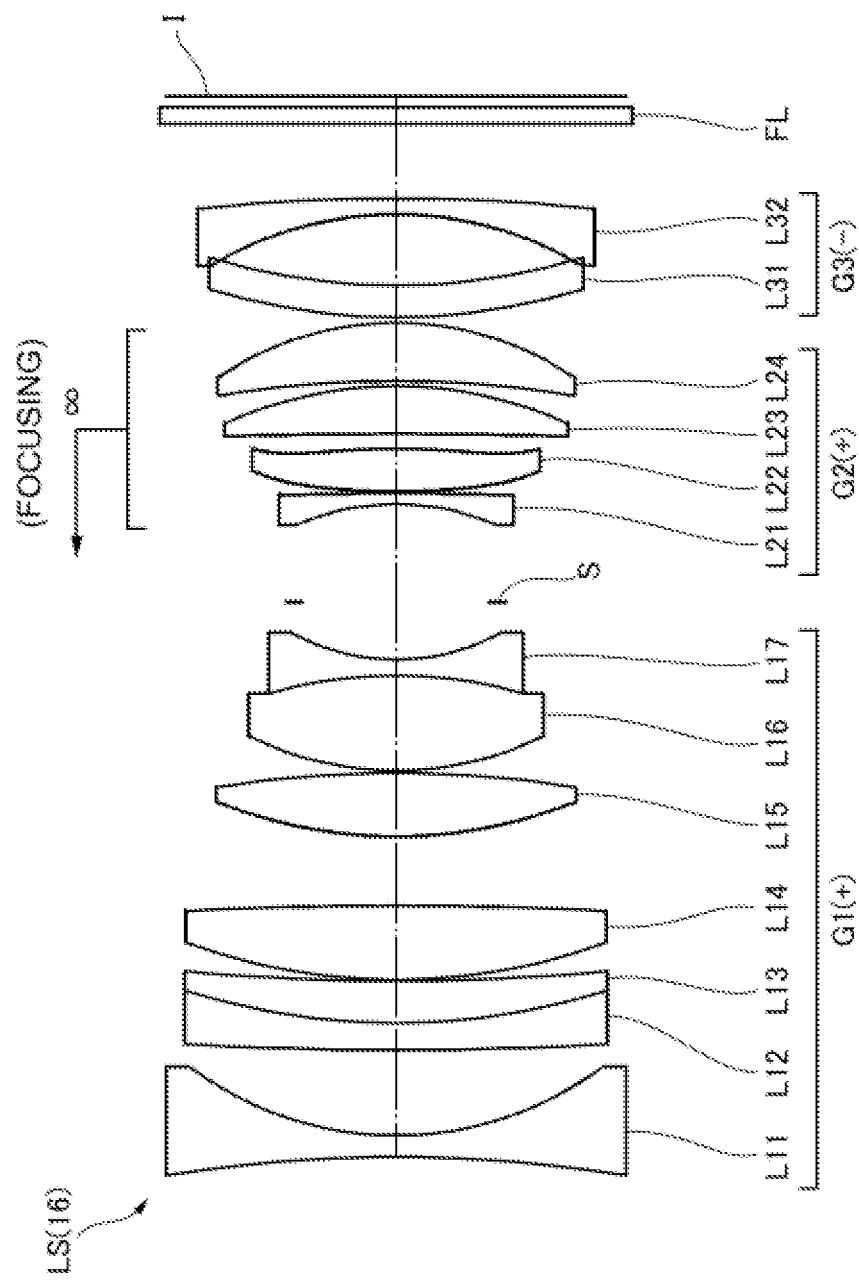

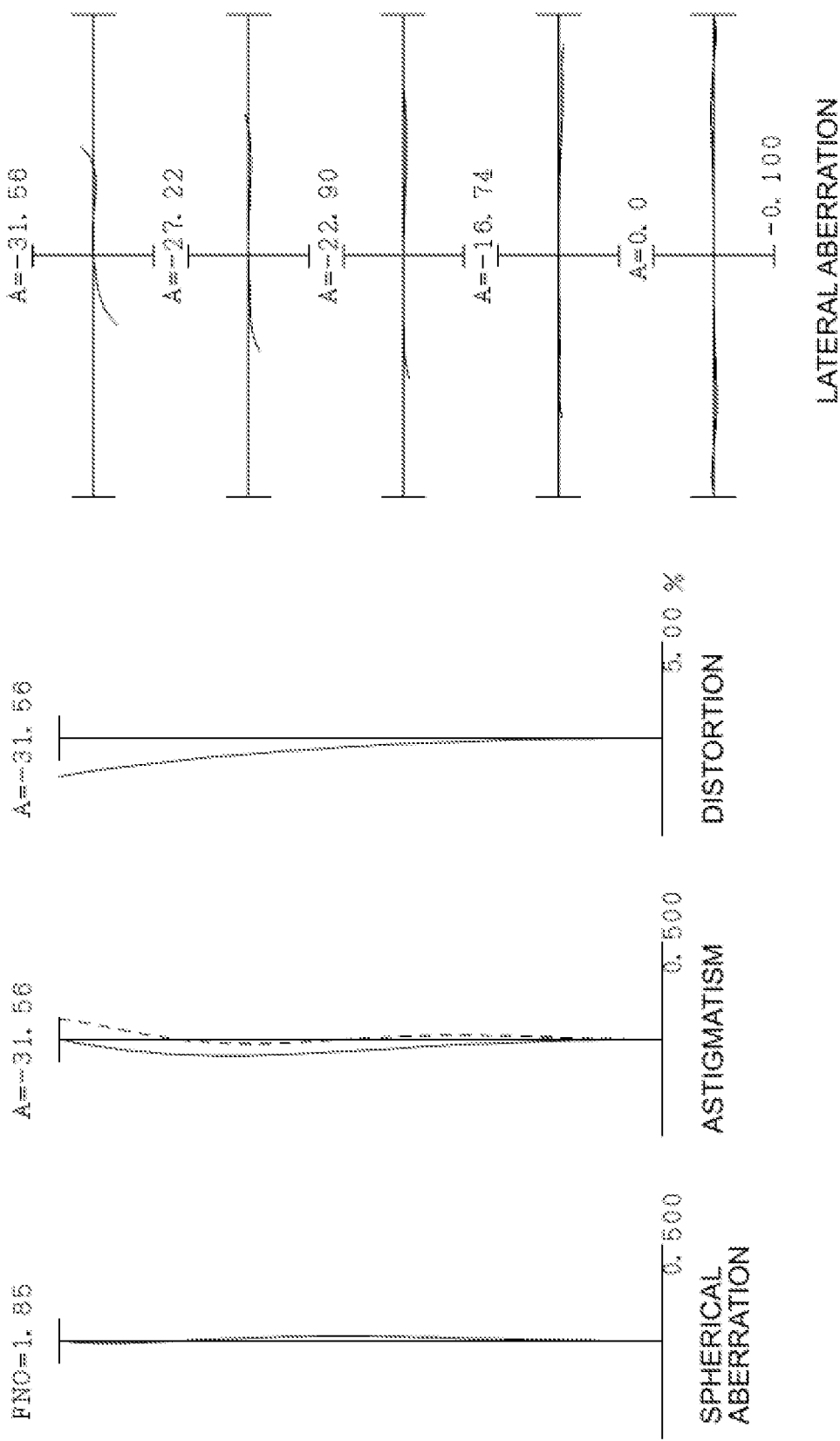

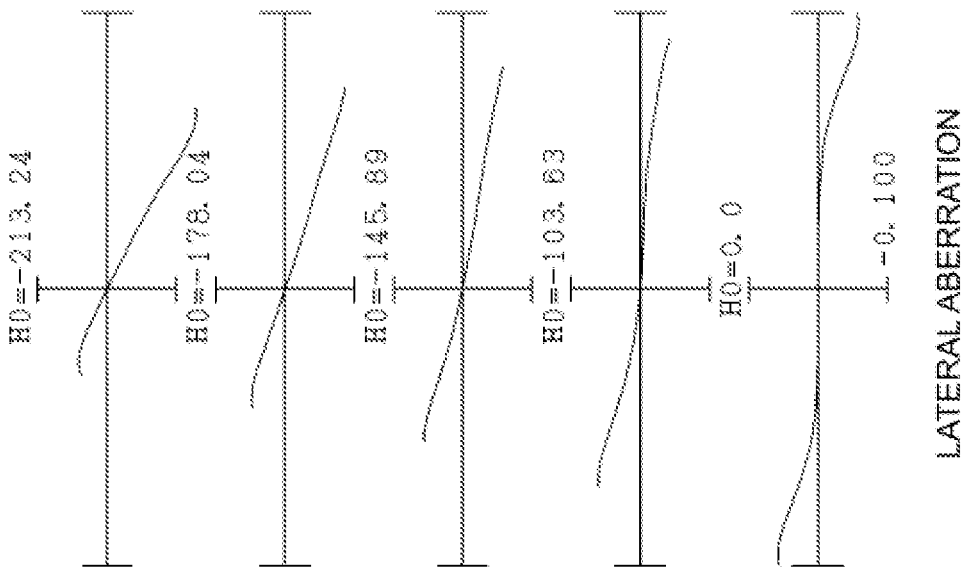
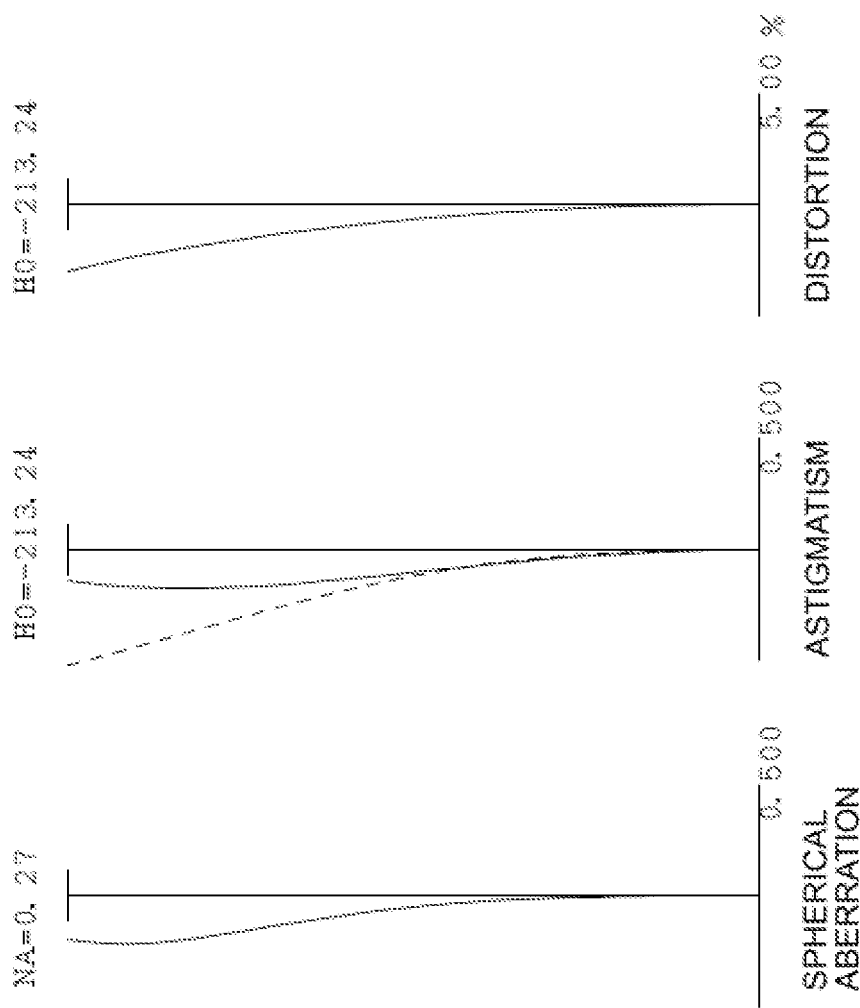
FIG.34B

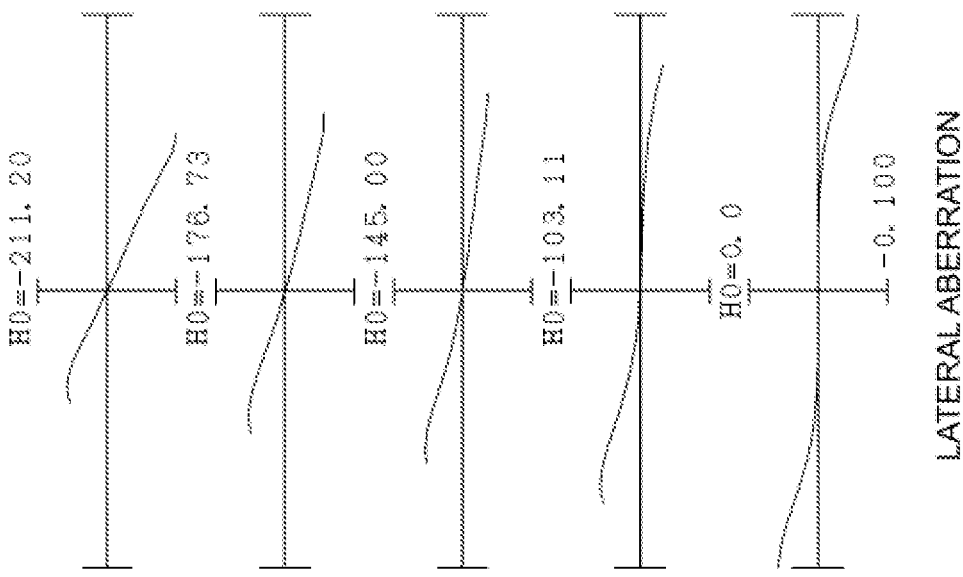
FIG.36B
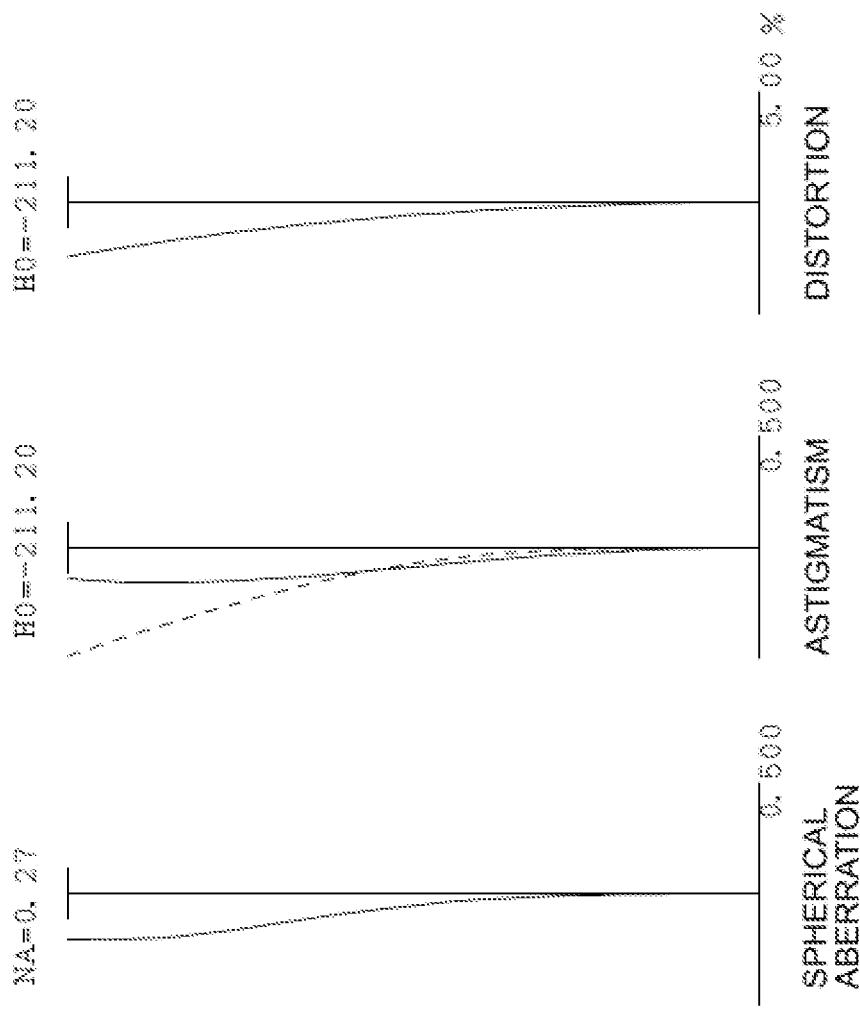

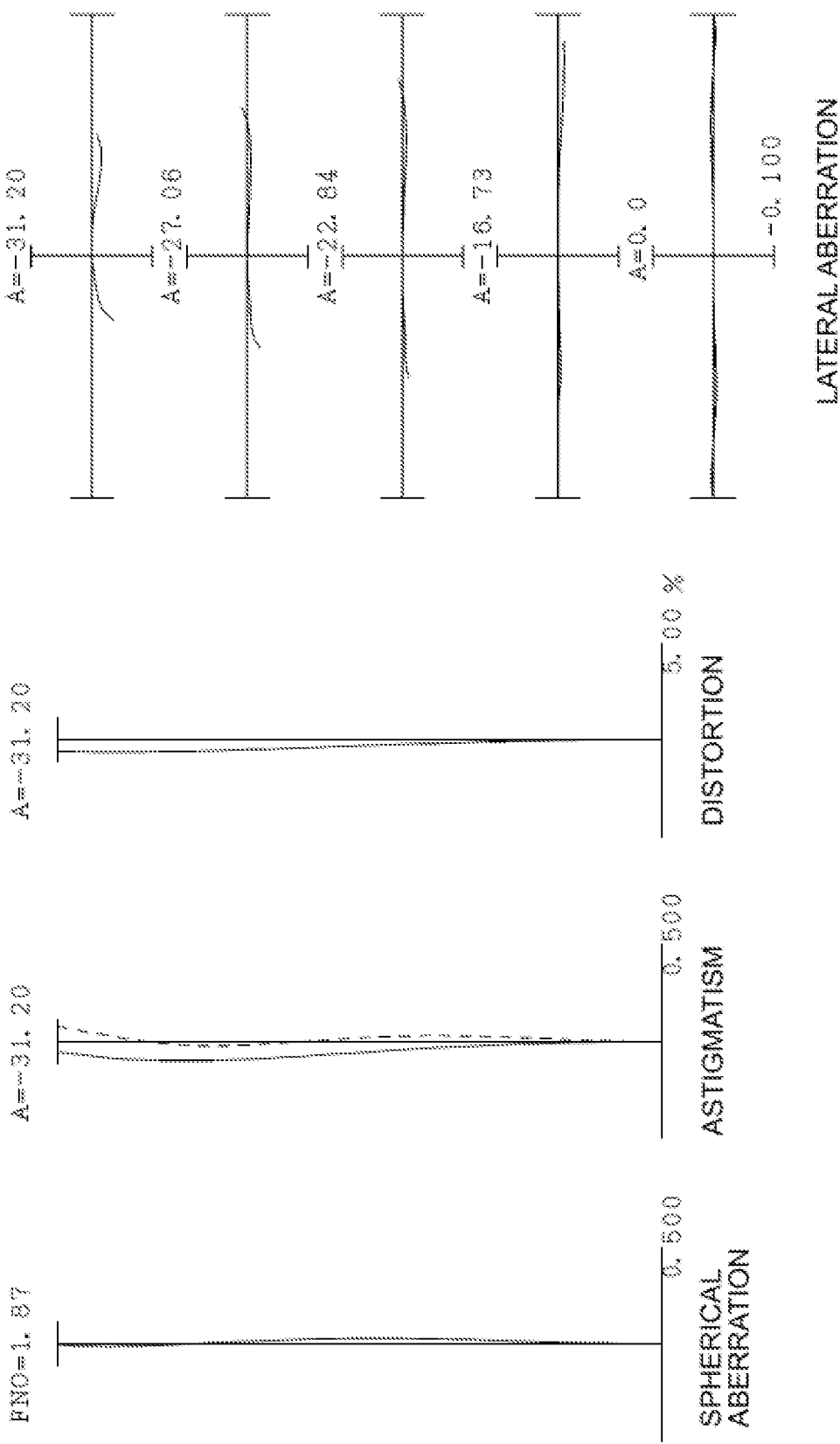

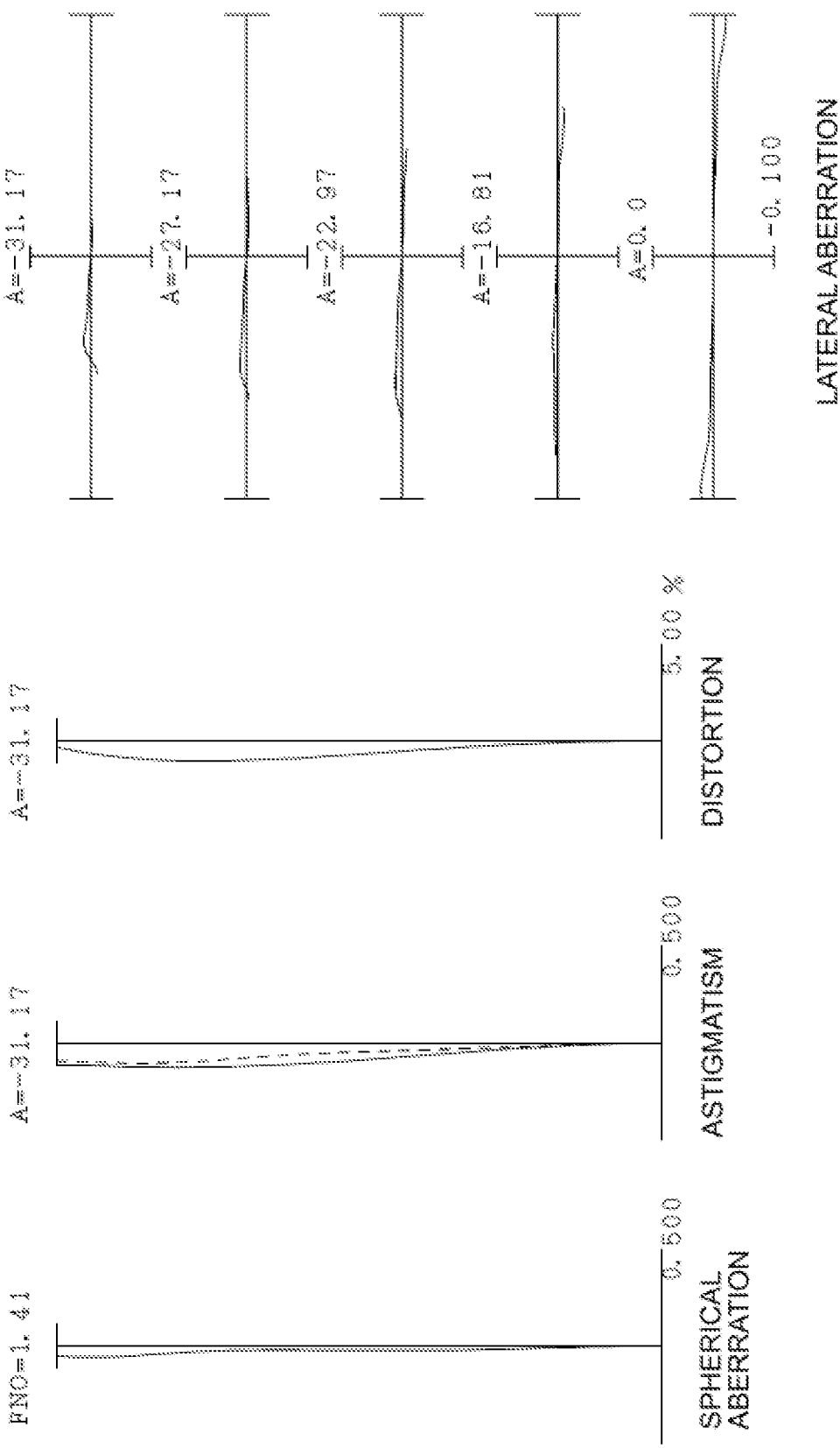

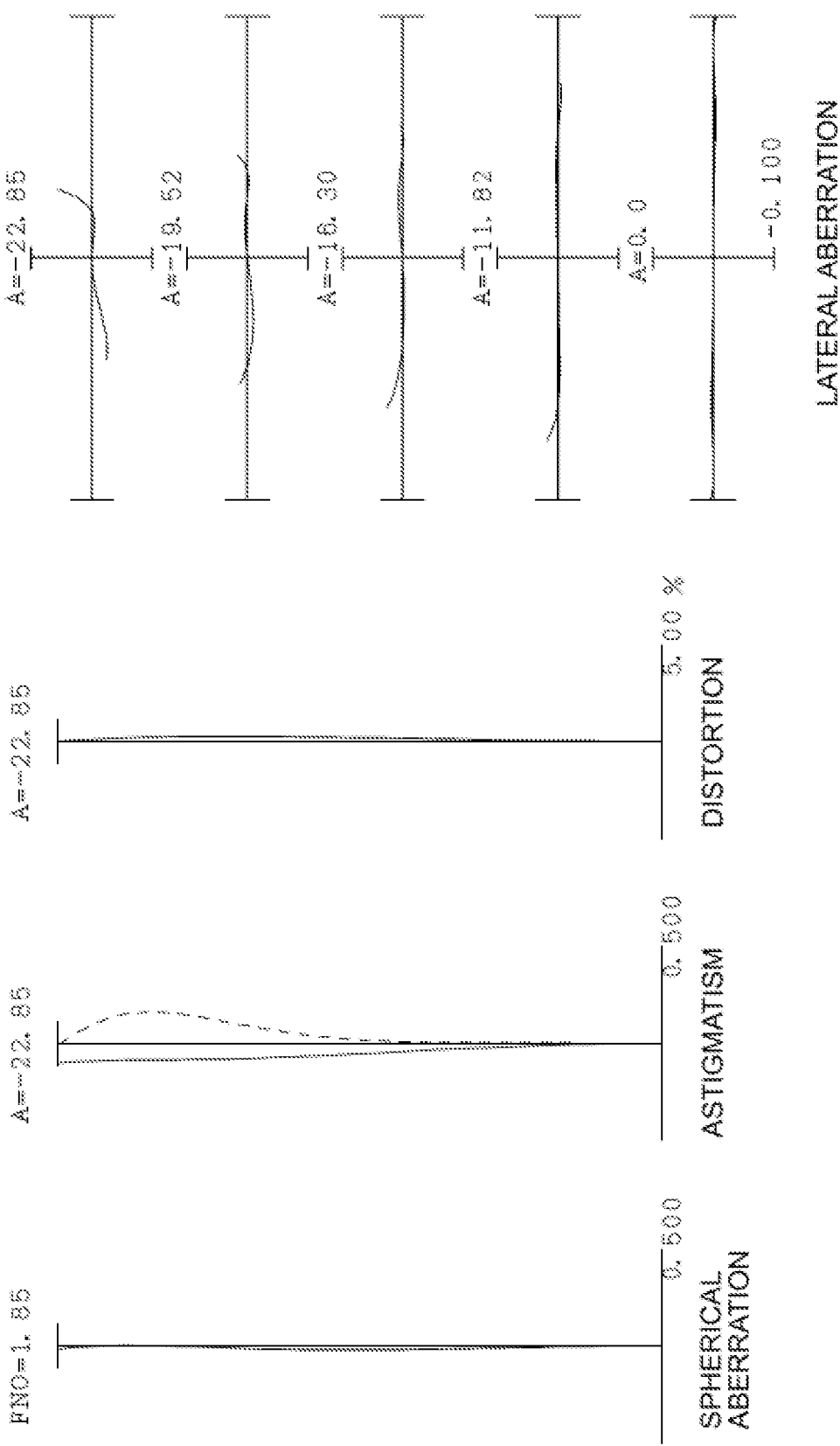

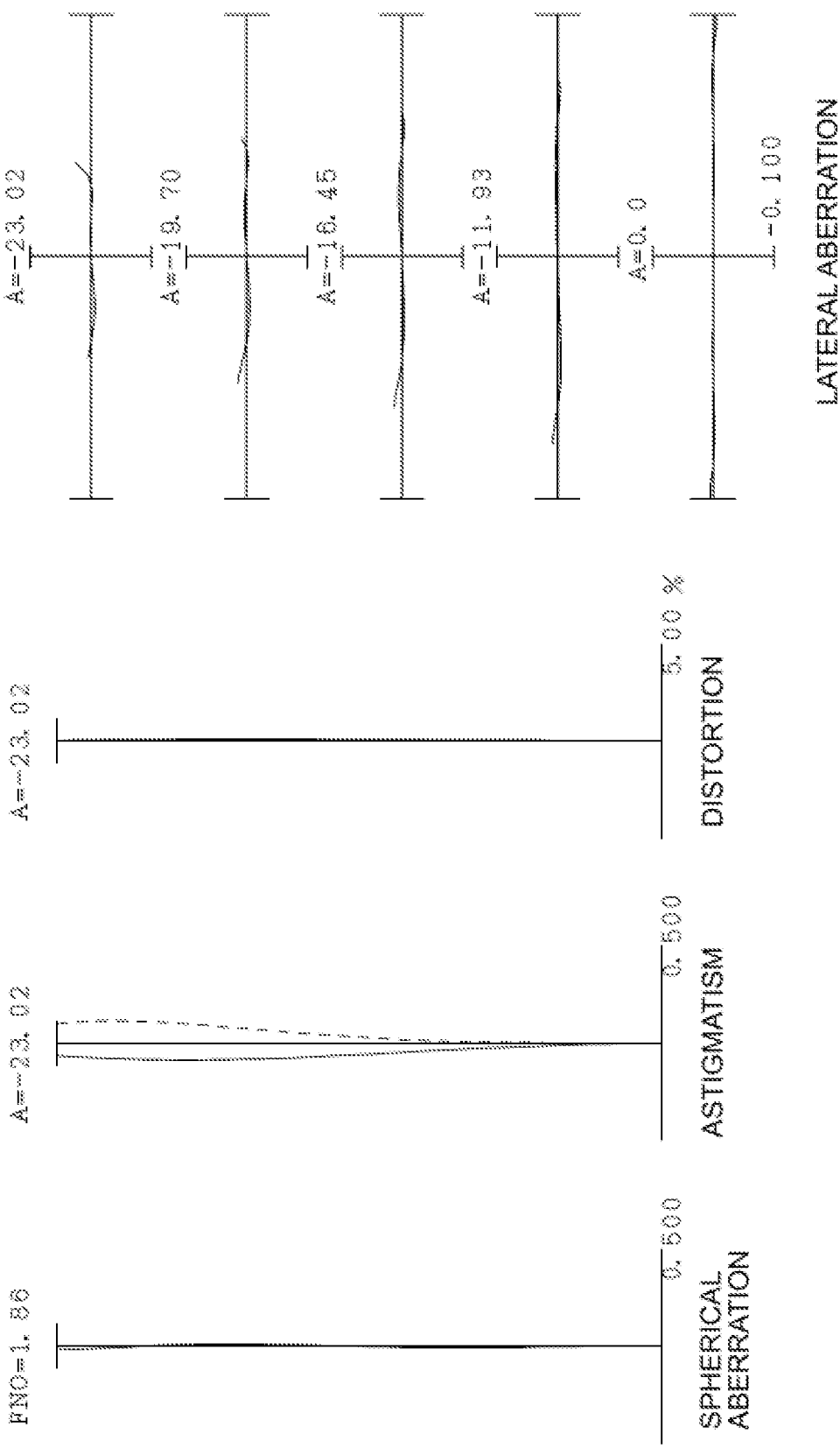

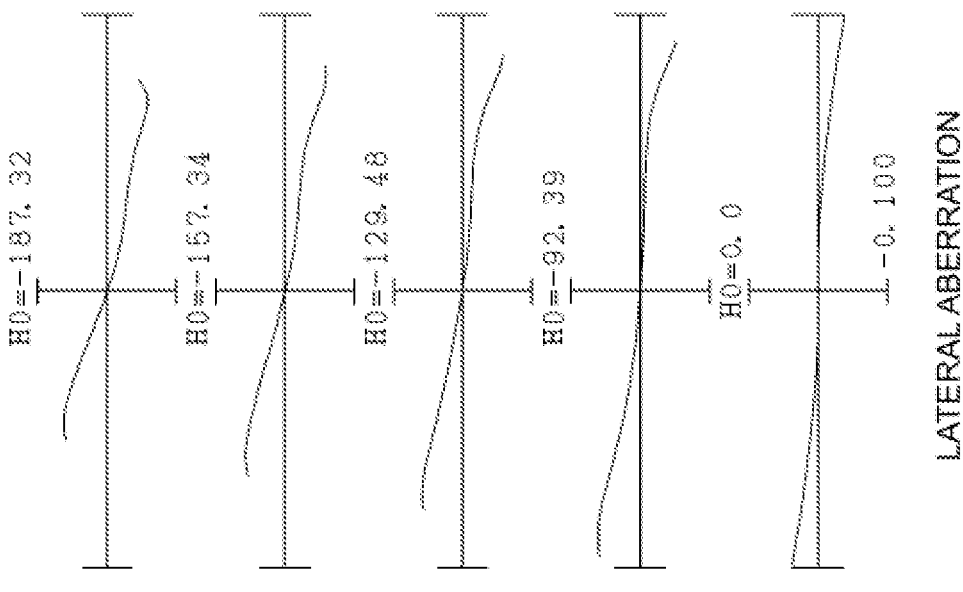
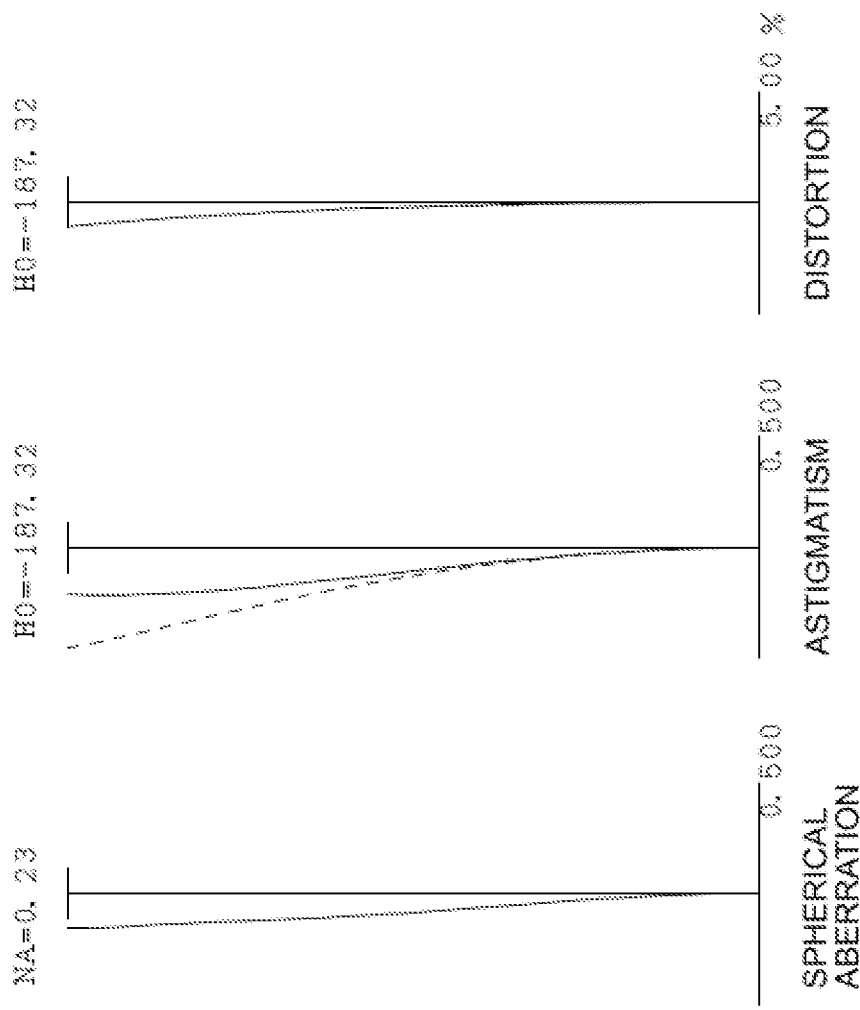
FIG.46B

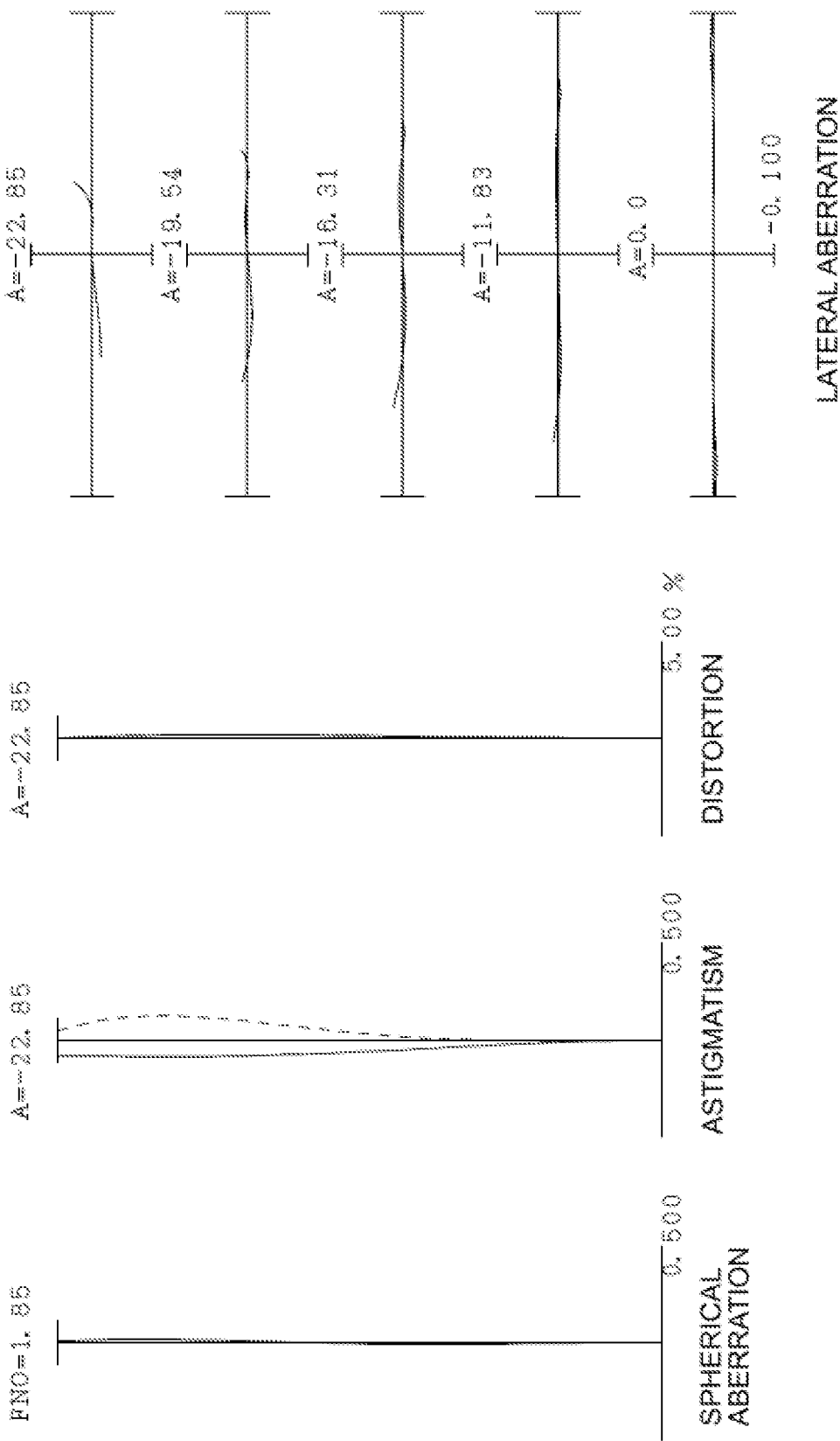

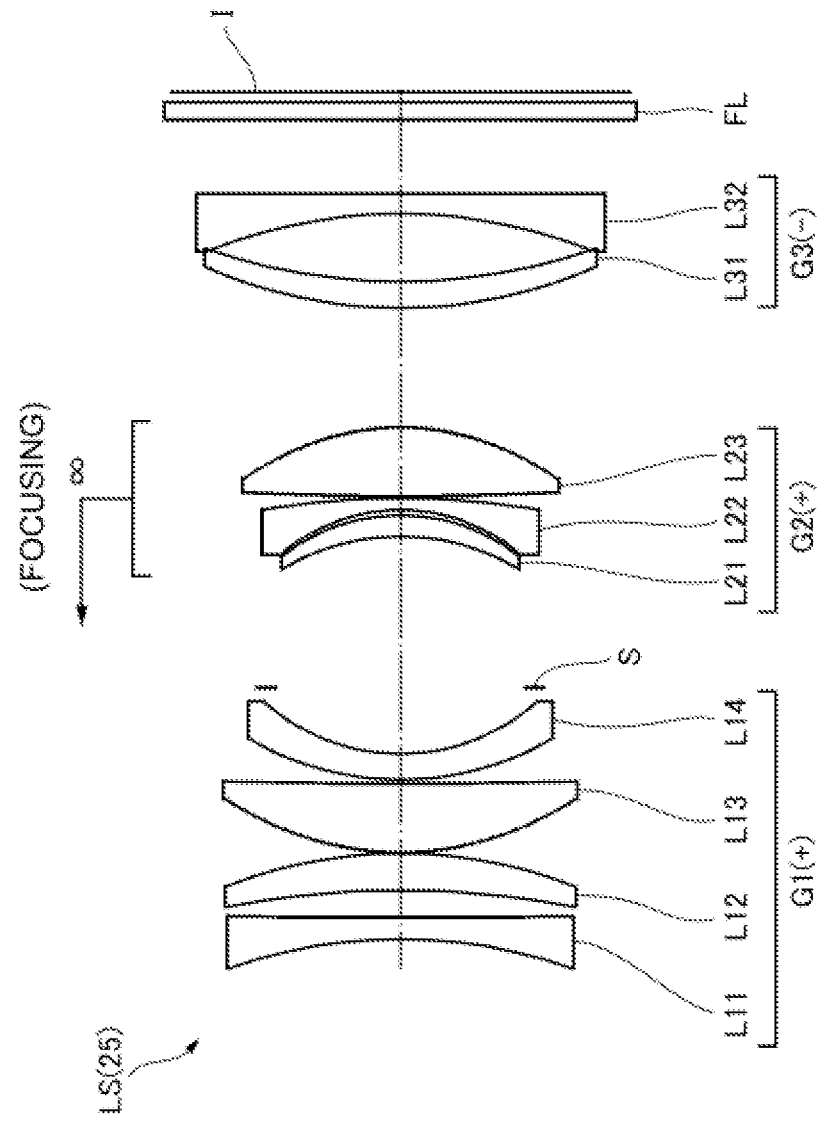

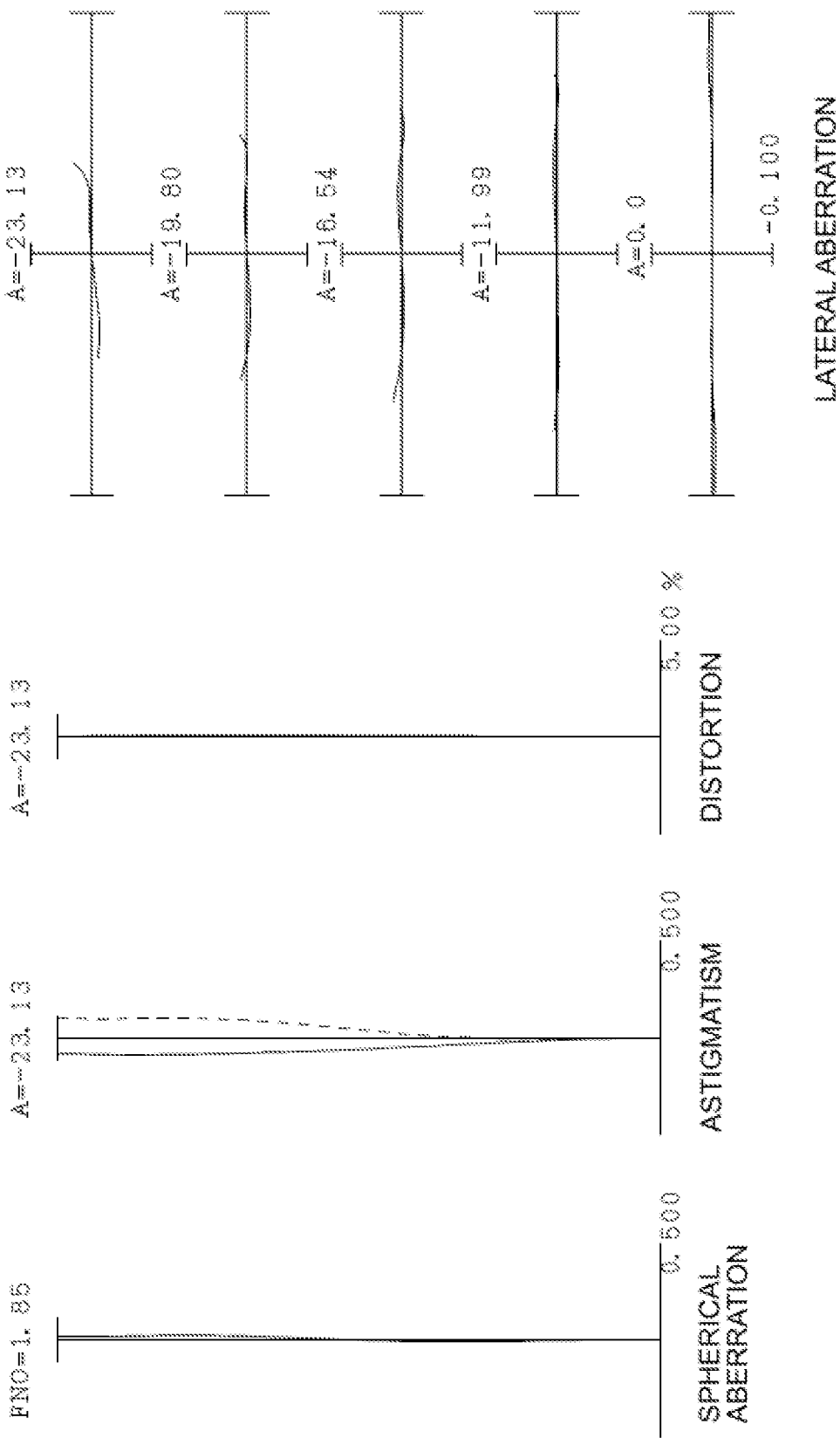

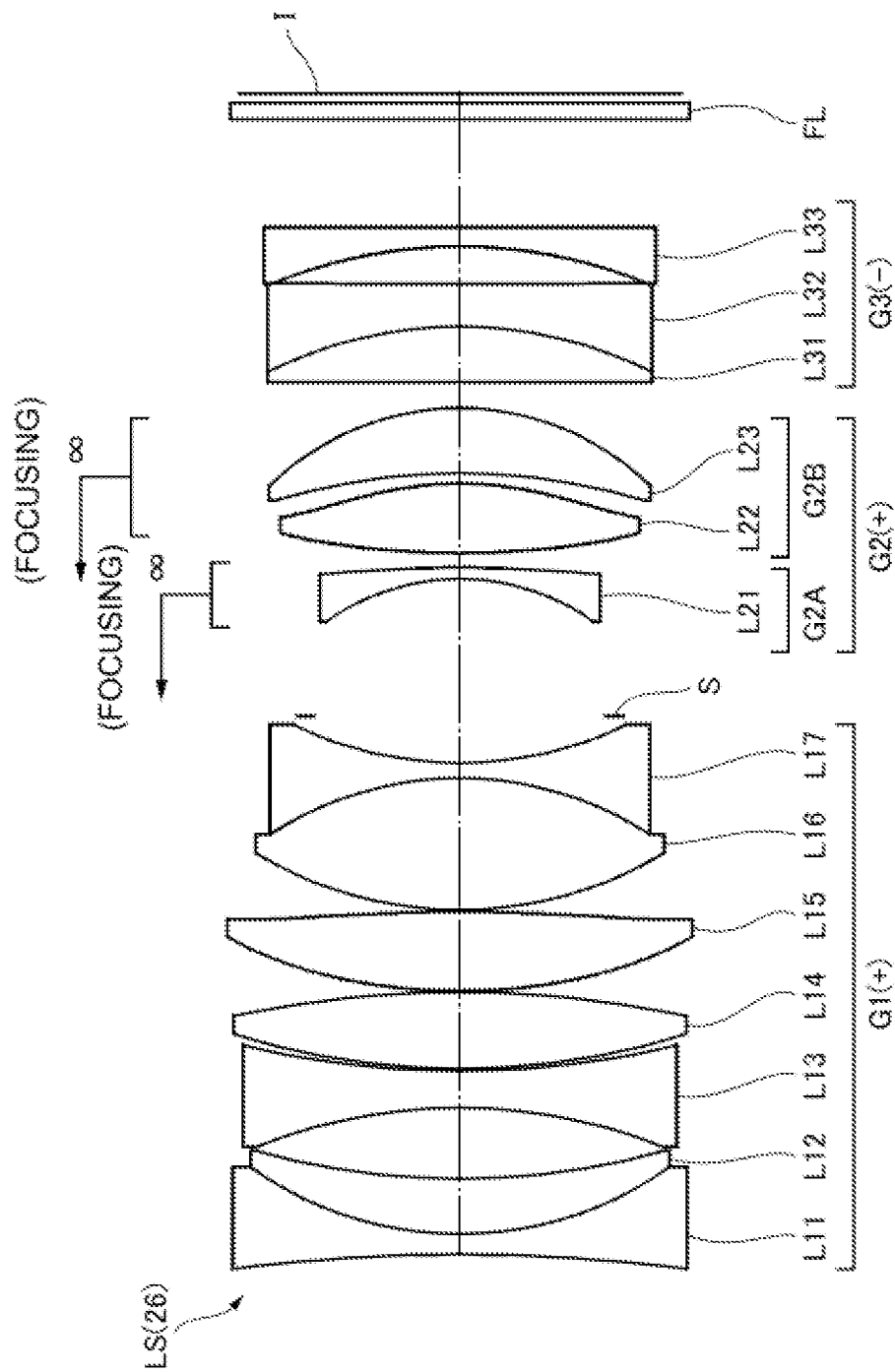

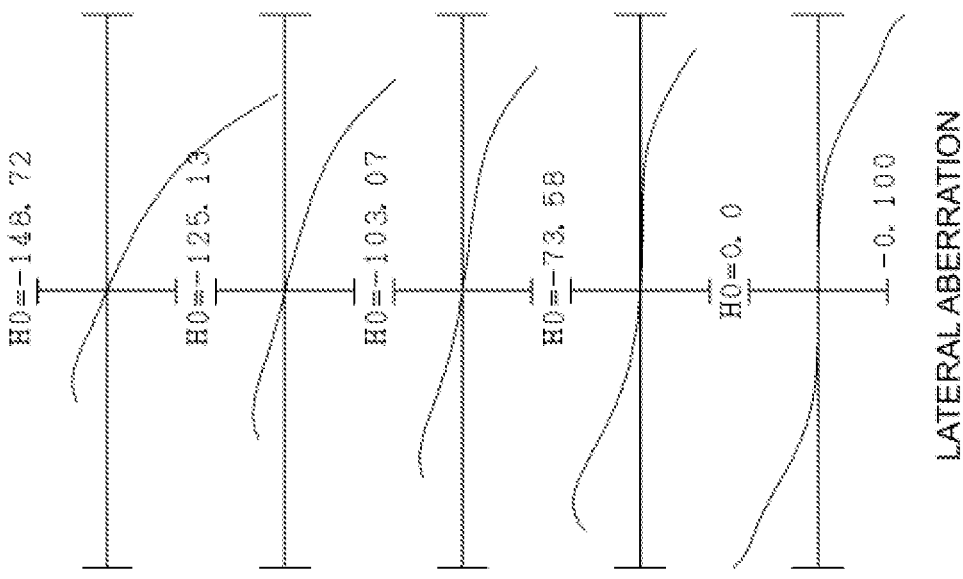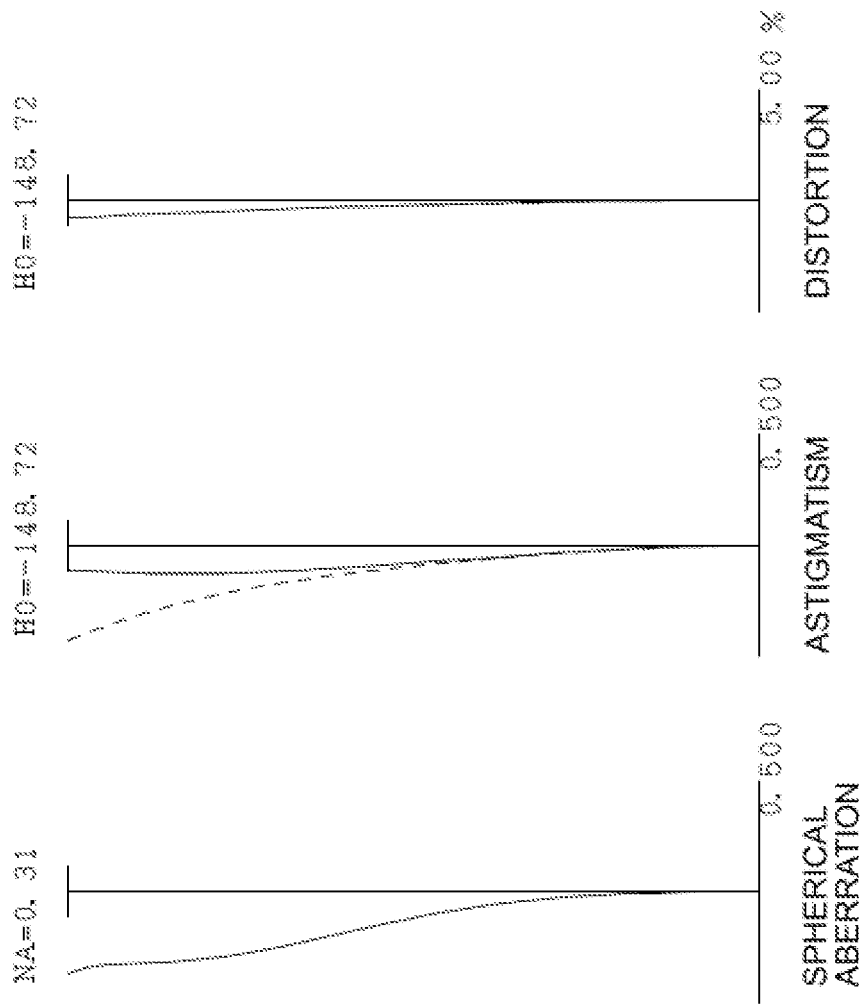
FIG. 52B

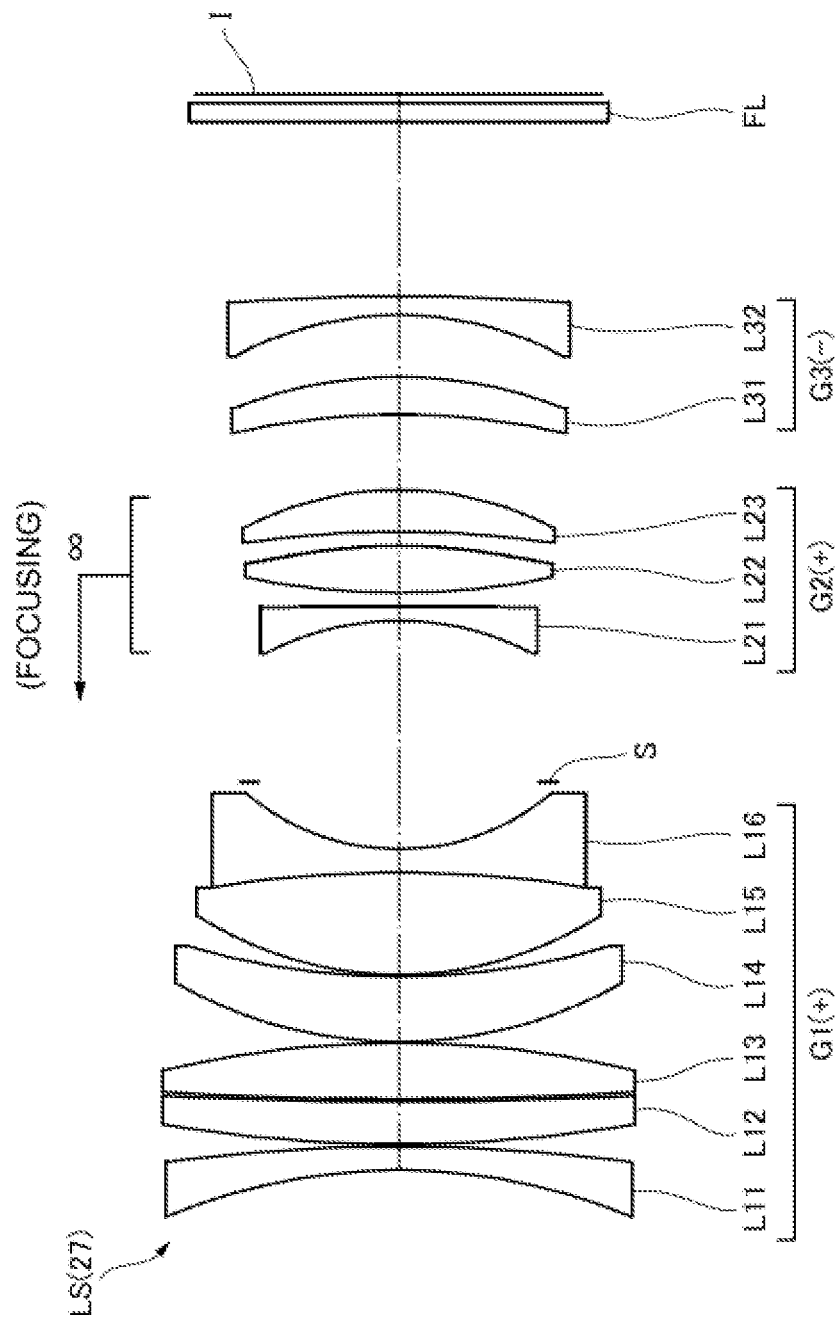

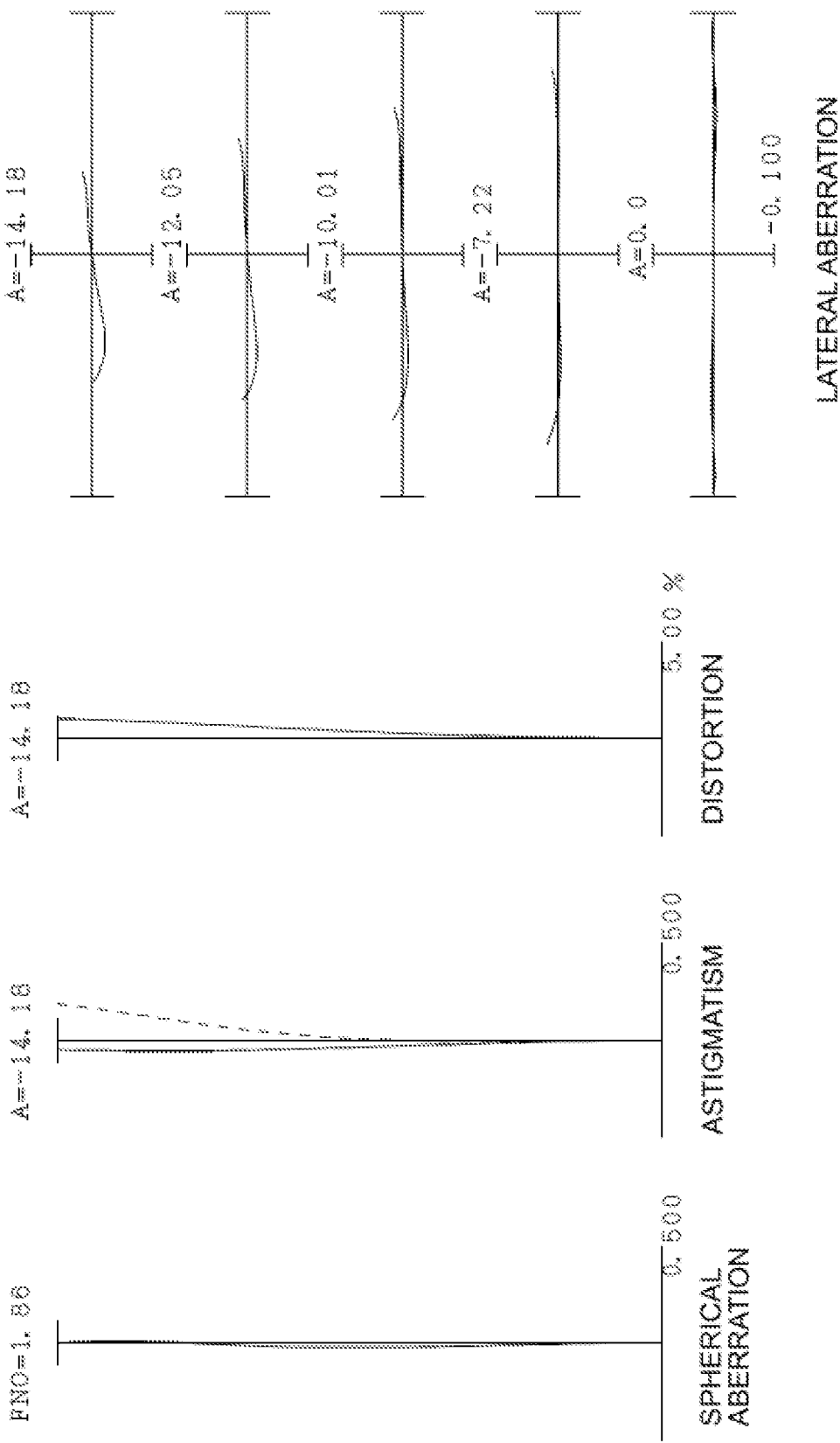

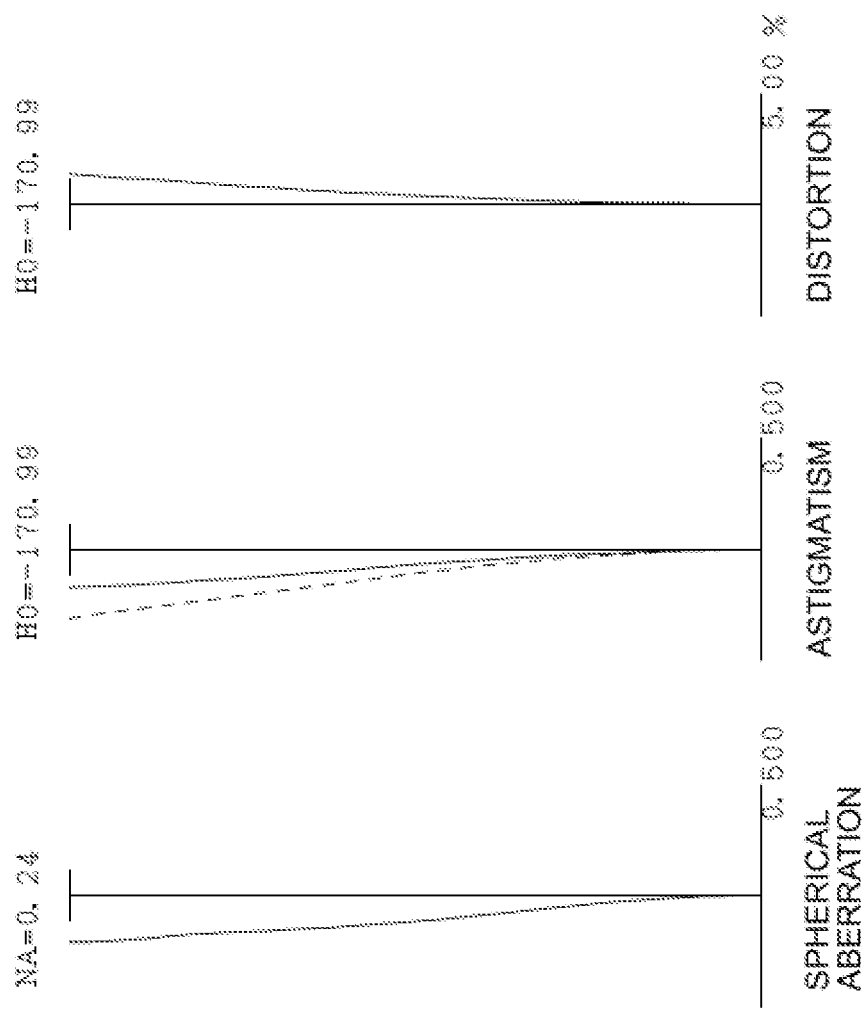

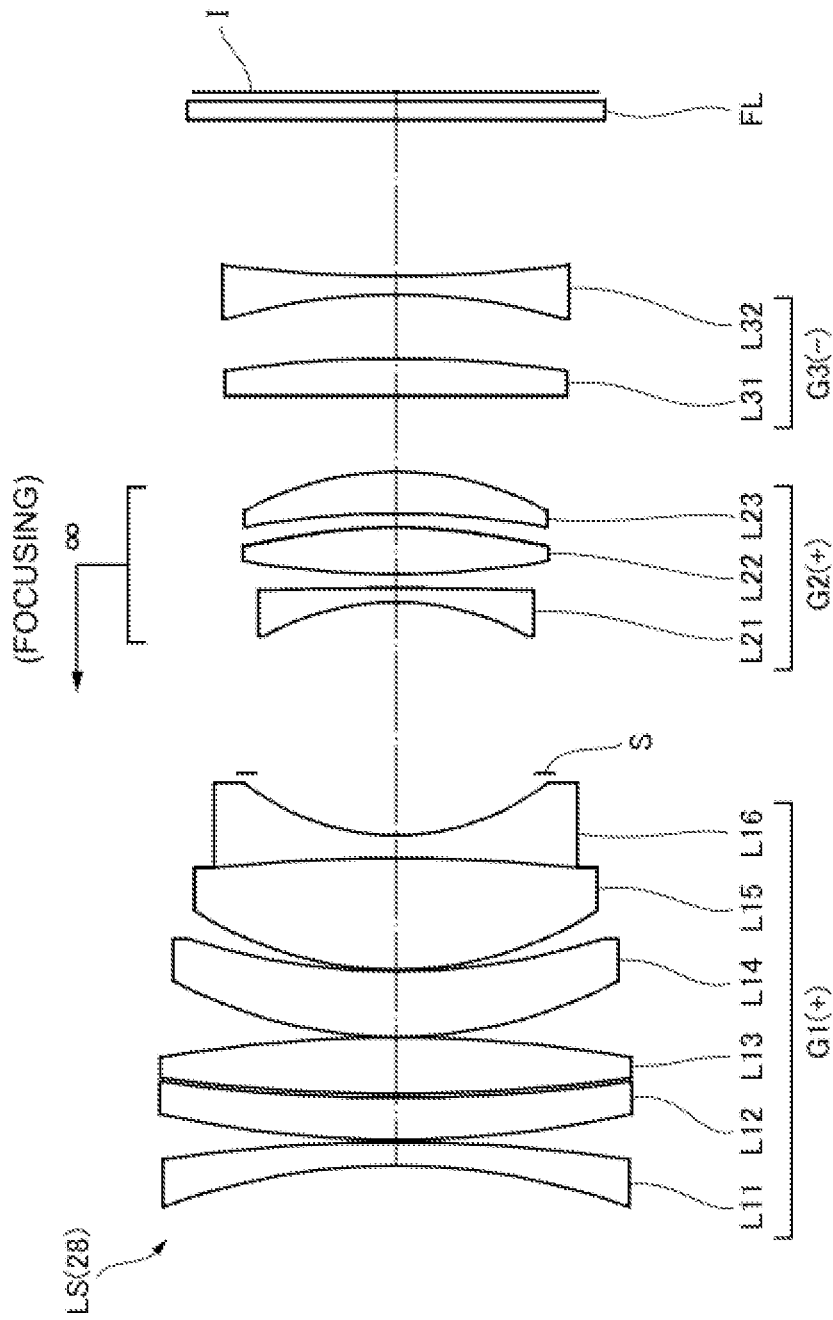

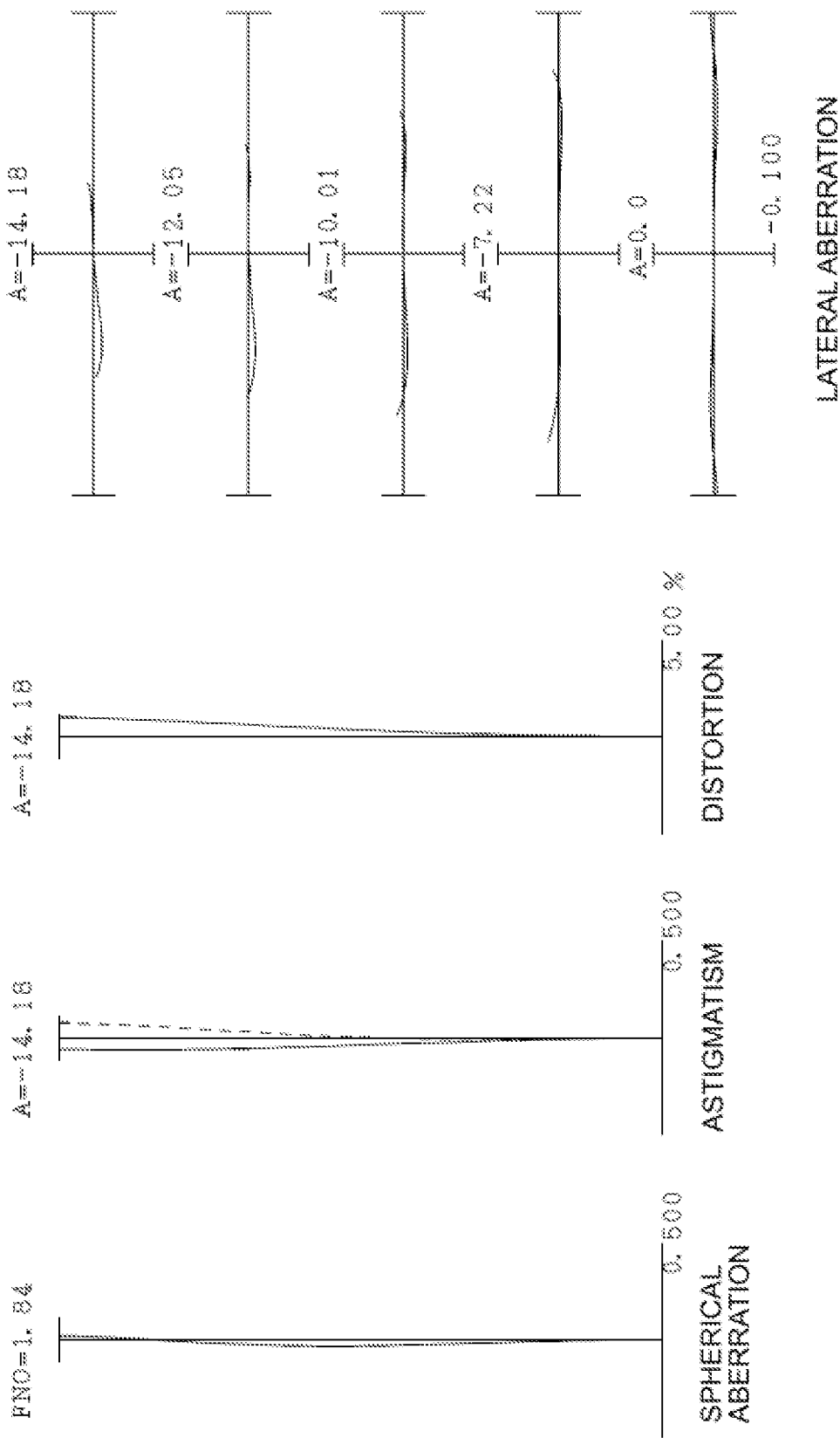

FIG.56B
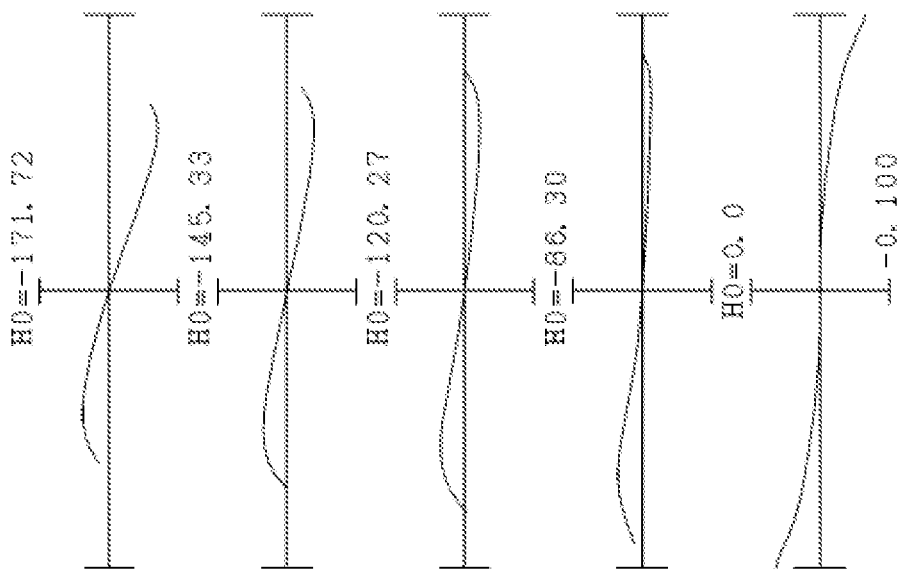
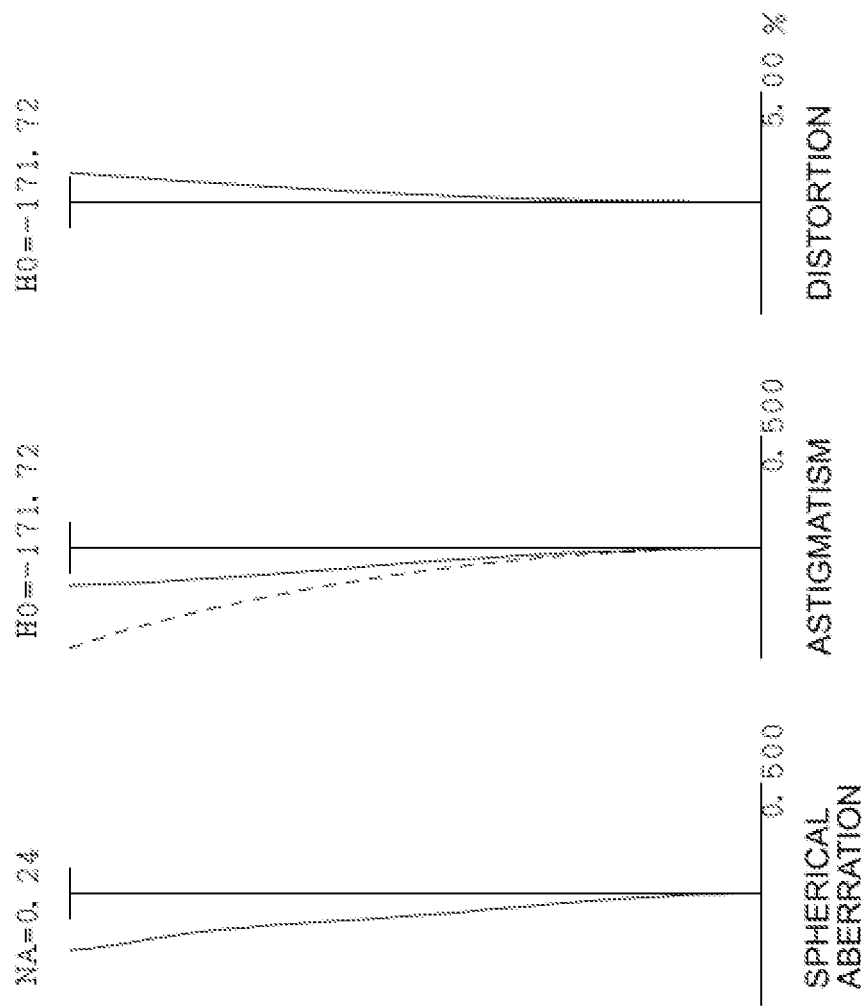

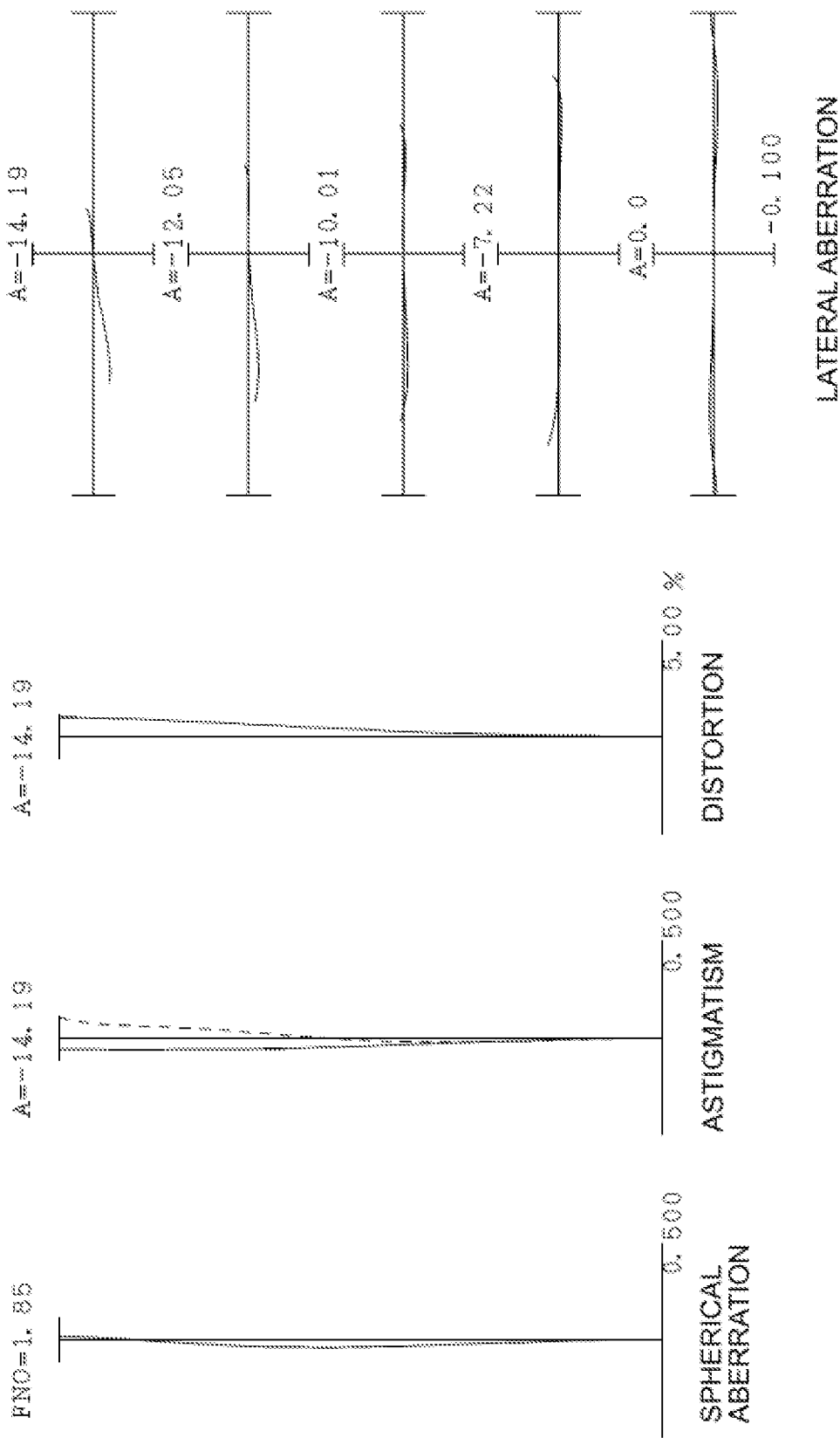

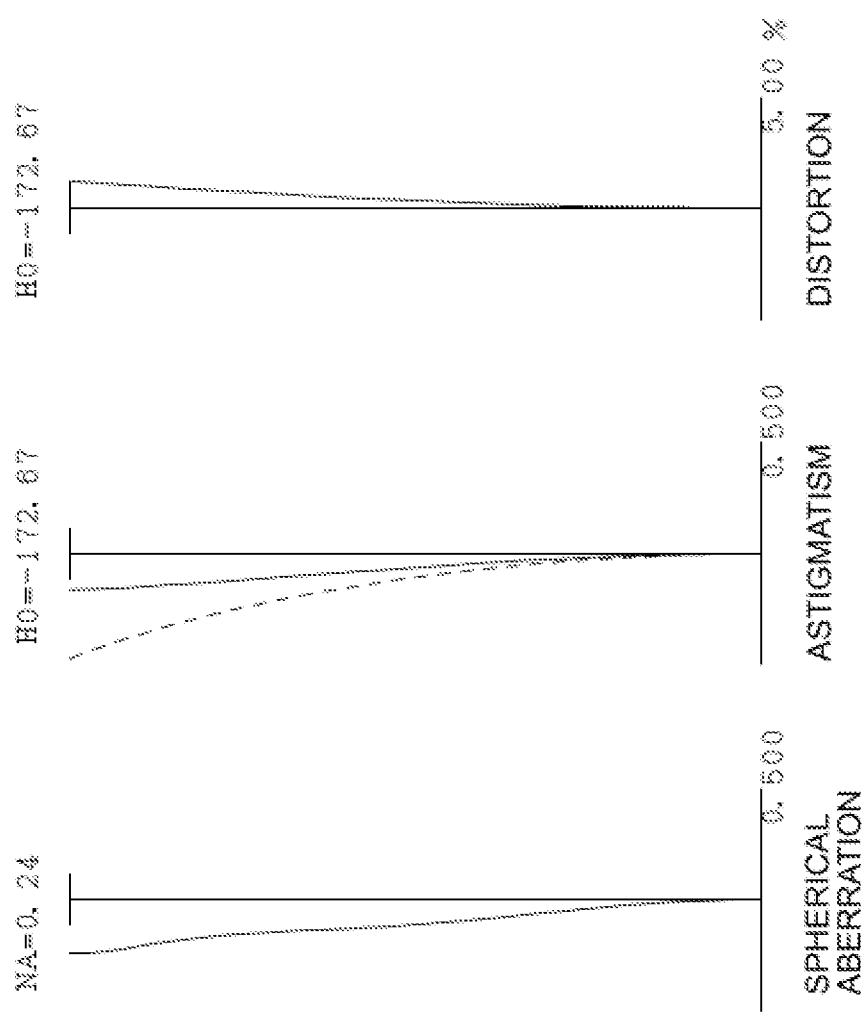

FIG. 62A
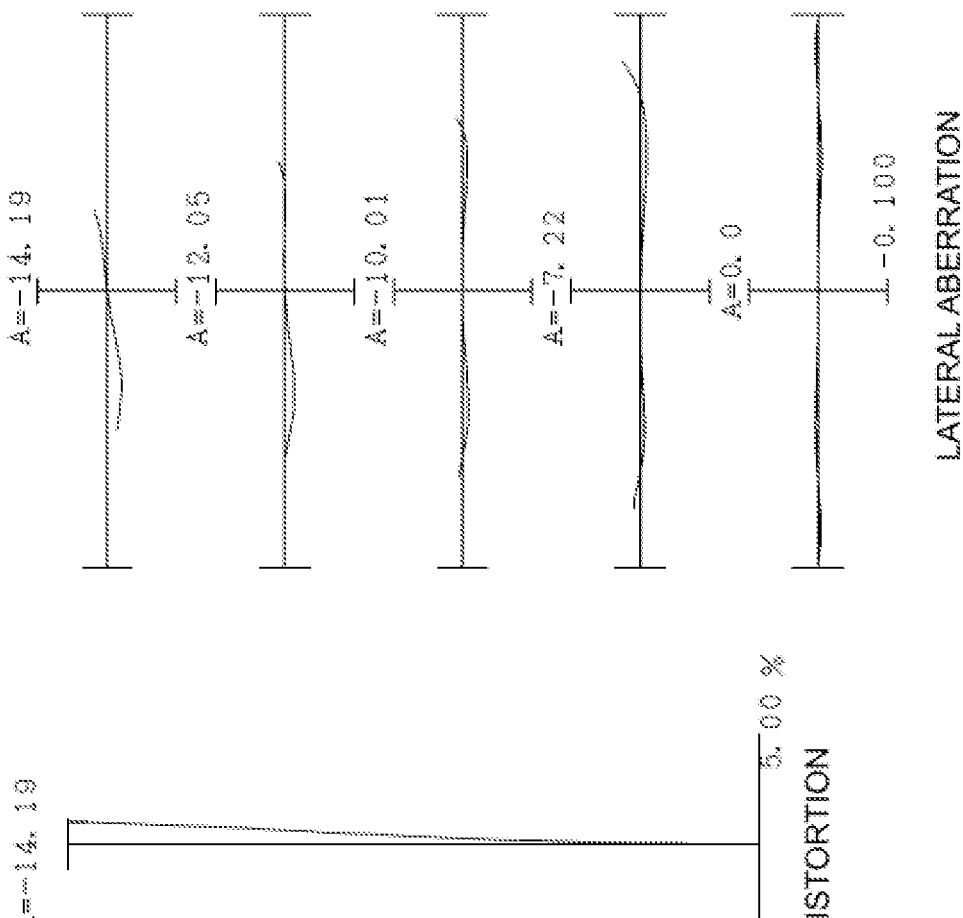
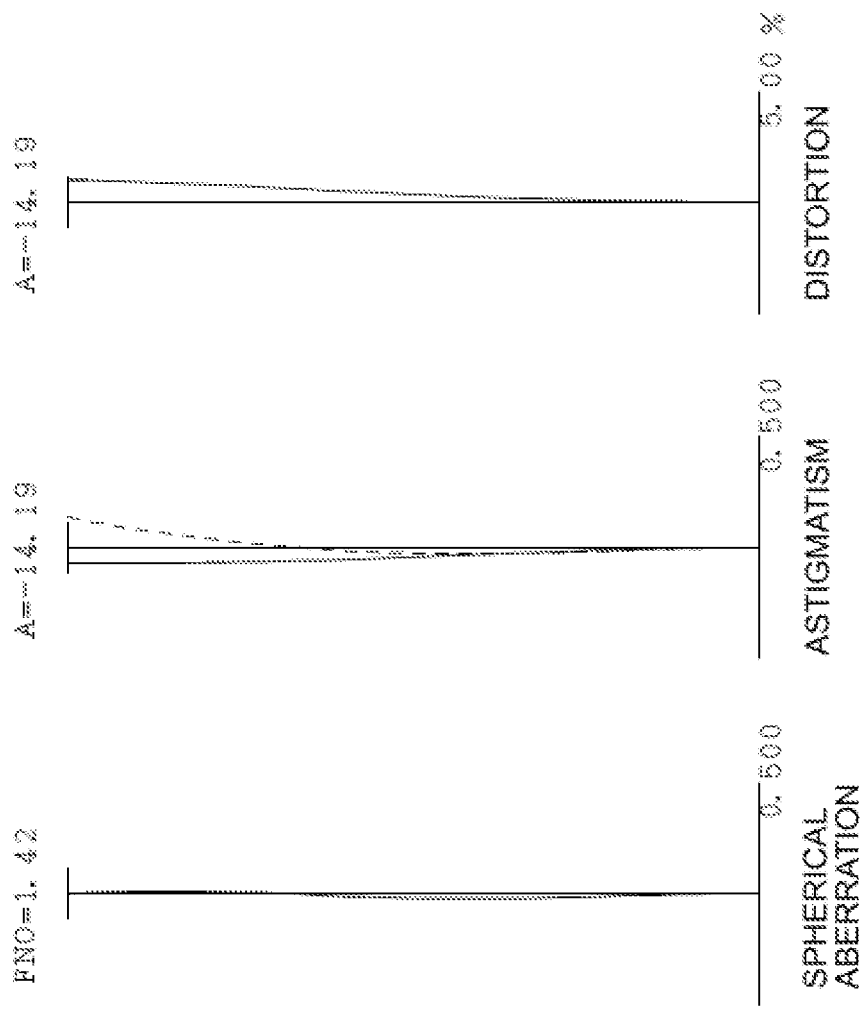

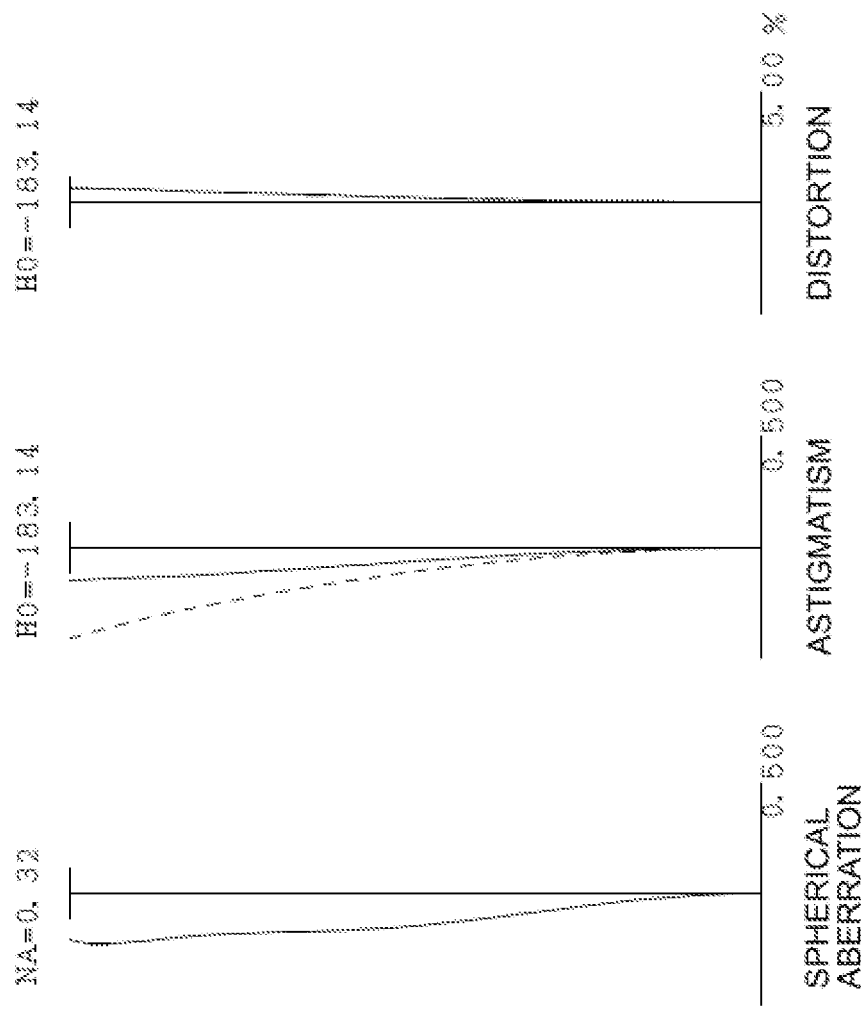

OPTICAL SYSTEM, OPTICAL APPARATUS, AND METHOD OF MANUFACTURING OPTICAL SYSTEM

TECHNICAL FIELD

The present invention relates to an optical system, an optical apparatus, and a method of manufacturing an optical system.

TECHNICAL BACKGROUND

In the related art, a fixed focal point optical system of the inner focus type that focuses by drawing out a positive lens group disposed on the image side of the diaphragm to the object side has been proposed (for example, see Patent literature 1). In a case where such an optical system is increased in diameter, it is difficult to correct various aberrations favorably.

PRIOR ARTS LIST

Patent Document

Patent literature 1: Japanese Laid-open Patent Publication No. 2012-234169 (A)

SUMMARY OF THE INVENTION

An optical system according to a first mode comprises a first lens group having positive refractive power, a second lens group having positive refractive power, and a third lens group having negative refractive power, arranged in order from the object side, wherein when focusing, the second lens group moves along the optical axis, and the optical system satisfies the following conditional expressions $$0.100 < BFa/f < 0.500 \text{ and}$$

$$-5.000 < (-G1R1)/f < 500.000$$

where BFa is an air equivalent distance on the optical axis from the lens surface on the image side to the image surface for the lens disposed farthest on the image side in the optical system, f is the focal length of the optical system, and G1R1 is the radius of curvature of the lens surface on the object side for the lens component disposed farthest on the object side in the first lens group.

An optical apparatus according to a second mode is provided with the above optical system.

A method of manufacturing an optical system according to a third mode is a method of manufacturing an optical system including a first lens group having positive refractive power, a second lens group having positive refractive power, and a third lens group having negative refractive power, arranged in order from the object side, the method comprising: disposing each lens within a lens barrel such that when focusing, the second lens group moves along the optical axis, and the optical system satisfies the following conditional expressions $$0.100 < BFa/f < 0.500 \text{ and}$$

$$-5.000 < (-G1R1)/f < 500.000$$

where BFa is an air equivalent distance on the optical axis from the lens surface on the image side to the image surface for the lens disposed farthest on the image side in the optical system, f is the focal length of the optical system, and G1R1 is the radius of curvature of the lens surface on the object side for the lens component disposed farthest on the object side in the first lens group.

BRIEF DESCRIPTION OF THE DRAWINGS

FIG. 2A illustrates various aberration graphs upon focusing on infinity in the optical system according to the 1st example, while FIG. 2B illustrates various aberration graphs upon focusing on a short-distance object in the optical system according to the 1st example;

FIG. 3 is a lens configuration diagram for the state of focusing on infinity in an optical system according to a 2nd example;

FIG. 4A illustrates various aberration graphs upon focusing on infinity in the optical system according to the 2nd example, while FIG. 4B illustrates various aberration graphs upon focusing on a short-distance object in the optical system according to the 2nd example;

FIG. 6A illustrates various aberration graphs upon focusing on infinity in the optical system according to the 3rd example, while FIG. 6B illustrates various aberration graphs upon focusing on a short-distance object in the optical system according to the 3rd example;

FIG. 7 is a lens configuration diagram for the state of focusing on infinity in an optical system according to a 4th example;

FIG. 8A illustrates various aberration graphs upon focusing on infinity in the optical system according to the 4th example, while FIG. 8B illustrates various aberration graphs upon focusing on a short-distance object in the optical system according to the 4th example;

FIG. 10A illustrates various aberration graphs upon focusing on infinity in the optical system according to the 5th example, while

FIG. 12A illustrates various aberration graphs upon focusing on infinity in the optical system according to the 6th example, while FIG. 12B illustrates various aberration graphs upon focusing on a short-distance object in the optical system according to the 6th example;

FIG. 14A illustrates various aberration graphs upon focusing on infinity in the optical system according to the 7th example, while FIG. 14B illustrates various aberration graphs upon focusing on a short-distance object in the optical system according to the 7th example;

FIG. 16A illustrates various aberration graphs upon focusing on infinity in the optical system according to the 8th example, while FIG. 16B illustrates various aberration graphs upon focusing on a short-distance object in the optical system according to the 8th example;

FIG. 18A illustrates various aberration graphs upon focusing on infinity in the optical system according to the 9th example, while FIG. 18B illustrates various aberration graphs upon focusing on a short-distance object in the optical system according to the 9th example;

FIG. 20A illustrates various aberration graphs upon focusing on infinity in the optical system according to the 10th example, while

FIG. 22A illustrates various aberration graphs upon focusing on infinity in the optical system according to the 11th example, while FIG. 22B illustrates various aberration graphs upon focusing on a short-distance object in the optical system according to the 11th example;

FIG. 23 is a lens configuration diagram for the state of focusing on infinity in an optical system according to a 12th example;

FIG. 24A illustrates various aberration graphs upon focusing on infinity in the optical system according to the 12th example, while FIG. 24B illustrates various aberration graphs upon focusing on a short-distance object in the optical system according to the 12th example;

FIG. 26A illustrates various aberration graphs upon focusing on infinity in the optical system according to the 13th example, while FIG. 26B illustrates various aberration graphs upon focusing on a short-distance object in the optical system according to the 13th example;

FIG. 28A illustrates various aberration graphs upon focusing on infinity in the optical system according to the 14th example, while FIG. 28B illustrates various aberration graphs upon focusing on a short-distance object in the optical system according to the 14th example;

FIG. 30A illustrates various aberration graphs upon focusing on infinity in the optical system according to the 15th example, while FIG. 30B illustrates various aberration graphs upon focusing on a short-distance object in the optical system according to the 15th example;

FIG. 31 is a lens configuration diagram for the state of focusing on infinity in an optical system according to a 16th example;

FIG. 32A illustrates various aberration graphs upon focusing on infinity in the optical system according to the 16th example, while

FIG. 34A illustrates various aberration graphs upon focusing on infinity in the optical system according to the 17th example, while FIG. 34B illustrates various aberration graphs upon focusing on a short-distance object in the optical system according to the 17th example;

FIG. 36A illustrates various aberration graphs upon focusing on infinity in the optical system according to the 18th example, while FIG. 36B illustrates various aberration graphs upon focusing on a short-distance object in the optical system according to the 18th example;

FIG. 38A illustrates various aberration graphs upon focusing on infinity in the optical system according to the 19th example, while

FIG. 40A illustrates various aberration graphs upon focusing on infinity in the optical system according to the 20th example, while

FIG. 42A illustrates various aberration graphs upon focusing on infinity in the optical system according to the 21st example, while

FIG. 44A illustrates various aberration graphs upon focusing on infinity in the optical system according to the 22nd example, while

FIG. 46A illustrates various aberration graphs upon focusing on infinity in the optical system according to the 23rd example, while FIG. 46B illustrates various aberration graphs upon focusing on a short-distance object in the optical system according to the 23rd example;

FIG. 48A illustrates various aberration graphs upon focusing on infinity in the optical system according to the 24th example, while

FIG. 49 is a lens configuration diagram for the state of focusing on infinity in an optical system according to a 25th example;

FIG. 50A illustrates various aberration graphs upon focusing on infinity in the optical system according to the 25th example, while

FIG. 51 is a lens configuration diagram for the state of focusing on infinity in an optical system according to a 26th example;

FIG. 52A illustrates various aberration graphs upon focusing on infinity in the optical system according to the 26th example, while FIG. 52B illustrates various aberration graphs upon focusing on a short-distance object in the optical system according to the 26th example;

FIG. 53 is a lens configuration diagram for the state of focusing on infinity in an optical system according to a 27th example;

FIG. 54A illustrates various aberration graphs upon focusing on infinity in the optical system according to the 27th example, while FIG. 54B illustrates various aberration graphs upon focusing on a short-distance object in the optical system according to the 27th example;

FIG. 55 is a lens configuration diagram for the state of focusing on infinity in an optical system according to a 28th example;

FIG. 56A illustrates various aberration graphs upon focusing on infinity in the optical system according to the 28th example, while FIG. 56B illustrates various aberration graphs upon focusing on a short-distance object in the optical system according to the 28th example;

FIG. 58A illustrates various aberration graphs upon focusing on infinity in the optical system according to the 29th example, while

FIG. 60A illustrates various aberration graphs upon focusing on infinity in the optical system according to the 30th example, while FIG. 60B illustrates various aberration graphs upon focusing on a short-distance object in the optical system according to the 30th example;

FIG. 62A illustrates various aberration graphs upon focusing on infinity in the optical system according to the 31st example, while FIG. 62B illustrates various aberration graphs upon focusing on a short-distance object in the optical system according to the 31st example;

DESCRIPTION OF THE EMBODIMENT

Figure 63:
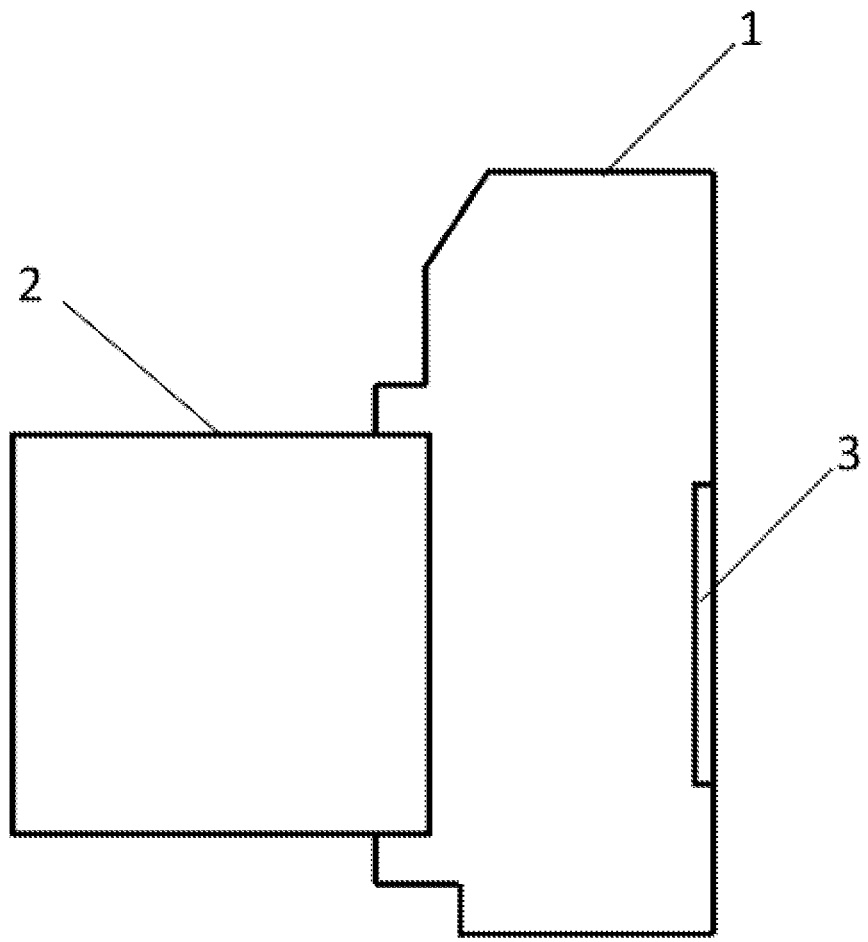
FIG. 63 is a diagram illustrating a configuration of a camera provided with the optical system according to the present embodiment.

Hereinafter, an optical system and an optical apparatus according to the present embodiment will be described with reference to the drawings. First, a camera (optical apparatus) provided with the optical system according to the present embodiment will be described on the basis of FIG. 63. As illustrated in FIG. 63, a camera 1 is a digital camera provided with the optical system according to the present embodiment as a photographic lens 2. In the camera 1, light from a physical object not illustrated (the subject) is condensed by the photographic lens 2, and arrives at an image sensor 3. With this arrangement, the light from the subject is captured by the image sensor 3 and recorded to memory not illustrated as a subject image. In this way, a photographer is able to capture an image of the subject with the camera 1. Note that the camera may be a mirrorless camera or a single-lens reflex camera having a quick-return mirror.

Figure 1:
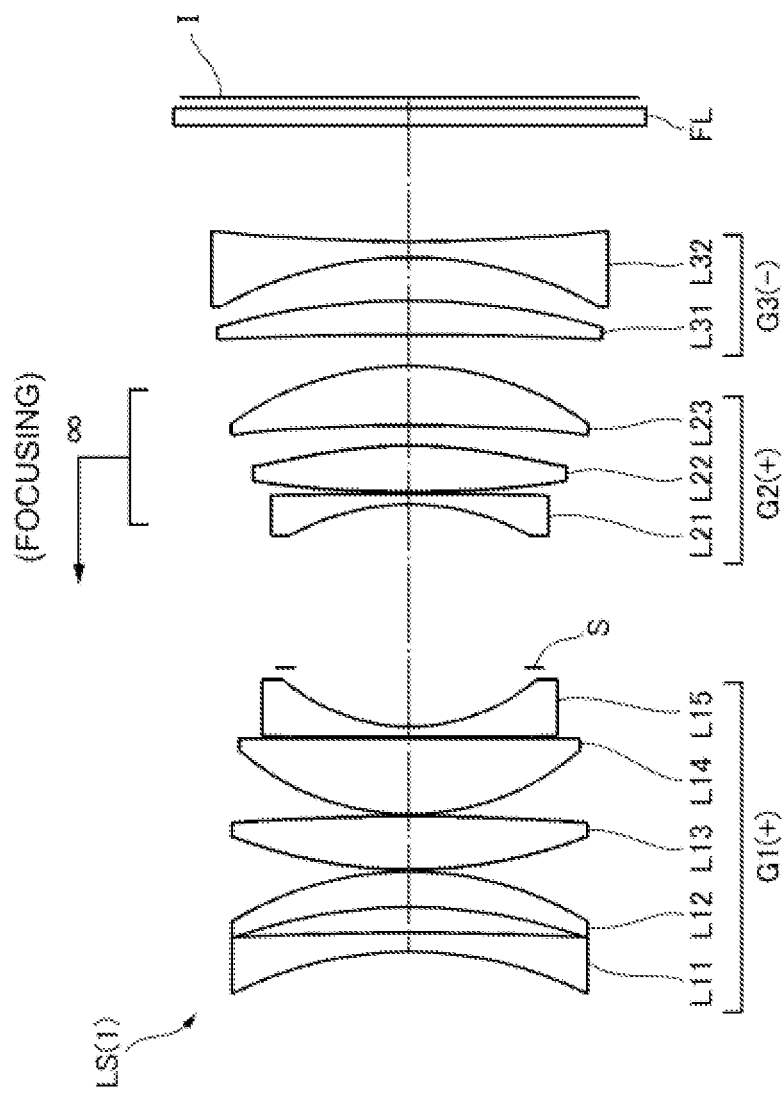
FIG. 1 is a lens configuration diagram for the state of focusing on infinity in an optical system according to a 1st example.

As illustrated in FIG. 1, an optical system LS(1) treated as an example of the optical system (photographic lens) LS according to the present embodiment comprises a first lens group G1 having positive refractive power, a second lens group G2 having positive refractive power, and a third lens group G3 having negative refractive power, arranged in order from the object side. When focusing, the second lens group G2 moves along the optical axis. This arrangement makes it possible to obtain favorable optical performance throughout the focusing range from infinity to short distances, while also restraining changes in image magnification.

The optical system LS according to the present embodiment is not limited to the optical system LS(1) illustrated in FIG. 1, and may also be the optical system LS(2) illustrated in FIG. 3. Similarly, the optical system LS according to the present embodiment may be any of the optical systems LS(3) to LS(31) illustrated in FIG. 5 and subsequent drawings.

Given the above configuration, the optical system LS according to the present embodiment satisfies the following conditional expressions.

$$0.100 < BFa/f < 0.500 \quad (1)$$

$$-5.000 < (-G1R1)/f < 500.000 \quad (2)$$

where BFa is an air equivalent distance on the optical axis from the lens surface on the image side to the image surface for the lens disposed farthest on the image side in the optical system LS, f is the focal length of the optical system LS, and G1R1 is the radius of curvature of the lens surface on the object side for the lens component disposed farthest on the object side in the first lens group G1.

Conditional Expression (1) prescribes the appropriate range of the ratio between the focal length of the whole optical system LS and the back focus. By satisfying Conditional Expression (1), astigmatism can be corrected favorably.

If the corresponding value of Conditional Expression (1) exceeds the upper limit, correcting astigmatism is difficult. By setting the upper limit of Conditional Expression (1) to 0.450, the effects of the present embodiment can be further ensured. To further ensure the effects of the present embodiment, the upper limit of Conditional Expression (1) preferably is set to 0.420, 0.400, 0.380, 0.350, 0.320, 0.300, 0.290, 0.280, 0.275, 0.270, or 0.265, more preferably to 0.260.

If the corresponding value of Conditional Expression (1) falls below the lower limit, correcting astigmatism is also difficult. By setting the lower limit of Conditional Expression (1) to 0.110, the effects of the present embodiment can be further ensured. To further ensure the effects of the present embodiment, the lower limit of Conditional Expression (1) preferably is set to 0.120, 0.130, 0.140, 0.150, or 0.160, more preferably to 0.170.

Conditional Expression (2) prescribes the appropriate range of the ratio between the radius of curvature of the lens surface farthest on the object side in the first lens group G1 and the focal length of the whole optical system LS. By satisfying Conditional Expression (2), favorable optical performance can be secured for the state of focusing on infinity. In the present embodiment, a lens component refers to a single lens or a cemented lens.

If the corresponding value of Conditional Expression (2) exceeds the upper limit, the radius of curvature of the lens surface farthest on the object side in the first lens group G1 decreases, and therefore an increased amount of various aberrations occur, and variations in coma aberration when focusing become larger. By setting the upper limit of Conditional Expression (2) to 400.000, the effects of the present embodiment can be further ensured. To further ensure the effects of the present embodiment, the upper limit of Conditional Expression (2) preferably is set to 300.000, 200.000, 100.000, 85.000, 75.000, 60.000, 45.000, or 30.000, more preferably to 20.000.

If the corresponding value of Conditional Expression (2) falls below the lower limit, the radius of curvature of the lens surface farthest on the object side in the first lens group G1 increases, which makes correcting coma aberration difficult. By setting the lower limit of Conditional Expression (2) to −4.000, the effects of the present embodiment can be further ensured. To further ensure the effects of the present embodiment, the lower limit of Conditional Expression (2) preferably is set to −3.000, −2.000, −1.000, 0.010, 0.100, 0.200, 0.250, 0.300, 0.350, 0.400, 0.450, 0.500, 0.550, 0.600, or 0.650, more preferably to 0.700.

It is desirable for the optical system LS according to the present embodiment to satisfy Conditional Expression (3) below.

$$-5.000 < (-G1R1)/f1 < 50.000 \tag{3}$$

where f1 is the focal length of the first lens group G1.

Conditional Expression (3) prescribes the appropriate range of the ratio between the radius of curvature of the lens surface farthest on the object side in the first lens group G1 and the focal length of the first lens group G1. By satisfying Conditional Expression (3), favorable optical performance can be secured for the state of focusing on infinity.

If the corresponding value of Conditional Expression (3) exceeds the upper limit, the radius of curvature of the lens surface farthest on the object side in the first lens group G1 decreases, and therefore an increased amount of various aberrations occur, and variations in coma aberration when focusing become larger. By setting the upper limit of Conditional Expression (3) to 40.000, the effects of the present embodiment can be further ensured. To further ensure the effects of the present embodiment, the upper limit of Conditional Expression (3) preferably is set to 30.000, 20.000, or 10.000, more preferably to 5.000.

If the corresponding value of Conditional Expression (3) falls below the lower limit, the radius of curvature of the lens surface farthest on the object side in the first lens group G1 increases, which makes correcting coma aberration difficult. By setting the lower limit of Conditional Expression (3) to −4.000, the effects of the present embodiment can be further ensured. To further ensure the effects of the present embodiment, the lower limit of Conditional Expression (3) preferably is set to −3.000, −2.000, −1.000, 0.010, 0.050, 0.100, 0.150, 0.200, 0.250, 0.300, 0.350, 0.400, or 0.450, more preferably to 0.500.

The optical system LS according to the present embodiment may also satisfy Conditional Expression (3-1) below.

$$0.010 < (-G1R1)/f1 < 1.100. \tag{3-1}$$

where f1 is the focal length of the first lens group G1.

Conditional Expression (3-1) is an expression similar to Conditional Expression (3), and effects similar to those of Conditional Expression (3) can be obtained. This range is desirable because various aberrations such as coma aberration can be corrected favorably. Particularly, by setting the lower limit of Conditional Expression (3-1) to 0.050, the effects of the present embodiment can be further ensured. To further ensure the effects of the present embodiment, the lower limit of Conditional Expression (3-1) preferably is set to 0.100, 0.150, 0.200, 0.250, 0.300, 0.350, 0.400, or 0.450, more preferably to 0.500. The optical system LS according to the present embodiment may also satisfy Conditional Expression (3-2) below.

$$1.000 < (-G1R1)/f1 < 50.000 \tag{3-2}$$

where f1 is the focal length of the first lens group G1.

Conditional Expression (3-2) is an expression similar to Conditional Expression (3), and effects similar to those of Conditional Expression (3) can be obtained. This range is desirable because various aberrations such as coma aberration can be corrected favorably. Particularly, by setting the upper limit of Conditional Expression (3-2) to 40.000, the effects of the present embodiment can be further ensured. To further ensure the effects of the present embodiment, the upper limit of Conditional Expression (3-2) preferably is set to 30.000, 20.000, or 10.000, more preferably to 5.000.

In the optical system LS according to the present embodiment, it is desirable for the first lens group G1 to comprise a diaphragm. With this arrangement, various aberrations such as coma aberration and astigmatism can be corrected favorably for the state of focusing on a short-distance object.

In the optical system LS according to the present embodiment, it is desirable for the first lens group G1 to be stationary. With this arrangement, the optical system LS can be made more compact as a whole.

It is desirable for the optical system LS according to the present embodiment to satisfy Conditional Expression (4) below.

$$0.010 < f/f1 < 5.000 \tag{4}$$

where f1 is the focal length of the first lens group G1.

Conditional Expression (4) prescribes the appropriate range of the ratio between the focal length of the whole optical system LS and the focal length of the first lens group G1. By satisfying Conditional Expression (4), favorable optical performance can be secured for the state of focusing on infinity.

If the corresponding value of Conditional Expression (4) exceeds the upper limit, the focal length of the first lens group G1 is shortened, and therefore an increased amount of various aberrations occur, and variations in coma aberration when focusing become larger. By setting the upper limit of Conditional Expression (4) to 4.500, the effects of the present embodiment can be further ensured. To further ensure the effects of the present embodiment, the upper limit of Conditional Expression (4) preferably is set to 4.000, 3.500, 3.000, 2.500, 2.000, 1.500, or 1.200, more preferably to 1.000.

If the corresponding value of Conditional Expression (4) falls below the lower limit, the focal length of the first lens group G1 is lengthened, which makes correcting coma aberration difficult. By setting the lower limit of Conditional Expression (4) to 0.050, the effects of the present embodiment can be further ensured. To further ensure the effects of the present embodiment, the lower limit of Conditional Expression (4) preferably is set to 0.100, 0.150, 0.200, 0.250, 0.300, 0.350, 0.400, 0.450, or 0.500, more preferably to 0.550.

It is desirable for the optical system LS according to the present embodiment to satisfy Conditional Expression (5) below.

$$0.010 < f/f2 < 5.000. \qquad (5)$$

where f2 is the focal length of the second lens group G2.

Conditional Expression (5) prescribes the appropriate range of the ratio between the focal length of the whole optical system LS and the focal length of the second lens group G2. By satisfying Conditional Expression (5), favorable optical performance can be secured for the state of focusing on a short-distance object.

If the corresponding value of Conditional Expression (5) exceeds the upper limit, the focal length of the second lens group G2 is shortened, and therefore an increased amount of various aberrations occur, and variations in coma aberration when focusing become larger. By setting the upper limit of Conditional Expression (5) to 4.500, the effects of the present embodiment can be further ensured. To further ensure the effects of the present embodiment, the upper limit of Conditional Expression (5) preferably is set to 4.000, 3.500, 3.000, 2.500, 2.000, 1.800, or 1.500, more preferably to 1.300.

If the corresponding value of Conditional Expression (5) falls below the lower limit, the focal length of the second lens group G2 is lengthened, and therefore the amount of movement by the second lens group G2 when focusing increases, and variations in spherical aberration and curvature of field when focusing become larger. By setting the lower limit of Conditional Expression (5) to 0.050, the effects of the present embodiment can be further ensured. To further ensure the effects of the present embodiment, the lower limit of Conditional Expression (5) preferably is set to 0.100, 0.150, 0.200, 0.250, 0.300, 0.350, 0.400, 0.450, 0.500, 0.550, or 0.600, more preferably to 0.650.

It is desirable for the optical system LS according to the present embodiment to satisfy Conditional Expression (6) below.

$$0.010 < f1/f2 < 5.000 \qquad (6)$$

where f1 is the focal length of the first lens group G1, and f2 is the focal length of the second lens group G2.

Conditional Expression (6) prescribes the appropriate range of the ratio between the focal length of the first lens group G1 and the focal length of the second lens group G2. By satisfying Conditional Expression (6), favorable optical performance can be secured for the state of focusing on infinity and for the state of focusing on a short-distance object.

If the corresponding value of Conditional Expression (6) exceeds the upper limit, the focal length of the second lens group G2 is shortened, and therefore an increased amount of various aberrations occur, and variations in coma aberration when focusing become larger. By setting the upper limit of Conditional Expression (6) to 4.000, the effects of the present embodiment can be further ensured. To further ensure the effects of the present embodiment, the upper limit of Conditional Expression (6) preferably is set to 3.500, 3.000, 2.500, or 2.000, more preferably to 1.800.

If the corresponding value of Conditional Expression (6) falls below the lower limit, the focal length of the second lens group G2 is lengthened, and therefore the amount of movement by the second lens group G2 when focusing increases, and variations in spherical aberration and curvature of field when focusing become larger. By setting the lower limit of Conditional Expression (6) to 0.100, the effects of the present embodiment can be further ensured. To further ensure the effects of the present embodiment, the lower limit of Conditional Expression (6) preferably is set to 0.200, 0.250, 0.300, 0.350, 0.400, 0.450, 0.500, 0.600, 0.700, or 0.800, more preferably to 0.900.

It is desirable for the optical system LS according to the present embodiment to satisfy Conditional Expression (7) below.

$$0.010 < f1/(-f3) < 3.000 \qquad (7)$$

where f1 is the focal length of the first lens group G1, and f3 is the focal length of the third lens group G3.

Conditional Expression (7) prescribes the appropriate range of the ratio between the focal length of the first lens group G1 and the focal length of the third lens group G3. By satisfying Conditional Expression (7), favorable optical performance can be secured for the state of focusing on infinity and for the state of focusing on a short-distance object.

If the corresponding value of Conditional Expression (7) exceeds the upper limit, the focal length of the first lens group G1 is lengthened, which makes correcting coma aberration difficult. By setting the upper limit of Conditional Expression (7) to 2.500, the effects of the present embodiment can be further ensured. To further ensure the effects of the present embodiment, the upper limit of Conditional Expression (7) preferably is set to 2.000, 1.800, 1.500, 1.300, 1.200, 1.180, or 1.165, more preferably to 1.160.

If the corresponding value of Conditional Expression (7) falls below the lower limit, the focal length of the first lens group G1 is shortened, and therefore an increased amount of various aberrations occur, and variations in coma aberration when focusing become larger. Also, the focal length of the third lens group G3 is lengthened on the negative side, which makes it difficult to correct various aberrations, and variations in curvature of field when focusing become larger. By setting the lower limit of Conditional Expression (7) to 0.050, the effects of the present embodiment can be further ensured. To further ensure the effects of the present embodiment, the lower limit of Conditional Expression (7) preferably is set to 0.100, 0.150, 0.200, 0.250, 0.300, 0.350, 0.400, 0.450, 0.500, or 0.520, more preferably to 0.550.

It is desirable for the optical system LS according to the present embodiment to satisfy Conditional Expression (8) below.

$$0.10 < fF/fR < 3.00 \qquad (8)$$

where fF is the composite focal length of the lenses disposed farther on the object side than the diaphragm in the optical system LS, and fR is the composite focal length of the lenses disposed farther on the image side than the diaphragm in the optical system LS.

Conditional Expression (8) prescribes the appropriate range of the ratio between the composite focal length of the lenses disposed farther on the object side than the diaphragm and the composite focal length of the lenses disposed farther on the image side than the diaphragm. Note that each composite focal length is the composite focal length for the state of focusing on infinity. By satisfying Conditional Expression (8), astigmatism and distortion can be corrected favorably.

If the corresponding value of Conditional Expression (8) exceeds the upper limit, correcting astigmatism and distortion is difficult. By setting the upper limit of Conditional Expression (8) to 2.50, the effects of the present embodiment can be further ensured. To further ensure the effects of the present embodiment, the upper limit of Conditional Expression (8) preferably is set to 2.00, 1.80, 1.50, or 1.20, more preferably to 1.10.

If the corresponding value of Conditional Expression (8) falls below the lower limit, correcting astigmatism and distortion is also difficult. By setting the lower limit of Conditional Expression (8) to 0.20, the effects of the present embodiment can be further ensured. To further ensure the effects of the present embodiment, the lower limit of Conditional Expression (8) preferably is set to 0.25, 0.27, 0.30, or 0.34, more preferably to 0.35.

It is desirable for the optical system LS according to the present embodiment to satisfy Conditional Expression (9) below.

$$-10.0<(G1R2+G1R1)/(G1R2-G1R1)<10.0 \quad (9)$$

where G1R2 is the radius of curvature of the lens surface on the image side for the lens component disposed farthest on the object side in the first lens group G1.

Conditional Expression (9) prescribes the shape factor of the lens component disposed farthest on the object side in the first lens group G1. By satisfying Conditional Expression (9), favorable optical performance can be secured for the state of focusing on infinity.

If the corresponding value of Conditional Expression (9) exceeds the upper limit, the curvature of the lens surface on the object side for the lens component disposed farthest on the object side in the first lens group G1 is tightened, and therefore an increased amount of various aberrations occur, and variations in coma aberration when focusing become larger. By setting the upper limit of Conditional Expression (9) to 8.0, the effects of the present embodiment can be further ensured. To further ensure the effects of the present embodiment, the upper limit of Conditional Expression (9) preferably is set to 7.0, 6.0, or 5.0, more preferably to 4.0.

If the corresponding value of Conditional Expression (9) falls below the lower limit, the curvature of the lens surface on the object side for the lens component disposed farthest on the object side in the first lens group G1 is loosened, which makes correcting coma aberration difficult. By setting the lower limit of Conditional Expression (9) to -8.0, the effects of the present embodiment can be further ensured. To further ensure the effects of the present embodiment, the lower limit of Conditional Expression (9) preferably is set to -7.0, -6.0, -5.0, -4.0, or -3.0, more preferably to -2.0.

It is desirable for the optical system LS according to the present embodiment to satisfy Conditional Expression (10) below.

$$0.30<\{1-(\beta 2)^2\}\times(\beta 3)^2<2.00 \quad (10)$$

where $\beta 2$ is the lateral magnification of the second lens group G2 for the state of focusing on infinity, and $\beta 3$ is the lateral magnification of the third lens group G3.

Conditional Expression (10) prescribes the displacement of the focal position with respect to movement by the second lens group G2. By satisfying Conditional Expression (10), favorable optical performance can be secured for the state of focusing on a short-distance object both on-axis and off-axis.

If the corresponding value of Conditional Expression (10) exceeds the upper limit, correcting coma aberration and astigmatism for the state of focusing on a short-distance object is difficult. By setting the upper limit of Conditional Expression (10) to 1.80, the effects of the present embodiment can be further ensured. To further ensure the effects of the present embodiment, the upper limit of Conditional Expression (10) preferably is set to 1.60, 1.40, 1.20, 1.00, 0.95, or 0.91, more preferably to 0.89.

If the corresponding value of Conditional Expression (10) falls below the lower limit, correcting coma aberration and astigmatism for the state of focusing on a short-distance object is also difficult. By setting the lower limit of Conditional Expression (10) to 0.35, the effects of the present embodiment can be further ensured. To further ensure the effects of the present embodiment, the lower limit of Conditional Expression (10) preferably is set to 0.40, 0.45, or 0.48, more preferably to 0.50.

It is desirable for the optical system LS according to the present embodiment to satisfy Conditional Expression (11) below.

$$0.50<FNO\times(f1/f)<5.50 \quad (11)$$

where FNO is the F-number of the optical system LS, and f1 is the focal length of the first lens group G1.

Conditional Expression (11) prescribes a value corresponding to the F-number of the first lens group G1. By satisfying Conditional Expression (11), various aberrations such as coma aberration can be corrected favorably.

If the corresponding value of Conditional Expression (11) exceeds the upper limit, correcting coma aberration and astigmatism is difficult. By setting the upper limit of Conditional Expression (11) to 5.00, the effects of the present embodiment can be further ensured. To further ensure the effects of the present embodiment, the upper limit of Conditional Expression (11) preferably is set to 4.50, 4.00, 3.50, or 3.20, more preferably to 3.00.

If the corresponding value of Conditional Expression (11) falls below the lower limit, correcting spherical aberration and coma aberration is also difficult. By setting the lower limit of Conditional Expression (11) to 0.80, the effects of the present embodiment can be further ensured. To further ensure the effects of the present embodiment, the lower limit of Conditional Expression (11) preferably is set to 1.00, 1.40, 1.60, or 1.80, more preferably to 1.95.

It is desirable for the optical system LS according to the present embodiment to satisfy Conditional Expression (12) below.

$$15.0°<2\omega<85.0° \quad (12)$$

where $2\omega$ is the angle of view of the optical system LS.

Conditional Expression (12) prescribes the angle of view of the optical system LS. By satisfying Conditional Expression (12), various aberrations can be corrected favorably, while maintaining a wide angle of view. By setting the upper limit of Conditional Expression (12) to 80.0°, the effects of the present embodiment can be further ensured. To further ensure the effects of the present embodiment, the upper limit of Conditional Expression (12) preferably is set to 75.0°, 70.0°, or 68.0°, more preferably to 65.0°. By setting the lower limit of Conditional Expression (12) to 17.0°, the effects of the present embodiment can be further ensured. To further ensure the effects of the present embodiment, the lower limit of Conditional Expression (12) preferably is set to 18.0°, 20.0°, or 22.0°, more preferably to 25.0°.

In the optical system LS according to the present embodiment, the lens disposed farthest on the object side in the first lens group G1 may also be a negative lens. With this arrangement, coma aberration can be corrected favorably.

In the optical system LS according to the present embodiment, the lens disposed farthest on the object side in the second lens group G2 may also be a negative lens. With this arrangement, curvature of field can be corrected favorably.

In the optical system LS according to the present embodiment, the second lens group G2 may comprise at least one positive lens and at least one negative lens. With this arrangement, various aberrations such as chromatic aberration can be corrected favorably.

In the optical system LS according to the present embodiment, the third lens group G3 may comprise at least one positive lens and at least one negative lens. With this arrangement, various aberrations such as chromatic aberration can be corrected favorably.

Figure 64:
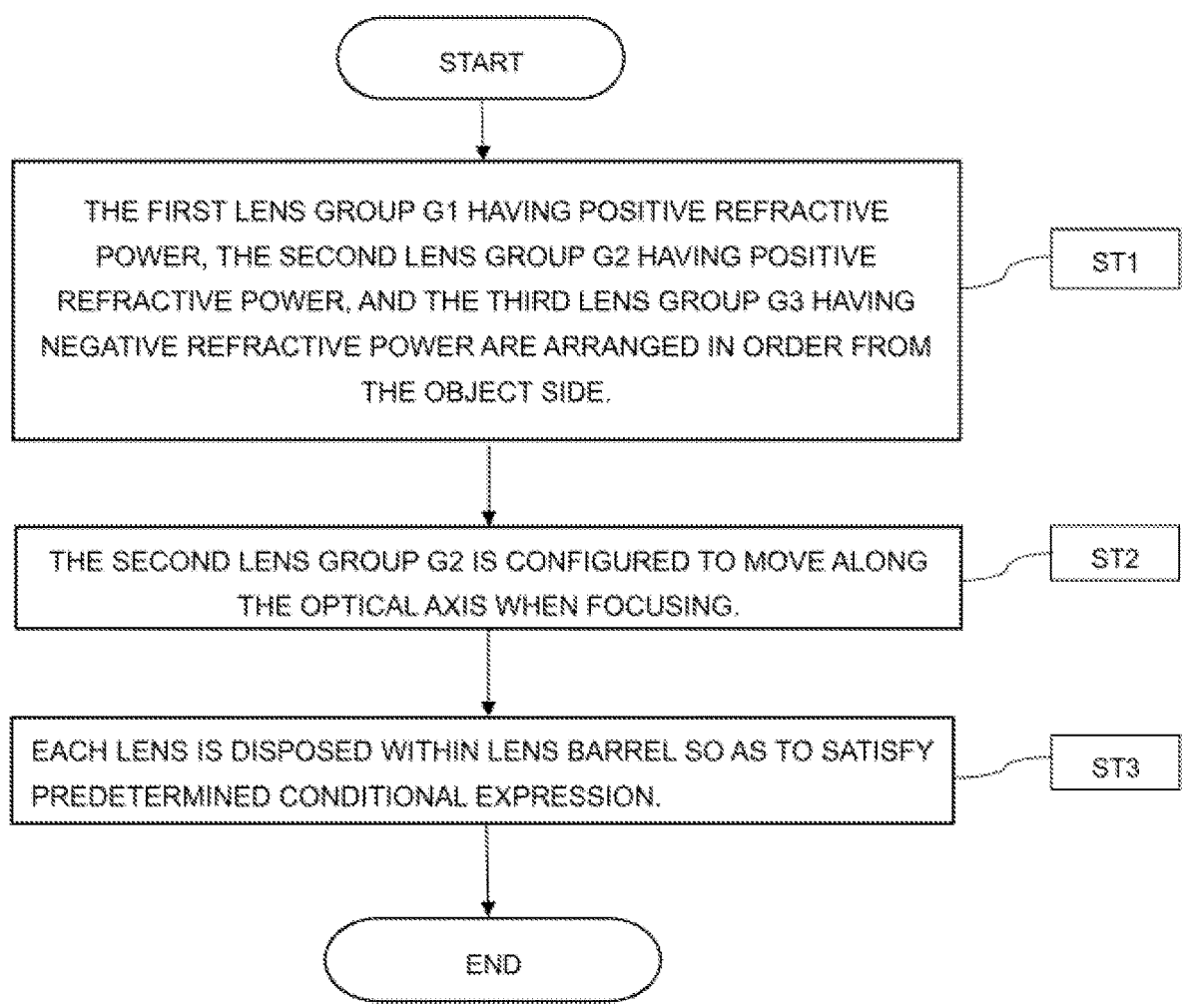
FIG. 64 is a flowchart illustrating a method of manufacturing the optical system according to the present embodiment.

Next, a method of manufacturing the optical system LS described above will be summarized with reference to FIG. 64. First, the first lens group G1 having positive refractive power, the second lens group G2 having positive refractive power, and the third lens group G3 having negative refractive power are arranged in order from the object side (step ST1). Thereafter, the second lens group G2 is configured to move along the optical axis when focusing (step ST2). Also, each lens is disposed within a lens barrel to satisfy at least Conditional Expressions (1) and (2) above (step ST3). According to such a manufacturing method, it is possible to manufacture an optical system capable of obtaining favorable optical performance throughout the focusing range from infinity to short distances, while also restraining changes in image magnification.

EXAMPLES

Hereinafter, the optical system LS according to examples of the present embodiment will be described on the basis of the drawings. FIG. 1 is a cross section illustrating the configuration and the refractive power distribution of an optical system LS {LS(1)} according to a 1st example. Similarly, FIGS. 3, 5, 7, 9, 11, 13, 15, 17, 19, and 21 are cross sections illustrating the configuration and the refractive power distribution of an optical system LS {LS(2) to LS(11)} according to second to 11th examples. FIGS. 23, 25, 27, 29, 31, 33, 35, 37, 39, and 41 are cross sections illustrating the configuration and the refractive power distribution of an optical system LS {LS(12) to LS(21)} according to 12th to 21st examples. FIGS. 43, 45, 47, 49, 51, 53, 55, 57, 59, and 61 are cross sections illustrating the configuration and the refractive power distribution of an optical system LS {LS(22) to LS(31)} according to 22nd to 31st examples. In each cross section, the movement direction when the focusing lens group focuses from infinity to a short-distance object is indicated by the arrow labeled "Focusing".

In these diagrams, each lens group is denoted by the combination of the sign G and a numeral, while each lens is denoted by the combination of the sign L and a numeral. In this case, to avoid confusion due to a large variety of signs and numerals and their values, the lens groups and the like are referenced using combinations of signs and numerals that are respectively independent in each of the examples. Consequently, even if the same combinations of signs and numerals are used between examples, this does not mean that the examples have the same configuration.

Tables 1 to 31 below indicate data regarding each of the 1st to 31st examples. In each example, the d-line (wavelength A=587.6 nm) is chosen as the target for computing aberration characteristics.

In the [General Data] table, f is the focal length of the entire lens system, FNO is the F-number, ω is the half angle of view (in units of degrees)) (°, and Y is the image height. Also, TL is the distance from the lens forefront surface to the lens last surface on the optical axis upon focusing on infinity plus BF, BF is the distance (back focus) from the lens last surface to the image surface I on the optical axis upon focusing on infinity, and BFa is the air equivalent length of the back focus.

In the [Lens Data] table, the surface number indicates the order of optical surfaces from the object side in the advancement direction of light rays, R is the radius of curvature of each optical surface (taken to be a positive value for a surface whose center of curvature is positioned on the image side), D is the distance from each optical surface to the next optical surface (or the image surface) on the optical axis, nd is the refractive index with respect to the d-line of the material of an optical member, and vd is the Abbe number with reference to the d-line of the material of an optical member. A radius of curvature of "∞" means a flat surface or an aperture, while "(Aperture Stop S)" means an aperture stop S. The refractive index of air nd=1.00000 is not listed. In a case where an optical surface is an aspherical surface, an asterisk (*) is appended to the surface number, and the paraxial radius of curvature is listed in the radius of curvature R field.

In the [Aspherical Surface Data] table, the shapes of the aspherical surfaces indicated in [Lens Data] are expressed by the subsequent expressions (A). X (y) is the distance (sag amount) in the optical axis direction from the tangential plane at the vertex of the aspherical surface to a position on the aspherical surface at the height y, R is the radius of curvature (paraxial radius of curvature) of a reference spherical surface, κ is the conical coefficient, and Ai is the ith order aspherical coefficient. Also, "E−n" denotes "×10$^{-n}$". For example, 1.234E−05=1.234×10$^{-5}$. Note that the 2nd order aspherical coefficient A2 is 0, and is not listed.

In the [Variable Distance Data] table, the distance to the next lens surface Di is indicated for the surface number i whose distance to the next lens surface is indicated as "variable" in the [Lens Data] table. For example, in the 1st example, the distances to the next lens surface D11, D17, and D23 are indicated for the surface numbers 11, 17, and 23. These values are indicated for the state of focusing on infinity and the state upon focusing on a short-distance (close-up) object.

In the [Lens Group Data] table, the first surface (the surface farthest on the object side) and the focal length of each lens group are indicated.

In the [Conditional Expression Corresponding Value] table, the value corresponding to each conditional expression is indicated.

In all of the data values hereinafter, the listed values of the focal length f, the radius of curvature R, the distance to the next lens surface D, and other lengths generally are given in "mm" unless otherwise specified, but are not limited thereto, because the same optical performance is obtained even if the optical system is enlarged proportionally or reduced proportionally.

The description of the tables so far is common to all of the examples, and hereinafter a duplicate description will be omitted.

1st Example

The 1st example will be described using FIGS. 1 and 2 and Table 1. FIG. 1 is a diagram illustrating the lens configuration for the state of focusing on infinity in the optical system according to the 1st example of the present embodiment. The optical system LS(1) according to the 1st example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place. The sign (+) or (−) appended to each lens group sign indicates the refractive power of each lens group. The same applies to all of the examples hereinafter.

The first lens group G1 comprises a first negative lens L11 having a meniscus shape whose concave surface is pointed toward the object, a first positive lens L12 having a meniscus shape whose concave surface is pointed toward the object, a second positive lens L13 that is biconvex, a third positive lens L14 that is biconvex, a second negative lens L15 having a meniscus shape whose convex surface is pointed toward the object, and an aperture stop S, arranged in order from the object side. The lens surface on either side of the second positive lens L13 is an aspherical surface.

The second lens group G2 comprises a negative lens L21 having a meniscus shape whose concave surface is pointed toward the object, a first positive lens L22 that is biconvex, and a second positive lens L23 having a meniscus shape whose concave surface is pointed toward the object, arranged in order from the object side. The lens surface on either side of the first positive lens L22 is an aspherical surface.

The third lens group G3 comprises a positive lens L31 having a meniscus shape whose concave surface is pointed toward the object and a negative lens L32 that is biconcave, arranged in order from the object side. An image surface I is disposed on the image side of the third lens group G3. An interchangeable optical filter FL is arranged between the third lens group G3 and the image surface I. A filter such as a neutral color (NC) filter, a color filter, a polarizing filter, a neutral density (ND) filter, or an infrared cut-off (IR) filter is used as the interchangeable optical filter FL, for example. Note that the above also applies to the interchangeable optical filter FL described in the 2nd to 31st examples described later.

Table 1 below lists data values regarding the optical system according to the 1st example.

TABLE 1

[General Data]

| | |
|---|---|
| f | 51.59 |
| FNO | 1.85 |
| ω | 22.6 |
| Y | 21.70 |
| TL | 80.800 |
| BF | 13.599 |
| BFa | 13.054 |

[Lens Data]

| Surface Number | R | D | nd | vd |
|---|---|---|---|---|
| 1 | −37.21999 | 1.800 | 1.60342 | 38.0 |
| 2 | −301.75553 | 2.422 | | |
| 3 | −50.10561 | 3.350 | 1.49782 | 82.6 |
| 4 | −32.57310 | 0.200 | | |
| 5* | 45.59156 | 5.050 | 1.82080 | 42.7 |
| 6* | −214.20431 | 0.200 | | |
| 7 | 24.72595 | 7.194 | 1.59319 | 67.9 |
| 8 | −5040.38050 | 0.100 | | |
| 9 | 1752.78680 | 1.000 | 1.60342 | 38.0 |
| 10 | 18.45027 | 5.608 | | |
| 11 | ∞ | D11 (Variable) | | (Aperture Stop S) |
| 12 | −23.43011 | 1.000 | 1.67270 | 32.2 |
| 13 | −582.82234 | 0.200 | | |
| 14* | 127.87476 | 4.350 | 1.82080 | 42.7 |
| 15* | −43.94757 | 1.950 | | |
| 16 | −157.95993 | 5.600 | 1.60300 | 65.4 |
| 17 | −28.85150 | D17 (Variable) | | |
| 18 | −374.08672 | 3.200 | 2.00100 | 29.1 |
| 19 | −68.25108 | 4.109 | | |
| 20 | −36.81307 | 1.500 | 1.69895 | 30.1 |
| 21 | 177.00000 | 11.000 | | |
| 22 | ∞ | 1.600 | 1.51680 | 63.9 |
| 23 | ∞ | D23 (Variable) | | |

[Aspherical surface data]

Fifth surface k = 1.00000
A4 = −1.10646E−06, A6 = −5.14585E−10,
A8 = 0.00000E+00, A10 = 0.00000E+00

Sixth surface k = 1.00000
A4 = 3.82437E−07, A6 = −2.48354E−10,
A8 = 0.00000E+00, A10 = 0.00000E+00

Fourteenth surface k = 1.00000
A4 = 2.59966E−06, A6 = 2.78570E−09,
A8 = 0.00000E+00, A10 = 0.00000E+00

Fifteenth surface k = 1.00000
A4 = 9.97453E−06, A6 = 1.00933E−08,
A8 = 0.00000E+00, A10 = 0.00000E+00

[Variable distance data]

| | Upon focusing on infinity f = 51.59 | Upon focusing on a short-distance object β = −0.1508 |
|---|---|---|
| D0 | ∞ | 319.20 |
| D11 | 15.367 | 5.165 |
| D17 | 3.000 | 13.203 |
| D23 | 0.999 | 0.999 |

[lens group data]

| group | starting surface | focal length |
|---|---|---|
| G1 | 1 | 68.17 |
| G2 | 12 | 56.22 |
| G3 | 18 | −101.37 |

[Conditional Expression Corresponding Value]

| | |
|---|---|
| Conditional Expression (1) | BFa/f = 0.253 |
| Conditional Expression (2) | (−G1R1)/f = 0.721 |
| Conditional Expression (3), (3-1), (3-2) | (−G1R1)/f1 = 0.546 |
| Conditional Expression (4) | f/f1 = 0.757 |
| Conditional Expression (5) | f/f2 = 0.918 |
| Conditional Expression (6) | f1/f2 = 1.213 |
| Conditional Expression (7) | f1/(−f3) = 0.672 |
| Conditional Expression (8) | fF/fR = 0.646 |
| Conditional Expression (9) | (G1R2 + G1R1)/ |

TABLE 1-continued

| | |
|---|---|
| | (G1R2 − G1R1) = 1.281 |
| Conditional Expression (10) | $\{1 − (\beta 2)^2\} \times (\beta 3)^2 = 0.613$ |
| Conditional Expression (11) | FNO × (f1/f) = 2.451 |
| Conditional Expression (12) | 2ω = 45.2 |

FIG. 2A illustrates various aberration n graphs upon focusing on infinity in the optical system according to the 1st example. In each aberration graph of FIG. 2A, FNO is the F-number and A is the half angle of view. Note that in the spherical aberration graph, the value of the F-number corresponding to the maximum aperture is illustrated, while in each of the astigmatism graph and the distortion graph, the maximum value of the half angle of view is illustrated, and in the lateral aberration graph, the value of each half angle of view is illustrated. FIG. 2B illustrates various aberration graphs upon focusing on a short-distance (close-up) object in the optical system according to the 1st example. In each aberration graph of FIG. 2B, NA is the numerical aperture and H0 is the object height. Note that in the spherical aberration graph, the value of the numerical aperture corresponding to the maximum aperture is illustrated, while in each of the astigmatism graph and the distortion graph, the maximum value of the object height is illustrated, and in the lateral aberration graph, the value of each object height is illustrated. Also, in the astigmatism graphs of FIGS. 2A and 2B, the solid line illustrates the sagittal image surface, while the dashed line illustrates the meridional image surface. Note that in the aberration graphs of each example illustrated hereinafter, signs similar to the present example will be used, and a duplicate description will be omitted.

The various aberration graphs demonstrate that the optical system according to the 1st example has excellent image forming performance in which various aberrations are corrected favorably.

2nd Example

The 2nd example will be described using FIGS. 3 and 4 and Table 2. FIG. 3 is a diagram illustrating the lens configuration for the state of focusing on infinity in the optical system according to the 2nd example of the present embodiment. The optical system LS(2) according to the 2nd example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a cemented lens consisting of a first negative lens L11 having a meniscus shape whose concave surface is pointed toward the object and a first positive lens L12 having a meniscus shape whose convex surface is pointed toward the object, a second positive lens L13 having a meniscus shape whose concave surface is pointed toward the object, a third positive lens L14 that is biconvex, a cemented lens consisting of a fourth positive lens L15 that is biconvex and a second negative lens L16 that is biconcave, and an aperture stop S, arranged in order from the object side. The lens surface on the object side of the third positive lens L14 is an aspherical surface.

The second lens group G2 comprises a negative lens L21 that is biconcave, a first positive lens L22 that is biconvex, and a second positive lens L23 having a meniscus shape whose concave surface is pointed toward the object, arranged in order from the object side. The lens surface on the image surface I side of the first positive lens L22 is an aspherical surface.

The third lens group G3 comprises a positive lens L31 having a meniscus shape whose concave surface is pointed toward the object, a first negative lens L32 having a meniscus shape whose concave surface is pointed toward the object, and a second negative lens L33 having a plano-concave shape whose concave surface is pointed toward the object, arranged in order from the object side. An image surface I is disposed on the image side of the third lens group G3. An interchangeable optical filter FL is arranged between the third lens group G3 and the image surface I.

Table 2 below lists data values regarding the optical system according to the 2nd example. Note that the 13th surface is a virtual surface.

TABLE 2

| [General Data] | |
|---|---|
| f | 51.60 |
| FNO | 1.85 |
| ω | 22.8 |
| Y | 21.70 |
| TL | 88.456 |
| BF | 13.100 |
| BFa | 12.555 |

| [Lens Data] | | | | |
|---|---|---|---|---|
| Surface Number | R | D | nd | vd |
| 1 | −39.70605 | 1.800 | 1.73800 | 32.3 |
| 2 | 68.44172 | 3.469 | 1.92286 | 20.9 |
| 3 | 740.55070 | 0.985 | | |
| 4 | −250.61896 | 4.504 | 1.59319 | 67.9 |
| 5 | −42.16654 | 0.200 | | |
| 6* | 41.73745 | 0.103 | 1.56093 | 36.6 |
| 7 | 40.99975 | 5.408 | 1.83481 | 42.7 |
| 8 | −316.20679 | 0.200 | | |
| 9 | 36.83151 | 7.628 | 1.49782 | 82.6 |
| 10 | −47.01014 | 1.500 | 1.62004 | 36.4 |
| 11 | 25.38130 | 4.386 | | |
| 12 | ∞ | D12 (Variable) | | (Aperture Stop S) |
| 13 | ∞ | 3.000 | | |
| 14 | −22.68035 | 1.100 | 1.64769 | 33.7 |
| 15 | 219.09880 | 0.200 | | |
| 16 | 85.95366 | 4.848 | 1.83481 | 42.7 |
| 17 | −48.70070 | 0.100 | 1.56093 | 36.6 |
| 18* | −38.65718 | 2.196 | | |
| 19 | −133.55548 | 6.300 | 1.60300 | 65.4 |
| 20 | −26.81373 | D20 (Variable) | | |
| 21 | −112.24414 | 2.782 | 1.90265 | 35.7 |
| 22 | −53.62057 | 5.134 | | |
| 23 | −41.69274 | 2.000 | 1.53172 | 48.8 |
| 24 | −133.37205 | 2.166 | | |
| 25 | −49.50596 | 2.000 | 1.60342 | 38.0 |
| 26 | ∞ | 10.500 | | |
| 27 | ∞ | 1.600 | 1.51680 | 64.1 |
| 28 | ∞ | D28 | | |

TABLE 2-continued (Variable)

[Aspherical surface data]
Sixth surface k = 1.00000
A4 = −8.44128E−07, A6 = 9.38473E−10,
A8 = −2.90073E−12, A10 = 6.84753E−15

Eighteenth surface k = 1.00000
A4 = 1.66834E−05, A6 = 1.07396E−08,
A8 = 3.36895E−11, A10 = −1.25245E−13

[Variable distance data]

|  | Upon focusing on infinity f = 51.60 | Upon focusing on a short-distance object β = −0.1562 |
|---|---|---|
| D0 | ∞ | 311.54 |
| D12 | 10.848 | 2.392 |
| D20 | 2.500 | 10.956 |
| D28 | 1.000 | 1.000 |

[lens group data]

| group | starting surface | focal length |
|---|---|---|
| G1 | 1 | 78.05 |
| G2 | 13 | 49.80 |
| G3 | 21 | −88.77 |

[Conditional Expression Corresponding Value]

| Conditional Expression (1) | BFa/f = 0.243 |
|---|---|
| Conditional Expression (2) | (−G1R1)/f = 0.769 |
| Conditional Expression (3), (3-1), (3-2) | (−G1R1)/f1 = 0.509 |
| Conditional Expression (4) | f/f1 = 0.661 |
| Conditional Expression (5) | f/f2 = 1.036 |
| Conditional Expression (6) | f1/f2 = 1.567 |
| Conditional Expression (7) | f1/(−f3) = 0.879 |
| Conditional Expression (8) | fF/fR = 0.877 |
| Conditional Expression (9) | (G1R2 + G1R1)/(G1R2 − G1R1) = 0.898 |
| Conditional Expression (10) | $\{1 - (\beta2)^2\} \times (\beta3)^2$ = 0.827 |
| Conditional Expression (11) | FNO × (f1/f) = 2.805 |
| Conditional Expression (12) | 2ω = 45.6 |

FIG. 4A illustrates various aberration graphs upon focusing on infinity in the optical system according to the 2nd example. FIG. 4B illustrates various aberration graphs upon focusing on a short-distance (close-up) object in the optical system according to the 2nd example. The various aberration graphs demonstrate that the optical system according to the 2nd example has excellent image forming performance in which various aberrations are corrected favorably.

3rd Example

Figure 5:
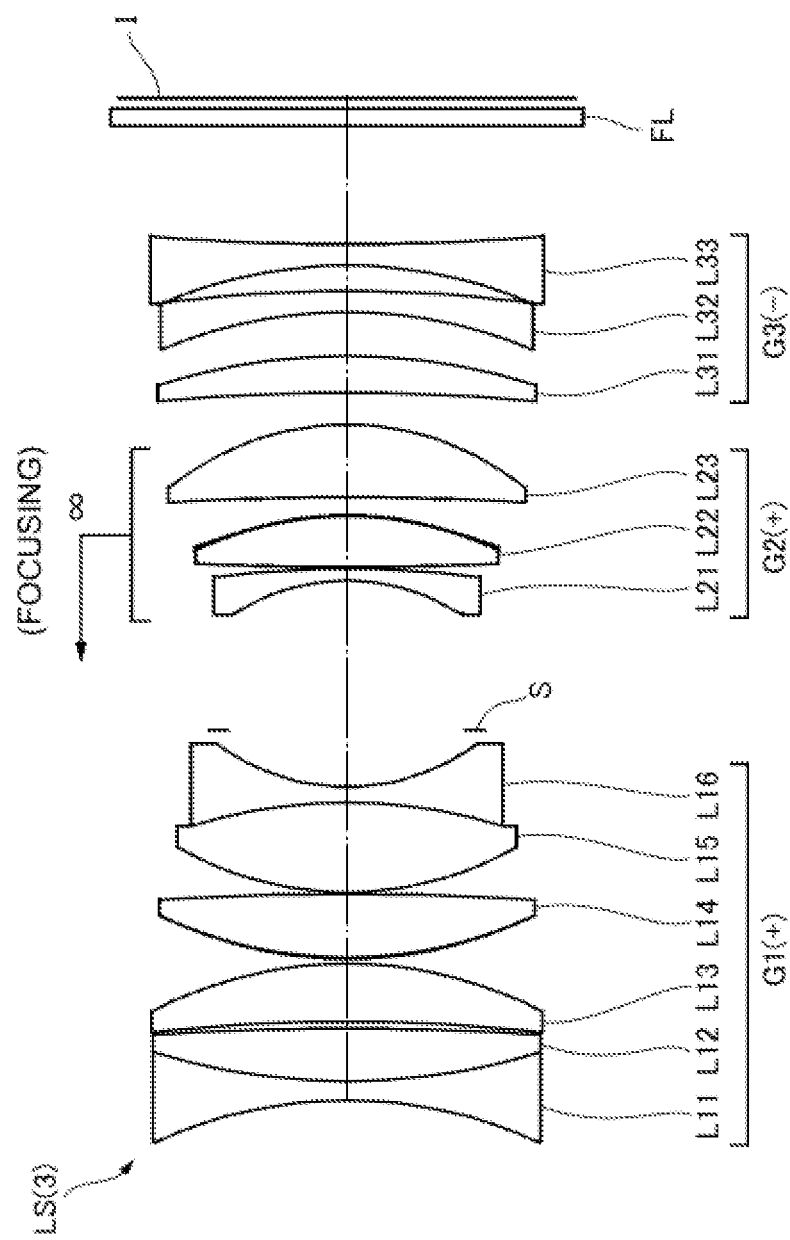
FIG. 5 is a lens configuration diagram for the state of focusing on infinity in an optical system according to a 3rd example.

The 3rd example will be described using FIGS. 5 and 6 and Table 3. FIG. 5 is a diagram illustrating the lens configuration for the state of focusing on infinity in the optical system according to the 3rd example of the present embodiment . . . . The optical system LS(3) according to the 3rd example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a cemented lens consisting of a first negative lens L11 that is biconcave and a first positive lens L12 that is biconvex, a second positive lens L13 having a meniscus shape whose concave surface is pointed toward the object, a third positive lens L14 that is biconvex, a cemented lens consisting of a fourth positive lens L15 that is biconvex and a second negative lens L16 that is biconcave, and an aperture stop S, arranged in order from the object side. The lens surface on the object side of the third positive lens L14 is an aspherical surface.

The second lens group G2 comprises a negative lens L21 having a meniscus shape whose concave surface is pointed toward the object, a first positive lens L22 that is biconvex, and a second positive lens L23 having a meniscus shape whose concave surface is pointed toward the object, arranged in order from the object side. The lens surface on the image surface I side of the first positive lens L22 is an aspherical surface.

The third lens group G3 comprises a positive lens L31 having a meniscus shape whose concave surface is pointed toward the object, a first negative lens L32 having a meniscus shape whose concave surface is pointed toward the object, and a second negative lens L33 that is biconcave, arranged in order from the object side. An image surface I is disposed on the image side of the third lens group G3. An interchangeable optical filter FL is arranged between the third lens group G3 and the image surface I.

Table 3 below lists data values regarding the optical system according to the 3rd example. Note that the 6th surface and the 14th surface are virtual surfaces.

TABLE 3

[General Data]

| f | 51.60 |
|---|---|
| FNO | 1.86 |
| ω | 23.0 |
| Y | 21.70 |
| TL | 95.000 |
| BF | 13.826 |
| BFa | 13.291 |

[Lens Data]

| Surface Number | R | D | nd | vd |
|---|---|---|---|---|
| 1 | −43.62202 | 1.800 | 1.95375 | 32.3 |
| 2 | 62.41759 | 5.000 | 1.84666 | 23.8 |
| 3 | −281.93425 | 0.654 | | |
| 4 | −167.37782 | 5.500 | 1.59319 | 67.9 |
| 5 | −40.10469 | 0.476 | | |
| 6 | ∞ | 0.000 | | |
| 7* | 39.95627 | 0.100 | 1.56093 | 36.6 |
| 8 | 41.35117 | 6.000 | 1.83481 | 42.7 |
| 9 | −308.32218 | 0.200 | | |
| 10 | 32.49687 | 8.500 | 1.49782 | 82.6 |
| 11 | −50.34522 | 1.500 | 1.58144 | 41.0 |
| 12 | 20.84633 | 5.400 | | |
| 13 | ∞ | D13 (Variable) | | (Aperture Stop S) |
| 14 | ∞ | 3.100 | | |
| 15 | −19.87542 | 1.100 | 1.67270 | 32.2 |
| 16 | −102.49215 | 0.200 | | |
| 17 | 349.06334 | 4.800 | 1.75500 | 52.3 |
| 18 | −33.68733 | 0.100 | 1.56093 | 36.6 |
| 19* | −30.20400 | 1.700 | | |
| 20 | −294.17915 | 6.900 | 1.49782 | 82.6 |
| 21 | −26.73936 | D21 | | |

TABLE 3-continued

|   | (Variable) | | | |
|---|---|---|---|---|
| 22 | −208.87897 | 3.500 | 2.00069 | 25.5 |
| 23 | −59.64897 | 4.172 | | |
| 24 | −45.02223 | 2.000 | 1.62004 | 36.4 |
| 25 | −133.33333 | 2.419 | | |
| 26 | −45.00000 | 2.000 | 1.62004 | 36.4 |
| 27 | 224.57692 | 11.236 | | |
| 28 | ∞ | 1.600 | 1.51680 | 64.1 |
| 29 | ∞ | D29 | | |
|   | (Variable) | | | |

[Aspherical surface data]
Seventh surface k = 1.00000
A4 = −1.17140E−06, A6 = 4.04242E−10,
A8 = 0.00000E+00, A10 = 0.00000E+00

Nineteenth surface k = 1.00000
A4 = 1.13379E−05, A6 = 1.62636E−08,
A8 = 0.00000E+00, A10 = 0.00000E+00

[Variable distance data]

| | Upon focusing on infinity f = 51.60 | Upon focusing on a short-distance object β = −0.1591 |
|---|---|---|
| D0 | ∞ | 305.00 |
| D13 | 11.043 | 2.821 |
| D21 | 3.000 | 11.223 |
| D29 | 1.000 | 1.000 |

[lens group data]

| group | starting surface | focal length |
|---|---|---|
| G1 | 1 | 82.69 |
| G2 | 14 | 49.27 |
| G3 | 22 | −80.88 |

[Conditional Expression Corresponding Value]

| | |
|---|---|
| Conditional Expression (1) | BFa/f = 0.258 |
| Conditional Expression (2) | (−G1R1)/f = 0.845 |
| Conditional Expression (3), (3-1), (3-2) | (−G1R1)/f1 = 0.528 |
| Conditional Expression (4) | f/f1 = 0.624 |
| Conditional Expression (5) | f/f2 = 1.047 |
| Conditional Expression (6) | f1/f2 = 1.678 |
| Conditional Expression (7) | f1/(−f3) = 1.022 |
| Conditional Expression (8) | fF/fR = 0.923 |
| Conditional Expression (9) | (G1R2 + G1R1)/(G1R2 − G1R1) = 1.366 |
| Conditional Expression (10) | $\{1 − (\beta 2)^2\} \times (\beta 3)^2 = 0.881$ |
| Conditional Expression (11) | FNO × (f1/f) = 2.983 |
| Conditional Expression (12) | 2ω = 46.0 |

Figure 6A:
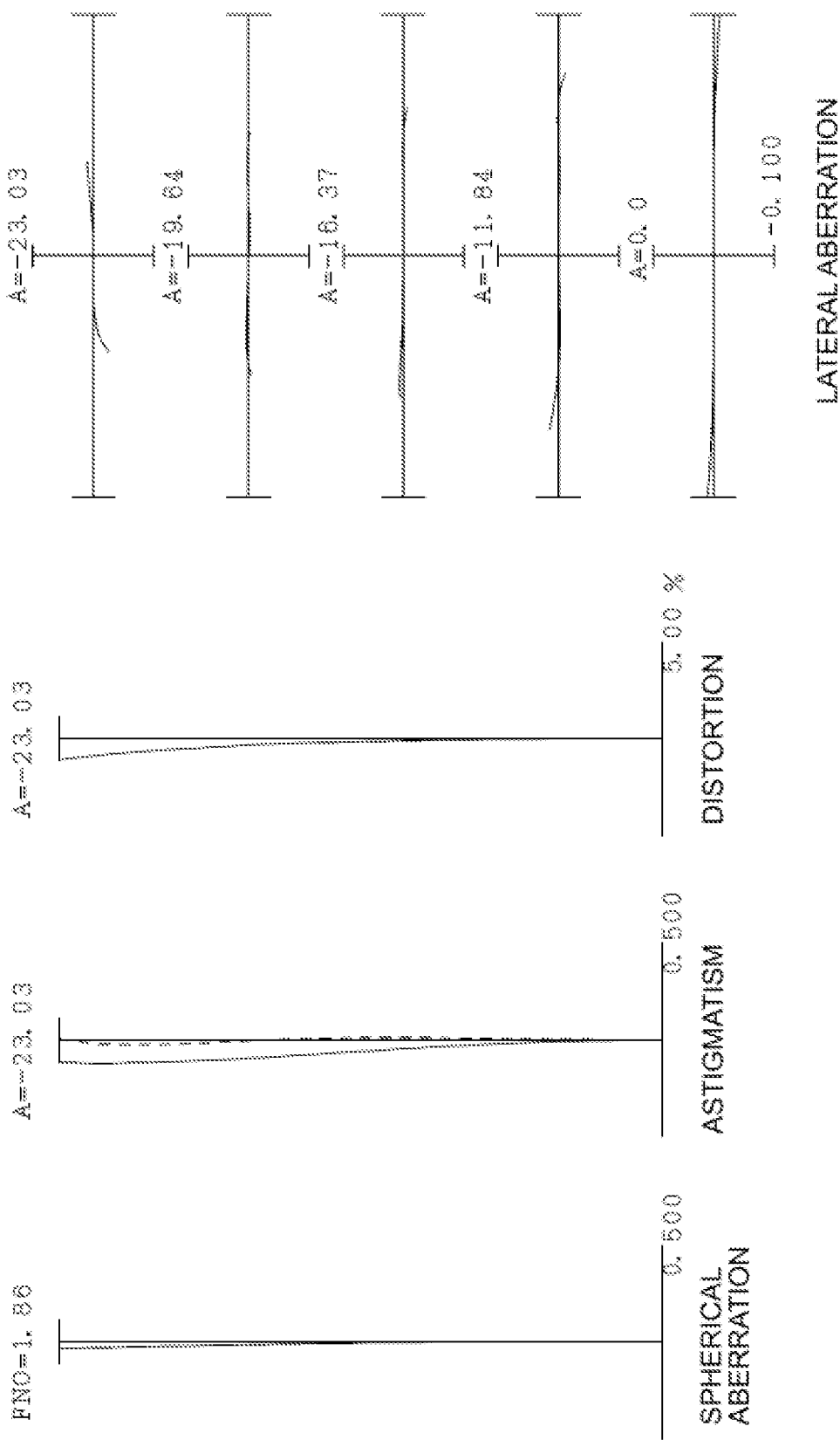

FIG. 6A illustrates various aberration graphs upon focusing on infinity in the optical system according to the 3rd example. FIG. 6B illustrates various aberration graphs upon focusing on a short-distance (close-up) object in the optical system according to the 3rd example. The various aberration graphs demonstrate that the optical system according to the 3rd example has excellent image forming performance in which various aberrations are corrected favorably.

4th Example

The 4th example will be described using FIGS. 7 and 8 and Table 4. FIG. 7 is a diagram illustrating the lens configuration for the state of focusing on infinity in the optical system according to the 4th example of the present embodiment. The optical system LS(4) according to the 4th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a cemented lens consisting of a first negative lens L11 that is biconcave and a first positive lens L12 having a meniscus shape whose convex surface is pointed toward the object, a second positive lens L13 having a meniscus shape whose concave surface is pointed toward the object, a third positive lens L14 having a meniscus shape whose convex surface is pointed toward the object, a cemented lens consisting of a fourth positive lens L15 that is biconvex and a second negative lens L16 that is biconcave, and an aperture stop S, arranged in order from the object side. The lens surface on the object side of the third positive lens L14 is an aspherical surface.

The second lens group G2 comprises a negative lens L21 that is biconcave, a first positive lens L22 that is biconvex, and a second positive lens L23 having a meniscus shape whose concave surface is pointed toward the object, arranged in order from the object side. The lens surface on the image surface I side of the first positive lens L22 is an aspherical surface.

The third lens group G3 comprises a positive lens L31 having a meniscus shape whose concave surface is pointed toward the object, a first negative lens L32 having a meniscus shape whose concave surface is pointed toward the object, and a second negative lens L33 having a meniscus shape whose concave surface is pointed toward the object, arranged in order from the object side. An image surface I is disposed on the image side of the third lens group G3. An interchangeable optical filter FL is arranged between the third lens group G3 and the image surface I.

Table 4 below lists data values regarding the optical system according to the 4th example. Note that the 13th surface is a virtual surface.

TABLE 4

[General Data]

| | |
|---|---|
| f | 51.60 |
| FNO | 1.85 |
| ω | 23.0 |
| Y | 21.70 |
| TL | 93.423 |
| BF | 13.099 |
| BFa | 12.554 |

[Lens Data]

| Surface Number | R | D | nd | νd |
|---|---|---|---|---|
| 1 | −49.34582 | 1.800 | 1.64769 | 33.7 |
| 2 | 46.34338 | 4.852 | 1.94595 | 18.0 |
| 3 | 88.17135 | 2.830 | | |
| 4 | −385.68443 | 6.805 | 1.75500 | 52.3 |
| 5 | −55.81519 | 0.100 | | |
| 6* | 32.37146 | 0.300 | 1.56093 | 36.6 |
| 7 | 34.78660 | 6.291 | 1.75500 | 52.3 |
| 8 | 3421.80810 | 0.200 | | |
| 9 | 34.21341 | 7.021 | 1.59319 | 67.9 |
| 10 | −76.80721 | 1.500 | 1.64769 | 33.7 |
| 11 | 20.90542 | 5.045 | | |

TABLE 4-continued

| | | | | |
|---|---|---|---|---|
| 12 | ∞ | D12 (Variable) | | (Aperture Stop S) |
| 13 | ∞ | 2.700 | | |
| 14 | −23.99823 | 1.100 | 1.64769 | 33.7 |
| 15 | 814.45031 | 0.200 | | |
| 16 | 93.44777 | 5.100 | 1.80400 | 46.6 |
| 17 | −40.16052 | 0.152 | 1.56093 | 36.6 |
| 18* | −34.60672 | 3.204 | | |
| 19 | −128.30142 | 6.400 | 1.49782 | 82.6 |
| 20 | −26.31276 | D20 (Variable) | | |
| 21 | −78.26552 | 2.798 | 1.94595 | 18.0 |
| 22 | −44.00653 | 2.232 | | |
| 23 | −46.73961 | 2.000 | 1.64769 | 33.7 |
| 24 | −150.55235 | 2.958 | | |
| 25 | −40.00000 | 1.900 | 1.64769 | 33.7 |
| 26 | −179.87126 | 10.500 | | |
| 27 | ∞ | 1.600 | 1.51680 | 64.1 |
| 28 | ∞ | D28 (Variable) | | |

[Aspherical surface data]
Sixth surface $k = 1.00000$
$A4 = -1.82369E-06$, $A6 = -1.73726E-09$,
$A8 = 2.00735E-12$, $A10 = -4.32700E-15$ Eighteenth surface $k = 1.00000$
$A4 = 1.61711E-05$, $A6 = 1.10899E-08$,
$A8 = 3.81964E-11$, $A10 = -1.19949E-13$

[Variable distance data]

| | Upon focusing on infinity<br>f = 51.60 | Upon focusing on a short-distance object<br>β = −0.1563 |
|---|---|---|
| D0 | ∞ | 306.58 |
| D12 | 10.336 | 2.398 |
| D20 | 2.500 | 10.438 |
| D28 | 0.999 | 0.999 |

[lens group data]

| group | starting surface | focal length |
|---|---|---|
| G1 | 1 | 73.48 |
| G2 | 13 | 47.81 |
| G3 | 21 | −81.77 |

[Conditional Expression Corresponding Value]

| | |
|---|---|
| Conditional Expression (1) | BFa/f = 0.243 |
| Conditional Expression (2) | (−G1R1)/f = 0.845 |
| Conditional Expression (3), (3-1), (3-2) | (−G1R1)/f1 = 0.528 |
| Conditional Expression (4) | f/f1 = 0.624 |
| Conditional Expression (5) | f/f2 = 1.047 |
| Conditional Expression (6) | f1/f2 = 1.678 |
| Conditional Expression (7) | f1/(−f3) = 1.022 |
| Conditional Expression (8) | fF/fR = 0.923 |
| Conditional Expression (9) | (G1R2 + G1R1)/(G1R2 − G1R1) = 1.366 |
| Conditional Expression (10) | $\{1 - (\beta 2)^2\} \times (\beta 3)^2 = 0.881$ |
| Conditional Expression (11) | FNO × (f1/f) = 2.983 |
| Conditional Expression (12) | 2ω = 46.0 |

FIG. 8A illustrates various aberration graphs upon focusing on infinity in the optical system according to the 4th example. FIG. 8B illustrates various aberration graphs upon focusing on a short-distance (close-up) object in the optical system according to the 4th example. The various aberration graphs demonstrate that the optical system according to the 4th example has excellent image forming performance in which various aberrations are corrected favorably.

5th Example

Figure 9:
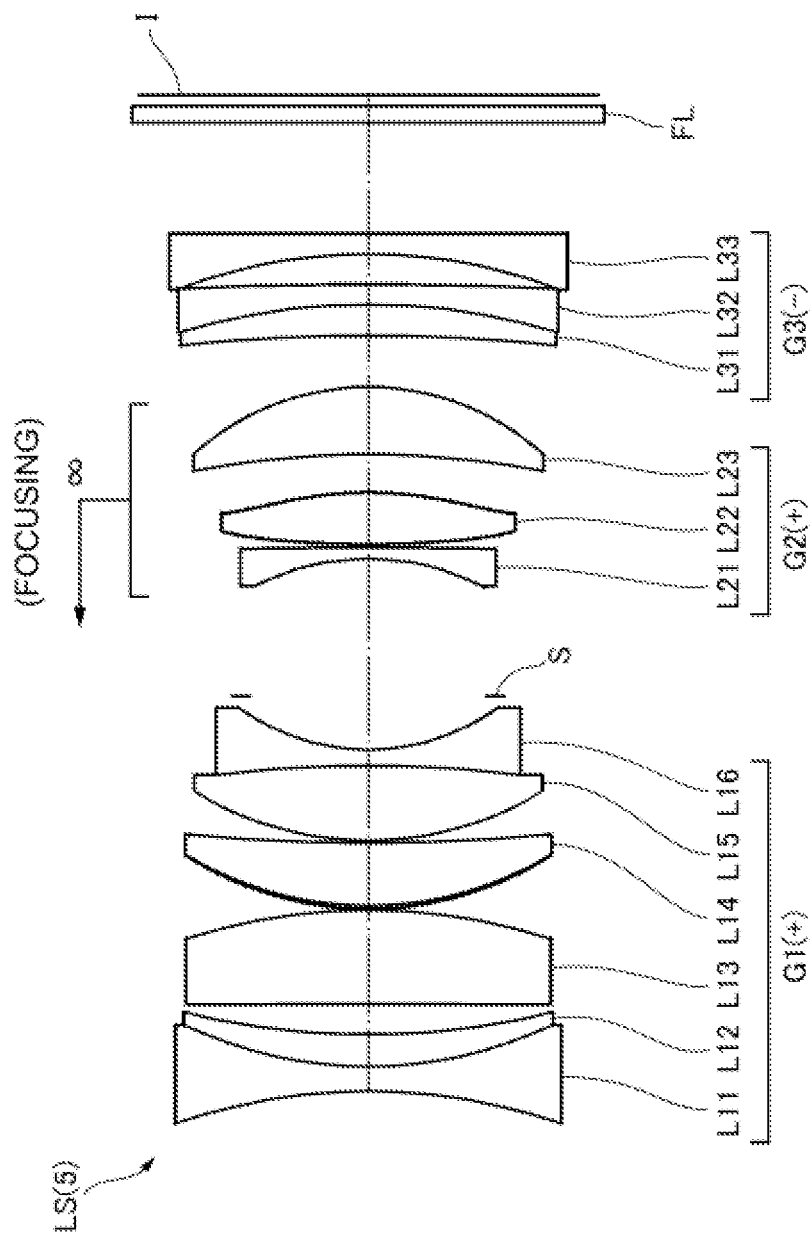
FIG. 9 is a lens configuration diagram for the state of focusing on infinity in an optical system according to a 5th example.

The 5th example will be described using FIGS. 9 and 10 and Table 5. FIG. 9 is a diagram illustrating the lens configuration for the state of focusing on infinity in the optical system according to the 5th example of the present embodiment. The optical system LS(5) according to the 5th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a cemented lens consisting of a first negative lens L11 that is biconcave and a first positive lens L12 having a meniscus shape whose convex surface is pointed toward the object, a second positive lens L13 having a meniscus shape whose concave surface is pointed toward the object, a third positive lens L14 having a meniscus shape whose convex surface is pointed toward the object, a cemented lens consisting of a fourth positive lens L15 that is biconvex and a second negative lens L16 that is biconcave, and an aperture stop S, arranged in order from the object side. The lens surface on the object side of the third positive lens L14 is an aspherical surface.

The second lens group G2 comprises a negative lens L21 having a meniscus shape whose concave surface is pointed toward the object, a first positive lens L22 that is biconvex, and a second positive lens L23 having a meniscus shape whose concave surface is pointed toward the object, arranged in order from the object side. The lens surface on either side of the first positive lens L22 is an aspherical surface.

The third lens group G3 comprises a cemented lens consisting of a positive lens L31 having a meniscus shape whose concave surface is pointed toward the object and a first negative lens L32 having a meniscus shape whose concave surface is pointed toward the object, and a second negative lens L33 having a plano-concave shape whose concave surface is pointed toward the object, arranged in order from the object side. An image surface I is disposed on the image side of the third lens group G3. An interchangeable optical filter FL is arranged between the third lens group G3 and the image surface I.

Table 5 below lists data values regarding the optical system according to the 5th example. Note that the 13th surface is a virtual surface.

TABLE 5

[General Data]

| | |
|---|---|
| f | 51.61 |
| FNO | 1.85 |
| ω | 22.8 |
| Y | 21.70 |
| TL | 94.298 |
| BF | 13.104 |
| BFa | 12.558 |

TABLE 5-continued

[Lens Data]

| Surface Number | R | D | nd | vd |
|---|---|---|---|---|
| 1 | −55.81981 | 2.351 | 1.67270 | 32.2 |
| 2 | 40.92718 | 3.030 | 1.94595 | 18.0 |
| 3 | 73.81686 | 2.866 | | |
| 4 | −2179.29960 | 8.923 | 1.75500 | 52.3 |
| 5 | −55.86755 | 0.100 | | |
| 6* | 31.91227 | 0.300 | 1.56093 | 36.6 |
| 7 | 33.62812 | 5.941 | 1.80400 | 46.6 |
| 8 | 179.47342 | 0.200 | | |
| 9 | 31.36834 | | | |
| 10 | −117.41333 | 1.500 | 1.67270 | 32.2 |
| 11 | 20.83074 | 5.078 | | |
| 12 | ∞ | D12 (Variable) | | (Aperture Stop S) |
| 13 | ∞ | 2.700 | | |
| 14 | −23.88176 | 1.100 | 1.64769 | 33.7 |
| 15 | −464.00395 | 0.306 | | |
| 16* | 107.59212 | 4.886 | 1.77377 | 47.2 |
| 17* | −34.57866 | 3.604 | | |
| 18 | −87.29087 | 6.386 | 1.49782 | 82.6 |
| 19 | −24.79412 | D19 (Variable) | | |
| 20 | −168.93770 | 2.949 | 1.94595 | 18.0 |
| 21 | −62.61109 | 1.900 | 1.62004 | 36.4 |
| 22 | −408.98106 | 2.897 | | |
| 23 | −49.70122 | 1.900 | 1.64769 | 33.7 |
| 24 | ∞ | 10.500 | | |
| 25 | ∞ | 1.600 | 1.51680 | 64.1 |
| 26 | ∞ | D26 (Variable) | | |

[Aspherical surface data]
Sixth surface k = 1.00000
A4 = −9.25285E−07, A6 = −2.44172E−10,
A8 = −5.83429E−13, A10 = 9.84913E−16

Sixteenth surface k = 1.00000
A4 = 2.83184E−06, A6 = 1.30771E−08,
A8 = 3.97727E−11, A10 = 2.50432E−13

Seventeenth surface k = 1.00000
A4 = 1.51803E−05, A6 = 3.07472E−08,
A8 = −2.44486E−11, A10 = 5.97193E−13

[Variable distance data]

| | Upon focusing on infinity f = 51.61 | Upon focusing on a short-distance object β = −0.1566 |
|---|---|---|
| D0 | ∞ | 305.70 |
| D12 | 10.295 | 2.359 |
| D19 | 4.868 | 12.804 |
| D26 | 1.004 | 1.004 |

[lens group data]

| group | starting surface | focal length |
|---|---|---|
| G1 | 1 | 74.25 |
| G2 | 13 | 47.70 |
| G3 | 20 | −83.87 |

[Conditional Expression Corresponding Value]

| Conditional Expression (1) | BFa/f = 0.243 |
|---|---|
| Conditional Expression (2) | (−G1R1)/f = 1.082 |
| Conditional Expression (3), (3-1), (3-2) | (−G1R1)/f1 = 0.752 |
| Conditional Expression (4) | f/f1 = 0.695 |
| Conditional Expression (5) | f/f2 = 1.082 |
| Conditional Expression (6) | f1/f2 = 1.556 |
| Conditional Expression (7) | f1/(−f3) = 0.885 |
| Conditional Expression (8) | fF/fR = 0.805 |
| Conditional Expression (9) | (G1R2 + G1R1)/(G1R2 − G1R1) = 0.139 |
| Conditional Expression (10) | $\{1 - (\beta 2)^2\} \times (\beta 3)^2 = 0.883$ |
| Conditional Expression (11) | FNO × (f1/f) = 2.668 |
| Conditional Expression (12) | 2ω = 45.6 |

Figure 10A:
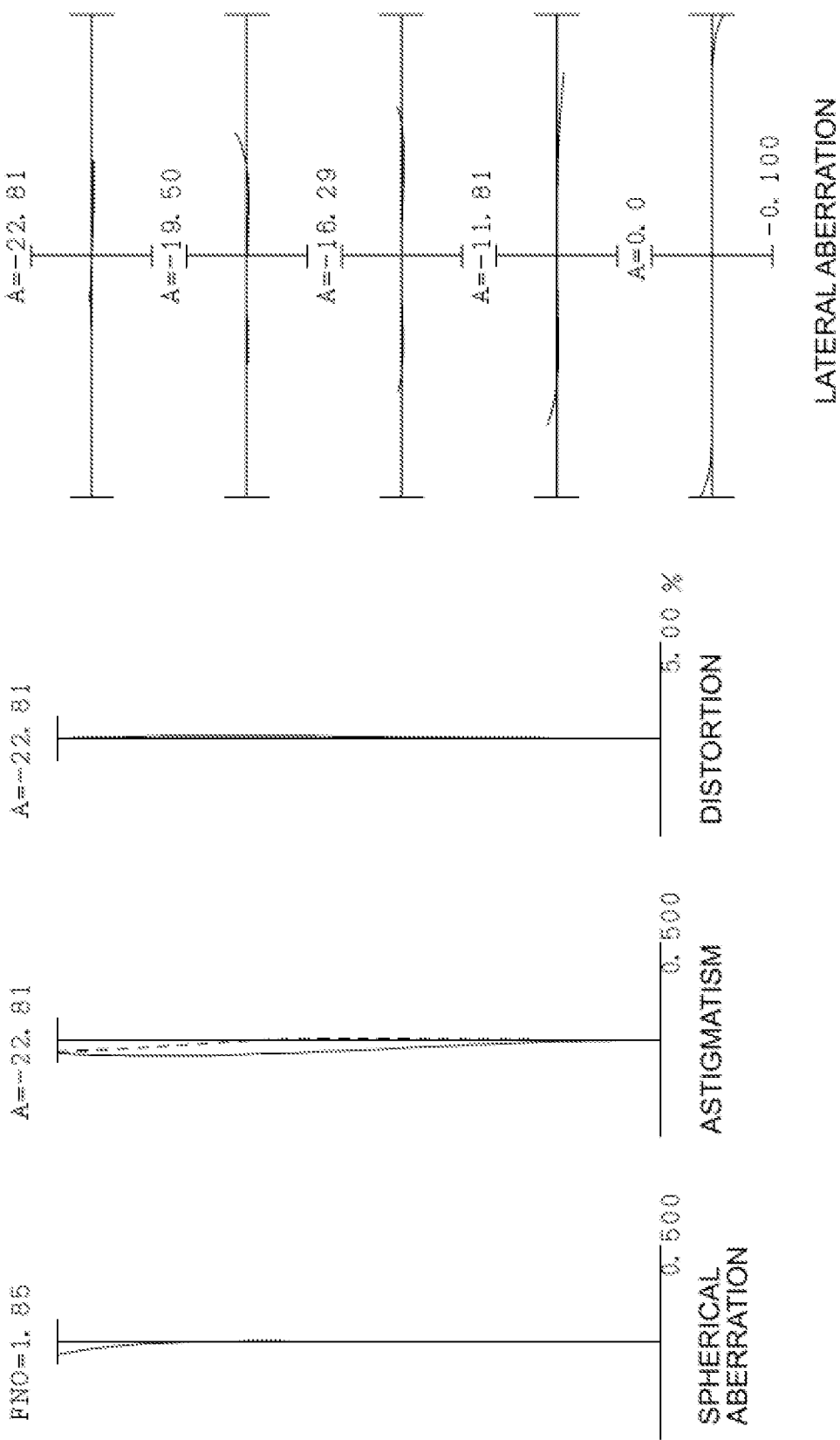
Figure 10B:
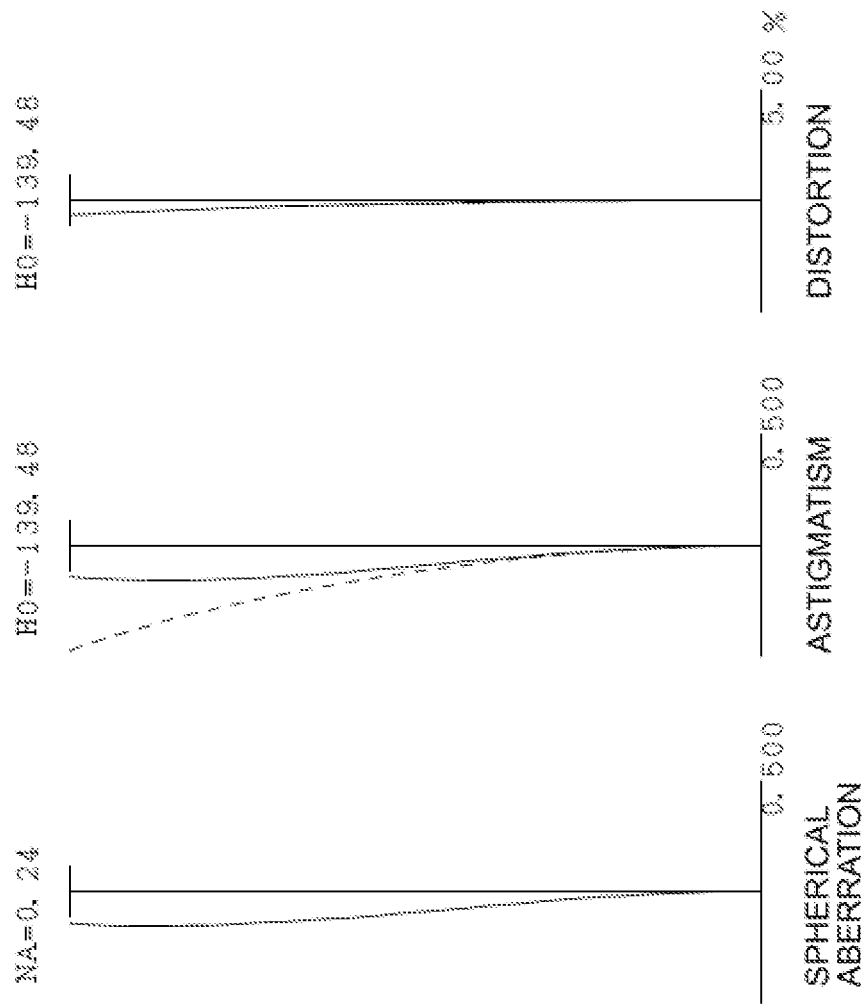
FIG. 10B illustrates various aberration graphs upon focusing on a short-distance object in the optical system according to the 5th example.

FIG. 10A illustrates various aberration graphs upon focusing on infinity in the optical system according to the 5th example. FIG. 10B illustrates various aberration graphs upon focusing on a short-distance (close-up) object in the optical system according to the 5th example. The various aberration graphs demonstrate that the optical system according to the 5th example has excellent image forming performance in which various aberrations are corrected favorably.

6th Example

Figure 11:
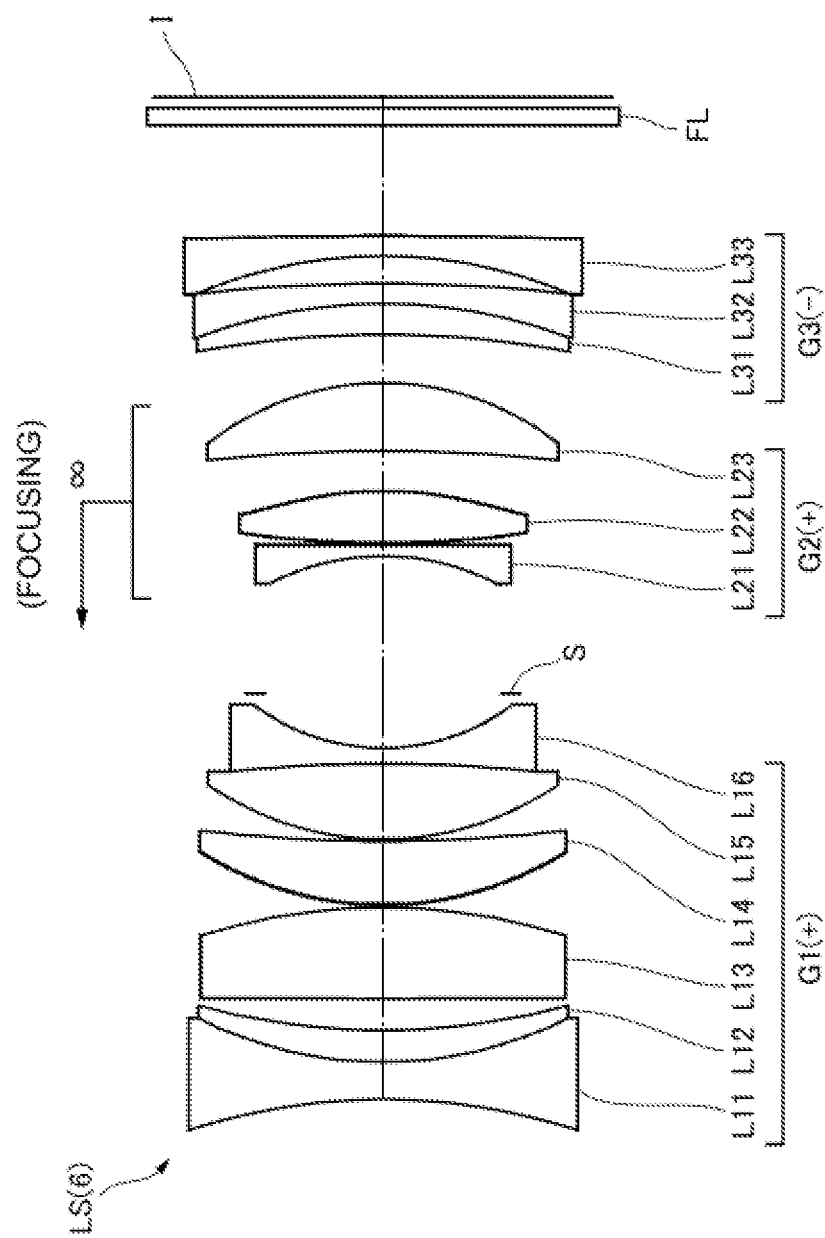
FIG. 11 is a lens configuration diagram for the state of focusing on infinity in an optical system according to a 6th example.

The 6th example will be described using FIGS. 11 and 12 and Table 6. FIG. 11 is a diagram illustrating the lens configuration for the state of focusing on infinity in the optical system according to the 6th example of the present embodiment. The optical system LS(6) according to the 6th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a cemented lens consisting of a first negative lens L11 that is biconcave and a first positive lens L12 having a meniscus shape whose convex surface is pointed toward the object, a second positive lens L13 that is biconvex, a third positive lens L14 having a meniscus shape whose convex surface is pointed toward the object, a cemented lens consisting of a fourth positive lens L15 that is biconvex and a second negative lens L16 that is biconcave, and an aperture stop S, arranged in order from the object side. The lens surface on the object side of the third positive lens L14 is an aspherical surface.

The second lens group G2 comprises a negative lens L21 that is biconcave, a first positive lens L22 that is biconvex, and a second positive lens L23 having a meniscus shape whose concave surface is pointed toward the object, arranged in order from the object side. The lens surface on either side of the first positive lens L22 is an aspherical surface.

The third lens group G3 comprises a cemented lens consisting of a positive lens L31 having a meniscus shape whose concave surface is pointed toward the object and a first negative lens L32 having a meniscus shape whose concave surface is pointed toward the object, and a second negative lens L33 having a plano-concave shape whose concave surface is pointed toward the object, arranged in order from the object side. An image surface I is disposed on the image side of the third lens group G3. An interchangeable optical filter FL is arranged between the third lens group G3 and the image surface I.

Table 6 below lists data values regarding the optical system according to the 6th example. Note that the 13th surface is a virtual surface.

TABLE 6

[General Data]

| | |
|---|---|
| f | 51.61 |
| FNO | 1.85 |
| ω | 22.7 |
| Y | 21.70 |
| TL | 94.879 |
| BF | 13.103 |
| BFa | 12.558 |

[Lens Data]

| Surface Number | R | D | nd | νd |
|---|---|---|---|---|
| 1 | −59.41700 | 3.521 | 1.67270 | 32.2 |
| 2 | 39.22460 | 3.028 | 1.94595 | 18.0 |
| 3 | 67.63630 | 2.963 | | |
| 4 | 3381.87660 | 8.656 | 1.75500 | 52.3 |
| 5 | −56.77477 | 0.200 | | |
| 6* | 32.10469 | 0.100 | 1.56093 | 36.6 |
| 7 | 32.39825 | 5.977 | 1.77250 | 49.6 |
| 8 | 150.72327 | 0.200 | | |
| 9 | 29.50426 | 7.110 | 1.59319 | 67.9 |
| 10 | −150.81319 | 1.500 | 1.64769 | 33.7 |
| 11 | 20.38598 | 5.145 | | |
| 12 | ∞ | D12 (Variable) | | (Aperture Stop S) |
| 13 | ∞ | 2.700 | | |
| 14 | −23.88655 | 1.100 | 1.64769 | 33.7 |
| 15 | 11241.53800 | 0.200 | | |
| 16* | 115.09348 | 4.892 | 1.77377 | 47.2 |
| 17* | −33.45446 | 3.784 | | |
| 18 | −154.31773 | 6.454 | | |
| 19 | −26.83890 | D19 (Variable) | | |
| 20 | −99.15080 | 2.941 | 1.94595 | 18.0 |
| 21 | −50.06903 | 1.900 | 1.60342 | 38.0 |
| 22 | −157.80139 | 2.610 | | |
| 23 | −45.69693 | 10.500 | | |
| 24 | −615.80945 | 1.600 | 1.51680 | 64.1 |
| 25 | ∞ | | | |
| 26 | ∞ | D26 (Variable) | | |

[Aspherical surface data]
Sixth surface k = 1.00000
A4 = −7.49375E−07, A6 = −1.64453E−10,
A8 = −6.23627E−13, A10 = 1.37024E−15

Sixteenth surface k = 1.00000
A4 = 4.71706E−08, A6 = 1.49836E−08,
A8 = 4.37655E−13, A10 = 2.84793E−13

Seventeenth surface k = 1.00000
A4 = 1.11172E−05, A6 = 3.11358E−08,
A8 = −9.41425E−11, A10 = 7.16057E−13

[Variable distance data]

| | Upon focusing on infinity f = 51.61 | Upon focusing on a short-distance object β = −0.1566 |
|---|---|---|
| D0 | ∞ | 305.12 |
| D12 | 10.330 | 2.348 |
| D19 | 4.563 | 12.545 |
| D26 | 1.003 | 1.005 |

TABLE 6-continued

[lens group data]

| group | starting surface | focal length |
|---|---|---|
| G1 | 1 | 71.11 |
| G2 | 13 | 47.97 |
| G3 | 20 | −83.32 |

[Conditional Expression Corresponding Value]

| | |
|---|---|
| Conditional Expression (1) | BFa/f = 0.243 |
| Conditional Expression (2) | (−G1R1)/f = 1.151 |
| Conditional Expression (3), (3-1), (3-2) | (−G1R1)/f1 = 0.836 |
| Conditional Expression (4) | f/f1 = 0.726 |
| Conditional Expression (5) | f/f2 = 1.076 |
| Conditional Expression (6) | f1/f2 = 1.482 |
| Conditional Expression (7) | f1/(−f3) = 0.853 |
| Conditional Expression (8) | fF/fR = 0.731 |
| Conditional Expression (9) | (G1R2 + G1R1)/(G1R2 − G1R1) = 0.065 |
| Conditional Expression (10) | $\{1 - (\beta 2)^2\} \times (\beta 3)^2 = 0.886$ |
| Conditional Expression (11) | FNO × (f1/f) = 2.555 |
| Conditional Expression (12) | 2ω = 45.4 |

FIG. 12A illustrates various aberration graphs upon focusing on infinity in the optical system according to the 6th example. FIG. 12B illustrates various aberration graphs upon focusing on a short-distance (close-up) object in the optical system according to the 6th example. The various aberration graphs demonstrate that the optical system according to the 6th example has excellent image forming performance in which various aberrations are corrected favorably.

7th Example

Figure 13:
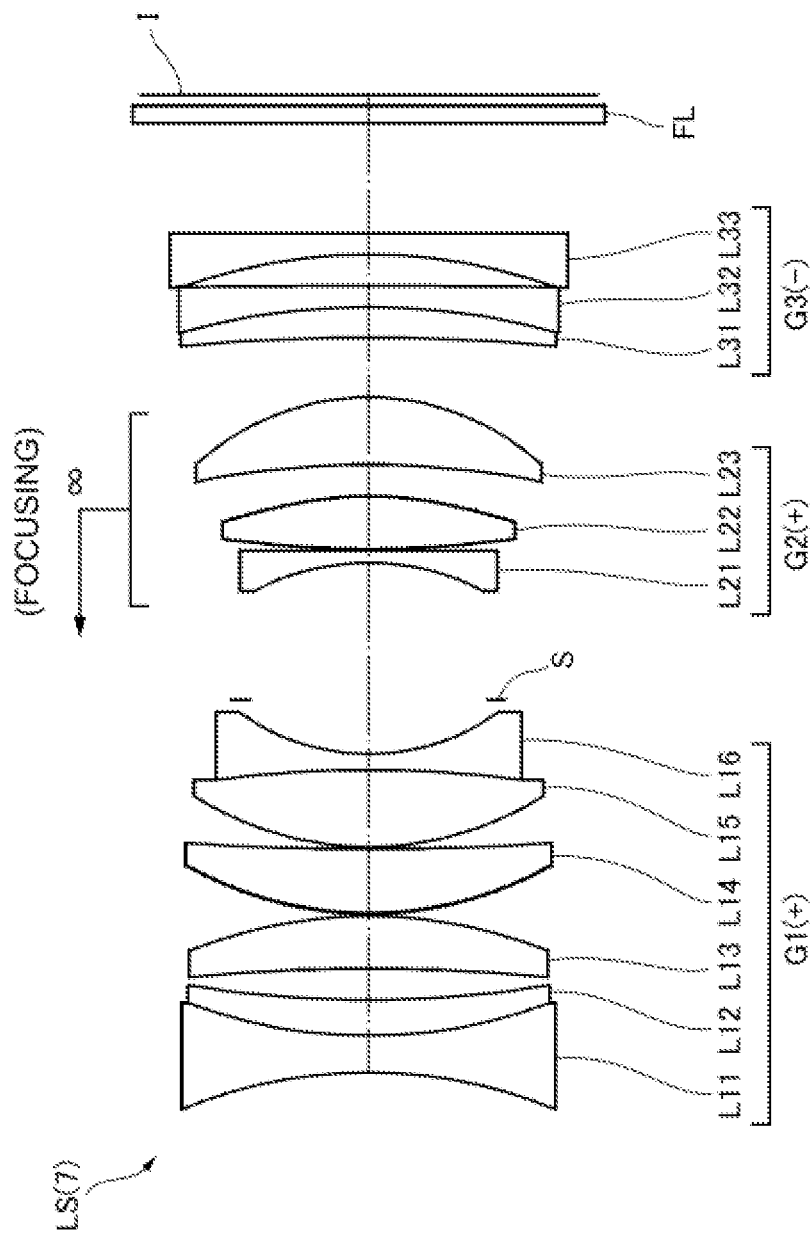
FIG. 13 is a lens configuration diagram for the state of focusing on infinity in an optical system according to a 7th example.

The 7th example will be described using FIGS. 13 and 14 and Table 7. FIG. 13 is a diagram illustrating the lens configuration for the state of focusing on infinity in the optical system according to the 7th example of the present embodiment. The optical system LS(7) according to the 7th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a cemented lens consisting of a first negative lens L11 that is biconcave and a first positive lens L12 having a meniscus shape whose convex surface is pointed toward the object, a second positive lens L13 having a meniscus shape whose concave surface is pointed toward the object, a third positive lens L14 having a meniscus shape whose convex surface is pointed toward the object, a cemented lens consisting of a fourth positive lens L15 that is biconvex and a second negative lens L16 that is biconcave, and an aperture stop S, arranged in order from the object side. The lens surface on the object side of the third positive lens L14 is an aspherical surface.

The second lens group G2 comprises a negative lens L21 that is biconcave, a first positive lens L22 that is biconvex, and a second positive lens L23 having a meniscus shape whose concave surface is pointed toward the object, arranged in order from the object side. The lens surface on either side of the first positive lens L22 is an aspherical surface.

The third lens group G3 comprises a cemented lens consisting of a positive lens L31 having a meniscus shape whose concave surface is pointed toward the object and a first negative lens L32 having a meniscus shape whose concave surface is pointed toward the object, and a second negative lens L33 having a plano-concave shape whose concave surface is pointed toward the object, arranged in order from the object side. An image surface I is disposed on the image side of the third lens group G3. An interchangeable optical filter FL is arranged between the third lens group G3 and the image surface I.

Table 7 below lists data values regarding the optical system according to the 7th example. Note that the 13th surface is a virtual surface.

TABLE 7

[General Data]

| | |
|---|---|
| f | 51.60 |
| FNO | 1.85 |
| ω | 23.0 |
| Y | 21.70 |
| TL | 92.606 |
| BF | 13.099 |
| BFa | 12.554 |

[Lens Data]

| Surface Number | R | D | nd | νd |
|---|---|---|---|---|
| 1 | −45.97401 | 3.464 | 1.67270 | 32.2 |
| 2 | 49.61070 | 3.386 | 1.94595 | 18.0 |
| 3 | 104.71966 | 2.977 | | |
| 4 | −171.07801 | 4.990 | 1.72916 | 54.6 |
| 5 | −45.04067 | 0.200 | | |
| 6* | 34.58722 | 0.100 | 1.56093 | 36.6 |
| 7 | 35.08925 | 6.046 | 1.80400 | 46.6 |
| 8 | 271.36284 | 0.200 | | |
| 9 | 30.75373 | 7.301 | 1.59319 | 67.9 |
| 10 | −109.57751 | 1.500 | 1.64769 | 33.7 |
| 11 | 21.09749 | 5.107 | | |
| 12 | ∞ | D12 (Variable) | | (Aperture Stop S) |
| 13 | ∞ | 2.700 | | |
| 14 | −23.42611 | 1.100 | 1.64769 | 33.7 |
| 15 | 1293.83890 | 0.200 | | |
| 16* | 96.25206 | 5.000 | 1.77377 | 47.2 |
| 17* | −33.63182 | 2.984 | | |
| 18 | −84.68095 | 6.400 | 1.49782 | 82.6 |
| 19 | −24.24361 | D19 (Variable) | | |
| 20 | −198.33414 | 2.923 | 1.94595 | 18.0 |
| 21 | −66.60448 | 2.000 | 1.64769 | 33.7 |
| 22 | −1255.72680 | 2.962 | | |
| 23 | −53.07631 | 2.000 | 1.64769 | 33.7 |
| 24 | ∞ | 10.500 | | |
| 25 | ∞ | 1.600 | 1.51680 | 64.1 |
| 26 | ∞ | D26 (Variable) | | |

[Aspherical surface data]
Sixth surface k = 1.00000
A4 = −9.44039E−07, A6 = −7.11276E−10,
A8 = 1.77477E−12, A10 = −1.49090E−15

Sixteenth surface k = 1.00000
A4 = −7.09863E−07, A6 = 1.39281E−08,
A8 = −7.11118E−11, A10 = −9.85203E−14

Seventeenth surface k = 1.00000
A4 = 1.29000E−05, A6 = 1.77000E−08,
A8 = 4.64016E−11, A10 = −4.30856E−13

TABLE 7-continued

[Variable distance data]

| | Upon focusing on infinity f = 51.60 | Upon focusing on a short-distance object β = −0.1564 |
|---|---|---|
| D0 | ∞ | 307.39 |
| D12 | 10.322 | 2.393 |
| D19 | 5.645 | 13.574 |
| D26 | 0.999 | 0.999 |

[lens group data]

| group | starting surface | focal length |
|---|---|---|
| G1 | 1 | 73.64 |
| G2 | 13 | 48.40 |
| G3 | 20 | −83.16 |

[Conditional Expression Corresponding Value]

| | |
|---|---|
| Conditional Expression (1) | BFa/f = 0.243 |
| Conditional Expression (2) | (−G1R1)/f = 0.891 |
| Conditional Expression (3), (3-1), (3-2) | (−G1R1)/f1 = 0.624 |
| Conditional Expression (4) | f/f1 = 0.701 |
| Conditional Expression (5) | f/f2 = 1.066 |
| Conditional Expression (6) | f1/f2 = 1.522 |
| Conditional Expression (7) | f1/(−f3) = 0.886 |
| Conditional Expression (8) | fF/fR = 0.769 |
| Conditional Expression (9) | (G1R2 + G1R1)/(G1R2 − G1R1) = 0.390 |
| Conditional Expression (10) | {1 − (β2)$^2$} × (β3)$^2$ = 0.883 |
| Conditional Expression (11) | FNO × (f1/f) = 2.646 |
| Conditional Expression (12) | 2ω = 46.0 |

Figure 14A:
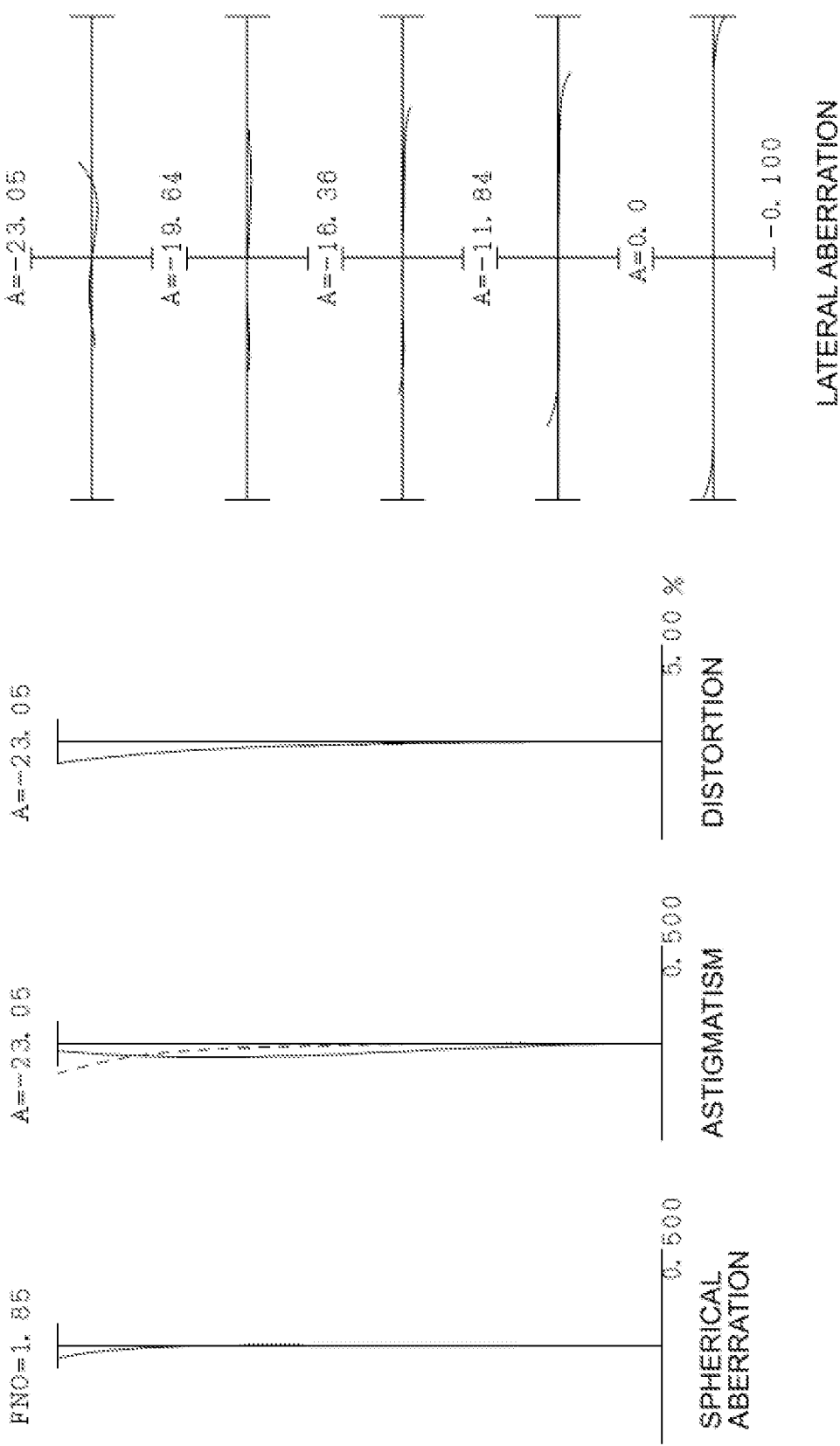

FIG. 14A illustrates various aberration graphs upon focusing on infinity in the optical system according to the 7th example. FIG. 14B illustrates various aberration graphs upon focusing on a short-distance (close-up) object in the optical system according to the 7th example. The various aberration graphs demonstrate that the optical system according to the 7th example has excellent image forming performance in which various aberrations are corrected favorably.

8th Example

Figure 15:
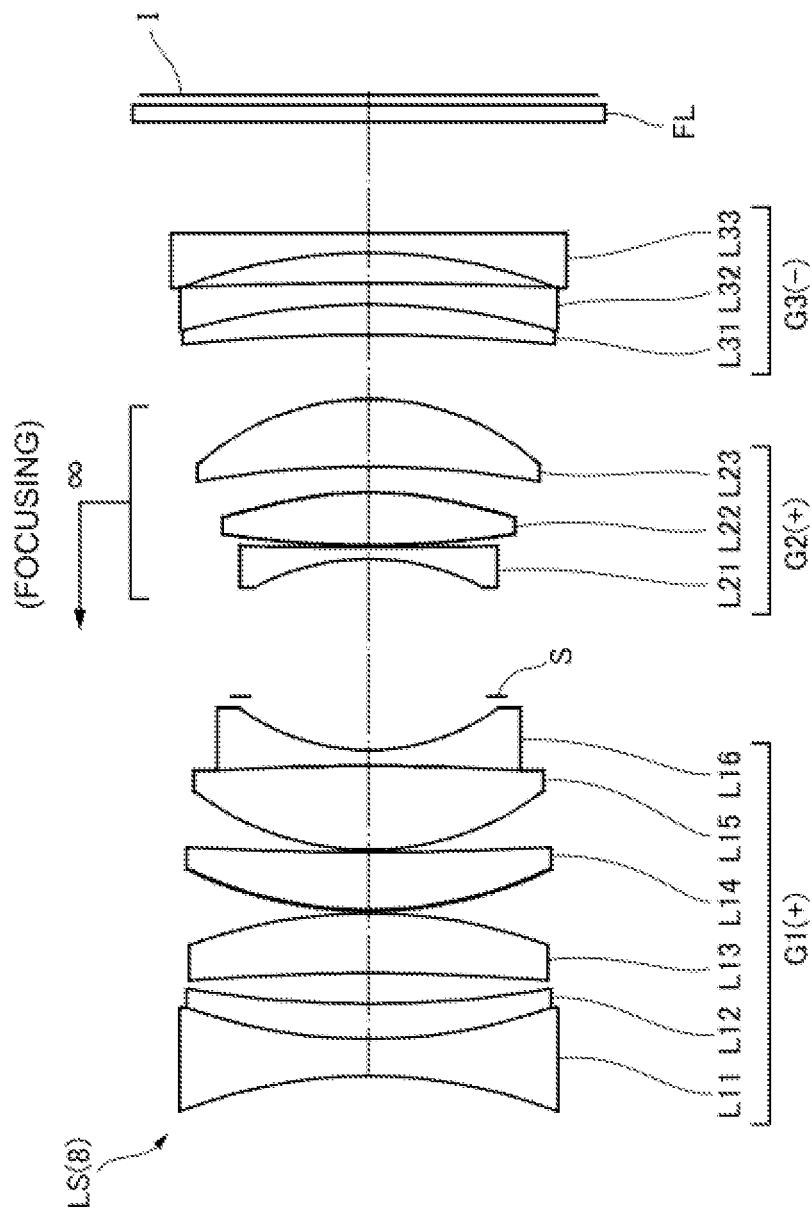
FIG. 15 is a lens configuration diagram for the state of focusing on infinity in an optical system according to an 8th example.

The 8th example will be described using FIGS. 15 and 16 and Table 8. FIG. 15 is a diagram illustrating the lens configuration for the state of focusing on infinity in the optical system according to the 8th example of the present embodiment. The optical system LS(8) according to the 8th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a cemented lens consisting of a first negative lens L11 that is biconcave and a first positive lens L12 having a meniscus shape whose convex surface is pointed toward the object, a second positive lens L13 having a meniscus shape whose concave surface is pointed toward the object, a third positive lens L14 having a meniscus shape whose convex surface is pointed toward the object, a cemented lens consisting of a fourth positive lens L15 that is biconvex and a second negative lens L16 that is biconcave, and an aperture stop S, arranged in order from the object side. The lens surface on the object side of the third positive lens L14 is an aspherical surface.

The second lens group G2 comprises a negative lens L21 that is biconcave, a first positive lens L22 that is biconvex, and a second positive lens L23 having a meniscus shape whose concave surface is pointed toward the object, arranged in order from the object side. The lens surface on either side of the first positive lens L22 is an aspherical surface.

The third lens group G3 comprises a cemented lens consisting of a positive lens L31 having a meniscus shape whose concave surface is pointed toward the object and a first negative lens L32 having a meniscus shape whose concave surface is pointed toward the object, and a second negative lens L33 having a plano-concave shape whose concave surface is pointed toward the object, arranged in order from the object side. An image surface I is disposed on the image side of the third lens group G3. An interchangeable optical filter FL is arranged between the third lens group G3 and the image surface I.

Table 8 below lists data values regarding the optical system according to the 8th example. Note that the 13th surface is a virtual surface.

TABLE 8

[General Data]

| | |
|---|---|
| f | 51.60 |
| FNO | 1.85 |
| ω | 22.9 |
| Y | 21.70 |
| TL | 93.035 |
| BF | 13.101 |
| BFa | 12.556 |

[Lens Data]

| Surface Number | R | D | nd | vd |
|---|---|---|---|---|
| 1 | −49.74101 | | | |
| 2 | 51.83840 | 3.342 | 1.94595 | 18.0 |
| 3 | 105.00000 | 2.890 | | |
| 4 | −198.79923 | 5.698 | 1.72916 | 54.6 |
| 5 | −48.74109 | 0.216 | | |
| 6* | 39.85460 | 0.100 | 1.56093 | 36.6 |
| 7 | 39.94369 | 5.459 | 1.80400 | 46.6 |
| 8 | 306.55979 | 0.200 | | |
| 9 | 27.39919 | 7.979 | 1.59319 | 67.9 |
| 10 | −244.36823 | 1.500 | 1.64769 | 33.7 |
| 11 | 21.09582 | 5.098 | | |
| 12 | ∞ | D12 (Variable) | | (Aperture Stop S) |
| 13 | ∞ | 2.700 | | |
| 14 | −23.37434 | 1.100 | 1.64769 | 33.7 |
| 15 | 630.74141 | 0.200 | | |
| 16* | 88.88240 | 5.000 | 1.77377 | 47.2 |
| 17* | −34.54296 | 2.466 | | |
| 18 | −91.09112 | 6.400 | 1.49782 | 82.6 |
| 19 | −24.26835 | D19 (Variable) | | |
| 20 | −173.73017 | 2.915 | 1.94595 | 18.0 |
| 21 | −63.36086 | 2.000 | 1.64769 | 33.7 |
| 22 | −410.38800 | 2.872 | | |
| 23 | −49.55593 | 1.900 | 1.64769 | 33.7 |
| 24 | ∞ | 10.500 | | |
| 25 | ∞ | 1.600 | 1.51680 | 64.1 |
| 26 | ∞ | D26 | | |

TABLE 8-continued (Variable)

[Aspherical surface data]
Sixth surface k = 1.00000
A4 = −1.98971E−07, A6 = −9.88462E−10,
A8 = 4.89667E−12, A10 = −4.46361E−15
Sixteenth surface k = 1.00000
A4 = −1.30154E−06, A6 = 1.97109E−08,
A8 = −1.12019E−10, A10 = −2.74309E−14
Seventeenth surface k = 1.00000
A4 = 1.29000E−05, A6 = 1.77000E−08,
A8 = 4.40194E−11, A10 = −4.63161E−13

[Variable distance data]

| | Upon focusing on infinity $f = 51.60$ | Upon focusing on a short-distance object $\beta = -0.1566$ |
|---|---|---|
| D0 | ∞ | 306.96 |
| D12 | 10.321 | 2.394 |
| D19 | 6.070 | 13.997 |
| D26 | 1.000 | 1.000 |

[lens group data]

| group | starting surface | focal length |
|---|---|---|
| G1 | 1 | 73.37 |
| G2 | 13 | 48.59 |
| G3 | 20 | −81.56 |

[Conditional Expression Corresponding Value]

| | |
|---|---|
| Conditional Expression (1) | BFa/f = 0.243 |
| Conditional Expression (2) | (−G1R1)/f = 0.964 |
| Conditional Expression (3), (3-1), (3-2) | (−G1R1)/f1 = 0.678 |
| Conditional Expression (4) | f/f1 = 0.703 |
| Conditional Expression (5) | f/f2 = 1.062 |
| Conditional Expression (6) | f1/f2 = 1.510 |
| Conditional Expression (7) | f1/(−f3) = 0.900 |
| Conditional Expression (8) | fF/fR = 0.747 |
| Conditional Expression (9) | (G1R2 + G1R1)/(G1R2 − G1R1) = 0.357 |
| Conditional Expression (10) | {1 − (β2)²} × (β3)² = 0.885 |
| Conditional Expression (11) | FNO × (f1/f) = 2.636 |
| Conditional Expression (12) | 2ω = 45.8 |

FIG. 16A illustrates various aberration graphs upon focusing on infinity in the optical system according to the 8th example. FIG. 16B illustrates various aberration graphs upon focusing on a short-distance (close-up) object in the optical system according to the 8th example. The various aberration graphs demonstrate that the optical system according to the 8th example has excellent image forming performance in which various aberrations are corrected favorably.

9th Example

Figure 17:
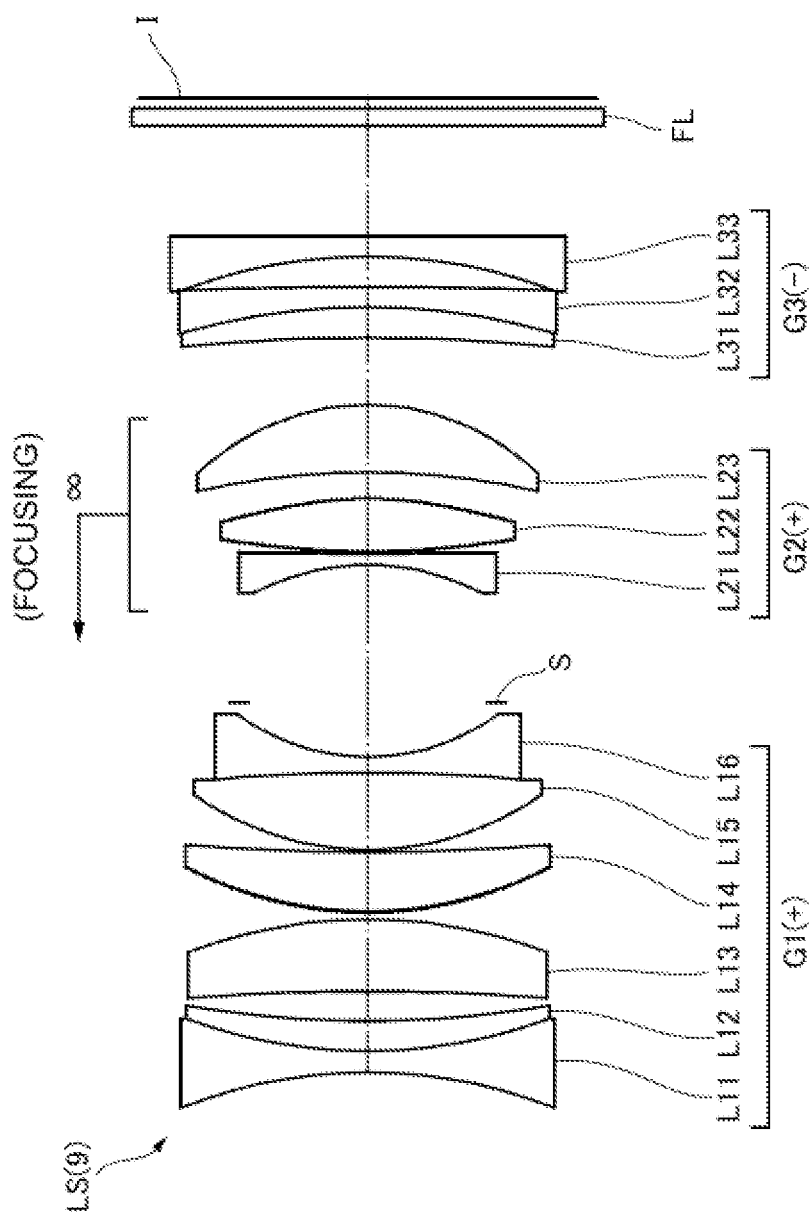
FIG. 17 is a lens configuration diagram for the state of focusing on infinity in an optical system according to a 9th example.

The 9th example will be described using FIGS. 17 and 18 and Table 9. FIG. 17 is a diagram illustrating the lens configuration for the state of focusing on infinity in the optical system according to the 9th example of the present embodiment. The optical system LS(9) according to the 9th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a cemented lens consisting of a first negative lens L11 that is biconcave and a first positive lens L12 having a meniscus shape whose convex surface is pointed toward the object, a second positive lens L13 having a meniscus shape whose concave surface is pointed toward the object, a third positive lens L14 having a meniscus shape whose convex surface is pointed toward the object, a cemented lens consisting of a fourth positive lens L15 that is biconvex and a second negative lens L16 that is biconcave, and an aperture stop S, arranged in order from the object side. The lens surface on the object side of the third positive lens L14 is an aspherical surface.

The second lens group G2 comprises a negative lens L21 that is biconcave, a first positive lens L22 that is biconvex, and a second positive lens L23 having a meniscus shape whose concave surface is pointed toward the object, arranged in order from the object side. The lens surface on either side of the first positive lens L22 is an aspherical surface.

The third lens group G3 comprises a cemented lens consisting of a positive lens L31 having a meniscus shape whose concave surface is pointed toward the object and a first negative lens L32 having a meniscus shape whose concave surface is pointed toward the object, and a second negative lens L33 having a plano-concave shape whose concave surface is pointed toward the object, arranged in order from the object side. An image surface I is disposed on the image side of the third lens group G3. An interchangeable optical filter FL is arranged between the third lens group G3 and the image surface I.

Table 9 below lists data values regarding the optical system according to the 9th example. Note that the 13th surface is a virtual surface.

TABLE 9

| [General Data] | |
|---|---|
| f | 51.60 |
| FNO | 1.85 |
| ω | 22.9 |
| Y | 21.70 |
| TL | 92.330 |
| BF | 13.100 |
| BFa | 12.554 |

| [Lens Data] | | | | |
|---|---|---|---|---|
| Surface Number | R | D | nd | vd |
| 1 | −48.06457 | 2.000 | 1.67270 | 32.2 |
| 2 | 50.03333 | 2.861 | 1.94595 | 18.0 |
| 3 | 105.00000 | 2.805 | | |
| 4 | −226.31231 | 6.827 | 1.72916 | 54.6 |
| 5 | −47.98013 | 0.644 | | |
| 6* | 36.64910 | 0.100 | 1.56093 | 36.6 |
| 7 | 36.85687 | 5.622 | 1.80400 | 46.6 |
| 8 | 217.92780 | 0.200 | | |
| 9 | 28.49361 | 7.332 | 1.59319 | 67.9 |
| 10 | −161.37986 | 1.500 | 1.64769 | 33.7 |
| 11 | 20.99038 | 5.164 | | |
| 12 | ∞ | D12 (Variable) | | (Aperture Stop S) |
| 13 | ∞ | 2.700 | | |
| 14 | −23.41799 | 1.100 | 1.64769 | 33.7 |
| 15 | 998.77224 | 0.200 | | |
| 16* | 85.12299 | 5.000 | 1.77377 | 47.2 |
| 17* | −35.29338 | 2.485 | | |
| 18 | −73.80381 | 6.400 | 1.49782 | 82.6 |
| 19 | −23.23519 | D19 (Variable) | | |
| 20 | −177.75440 | 2.927 | 1.94595 | 18.0 |
| 21 | −63.69645 | 1.900 | 1.64769 | 33.7 |
| 22 | −482.01125 | 2.887 | | |
| 23 | −50.20764 | 1.900 | 1.64769 | 33.7 |
| 24 | ∞ | 10.500 | | |
| 25 | ∞ | 1.600 | 1.51680 | 64.1 |
| 26 | ∞ | D26 (Variable) | | |

[Aspherical surface data]

Sixth surface
κ = 1.00000
A4 = −4.74106E−07, A6 = −3.40824E−10, A8 = 2.15394E−12, A10 = −1.54492E−15
Sixteenth surface
κ = 1.00000
A4 = −1.95205E−07, A6 = 1.94342E−08, A8 = −8.61846E−11, A10 = −2.07763E−13

TABLE 9-continued

Seventeenth surface
κ = 1.00000
A4 = 1.47643E−05, A6 = 2.08671E−08, A8 = 8.44852E−11, A10 = −6.93210E−13

[Variable distance data]

| | Upon focusing on infinity f = 51.60 | Upon focusing on a short-distance object β = −0.1565 |
|---|---|---|
| D0 | ∞ | 307.67 |
| D12 | 10.320 | 2.409 |
| D19 | 6.356 | 14.267 |
| D26 | 1.000 | 1.000 |

[lens group data]

| group | starting surface | focal length |
|---|---|---|
| G1 | 1 | 73.63 |
| G2 | 13 | 48.76 |
| G3 | 20 | −81.76 |

[Conditional Expression Corresponding Value]

| | |
|---|---|
| Conditional Expression (1) | BFa/f = 0.243 |
| Conditional Expression (2) | (−G1R1)/f = 0.964 |
| Conditional Expression (3), (3-1), (3-2) | (−G1R1)/f1 = 0.676 |
| Conditional Expression (4) | f/f1 = 0.701 |
| Conditional Expression (5) | f/f2 = 1.058 |
| Conditional Expression (6) | f1/f2 = 1.510 |
| Conditional Expression (7) | f1/(−f3) = 0.900 |
| Conditional Expression (8) | fF/fR = 0.748 |
| Conditional Expression (9) | (G1R2 + G1R1)/(G1R2 − G1R1) = 0.357 |
| Conditional Expression (10) | {1 − (β2)$^2$} × (β3)$^2$ = 0.888 |
| Conditional Expression (11) | FNO × (f1/f) = 2.645 |
| Conditional Expression (12) | 2ω = 45.8 |

FIG. 18A illustrates various aberration graphs upon focusing on infinity in the optical system according to the 9th example. FIG. 18B illustrates various aberration graphs upon focusing on a short-distance (close-up) object in the optical system according to the 9th example. The various aberration graphs demonstrate that the optical system according to the 9th example has excellent image forming performance in which various aberrations are corrected favorably.

10th Example

Figure 19:
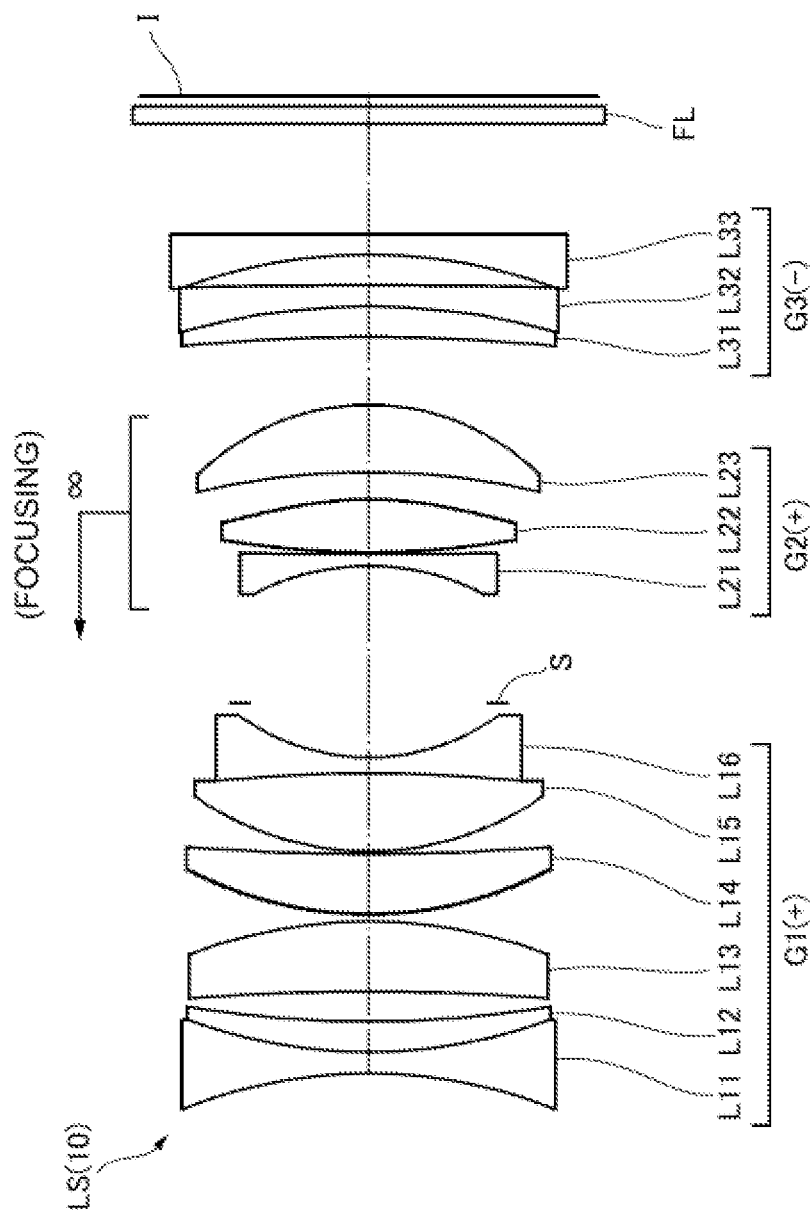
FIG. 19 is a lens configuration diagram for the state of focusing on infinity in an optical system according to a 10th example.

The 10th example will be described using FIGS. 19 and 20 and Table 10. FIG. 19 is a diagram illustrating the lens configuration for the state of focusing on infinity in the optical system according to the 10th example of the present embodiment. The optical system LS(10) according to the 10th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a cemented lens consisting of a first negative lens L11 that is biconcave and a first positive lens L12 having a meniscus shape whose convex surface is pointed toward the object, a second positive lens L13 having a meniscus shape whose concave surface is pointed toward the object, a third positive lens L14 having a meniscus shape whose convex surface is pointed toward the object, a cemented lens consisting of a fourth positive lens L15 that is biconvex and a second negative lens L16 that is biconcave, and an aperture stop S, arranged in order from the object side. The lens surface on the object side of the third positive lens L14 is an aspherical surface.

The second lens group G2 comprises a negative lens L21 that is biconcave, a first positive lens L22 that is biconvex, and a second positive lens L23 having a meniscus shape whose concave surface is pointed toward the object, arranged in order from the object side. The lens surface on either side of the first positive lens L22 is an aspherical surface.

The third lens group G3 comprises a cemented lens consisting of a positive lens L31 having a meniscus shape whose concave surface is pointed toward the object and a first negative lens L32 having a meniscus shape whose concave surface is pointed toward the object, and a second negative lens L33 having a plano-concave shape whose concave surface is pointed toward the object, arranged in order from the object side. An image surface I is disposed on the image side of the third lens group G3. An interchangeable optical filter FL is arranged between the third lens group G3 and the image surface I.

Table 10 below lists data values regarding the optical system according to the 10th example. Note that the 13th surface is a virtual surface.

TABLE 10

| [General Data] | |
|---|---|
| f | 51.61 |
| FNO | 1.85 |
| ω | 23.0 |
| Y | 21.70 |
| TL | 92.630 |
| BF | 13.111 |
| BFa | 12.566 |

[Lens Data]

| Surface Number | R | D | nd | νd |
|---|---|---|---|---|
| 1 | −47.48420 | 2.000 | 1.67270 | 32.2 |
| 2 | 49.34200 | 2.900 | 1.94595 | 18.0 |
| 3 | 105.06869 | 2.850 | | |
| 4 | −214.61709 | 6.650 | 1.72916 | 54.6 |
| 5 | −47.45376 | 0.640 | | |
| 6* | 36.92032 | 0.100 | 1.56093 | 36.6 |
| 7 | 37.08029 | 5.650 | 1.80400 | 46.6 |
| 8 | 227.67817 | 0.250 | | |
| 9 | 28.81243 | 7.400 | 1.59319 | 67.9 |
| 10 | −141.32000 | 1.500 | 1.64769 | 33.7 |
| 11 | 21.19231 | 5.130 | | |
| 12 | ∞ | D12 (Variable) | | (Aperture Stop S) |
| 13 | ∞ | 2.700 | | |
| 14 | −23.47056 | 1.100 | 1.64769 | 33.7 |
| 15 | 682.91466 | 0.200 | | |
| 16* | 83.29512 | 5.000 | 1.77377 | 47.2 |
| 17* | −35.02672 | 2.570 | | |
| 18 | −71.96528 | 6.400 | 1.49782 | 82.6 |
| 19 | −23.20263 | D19 (Variable) | | |
| 20 | −192.79576 | 2.950 | 1.94595 | 18.0 |
| 21 | −65.62300 | 2.000 | 1.64769 | 33.7 |
| 22 | −664.53730 | 2.909 | | |
| 23 | −51.20031 | 1.900 | 1.64769 | 33.7 |
| 24 | ∞ | 10.500 | | |
| 25 | ∞ | 1.600 | 1.51680 | 64.1 |
| 26 | ∞ | D26 (Variable) | | |

[Aspherical surface data]

Sixth surface
κ = 1.00000
A4 = −4.82693E−07, A6 = −2.32147E−10, A8 = 1.82978E−12, A10 = −1.19713E−15
Sixteenth surface
κ = 1.00000
A4 = −2.77465E−07, A6 = 1.84476E−08, A8 = −7.60811E−11, A10 = −2.05509E−13
Seventeenth surface
κ = 1.00000
A4 = 1.46947E−05, A6 = 2.13572E−08, A8 = 8.25934E−11, A10 = −6.58549E−13

[Variable distance data]

| | Upon focusing on infinity f = 51.61 | Upon focusing on a short-distance object β = −0.1568 |
|---|---|---|
| D0 | ∞ | 307.37 |
| D12 | 10.320 | 2.403 |
| D19 | 6.400 | 14.317 |
| D26 | 1.011 | 1.011 |

[lens group data]

| group | starting surface | focal length |
|---|---|---|
| G1 | 1 | 74.30 |
| G2 | 13 | 48.80 |
| G3 | 20 | −82.85 |

[Conditional Expression Corresponding Value]

Conditional Expression (1)   BFa/f = 0.243
Conditional Expression (2)   (−G1R1)/f = 0.920
Conditional Expression (3), (3-1), (3-2)   (−G1R1)/f1 = 0.639

TABLE 10-continued

| | |
|---|---|
| Conditional Expression (4) | f/f1 = 0.695 |
| Conditional Expression (5) | f/f2 = 1.058 |
| Conditional Expression (6) | f1/f2 = 1.523 |
| Conditional Expression (7) | f1/(−f3) = 0.897 |
| Conditional Expression (8) | fF/fR = 0.768 |
| Conditional Expression (9) | (G1R2 + G1R1)/(G1R2 − G1R1) = 0.377 |
| Conditional Expression (10) | {1 − (β2)$^2$} × (β3)$^2$ = 0.890 |
| Conditional Expression (11) | FNO × (f1/f) = 2.670 |
| Conditional Expression (12) | 2ω = 46.0 |

Figure 20B:
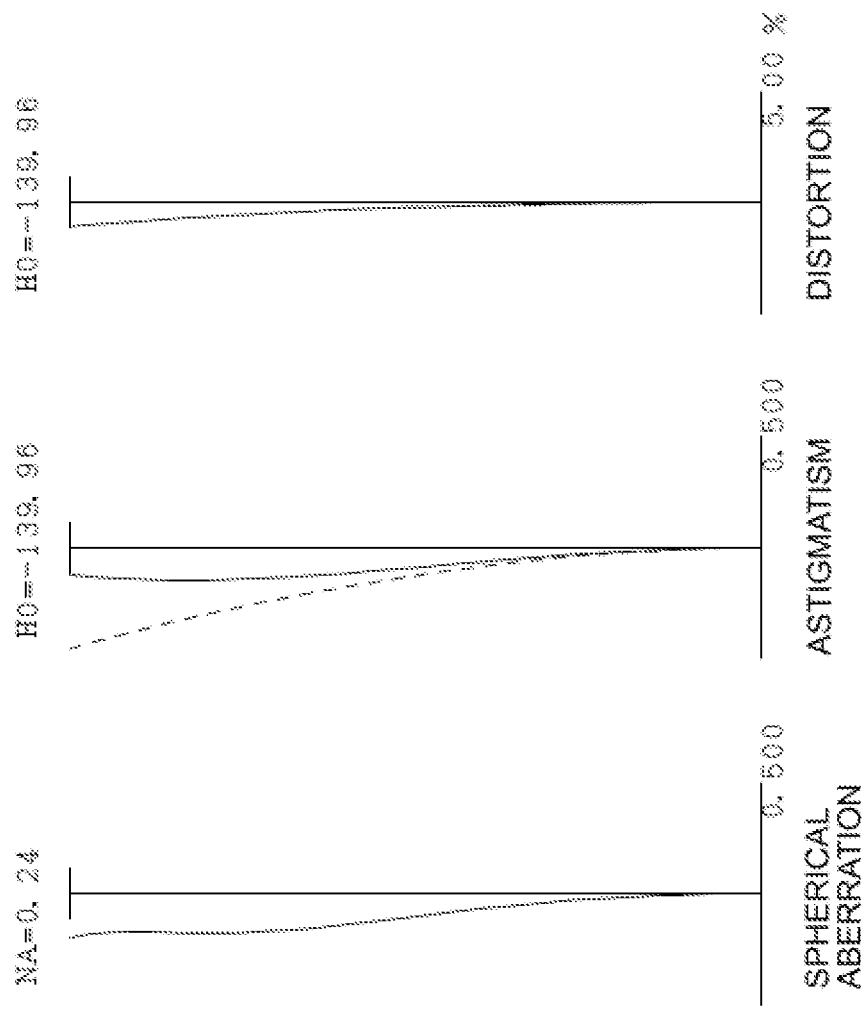
FIG. 20B illustrates various aberration graphs upon focusing on a short-distance object in the optical system according to the 10th example.

FIG. 20A illustrates various aberration graphs upon focusing on infinity in the optical system according to the 10th example. FIG. 20B illustrates various aberration graphs upon focusing on a short-distance (close-up) object in the optical system according to the 10th example. The various aberration graphs demonstrate that the optical system according to the 10th example has excellent image forming performance in which various aberrations are corrected favorably.

11th Example

Figure 21:
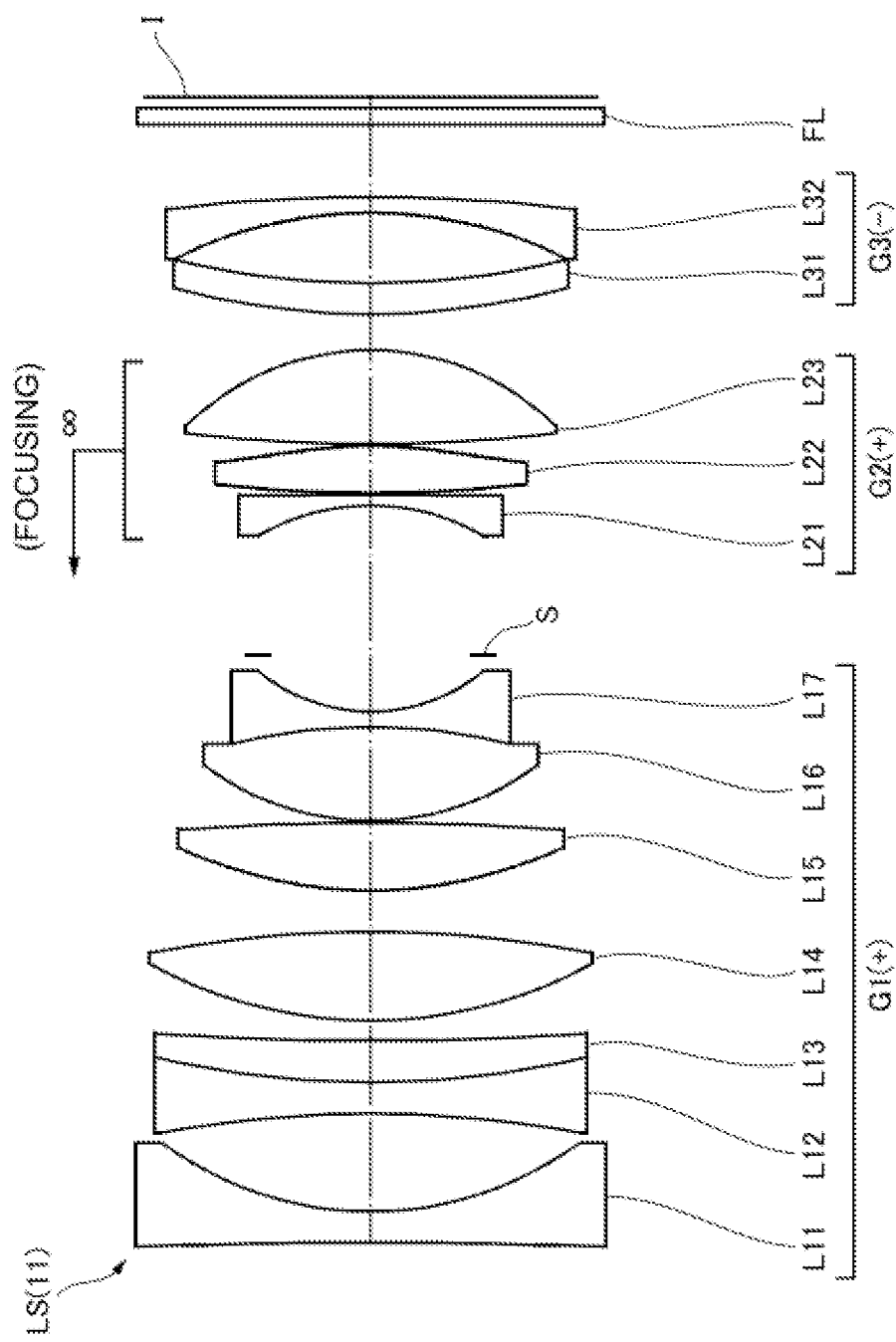
FIG. 21 is a lens configuration diagram for the state of focusing on infinity in an optical system according to an 11th example.

The 11th example will be described using FIGS. 21 and 22 and Table 11. FIG. 21 is a diagram illustrating the lens configuration for the state of focusing on infinity in the optical system according to the 11th example of the present embodiment. The optical system LS(11) according to the 11th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a cemented lens consisting of a second negative lens L12 that is biconcave and a first positive lens L13 having a meniscus shape whose convex surface is pointed toward the object, a second positive lens L14 that is biconvex, a third positive lens L15 that is biconvex, a cemented lens consisting of a fourth positive lens L16 that is biconvex and a third negative lens L17 that is biconcave, and an aperture stop S, arranged in order from the object side. The lens surface on the object side of the third positive lens L15 is an aspherical surface.

The second lens group G2 comprises a negative lens L21 having a meniscus shape whose concave surface is pointed toward the object, a first positive lens L22 that is biconvex, and a second positive lens L23 that is biconvex, arranged in order from the object side. The lens surface on either side of the first positive lens L22 is an aspherical surface.

The third lens group G3 comprises a positive lens L31 having a meniscus shape whose convex surface is pointed toward the object and a negative lens L32 having a meniscus shape whose concave surface is pointed toward the object, arranged in order from the object side. The lens surface on the object side of the negative lens L32 is an aspherical surface. An image surface I is disposed on the image side of the third lens group G3. An interchangeable optical filter FL is arranged between the third lens group G3 and the image surface I.

Table 11 below lists data values regarding the optical system according to the 11th example. Note that the 14th surface is a virtual surface.

TABLE 11

[General Data]

| | |
|---|---|
| f | 37.63 |
| FNO | 1.85 |
| ω | 30.0 |
| Y | 21.70 |
| TL | 110.000 |
| BF | 9.600 |
| BFa | 9.055 |

[Lens Data]

| Surface Number | R | D | nd | vd |
|---|---|---|---|---|
| 1 | −662.83160 | 3.000 | 1.80920 | 33.6 |
| 2 | 33.87219 | 9.404 | | |
| 3 | −109.33916 | 3.000 | 1.48749 | 70.4 |
| 4 | 89.77072 | 4.000 | 1.94595 | 18.0 |
| 5 | 317.57072 | 1.945 | | |
| 6 | 44.26915 | 8.500 | 1.48749 | 70.4 |
| 7 | −112.47821 | 3.972 | | |
| 8* | 41.20576 | 6.500 | 1.80400 | 46.6 |
| 9 | −255.27183 | 0.200 | | |
| 10 | 26.75656 | 9.000 | 1.59319 | 67.9 |
| 11 | −57.15784 | 1.500 | 1.67270 | 32.2 |
| 12 | 17.14008 | 5.399 | | |
| 13 | ∞ | D13 (Variable) | | (Aperture Stop S) |
| 14 | ∞ | 3.000 | | |

TABLE 11-continued

| | | | | |
|---|---|---|---|---|
| 15 | −21.57444 | 1.000 | 1.67270 | 32.2 |
| 16 | −1291.14570 | 0.200 | | |
| 17* | 157.44017 | 4.500 | 1.77377 | 47.2 |
| 18* | −44.84339 | 0.200 | | |
| 19 | 155.77289 | 9.000 | 1.59319 | 67.9 |
| 20 | −25.32306 | D20 (Variable) | | |
| 21 | 71.98835 | 3.000 | 1.94595 | 18.0 |
| 22 | 81.46254 | 6.736 | | |
| 23* | −41.56282 | 1.500 | 1.64769 | 33.7 |
| 24 | −168.89768 | 7.000 | | |
| 25 | ∞ | 1.600 | 1.51680 | 64.1 |
| 26 | ∞ | D26 (Variable) | | |

[Aspherical surface data]

Eighth surface
κ = 1.00000
A4 = −1.90145E−06, A6 = −9.52591E−10, A8 = −1.08708E−12, A10 = −6.77034E−16
Seventeenth surface
κ = 1.00000
A4 = 6.23513E−06, A6 = −1.23942E−08, A8 = 3.34827E−11, A10 = −3.01713E−13
Eighteenth surface
κ = 1.00000
A4 = 1.88293E−05, A6 = 1.24857E−08, A8 = 2.84962E−11, A10 = −3.23051E−13
Twenty-third surface
κ = 1.00000
A4 = 5.43854E−06, A6 = −1.52554E−08, A8 = 0.00000E+00, A10 = 0.00000E+00

[Variable distance data]

| | Upon focusing on infinity f = 37.63 | Upon focusing on a short-distance object β = −0.2078 |
|---|---|---|
| D0 | ∞ | 151.72 |
| D13 | 11.387 | 2.404 |
| D20 | 3.456 | 12.439 |
| D26 | 1.000 | 1.000 |

[lens group data]

| group | starting surface | focal length |
|---|---|---|
| G1 | 1 | 58.79 |
| G2 | 14 | 43.00 |
| G3 | 21 | −104.59 |

[Conditional Expression Corresponding Value]

| | |
|---|---|
| Conditional Expression (1) | BFa/f = 0.241 |
| Conditional Expression (2) | (−G1R1)/f = 17.613 |
| Conditional Expression (3), (3-1), (3-2) | (−G1R1)/f1 = 11.275 |
| Conditional Expression (4) | f/f1 = 0.640 |
| Conditional Expression (5) | f/f2 = 0.875 |
| Conditional Expression (6) | f1/f2 = 1.367 |
| Conditional Expression (7) | f1/(−f3) = 0.562 |
| Conditional Expression (8) | fF/fR = 0.945 |
| Conditional Expression (9) | (G1R2 + G1R1)/(G1R2 − G1R1) = −0.903 |
| Conditional Expression (10) | {1 − (β2)$^2$} × (β3)$^2$ = 0.728 |
| Conditional Expression (11) | FNO × (f1/f) = 2.893 |
| Conditional Expression (12) | 2ω = 60.0 |

FIG. 22A illustrates various aberration graphs upon focusing on infinity in the optical system according to the 11th example. FIG. 22B illustrates various aberration graphs upon focusing on a short-distance (close-up) object in the optical system according to the 11th example. The various aberration graphs demonstrate that the optical system according to the 11th example has excellent image forming performance in which various aberrations are corrected favorably.

12th Example

The 12th example will be described using FIGS. 23 and 24 and Table 12. FIG. 23 is a diagram illustrating the lens configuration for the state of focusing on infinity in the optical system according to the 12th example of the present embodiment. The optical system LS(12) according to the 12th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a cemented lens consisting of a second negative lens L12 that is biconcave and a first positive lens L13 having a meniscus shape whose convex surface is pointed toward the object, a second positive lens L14 that is biconvex, a third positive lens L15 that is biconvex, a cemented lens consisting of a fourth positive lens L16 that is biconvex and a third negative lens L17 that is biconcave, and an aperture stop S, arranged in order from the object side. The lens surface on the object side of the third positive lens L15 is an aspherical surface.

The second lens group G2 comprises a negative lens L21 having a meniscus shape whose concave surface is pointed toward the object, a first positive lens L22 having a meniscus shape whose concave surface is pointed toward the object, a second positive lens L23 that is biconvex, and a third positive lens L24 having a meniscus shape whose concave surface is pointed toward the object, arranged in order from the object side. The lens surface on either side of the first positive lens L22 is an aspherical surface.

The third lens group G3 comprises a positive lens L31 having a meniscus shape whose concave surface is pointed toward the object and a negative lens L32 having a meniscus shape whose concave surface is pointed toward the object, arranged in order from the object side. The lens surface on the object side of the negative lens L32 is an aspherical surface. An image surface I is disposed on the image side of the third lens group G3. An interchangeable optical filter FL is arranged between the third lens group G3 and the image surface I.

Table 12 below lists data values regarding the optical system according to the 12th example. Note that the 14th surface is a virtual surface.

TABLE 12

| [General Data] | |
|---|---|
| f | 37.70 |
| FNO | 1.88 |
| ω | 30.0 |
| Y | 21.70 |
| TL | 110.000 |
| BF | 9.600 |
| BFa | 9.055 |

[Lens Data]

| Surface Number | R | D | nd | vd |
|---|---|---|---|---|
| 1 | −3112.32120 | 3.000 | 1.73282 | 32.6 |
| 2 | 32.68764 | 8.690 | | |
| 3 | −440.00413 | 3.000 | 1.48749 | 70.4 |
| 4 | 57.93171 | 4.000 | 1.94595 | 18.0 |
| 5 | 108.74454 | 3.168 | | |
| 6 | 42.60783 | 8.500 | 1.50267 | 62.2 |
| 7 | −141.78756 | 3.866 | | |
| 8* | 45.06258 | 6.500 | 1.80400 | 46.6 |
| 9 | −210.82291 | 0.200 | | |
| 10 | 36.02017 | 9.000 | 1.59319 | 67.9 |
| 11 | −45.79266 | 1.500 | 1.67270 | 32.2 |
| 12 | 22.46589 | 5.399 | | |
| 13 | ∞ | D13 (Variable) | | (Aperture Stop S) |
| 14 | ∞ | 3.000 | | |
| 15 | −22.15003 | 1.000 | 1.67270 | 32.2 |
| 16 | −98.33346 | 0.318 | | |
| 17* | −130.89892 | 2.500 | 1.77377 | 47.2 |
| 18* | −43.35291 | 1.224 | | |
| 19 | 101.79100 | 5.500 | 1.59319 | 67.9 |
| 20 | −53.62571 | 0.100 | | |
| 21 | −81.82793 | 6.000 | 1.59319 | 67.9 |
| 22 | −25.48031 | D22 (Variable) | | |
| 23 | −75.16977 | 3.000 | 1.94595 | 18.0 |
| 24 | −63.16701 | 8.776 | | |
| 25* | −25.51533 | 1.500 | 1.64769 | 33.7 |
| 26 | −99.50792 | 7.000 | | |
| 27 | ∞ | 1.600 | 1.51680 | 64.1 |
| 28 | ∞ | D28 (Variable) | | |

[Aspherical surface data]

Eighth surface
κ = 1.00000
A6 = −1.62936E−06, A6 = −1.61898E−09, A8 = 3.72851E−12, A10 = −6.56781E−15
Seventeenth surface
κ = 1.00000
A4 = 3.15178E−05, A6 = 1.77790E−07, A8 = −3.27517E−10, A10 = −1.26227E−12
Eighteenth surface
κ = 1.00000
A4 = 4.17433E−05, A6 = 1.91618E−07, A8 = 1.40927E−10, A10 = −2.86119E−12

TABLE 12-continued

Twenty-fifth surface
κ = 1.00000
A4 = 1.10584E−05, A6 = −1.56481E−10, A8 = 0.00000E+00, A10 = 0.00000E+00

[Variable distance data]

| | Upon focusing on infinity f = 37.70 | Upon focusing on a short-distance object β = −0.1179 |
|---|---|---|
| D0 | ∞ | 290.00 |
| D13 | 6.605 | 2.441 |
| D22 | 4.053 | 8.217 |
| D28 | 1.000 | 1.000 |

[lens group data]

| group | starting surface | focal length |
|---|---|---|
| G1 | 1 | 63.38 |
| G2 | 14 | 39.22 |
| G3 | 23 | −62.57 |

[Conditional Expression Corresponding Value]

| Conditional Expression (1) | BFa/f = 0.240 |
|---|---|
| Conditional Expression (2) | (−G1R1)/f = 82.547 |
| Conditional Expression (3), (3-1), (3-2) | (−G1R1)/f1 = 49.101 |
| Conditional Expression (4) | f/f1 = 0.595 |
| Conditional Expression (5) | f/f2 = 0.961 |
| Conditional Expression (6) | f1/f2 = 1.616 |
| Conditional Expression (7) | f1/(−f3) = 1.013 |
| Conditional Expression (8) | fF/fR = 0.873 |
| Conditional Expression (9) | (G1R2 + G1R1)/(G1R2 − G1R1) = −0.979 |
| Conditional Expression (10) | $\{1 - (\beta 2)^2\} \times (\beta 3)^2 = 0.994$ |
| Conditional Expression (11) | FNO × (f1/f) = 3.160 |
| Conditional Expression (12) | 2ω = 60.0 |

FIG. 24A illustrates various aberration graphs upon focusing on infinity in the optical system according to the 12th example. FIG. 24B illustrates various aberration graphs upon focusing on a short-distance (close-up) object in the optical system according to the 12th example. The various aberration graphs demonstrate that the optical system according to the 12th example has excellent image forming performance in which various aberrations are corrected favorably.

13th Example

Figure 25:
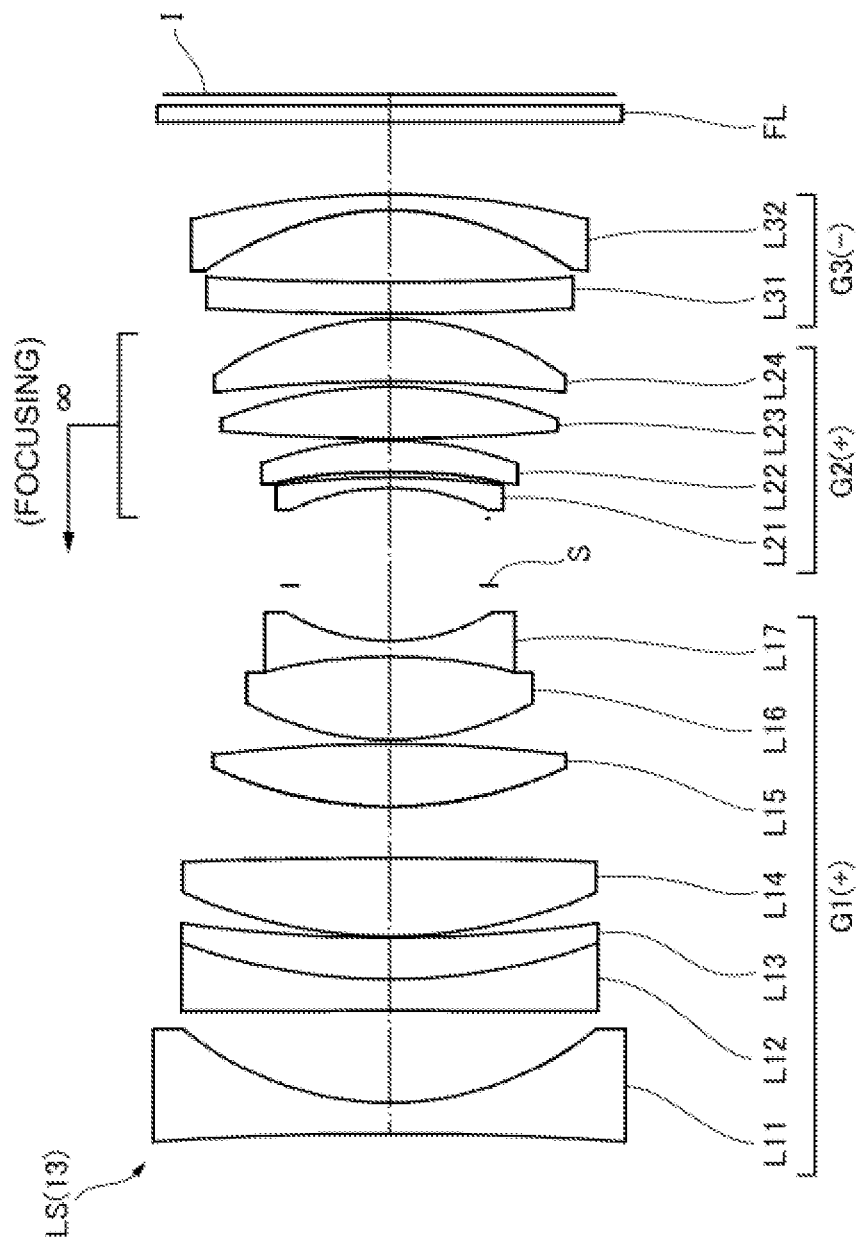
FIG. 25 is a lens configuration diagram for the state of focusing on infinity in an optical system according to a 13th example.

The 13th example will be described using FIGS. 25 and 26 and Table 13. FIG. 25 is a diagram illustrating the lens configuration for the state of focusing on infinity in the optical system according to the 13th example of the present embodiment. The optical system LS(13) according to the 13th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a cemented lens consisting of a second negative lens L12 that is biconcave and a first positive lens L13 having a meniscus shape whose convex surface is pointed toward the object, a second positive lens L14 that is biconvex, a third positive lens L15 that is biconvex, a cemented lens consisting of a fourth positive lens L16 that is biconvex and a third negative lens L17 that is biconcave, and an aperture stop S, arranged in order from the object side. The lens surface on the object side of the third positive lens L15 is an aspherical surface.

The second lens group G2 comprises a negative lens L21 having a meniscus shape whose concave surface is pointed toward the object, a first positive lens L22 having a meniscus shape whose concave surface is pointed toward the object, a second positive lens L23 that is biconvex, and a third positive lens L24 having a meniscus shape whose concave surface is pointed toward the object, arranged in order from the object side. The lens surface on the object side of the first positive lens L22 is an aspherical surface.

The third lens group G3 comprises a positive lens L31 having a meniscus shape whose convex surface is pointed toward the object and a negative lens L32 having a meniscus shape whose concave surface is pointed toward the object, arranged in order from the object side. The lens surface on the object side of the negative lens L32 is an aspherical surface. An image surface I is disposed on the image side of the third lens group G3. An interchangeable optical filter FL is arranged between the third lens group G3 and the image surface I.

Table 13 below lists data values regarding the optical system according to the 13th example. Note that the 14th surface is a virtual surface.

TABLE 13

| [General Data] | |
|---|---|
| f | 36.52 |
| FNO | 1.85 |
| ω | 30.6 |
| Y | 21.70 |
| TL | 100.000 |
| BF | 9.600 |
| BFa | 9.055 |

[Lens Data]

| Surface Number | R | D | nd | vd |
|---|---|---|---|---|
| 1 | −344.23276 | 3.000 | 1.71736 | 29.6 |
| 2 | 31.47663 | 8.864 | | |
| 3 | −5197.94500 | 3.000 | 1.48749 | 70.3 |
| 4 | 59.50193 | 4.000 | 1.94595 | 18.0 |
| 5 | 141.00357 | 0.152 | | |
| 6 | 49.20783 | 7.500 | 1.60300 | 65.4 |
| 7 | −563.87665 | 4.981 | | |
| 8* | 39.11480 | 6.000 | 1.77250 | 49.6 |
| 9 | −139.68211 | 0.427 | | |
| 10 | 28.58681 | 8.000 | 1.59319 | 67.9 |
| 11 | −50.06370 | 1.500 | 1.67270 | 32.2 |
| 12 | 19.18437 | 5.399 | | |
| 13 | ∞ | D13 (Variable) | | (Aperture Stop S) |
| 14 | ∞ | 3.000 | | |
| 15 | −22.50724 | 1.000 | 1.67270 | 32.2 |
| 16 | −81.31951 | 0.549 | | |
| 17* | −74.31824 | 3.000 | 1.77377 | 47.2 |
| 18 | −35.67165 | 0.203 | | |
| 19 | 180.93759 | 5.000 | 1.59319 | 67.9 |
| 20 | −43.85092 | 0.500 | | |
| 21 | −132.62507 | 6.000 | 1.59319 | 67.9 |
| 22 | −29.07561 | D22 (Variable) | | |
| 23 | 317.64282 | 3.000 | 1.94595 | 18.0 |
| 24 | 314.90339 | 6.932 | | |
| 25* | −26.84153 | 1.500 | 1.64769 | 33.7 |
| 26 | −77.55848 | 7.000 | | |
| 27 | ∞ | 1.600 | 1.51680 | 64.1 |
| 28 | ∞ | D28 (Variable) | | |

[Aspherical surface data]

Eighth surface
κ = 1.00000
A4 = −1.59558E−06, A6 = −1.61180E−09, A8 = 2.67206E−12, A10 = −4.02129E−15
Seventeenth surface
κ = 1.00000
A4 = −1.62012E−05, A6 = −2.42502E−08, A8 = 1.25145E−10, A10 = −1.02694E−12
Twenty-fifth surface
κ = 1.00000
A4 = 7.25982E−06, A6 = 1.79235E−08, A8 = −4.70327E−11, A10 = 2.68072E−14

[Variable distance data]

| | Upon focusing on infinity<br>f = 36.52 | Upon focusing on a short-distance object<br>β = −0.1131 |
|---|---|---|
| D0 | ∞ | 290.00 |
| D13 | 6.346 | 1.987 |
| D22 | 0.549 | 4.907 |
| D28 | 1.000 | 1.000 |

[lens group data]

| group | starting surface | focal length |
|---|---|---|
| G1 | 1 | 52.27 |
| G2 | 14 | 37.19 |
| G3 | 23 | −64.36 |

[Conditional Expression Corresponding Value]

| Conditional Expression (1) | BFa/f = 0.248 |
|---|---|
| Conditional Expression (2) | (−G1R1)/f = 9.427 |

TABLE 13-continued

| Conditional Expression (3), (3-1), (3-2) | (−G1R1)/f1 = 6.586 |
|---|---|
| Conditional Expression (4) | f/f1 = 0.699 |
| Conditional Expression (5) | f/f2 = 0.982 |
| Conditional Expression (6) | f1/f2 = 1.406 |
| Conditional Expression (7) | f1/(−f3) = 0.812 |
| Conditional Expression (8) | fF/fR = 0.724 |
| Conditional Expression (9) | (G1R2 + G1R1)/(G1R2 − G1R1) = −0.832 |
| Conditional Expression (10) | {1 − (β2)²} × (β3)² = 0.853 |
| Conditional Expression (11) | FNO × (f1/f) = 2.645 |
| Conditional Expression (12) | 2ω = 61.2 |

Figure 26A:
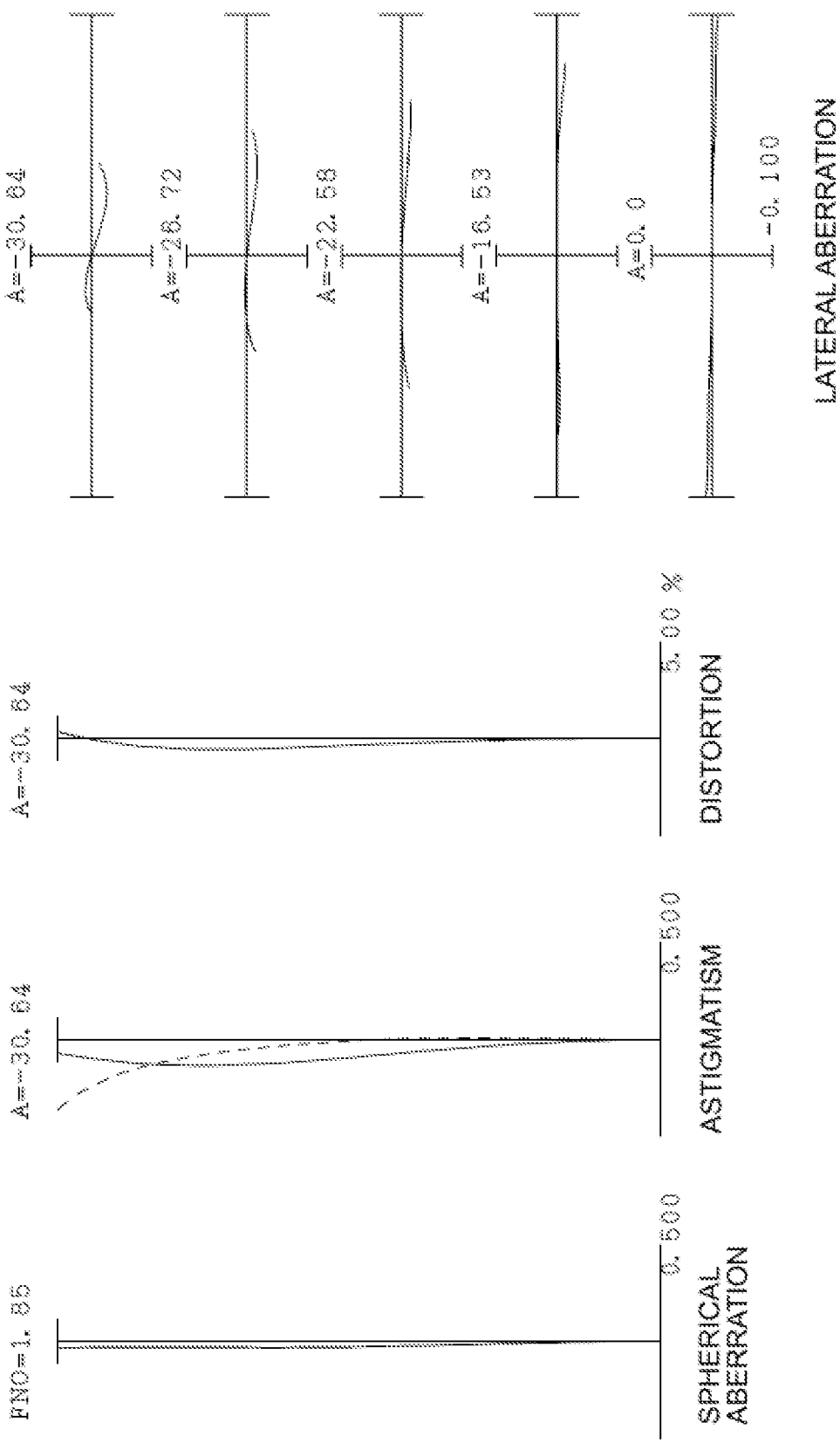

FIG. 26A illustrates various aberration graphs upon focusing on infinity in the optical system according to the 13th example. FIG. 26B illustrates various aberration graphs upon focusing on a short-distance (close-up) object in the optical system according to the 13th example. The various aberration graphs demonstrate that the optical system according to the 13th example has excellent image forming performance in which various aberrations are corrected favorably.

14th Example

Figure 27:
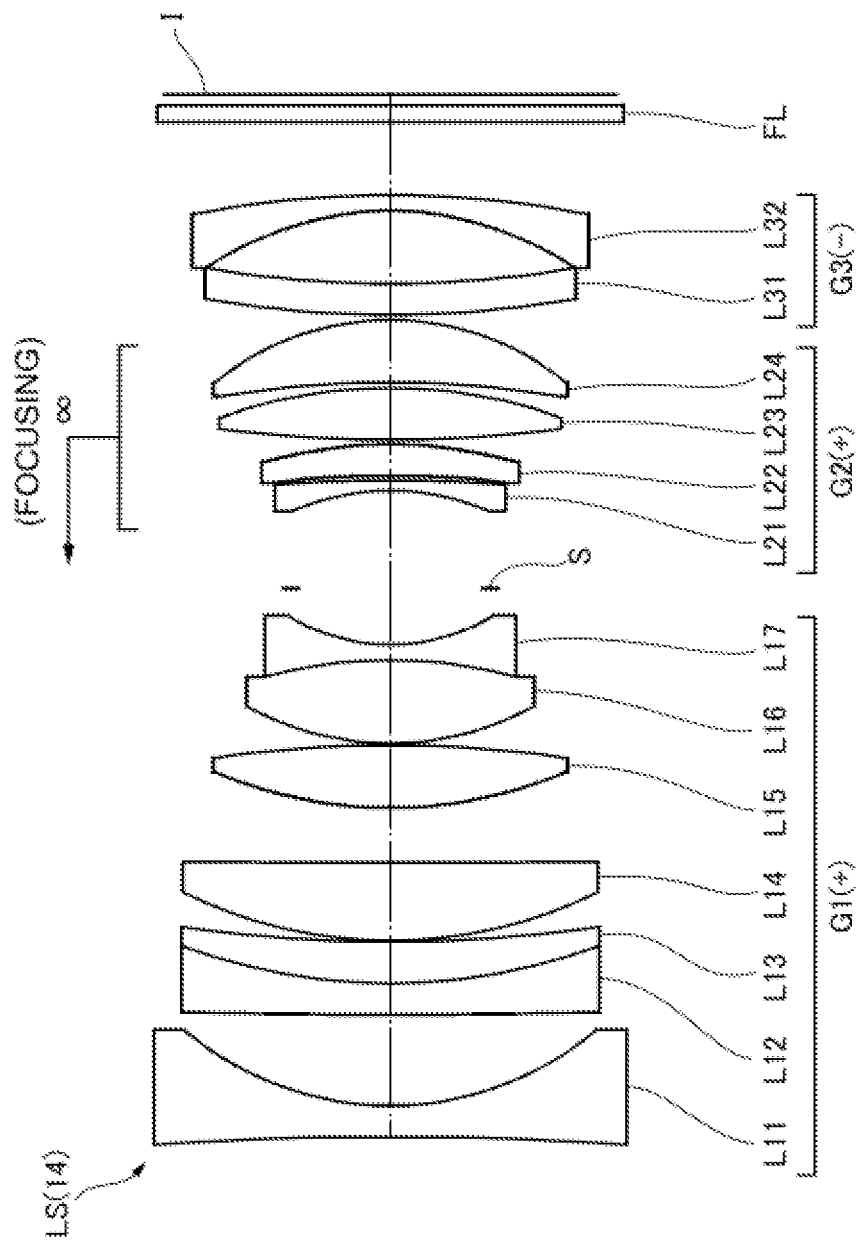
FIG. 27 is a lens configuration diagram for the state of focusing on infinity in an optical system according to a 14th example.

The 14th example will be described using FIGS. 27 and 28 and Table 14. FIG. 27 is a diagram illustrating the lens configuration for the state of focusing on infinity in the optical system according to the 14th example of the present embodiment. The optical system LS(14) according to the 14th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a cemented lens consisting of a second negative lens L12 having a meniscus shape whose convex surface is pointed toward the object and a first positive lens L13 having a meniscus shape whose convex surface is pointed toward the object, a second positive lens L14 having a meniscus shape whose convex surface is pointed toward the object, a third positive lens L15 that is biconvex, a cemented lens consisting of a fourth positive lens L16 that is biconvex and a third negative lens L17 that is biconcave, and an aperture stop S, arranged in order from the object side. The lens surface on the object side of the third positive lens L15 is an aspherical surface.

The second lens group G2 comprises a negative lens L21 having a meniscus shape whose concave surface is pointed toward the object, a first positive lens L22 having a meniscus shape whose concave surface is pointed toward the object, a second positive lens L23 that is biconvex, and a third positive lens L24 having a meniscus shape whose concave surface is pointed toward the object, arranged in order from the object side. The lens surface on either side of the first positive lens L22 is an aspherical surface.

The third lens group G3 comprises a positive lens L31 having a meniscus shape whose convex surface is pointed toward the object and a negative lens L32 having a meniscus shape whose concave surface is pointed toward the object, arranged in order from the object side. The lens surface on the object side of the negative lens L32 is an aspherical surface. An image surface I is disposed on the image side of the third lens group G3. An interchangeable optical filter FL is arranged between the third lens group G3 and the image surface I.

Table 14 below lists data values regarding the optical system according to the 14th example. Note that the 14th surface is a virtual surface.

TABLE 14

[General Data]

| f | 36.50 |
|---|---|
| FNO | 1.85 |
| ω | 30.7 |
| Y | 21.70 |
| TL | 100.000 |
| BF | 9.600 |
| BFa | 9.055 |

[Lens Data]

| Surface Number | R | D | nd | νd |
|---|---|---|---|---|
| 1 | −328.51209 | 3.000 | 1.71736 | 29.6 |
| 2 | 30.62735 | 8.724 | | |
| 3 | 862.45645 | 3.000 | 1.48749 | 70.3 |
| 4 | 57.42336 | 4.000 | 1.94595 | 18.0 |
| 5 | 141.63170 | 0.100 | | |
| 6 | 44.98135 | 7.500 | 1.60300 | 65.4 |
| 7 | 5539.31740 | 5.241 | | |
| 8* | 41.34810 | 6.000 | 1.77250 | 49.6 |
| 9 | −119.73719 | 0.200 | | |
| 10 | 28.47480 | 8.000 | 1.59319 | 67.9 |

TABLE 14-continued

| | | | | |
|---|---|---|---|---|
| 11 | −45.24565 | 1.500 | 1.67270 | 32.2 |
| 12 | 19.20206 | 5.399 | | |
| 13 | ∞ | D13 (Variable) | | (Aperture Stop S) |
| 14 | ∞ | 3.000 | | |
| 15 | −23.51305 | 1.000 | 1.67270 | 32.2 |
| 16 | −129.15388 | 0.457 | | |
| 17* | −103.44705 | 3.000 | 1.77377 | 47.2 |
| 18* | −39.20704 | 0.417 | | |
| 19 | 131.40567 | 5.000 | 1.59319 | 67.9 |
| 20 | −48.12075 | 0.500 | | |
| 21 | −100.00000 | 6.000 | 1.59319 | 67.9 |
| 22 | −26.83541 | D22 (Variable) | | |
| 23 | 102.68371 | 3.000 | 1.94595 | 18.0 |
| 24 | 106.30512 | 6.996 | | |
| 25* | −28.73049 | 1.500 | 1.64769 | 33.7 |
| 26 | −98.04242 | 7.000 | | |
| 27 | ∞ | 1.600 | 1.51680 | 64.1 |
| 28 | ∞ | D28 (Variable) | | |

[Aspherical surface data]

Eighth surface
$\kappa = 1.00000$
$A4 = -1.74572E-06$, $A6 = -1.86902E-09$, $A8 = 3.70243E-12$, $A10 = -5.65794E-15$
Seventeenth surface
$\kappa = 1.00000$
$A4 = -4.49752E-06$, $A6 = -4.35264E-08$, $A8 = 1.70129E-10$, $A10 = -7.71012E-13$
Eighteenth surface
$\kappa = 1.00000$
$A4 = 1.06552E-05$, $A6 = 0.00000E+00$, $A8 = 0.00000E+00$, $A10 = 0.00000E+00$
Twenty-fifth surface
$\kappa = 1.00000$
$A4 = 6.97711E-06$, $A6 = 8.30426E-09$, $A8 = -3.04728E-11$, $A10 = -2.65514E-15$

[Variable distance data]

| | Upon focusing on infinity $f = 36.50$ | Upon focusing on a short-distance object $\beta = -0.1131$ |
|---|---|---|
| D0 | ∞ | 290.00 |
| D13 | 6.366 | 1.830 |
| D22 | 0.500 | 5.036 |
| D28 | 1.000 | 1.000 |

[lens group data]

| group | starting surface | focal length |
|---|---|---|
| G1 | 1 | 52.56 |
| G2 | 14 | 38.05 |
| G3 | 23 | −66.26 |

[Conditional Expression Corresponding Value]

| | |
|---|---|
| Conditional Expression (1) | BFa/f = 0.248 |
| Conditional Expression (2) | (−G1R1)/f = 9.000 |
| Conditional Expression (3), (3-1), (3-2) | (−G1R1)/f1 = 6.250 |
| Conditional Expression (4) | f/f1 = 0.694 |
| Conditional Expression (5) | f/f2 = 0.959 |
| Conditional Expression (6) | f1/f2 = 1.381 |
| Conditional Expression (7) | f1/(−f3) = 0.793 |
| Conditional Expression (8) | fF/fR = 0.729 |
| Conditional Expression (9) | (G1R2 + G1R1)/(G1R2 − G1R1) |
| Conditional Expression (10) | $\{1 - (\beta 2)^2\} \times (\beta 3)^2 = -0.829$ |
| Conditional Expression (11) | FNO × (f1/f) = 2.664 |
| Conditional Expression (12) | 2ω = 61.4 |

FIG. 28A illustrates various aberration graphs upon focusing on infinity in the optical system according to the 14th example. FIG. 28B illustrates various aberration graphs upon focusing on a short-distance (close-up) object in the optical system according to the 14th example. The various aberration graphs demonstrate that the optical system according to the 14th example has excellent image forming performance in which various aberrations are corrected favorably.

15th Example

Figure 29:
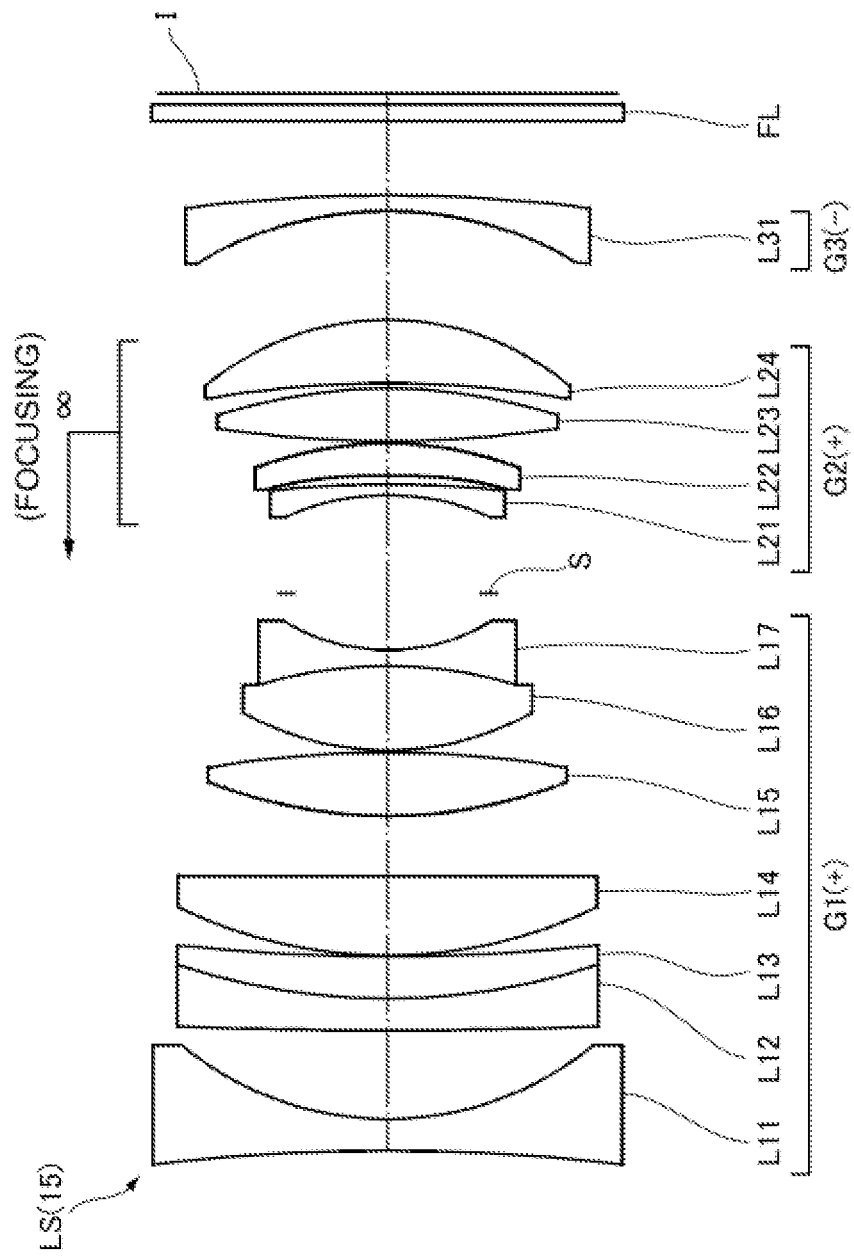
FIG. 29 is a lens configuration diagram for the state of focusing on infinity in an optical system according to a 15th example.

The 15th example will be described using FIGS. 29 and 30 and Table 15. FIG. 29 is a diagram illustrating the lens configuration for the state of focusing on infinity in the optical system according to the 15th example of the present embodiment. The optical system LS(15) according to the 15th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a cemented lens consisting of a second negative lens L12 having a meniscus shape whose convex surface is pointed toward the object and a first positive lens L13 having a meniscus shape whose convex surface is pointed toward the object, a second positive lens L14 that is biconvex, a third positive lens L15 that is biconvex, a cemented lens consisting of a fourth positive lens L16 that is biconvex and a third negative lens L17 that is biconcave, and an aperture stop S, arranged in order from the object side. The lens surface on the object side of the third positive lens L15 is an aspherical surface.

The second lens group G2 comprises a negative lens L21 having a meniscus shape whose concave surface is pointed toward the object, a first positive lens L22 having a meniscus shape whose concave surface is pointed toward the object, a second positive lens L23 that is biconvex, and a third positive lens L24 having a meniscus shape whose concave surface is pointed toward the object, arranged in order from the object side. The lens surface on either side of the first positive lens L22 is an aspherical surface.

The third lens group G3 comprises a negative lens L31 having a meniscus shape whose concave surface is pointed toward the object. The lens surface on the object side of the negative lens L31 is an aspherical surface. An image surface I is disposed on the image side of the third lens group G3. An interchangeable optical filter FL is arranged between the third lens group G3 and the image surface I.

Table 15 below lists data values regarding the optical system according to the 15th example. Note that the 14th surface is a virtual surface.

TABLE 15

| [General Data] | |
| --- | --- |
| f | 36.50 |
| FNO | 1.87 |
| ω | 30.7 |
| Y | 21.70 |
| TL | 100.000 |
| BF | 9.600 |
| BFa | 9.054 |

| [Lens Data] | | | | |
| --- | --- | --- | --- | --- |
| Surface Number | R | D | nd | vd |
| 1 | −188.20085 | 3.000 | 1.71736 | 29.6 |
| 2 | 30.66496 | 8.404 | | |
| 3 | 547.03690 | 3.000 | 1.48749 | 70.3 |
| 4 | 62.69373 | 4.000 | 1.94595 | 18.0 |
| 5 | 190.11798 | 0.100 | | |
| 6 | 45.62385 | 7.500 | 1.60300 | 65.4 |
| 7 | −115579.46000 | 5.673 | | |
| 8* | 44.63892 | 6.000 | 1.77250 | 49.6 |
| 9 | −102.19551 | 0.200 | | |
| 10 | 28.17341 | 8.000 | 1.59319 | 67.9 |
| 11 | −42.44281 | 1.500 | 1.67270 | 32.2 |
| 12 | 19.02911 | 5.399 | | |
| 13 | ∞ | D13 (Variable) | | (Aperture Stop S) |
| 14 | ∞ | 3.000 | | |
| 15 | −23.61092 | 1.000 | 1.67270 | 32.2 |
| 16 | −109.82047 | 0.899 | | |
| 17* | −60.75679 | 3.000 | 1.77377 | 47.2 |
| 18* | −33.74626 | 0.200 | | |
| 19 | 105.85192 | 5.000 | 1.59319 | 67.9 |
| 20 | −52.67684 | 0.500 | | |
| 21 | −100.00000 | 6.000 | 1.59319 | 67.9 |
| 22 | −26.83541 | D22 (Variable) | | |
| 23* | −35.17199 | 1.500 | 1.64769 | 33.7 |
| 24 | −148.75840 | 7.000 | | |
| 25 | ∞ | 1.600 | 1.51680 | 64.1 |
| 26 | ∞ | D26 (Variable) | | |

TABLE 15-continued

[Aspherical surface data]

Eighth surface
κ = 1.00000
A4 = −1.59317E−06, A6 = −1.58329E−09, A8 = 3.51477E−12, A10 = −5.52433E−15
Seventeenth surface
κ = 1.00000
A4 = −1.23191E−05, A6 = −4.63629E−08, A8 = 2.30352E−10, A10 = −1.55636E−12
Eighteenth surface
κ = 1.00000
A4 = 3.43104E−06, A6 = 0.00000E+00, A8 = 0.00000E+00, A10 = 0.00000E+00
Twenty-third surface
κ = 1.00000
A4 = 2.07644E−06, A6 = 2.61568E−09, A8 = −1.43218E−11, A10 = −5.83085E−14

[Variable distance data]

|     | Upon focusing on infinity f = 36.50 | Upon focusing on a short-distance object β = −0.1132 |
|-----|-------------------------------------|-------------------------------------------------------|
| D0  | 8                                   | 290.00                                                |
| D13 | 6.253                               | 1.764                                                 |
| D22 | 10.273                              | 14.761                                                |
| D28 | 1.000                               | 1.000                                                 |

[lens group data]

| group | starting surface | focal length |
|-------|------------------|--------------|
| G1    | 1                | 52.70        |
| G2    | 14               | 38.26        |
| G3    | 23               | −71.49       |

[Conditional Expression Corresponding Value]

| Conditional Expression (1) | BFa/f = 0.248 |
| Conditional Expression (2) | (−G1R1)/f = 5.156 |
| Conditional Expression (3), (3-1), (3-2) | (−G1R1)/f1 = 3.571 |
| Conditional Expression (4) | f/f1 = 0.693 |
| Conditional Expression (5) | f/f2 = 0.954 |
| Conditional Expression (6) | f1/f2 = 1.377 |
| Conditional Expression (7) | f1/(−f3) = 0.737 |
| Conditional Expression (8) | fF/fR = 0.758 |
| Conditional Expression (9) | (G1R2 + G1R1)/(G1R2 − G1R1) = −0.720 |
| Conditional Expression (10) | $\{1 − (β2)^2\} × (β3)^2$ = 0.828 |
| Conditional Expression (11) | FNO × (f1/f) = 2.696 |
| Conditional Expression (12) | 2ω = 61.4 |

Figure 30A:
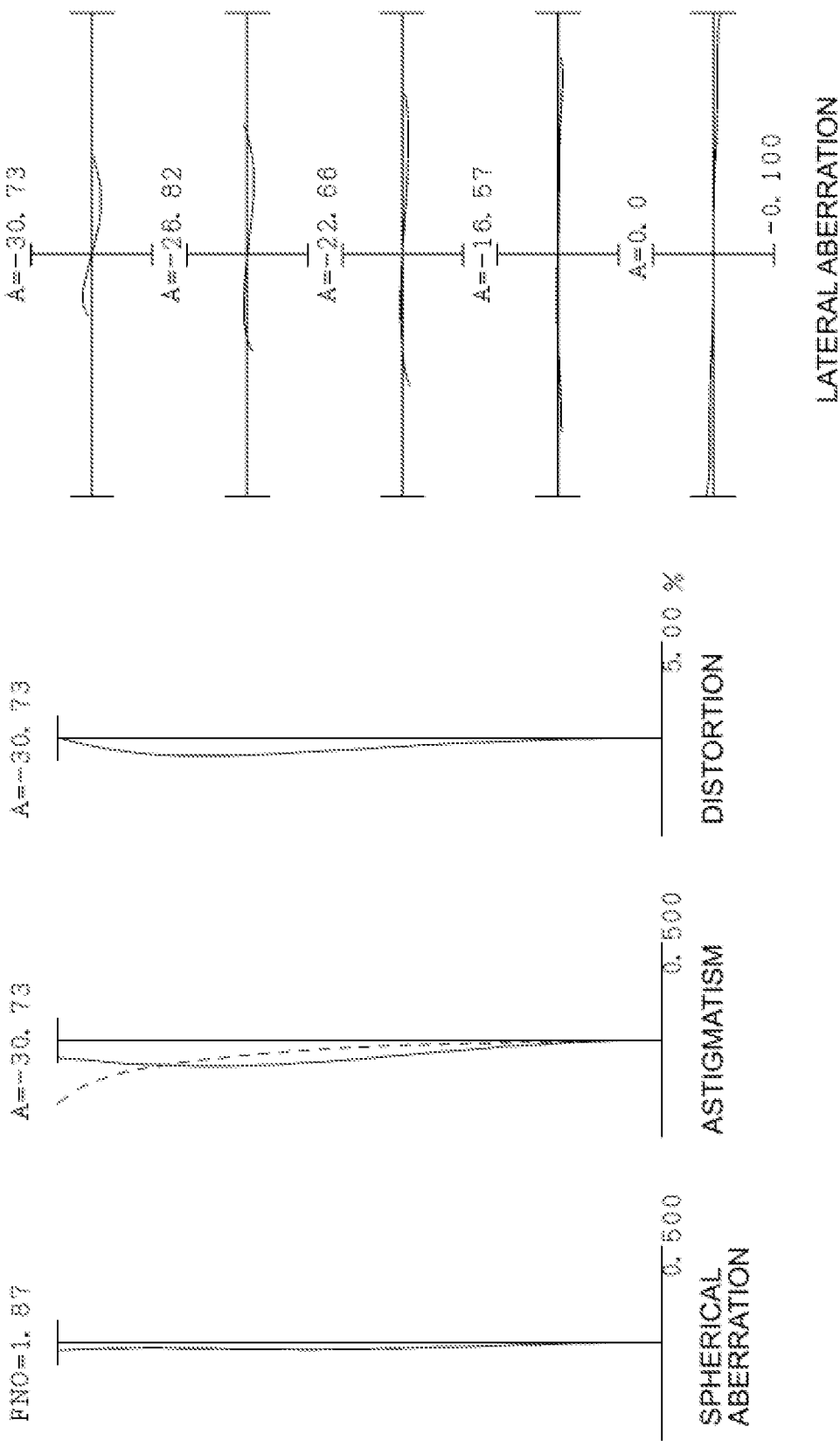

FIG. 30A illustrates various aberration graphs upon focusing on infinity in the optical system according to the 15th example. FIG. 30B illustrates various aberration graphs upon focusing on a short-distance (close-up) object in the optical system according to the 15th example. The various aberration graphs demonstrate that the optical system according to the 15th example has excellent image forming performance in which various aberrations are corrected favorably.

16th Example

The 16th example will be described using FIGS. 31 and 32 and Table 16. FIG. 31 is a diagram illustrating the lens configuration for the state of focusing on infinity in the optical system according to the 16th example of the present embodiment. The optical system LS(16) according to the 16th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a cemented lens consisting of a second negative lens L12 having a meniscus shape whose convex surface is pointed toward the object and a first positive lens L13 having a meniscus shape whose convex surface is pointed toward the object, a second positive lens L14 that is biconvex, a third positive lens L15 that is biconvex, a cemented lens consisting of a fourth positive lens L16 that is biconvex and a third negative lens L17 that is biconcave, and an aperture stop S, arranged in order from the object side. The lens surface on the object side of the third positive lens L15 is an aspherical surface.

The second lens group G2 comprises a negative lens L21 having a meniscus shape whose concave surface is pointed toward the object, a first positive lens L22 that is biconvex, a second positive lens L23 having a meniscus shape whose concave surface is pointed toward the object, and a third positive lens L24 having a meniscus shape whose concave surface is pointed toward the object, arranged in order from the object side. The lens surface on either side of the first positive lens L22 is an aspherical surface.

The third lens group G3 comprises a positive lens L31 having a meniscus shape whose convex surface is pointed toward the object and a negative lens L32 having a meniscus shape whose concave surface is pointed toward the object, arranged in order from the object side. The lens surface on the object side of the negative lens L32 is an aspherical surface. An image surface I is disposed on the image side of the third lens group G3. An interchangeable optical filter FL is arranged between the third lens group G3 and the image surface I.

Table 16 below lists data values regarding the optical system according to the 16th example. Note that the 14th surface is a virtual surface.

TABLE 16

[General Data]

| | |
|---|---|
| f | 36.50 |
| FNO | 1.86 |
| ω | 30.8 |
| Y | 21.70 |
| TL | 100.000 |
| BF | 9.600 |
| BFa | 9.055 |

[Lens Data]

| Surface Number | R | D | nd | vd |
|---|---|---|---|---|
| 1 | −133.60683 | 2.000 | 1.71736 | 29.6 |
| 2 | 32.54620 | 8.076 | | |
| 3 | 388.71645 | 2.500 | 1.48749 | 70.3 |
| 4 | 65.47753 | 4.000 | 1.94595 | 18.0 |
| 5 | 219.57835 | 0.100 | | |
| 6 | 57.60424 | 7.000 | 1.60300 | 65.4 |
| 7 | −387.08519 | 6.523 | | |
| 8* | 44.24367 | 6.000 | 1.77250 | 49.6 |
| 9 | −104.52830 | 0.200 | | |
| 10 | 31.09490 | 9.000 | 1.59319 | 67.9 |
| 11 | −42.99037 | 1.500 | 1.67270 | 32.2 |
| 12 | 20.68411 | 5.399 | | |
| 13 | ∞ | D13 (Variable) | | (Aperture Stop S) |
| 14 | ∞ | 3.000 | | |
| 15 | −23.39527 | 1.000 | 1.67270 | 32.2 |
| 16 | −374.05277 | 0.224 | | |
| 17* | 89.21164 | 4.000 | 1.77377 | 47.2 |
| 18* | −62.00927 | 1.388 | | |
| 19 | −586.47623 | 4.500 | 1.59319 | 67.9 |
| 20 | −38.88857 | 0.500 | | |
| 21 | −100.00000 | 5.500 | 1.59319 | 67.9 |
| 22 | −29.94109 | D22 (Variable) | | |
| 23 | 59.66877 | 3.000 | 1.94595 | 18.0 |
| 24 | 59.44379 | 6.722 | | |
| 25* | −32.82899 | 1.500 | 1.64769 | 33.7 |
| 26 | −177.92654 | 7.000 | | |
| 27 | ∞ | 1.600 | 1.51680 | 63.9 |
| 28 | ∞ | D28 (Variable) | | |

[Aspherical surface data]
Eighth surface k = 1.00000
A4 = −1.04917E−06, A6 = −1.42831E−09,
A8 = 4.66129E−12, A10 = −6.33796E−15

Seventeenth surface k = 1.00000
A4 = 1.65960E−05, A6 = 5.96989E−08,
A6 = −6.57382E−11, A10 = 1.19611E−13

TABLE 16-continued

Eighteenth surface k = 1.00000
A4 = 2.95825E−05, A6 = 7.91633E−08,
A8 = 0.00000E+00, A10 = 0.00000E+00

Twenty-fifth surface k = 1.00000
A4 = 4.39415E−06, A6 = −1.10198E−08,
A8 = 5.26933E−11, A10 = −1.66739E−13

[Variable distance data]

| | Upon focusing on infinity f = 36.50 | Upon focusing on a short-distance object β = −0.1137 |
|---|---|---|
| D0 | ∞ | 290.00 |
| D13 | 6.258 | 1.649 |
| D22 | 0.509 | 5.118 |
| D28 | 1.000 | 1.000 |

[lens group data]

| group | starting surface | focal length |
|---|---|---|
| G1 | 1 | 53.58 |
| G2 | 14 | 39.30 |
| G3 | 23 | −65.49 |

[Conditional Expression Corresponding Value]

| | |
|---|---|
| Conditional Expression (1) | BFa/f = 0.248 |
| Conditional Expression (2) | (−G1R1)/f = 3.660 |
| Conditional Expression (3), (3-1), (3-2) | (−G1R1)/f1 = 2.494 |
| Conditional Expression (4) | f/f1 = 0.681 |
| Conditional Expression (5) | f/f2 = 0.929 |
| Conditional Expression (6) | f1/f2 = 1.363 |
| Conditional Expression (7) | f1/(−f3) = 0.818 |
| Conditional Expression (8) | fF/fR = 0.714 |
| Conditional Expression (9) | (G1R2 + G1R1)/(G1R2 − G1R1) = −0.608 |
| Conditional Expression (10) | $\{1 - (\beta 2)^2\} \times (\beta 3)^2 = 0.810$ |
| Conditional Expression (11) | FNO × (f1/f) = 2.734 |
| Conditional Expression (12) | 2ω = 61.6 |

Figure 32A:
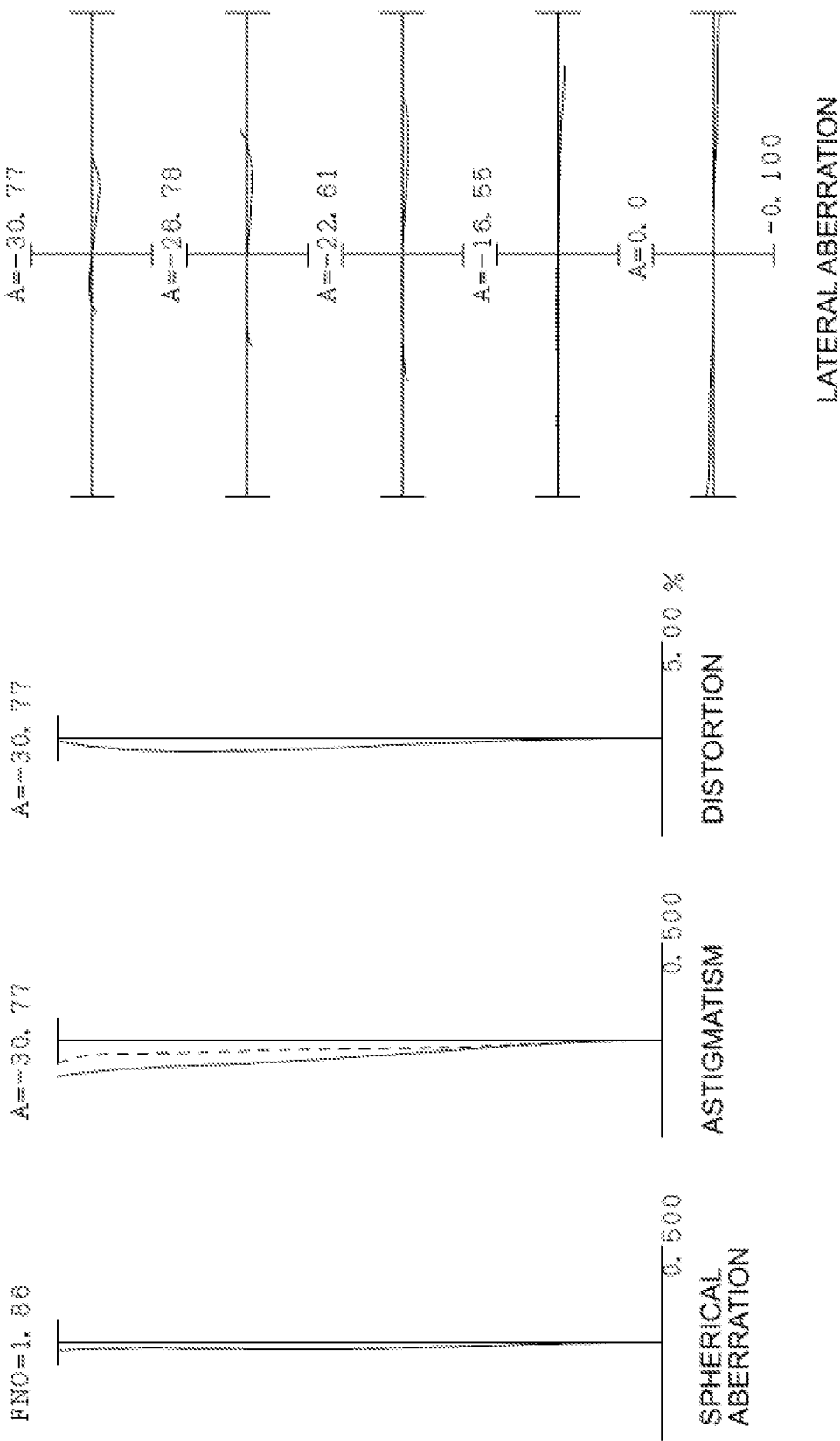
Figure 32B:
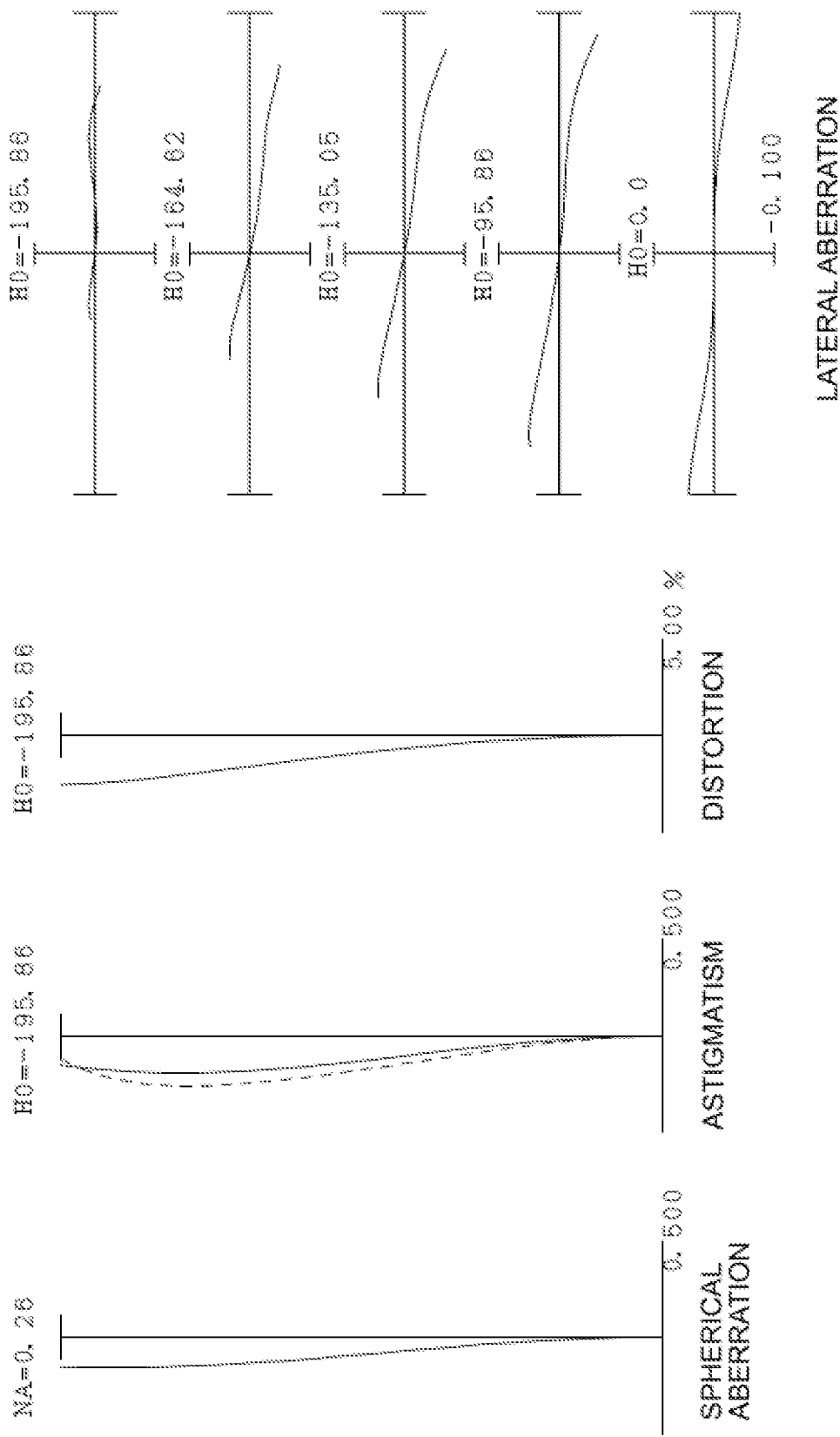
FIG. 32B illustrates various aberration graphs upon focusing on a short-distance object in the optical system according to the 16th example.

FIG. 32A illustrates various aberration graphs upon focusing on infinity in the optical system according to the 16th example. FIG. 32B illustrates various aberration graphs upon focusing on a short-distance (close-up) object in the optical system according to the 16th example. The various aberration graphs demonstrate that the optical system according to the 16th example has excellent image forming performance in which various aberrations are corrected favorably.

17th Example

Figure 33:
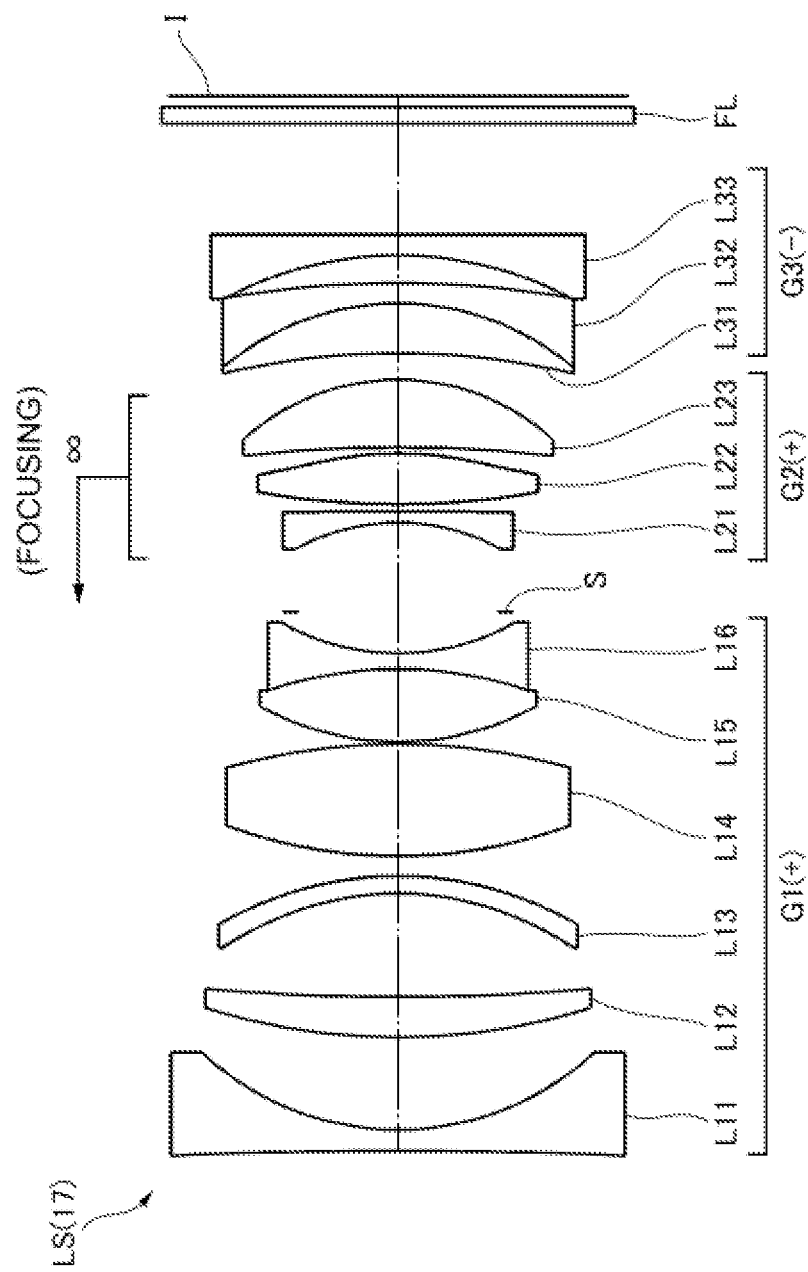
FIG. 33 is a lens configuration diagram for the state of focusing on infinity in an optical system according to a 17th example.

The 17th example will be described using FIGS. 33 and 34 and Table 17. FIG. 33 is a diagram illustrating the lens configuration for the state of focusing on infinity in the optical system according to the 17th example of the present embodiment. The optical system LS(17) according to the 17th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a first positive lens L12 having a meniscus shape whose convex surface is pointed toward the object, a second negative lens L13 having a meniscus shape whose concave surface is pointed toward the object, a second positive lens L14 that is biconvex, a cemented lens consisting of a third positive lens L15 that is biconvex and a third negative lens L16 that is biconcave, and an aperture stop S, arranged in order from the object side. The lens surface on the image surface I side of the second negative lens L13 is an aspherical surface. The lens surface on the object side of the second positive lens L14 is an aspherical surface.

The second lens group G2 comprises a negative lens L21 having a meniscus shape whose concave surface is pointed toward the object, a first positive lens L22 that is biconvex, and a second positive lens L23 having a meniscus shape whose concave surface is pointed toward the object, arranged in order from the object side. The lens surface on either side of the first positive lens L22 is an aspherical surface.

The third lens group G3 comprises a cemented lens consisting of a positive lens L31 having a meniscus shape whose concave surface is pointed toward the object and a first negative lens L32 having a meniscus shape whose concave surface is pointed toward the object, and a second negative lens L33 having a plano-concave shape whose concave surface is pointed toward the object, arranged in order from the object side. An image surface I is disposed on the image side of the third lens group G3. An interchangeable optical filter FL is arranged between the third lens group G3 and the image surface I.

Table 17 below lists data values regarding the optical system according to the 17th example. Note that the 13th surface is a virtual surface.

TABLE 17

[General Data]

| | |
|---|---|
| f | 36.05 |
| FNO | 1.85 |
| ω | 31.6 |
| Y | 21.70 |
| TL | 99.592 |
| BF | 13.100 |
| BFa | 12.555 |

[Lens Data]

| Surface Number | R | D | nd | vd |
|---|---|---|---|---|
| 1 | −500.00000 | 2.000 | 1.59270 | 35.3 |
| 2 | 27.30135 | 8.716 | | |
| 3 | 60.46320 | 3.840 | 1.94594 | 18.0 |
| 4 | 220.11217 | 9.742 | | |
| 5 | −29.41908 | 1.659 | 1.77377 | 47.2 |
| 6* | −33.35969 | 1.884 | | |
| 7* | 47.17368 | 10.592 | 1.76801 | 49.2 |
| 8 | −60.97010 | 0.200 | | |
| 9 | 27.06671 | 6.869 | 1.59319 | 67.9 |
| 10 | −38.40610 | 1.500 | 1.69895 | 30.1 |
| 11 | 22.53254 | 3.899 | | |
| 12 | ∞ | D12 (Variable) | | (Aperture Stop S) |
| 13 | ∞ | 2.700 | | |
| 14 | −20.48042 | 1.100 | 1.64769 | 33.7 |
| 15 | −452.00052 | 0.648 | | |
| 16* | 80.79578 | 4.788 | 1.77377 | 47.2 |
| 17* | −31.41145 | 0.568 | | |
| 18 | −137.97943 | 6.400 | 1.49782 | 82.6 |
| 19 | −21.82018 | D19 | | |

TABLE 17-continued

| | | | | |
|---|---|---|---|---|
| | | (Variable) | | |
| 20 | −72.37319 | 4.704 | 1.94594 | 18.0 |
| 21 | −25.72015 | 1.900 | 1.80518 | 25.4 |
| 22 | −96.08935 | 2.660 | | |
| 23 | −34.82473 | 1.900 | 1.64769 | 33.7 |
| 24 | ∞ | 10.500 | | |
| 25 | ∞ | 1.600 | 1.51680 | 64.1 |
| 26 | ∞ | D26 (Variable) | | |

[Aspherical surface data]

Sixth surface k = 1.00000
A4 = −1.02986E−07, A6 = 4.20882E−09,
A8 = −1.01963E−11, A10 = 2.17897E−14

Seventh surface k = 1.00000
A4 = −2.57635E−07, A6 = 3.44388E−09,
A8 = −9.56027E−12, A10 = 7.45193E−15

Sixteenth surface k = 1.00000
A4 = −2.53184E−06, A6 = 4.68537E−08,
A8 = −1.77268E−11, A10 = −7.02284E−13

Seventeenth surface k = 1.00000
A4 = 2.23902E−05, A6 = 1.94868E−08,
A8 = 4.29642E−10, A10 = −1.80787E−12

[Variable distance data]

| | Upon focusing on infinity $f = 36.05$ | Upon focusing on a short-distance object $\beta = -0.1049$ |
|---|---|---|
| D0 | ∞ | 314.50 |
| D12 | 5.722 | 2.550 |
| D19 | 2.500 | 5.667 |
| D26 | 1.000 | 1.000 |

[lens group data]

| group | starting surface | focal length |
|---|---|---|
| G1 | 1 | 49.49 |
| G2 | 13 | 36.41 |
| G3 | 20 | −55.61 |

[Conditional Expression Corresponding Value]

| | |
|---|---|
| Conditional Expression (1) | BFa/f = 0.348 |
| Conditional Expression (2) | (−G1R1)/f = 13.870 |
| Conditional Expression (3), (3-1), (3-2) | (−G1R1)/f1 = 10.103 |
| Conditional Expression (4) | f/f1 = 0.728 |
| Conditional Expression (5) | f/f2 = 0.990 |
| Conditional Expression (6) | f1/f2 = 1.359 |
| Conditional Expression (7) | f1/(−f3) = 0.890 |
| Conditional Expression (8) | fF/fR = 0.554 |
| Conditional Expression (9) | (G1R2 + G1R1)/(G1R2 − G1R1) = −0.896 |
| Conditional Expression (10) | $\{1 - (\beta 2)^2\} \times (\beta 3)^2 = 1.114$ |
| Conditional Expression (11) | FNO × (f1/f) = 2.534 |
| Conditional Expression (12) | 2ω = 63.2 |

FIG. 34A illustrates various aberration graphs upon focusing on infinity in the optical system according to the 17th example. FIG. 34B illustrates various aberration graphs upon focusing on a short-distance (close-up) object in the optical system according to the 17th example. The various aberration graphs demonstrate that the optical system according to the 17th example has excellent image forming performance in which various aberrations are corrected favorably.

18th Example

Figure 35:
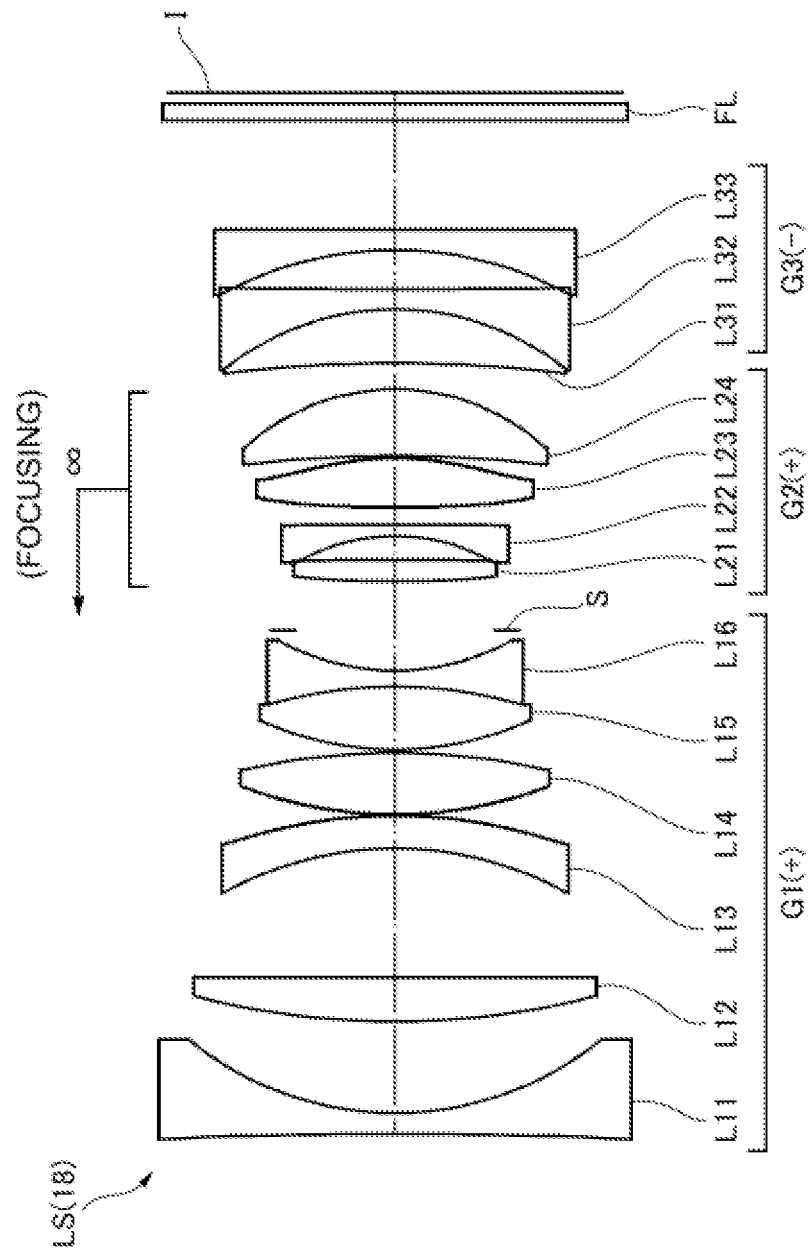
FIG. 35 is a lens configuration diagram for the state of focusing on infinity in an optical system according to an 18th example.

The 18th example will be described using FIGS. 35 and 36 and Table 18. FIG. 35 is a diagram illustrating the lens configuration for the state of focusing on infinity in the optical system according to the 18th example of the present embodiment. The optical system LS(18) according to the 18th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a first positive lens L12 that is biconvex, a second negative lens L13 having a meniscus shape whose concave surface is pointed toward the object, a second positive lens L14 that is biconvex, a cemented lens consisting of a third positive lens L15 that is biconvex and a third negative lens L16 that is biconcave, and an aperture stop S, arranged in order from the object side. The lens surface on the image surface I side of the second negative lens L13 is an aspherical surface. The lens surface on the object side of the second positive lens L14 is an aspherical surface.

The second lens group G2 comprises a first positive lens L21 that is biconvex, a negative lens L22 having a meniscus shape whose concave surface is pointed toward the object, a second positive lens L23 that is biconvex, and a third positive lens L24 having a meniscus shape whose concave surface is pointed toward the object, arranged in order from the object side. The lens surface on either side of the second positive lens L23 is an aspherical surface.

The third lens group G3 comprises a cemented lens consisting of a positive lens L31 having a meniscus shape whose concave surface is pointed toward the object and a first negative lens L32 that is biconcave, and a second negative lens L33 having a plano-concave shape whose concave surface is pointed toward the object, arranged in order from the object side. An image surface I is disposed on the image side of the third lens group G3. An interchangeable optical filter FL is arranged between the third lens group G3 and the image surface I.

Table 18 below lists data values regarding the optical system according to the 18th example.

TABLE 18

[General Data]

| | |
|---|---|
| f | 36.05 |
| FNO | 1.86 |
| ω | 31.6 |
| Y | 21.70 |
| TL | 99.539 |
| BF | 13.100 |
| BFa | 12.555 |

[Lens Data]

| Surface Number | R | D | nd | νd |
|---|---|---|---|---|
| 1 | −500.00000 | 2.000 | 1.59270 | 35.3 |
| 2 | 31.30252 | 8.752 | | |
| 3 | 77.05411 | 4.224 | 1.94594 | 18.0 |
| 4 | −4995.87340 | 12.332 | | |
| 5 | −34.14226 | 3.140 | 1.77377 | 47.2 |
| 6* | −47.59110 | 0.100 | | |
| 7* | 41.62130 | 5.898 | 1.76801 | 49.2 |
| 8 | −65.35489 | 0.294 | | |
| 9 | 31.07689 | 6.046 | 1.59319 | 67.9 |
| 10 | −44.14843 | 1.500 | 1.69895 | 30.1 |
| 11 | 22.96400 | 3.883 | | |
| 12 | ∞ | D12 (Variable) | | (Aperture Stop S) |
| 13 | 95.03984 | 2.062 | 1.49782 | 82.6 |
| 14 | −345.94097 | 2.289 | | |
| 15 | −19.00516 | 1.100 | 1.64769 | 33.7 |
| 16* | −992.59484 | 1.622 | | |
| 17* | 123.45937 | 4.722 | 1.77377 | 47.2 |
| 18 | −28.92599 | 0.200 | | |
| 19 | −129.08817 | 6.400 | 1.49782 | 82.6 |
| 20 | −21.31763 | D20 (Variable) | | |
| 21 | −134.41671 | 5.154 | 1.94594 | 18.0 |
| 22 | −26.15911 | 1.900 | 1.80518 | 25.4 |
| 23 | 1225.10730 | 3.764 | | |
| 24 | −34.85007 | 1.900 | 1.64769 | 33.7 |
| 25 | ∞ | 10.500 | | |
| 26 | ∞ | 1.600 | 1.51680 | 64.1 |
| 27 | ∞ | D27 (Variable) | | |

[Aspherical surface data]

Sixth surface k = 1.00000
A4 = 9.02554E−07, A6 = 3.14643E−09,
A8 = −1.89905E−12, A10 = 1.77634E−14

Seventh surface k = 1.00000
A4 = −1.81054E−07, A6 = 2.54149E−09,
A8 = −7.43973E−12, A10 = 8.48515E−15

Seventeenth surface k = 1.00000
A4 = 3.23226E−06, A6 = 4.85057E−08,
A8 = 1.37810E−11, A10 = −1.32577E−13

Eighteenth surface k = 1.00000
A4 = 2.32157E−05, A6 = 3.57378E−08,
A8 = 3.07145E−10, A10 = −6.42283E−13

[Variable distance data]

| | Upon focusing on infinity f = 36.05 | Upon focusing on a short-distance object β = −0.1053 |
|---|---|---|
| D0 | ∞ | 314.50 |
| D12 | 4.656 | 2.000 |
| D20 | 2.500 | 5.150 |
| D27 | 1.000 | 1.000 |

[lens group data]

| group | starting surface | focal length |
|---|---|---|
| G1 | 1 | 58.73 |
| G2 | 13 | 33.00 |
| G3 | 20 | −46.85 |

[Conditional Expression Corresponding Value]

| | |
|---|---|
| Conditional Expression (1) | BFa/f = 0.348 |
| Conditional Expression (2) | (−G1R1)/f = 13.870 |
| Conditional Expression (3), (3-1), (3-2) | (−G1R1)/f1 = 8.514 |
| Conditional Expression (4) | f/f1 = 0.614 |
| Conditional Expression (5) | f/f2 = 1.092 |
| Conditional Expression (6) | f1/f2 = 1.780 |
| Conditional Expression (7) | f1/(−f3) = 1.253 |
| Conditional Expression (8) | fF/fR = 0.765 |
| Conditional Expression (9) | (G1R2 + G1R1)/ (G1R2 − G1R1) = −0.882 |

TABLE 18-continued

| Conditional Expression (10) | $\{1 - (\beta 2)^2\} \times (\beta 3)^2 = 1.369$ |
| --- | --- |
| Conditional Expression (11) | FNO × (f1/f) = 3.025 |
| Conditional Expression (12) | 2ω = 63.2 |

Figure 36A:
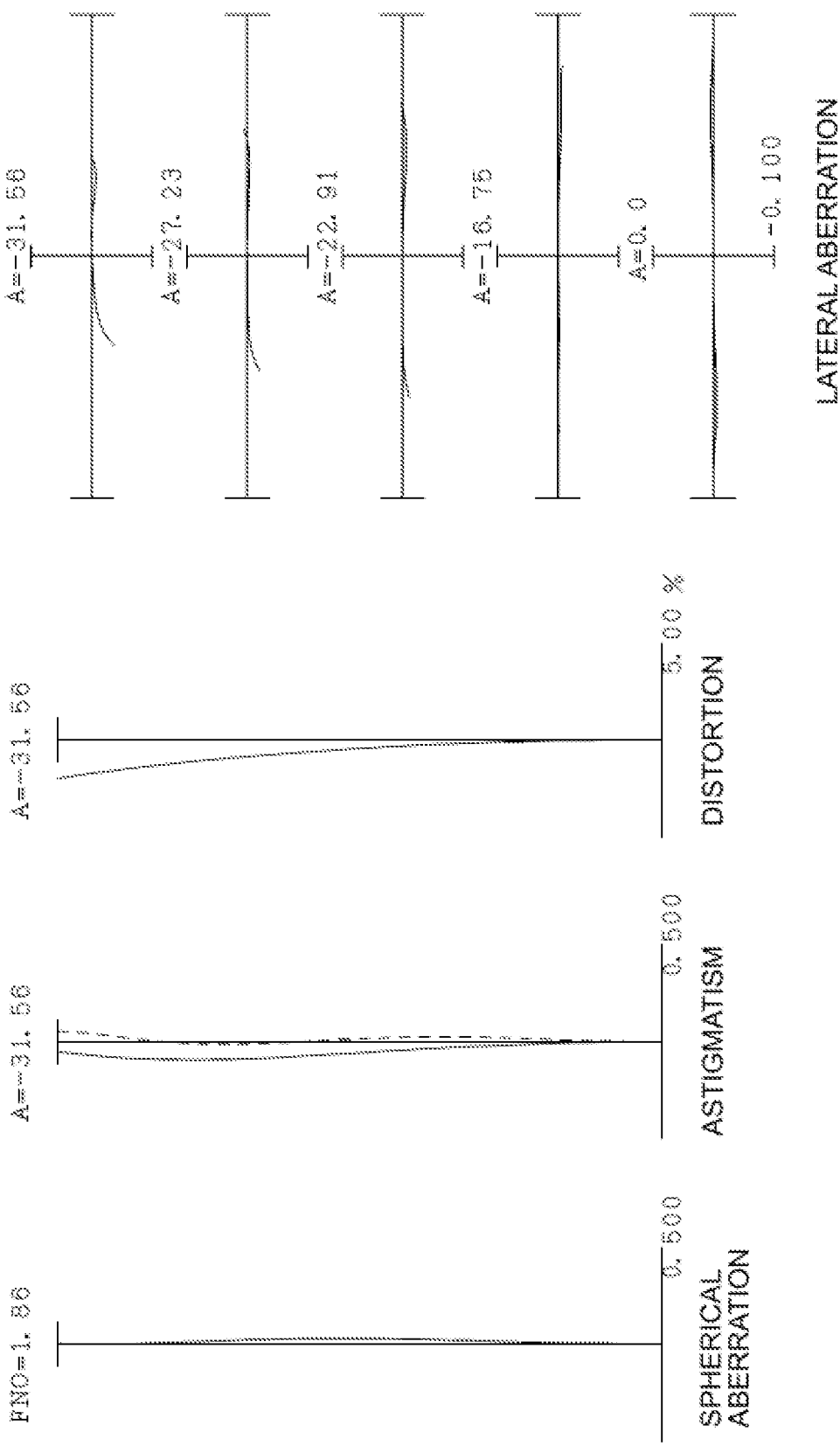

FIG. 36A illustrates various aberration graphs upon focusing on infinity in the optical system according to the 18th example. FIG. 36B illustrates various aberration graphs upon focusing on a short-distance (close-up) object in the optical system according to the 18th example. The various aberration graphs demonstrate that the optical system according to the 18th example has excellent image forming performance in which various aberrations are corrected favorably.

19th Example

Figure 37:
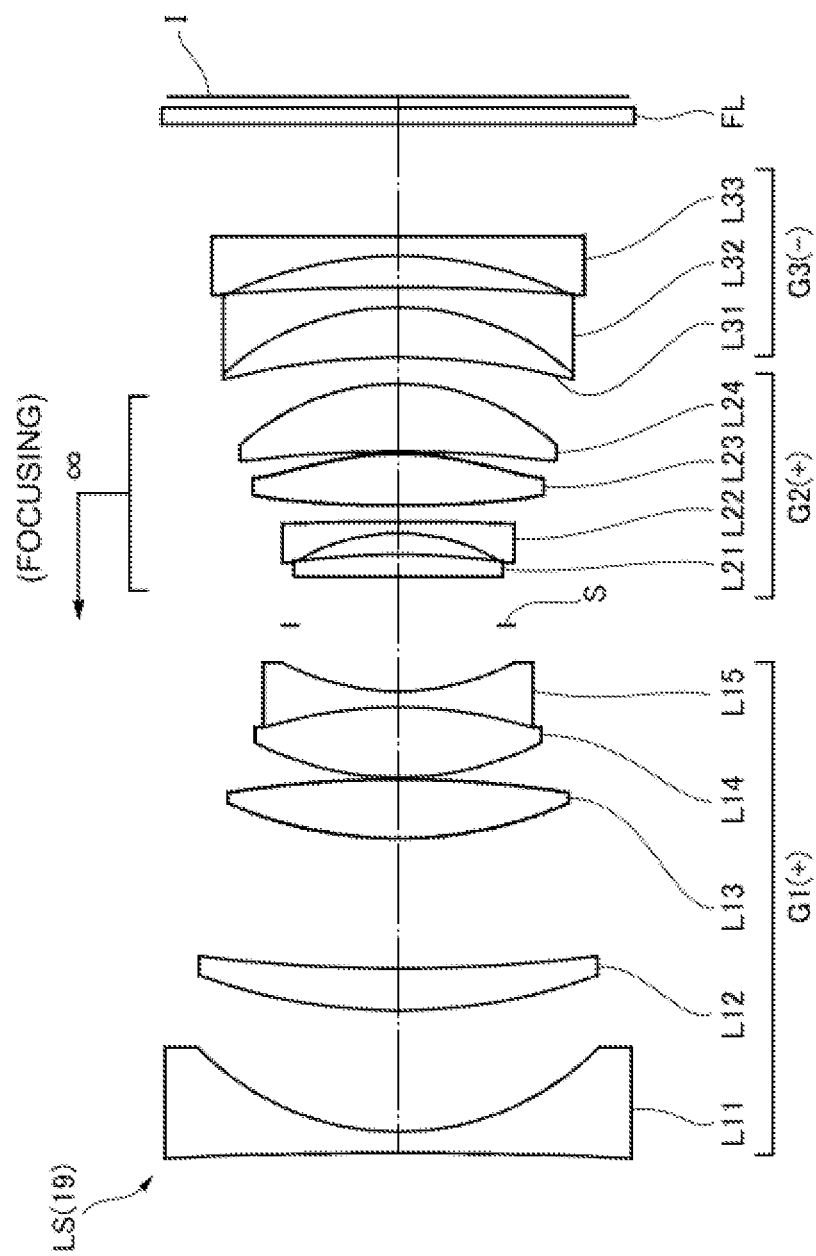
FIG. 37 is a lens configuration diagram for the state of focusing on infinity in an optical system according to a 19th example.

The 19th example will be described using FIGS. 37 and 38 and Table 19. FIG. 37 is a diagram illustrating the lens configuration for the state of focusing on infinity in the optical system according to the 19th example of the present embodiment. The optical system LS(19) according to the 19th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a first positive lens L12 having a meniscus shape whose convex surface is pointed toward the object, a second positive lens L13 that is biconvex, a cemented lens consisting of a third positive lens L14 that is biconvex and a second negative lens L15 that is biconcave, and an aperture stop S, arranged in order from the object side. The lens surface on either side of the second positive lens L13 is an aspherical surface.

The second lens group G2 comprises a first positive lens L21 having a plano-convex shape whose convex surface is pointed toward the image surface I, a negative lens L22 having a meniscus shape whose concave surface is pointed toward the object, a second positive lens L23 that is biconvex, and a third positive lens L24 having a meniscus shape whose concave surface is pointed toward the object, arranged in order from the object side. The lens surface on either side of the second positive lens L23 is an aspherical surface.

The third lens group G3 comprises a cemented lens consisting of a positive lens L31 having a meniscus shape whose concave surface is pointed toward the object and a first negative lens L32 having a meniscus shape whose concave surface is pointed toward the object, and a second negative lens L33 having a plano-concave shape whose concave surface is pointed toward the object, arranged in order from the object side. An image surface I is disposed on the image side of the third lens group G3. An interchangeable optical filter FL is arranged between the third lens group G3 and the image surface I.

Table 19 below lists data values regarding the optical system according to the 19th example. Note that the 5th surface and the 6th surface are virtual surfaces.

TABLE 19

[General Data]

| | |
| --- | --- |
| f | 36.05 |
| FNO | 1.87 |
| ω | 31.2 |
| Y | 21.70 |
| TL | 99.566 |
| BF | 13.100 |
| BFa | 12.555 |

[Lens Data]

| Surface Number | R | D | nd | vd |
| --- | --- | --- | --- | --- |
| 1 | −500.00000 | 2.000 | 1.59270 | 35.3 |
| 2 | 26.44740 | 11.431 | | |
| 3 | 54.58955 | 3.977 | 1.94594 | 18.0 |
| 4 | 151.93034 | 2.197 | | |
| 5 | ∞ | 0.000 | | |
| 6 | ∞ | 10.067 | | |
| 7* | 40.90811 | 5.557 | 1.76801 | 49.2 |
| 8* | −104.02802 | 0.200 | | |
| 9 | 29.51647 | 6.609 | 1.59319 | 67.9 |
| 10 | −42.76988 | 1.500 | 1.69895 | 30.1 |
| 11 | 23.53316 | 6.210 | | |
| 12 | ∞ | D12 (Variable) | | (Aperture Stop S) |
| 13 | ∞ | 2.090 | 1.49782 | 82.6 |
| 14 | −74.67300 | 2.012 | | |
| 15 | −18.81061 | 1.100 | 1.64769 | 33.7 |
| 16 | −248.50402 | 1.512 | | |
| 17* | 118.78898 | 4.866 | 1.77377 | 47.2 |
| 18* | −28.64501 | 0.200 | | |
| 19 | −125.10532 | 6.400 | 1.49782 | 82.6 |
| 20 | −22.16547 | D20 (Variable) | 1.94594 | 18.0 |
| 21 | −66.18341 | 4.709 | 1.94594 | 18.0 |
| 22 | −24.96921 | 1.900 | 1.80518 | 25.4 |
| 23 | −199.98195 | 2.935 | | |
| 24 | −38.28094 | 1.900 | 1.64769 | 33.7 |
| 25 | ∞ | 10.500 | | |
| 26 | ∞ | 1.600 | 1.51680 | 64.1 |
| 27 | ∞ | D27 (Variable) | | |

[Aspherical surface data]
Seventh surface k = 1.00000
A4 = 3.16584E−07, A6 = 2.60390E−09,
A8 = −1.78975E−11, A10 = 5.41316E−14

Eighth surface k = 1.00000
A4 = 4.34400E−08, A6 = −4.51994E−10,
A8 = −7.80080E−12, A10 = 3.78367E−14

Seventeenth surface k = 1.00000
A4 = −3.61366E−06, A6 = 5.25325E−08,
A8 = −5.32628E−12, A10 = 1.17020E−14

Eighteenth surface k = 1.00000
A4 = 2.00858E−05, A6 = 3.18374E−08,
A8 = 2.71615E−10, A10 = −4.03272E−13

[Variable distance data]

| | Upon focusing on infinity f = 36.05 | Upon focusing on a short-distance object β = −0.1049 |
| --- | --- | --- |
| D0 | ∞ | 314.50 |
| D12 | 4.594 | 2.000 |
| D19 | 2.500 | 5.088 |
| D26 | 1.000 | 1.000 |

TABLE 19-continued

[lens group data]

| group | starting surface | focal length |
|---|---|---|
| G1 | 1 | 53.15 |
| G2 | 13 | 32.25 |
| G3 | 20 | −45.20 |

[Conditional Expression Corresponding Value]

| | |
|---|---|
| Conditional Expression (1) | BFa/f = 0.348 |
| Conditional Expression (2) | (−G1R1)/f = 13.870 |
| Conditional Expression (3), (3-1), (3-2) | (−G1R1)/f1 = 9.407 |
| Conditional Expression (4) | f/f1 = 0.678 |
| Conditional Expression (5) | f/f2 = 1.118 |
| Conditional Expression (6) | f1/f2 = 1.648 |
| Conditional Expression (7) | f1/(−f3) = 1.176 |
| Conditional Expression (8) | fF/fR = 0.626 |
| Conditional Expression (9) | (G1R2 + G1R1)/(G1R2 − G1R1) = −0.900 |
| Conditional Expression (10) | $\{1 − (\beta 2)^2\} \times (\beta 3)^2 = 1.388$ |
| Conditional Expression (11) | FNO × (f1/f) = 2.751 |
| Conditional Expression (12) | 2ω = 62.4 |

Figure 38B:
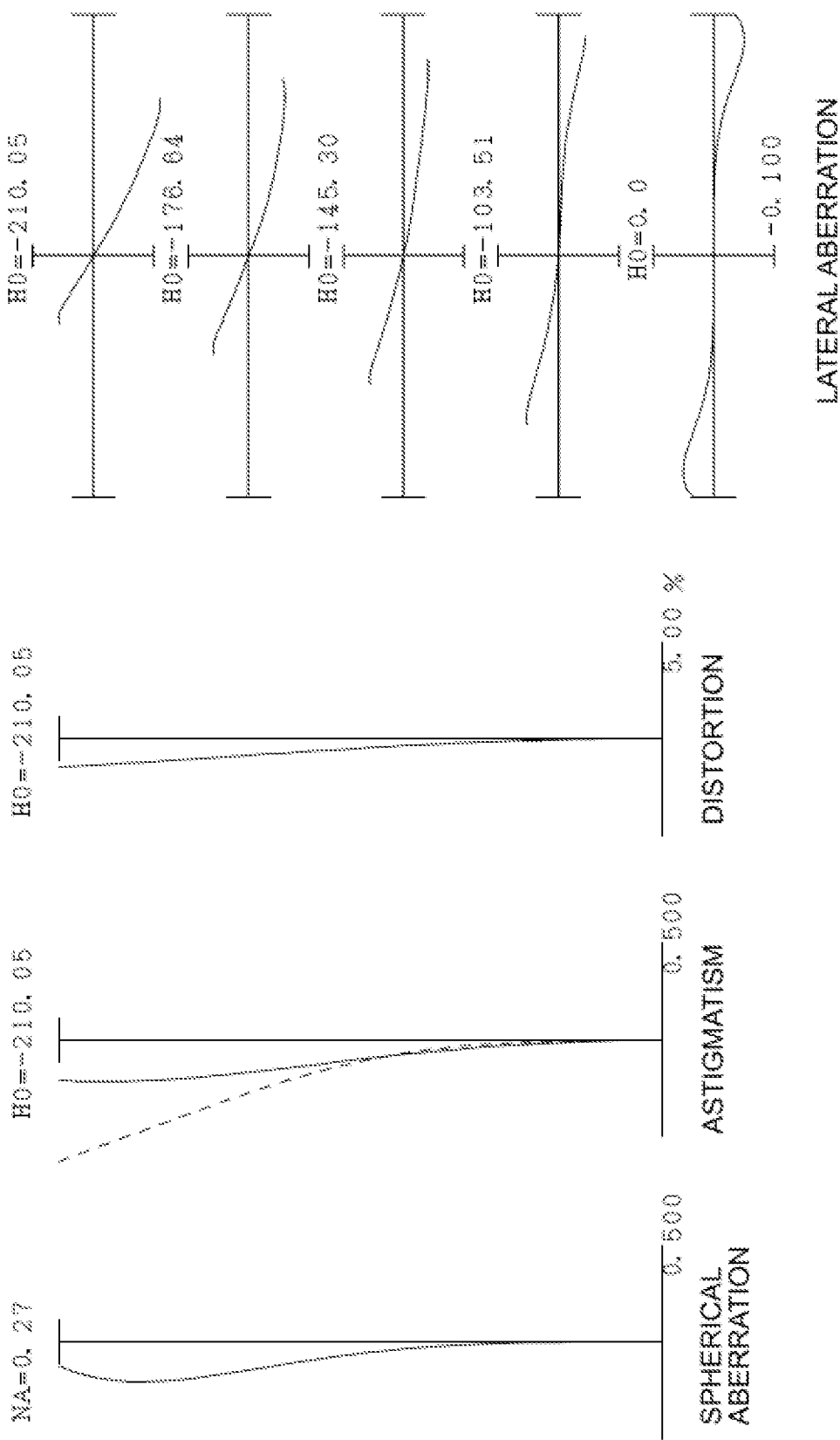
FIG. 38B illustrates various aberration graphs upon focusing on a short-distance object in the optical system according to the 19th example.

FIG. 38A illustrates various aberration graphs upon focusing on infinity in the optical system according to the 19th example. FIG. 38B illustrates various aberration graphs upon focusing on a short-distance (close-up) object in the optical system according to the 19th example. The various aberration graphs demonstrate that the optical system according to the 19th example has excellent image forming performance in which various aberrations are corrected favorably.

20th Example

Figure 39:
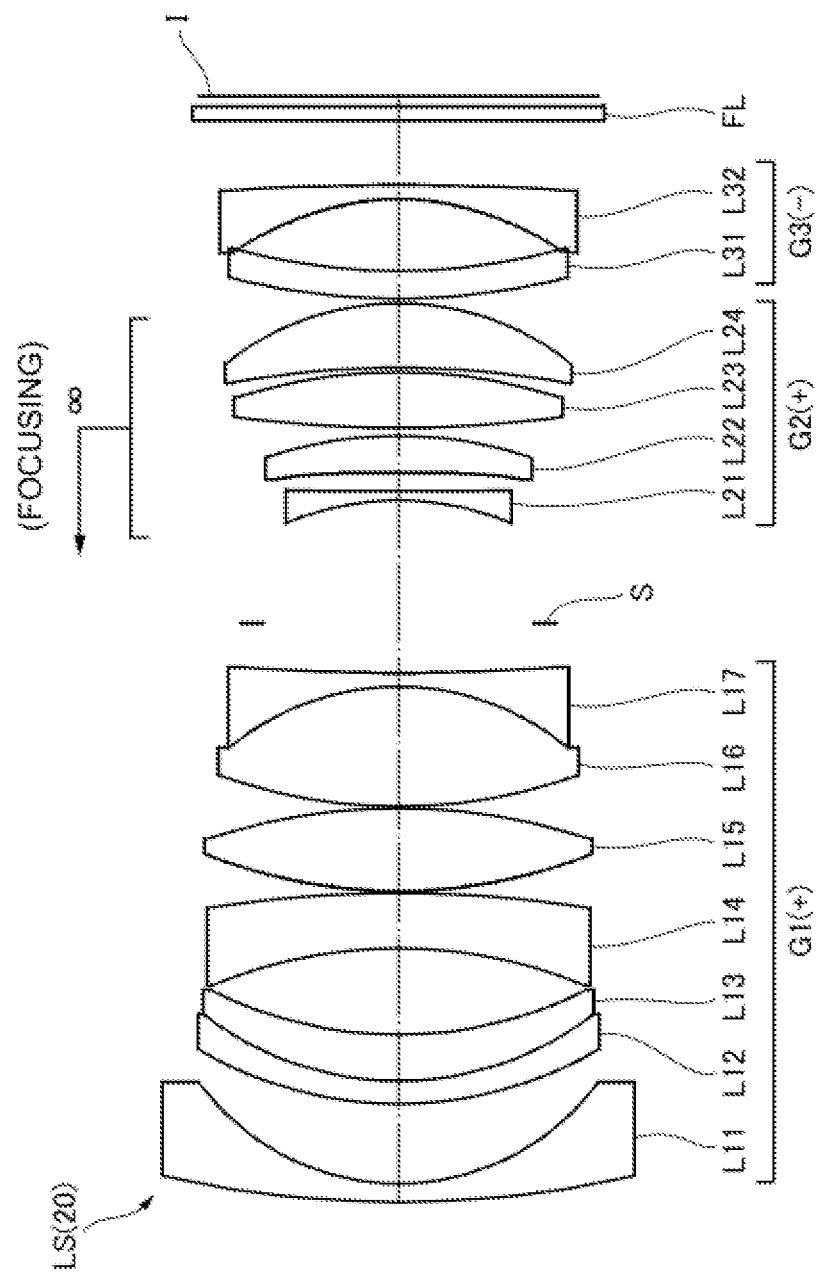
FIG. 39 is a lens configuration diagram for the state of focusing on infinity in an optical system according to a 20th

The 20th example will be described using FIGS. 39 and 40 and Table 20. FIG. 39 is a diagram illustrating the lens configuration for the state of focusing on infinity in the optical system according to the 20th example of the present embodiment. The optical system LS(20) according to the 20th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 having a meniscus shape whose convex surface is pointed toward the object, a cemented lens consisting of a second negative lens L12 having a meniscus shape whose convex surface is pointed toward the object and a first positive lens L13 having a meniscus shape whose convex surface is pointed toward the object, a third negative lens L14 having a meniscus shape whose concave surface is pointed toward the object, a second positive lens L15 that is biconvex, a cemented lens consisting of a third positive lens L16 that is biconvex and a fourth negative lens L17 that is biconcave, and an aperture stop S, arranged in order from the object side. The lens surface on the object side of the second positive lens L15 is an aspherical surface.

The second lens group G2 comprises a negative lens L21 that is biconcave, a first positive lens L22 having a meniscus shape whose concave surface is pointed toward the object, a second positive lens L23 that is biconvex, and a third positive lens L24 having a meniscus shape whose concave surface is pointed toward the object, arranged in order from the object side. The lens surface on the object side of the first positive lens L22 is an aspherical surface.

The third lens group G3 comprises a first negative lens L31 having a meniscus shape whose convex surface is pointed toward the object and a second negative lens L32 having a meniscus shape whose concave surface is pointed toward the object, arranged in order from the object side. The lens surface on the object side of the second negative lens L32 is an aspherical surface. An image surface I is disposed on the image side of the third lens group G3. An interchangeable optical filter FL is arranged between the third lens group G3 and the image surface I.

Table 20 below lists data values regarding the optical system according to the 20th example.

TABLE 20

[General Data]

| | |
|---|---|
| f | 36.41 |
| FNO | 1.45 |
| ω | 30.7 |
| Y | 21.70 |
| TL | 120.000 |
| BF | 9.600 |
| BFa | 9.055 |

[Lens Data]

| Surface Number | R | D | nd | vd |
|---|---|---|---|---|
| 1 | 117.52540 | 2.000 | 1.71736 | 29.6 |
| 2 | 26.99520 | 8.652 | | |
| 3 | 42.97983 | 2.500 | 1.48749 | 70.3 |
| 4 | 34.72137 | 5.000 | 1.94595 | 18.0 |
| 5 | 45.17490 | 9.389 | | |
| 6 | −52.71945 | 6.000 | 1.60300 | 65.4 |
| 7 | −131.66451 | 0.200 | | |
| 8* | 55.12835 | 9.000 | 1.77250 | 49.6 |
| 9 | −66.63993 | 0.200 | | |
| 10 | 57.67591 | 13.000 | 1.59319 | 67.9 |
| 11 | −28.99052 | 1.500 | 1.67270 | 32.2 |
| 12 | 230.60272 | 5.399 | | |
| 13 | ∞ | D13 (Variable) | | (Aperture Stop S) |
| 14 | −30.96994 | 1.000 | 1.67270 | 32.2 |
| 15 | 1151.90580 | 2.000 | | |
| 16* | −406.76312 | 4.000 | 1.77377 | 47.2 |
| 17 | −45.06075 | 0.881 | | |
| 18 | 140.10078 | 6.000 | 1.59319 | 67.9 |
| 19 | −58.07296 | 0.500 | | |
| 20 | −100.00000 | 7.000 | 1.59319 | 67.9 |
| 21 | −30.10496 | D21 (Variable) | | |
| 22 | 74.17179 | 3.000 | 1.94595 | 18.0 |
| 23 | 67.04188 | 7.824 | | |
| 24* | −26.97932 | 1.500 | 1.64769 | 33.7 |
| 25 | −290.34268 | 7.000 | | |
| 26 | ∞ | 1.600 | 1.51680 | 63.9 |
| 27 | ∞ | D27 (Variable) | | |

[Aspherical surface data]
Eighth surface k = 1.00000
A4 = −6.93107E−07, A6 = −4.54051E−10,
A8 = 1.72053E−12, A10 = −1.39325E−15

Sixteenth surface k = 1.00000
A4 = −1.46752E−05, A6 = −1.19814E−08,
A8 = 3.20679E−11, A10 = −2.43972E−13

TABLE 20-continued

Twenty-fourth surface k = 1.00000
A4 = 1.09875E-05, A6 = 2.56103E-09,
A8 = -8.64670E-12, A10 = -3.14024E-14

[Variable distance data]

|  | Upon focusing on infinity<br>f = 36.41 | Upon focusing on a short-distance object<br>β = -0.1095 |
|---|---|---|
| D0 | ∞ | 290.00 |
| D13 | 13.354 | 9.399 |
| D21 | 0.500 | 4.455 |
| D27 | 1.000 | 1.000 |

[lens group data]

| group | starting surface | focal length |
|---|---|---|
| G1 | 1 | 48.51 |
| G2 | 14 | 38.61 |
| G3 | 22 | -44.33 |

[Conditional Expression Corresponding Value]

| Conditional Expression (1) | BFa/f = 0.249 |
|---|---|
| Conditional Expression (2) | (-G1R1)/f = -3.228 |
| Conditional Expression (3), (3-1), (3-2) | (-G1R1)/f1 = -2.423 |
| Conditional Expression (4) | f/f1 = 0.751 |
| Conditional Expression (5) | f/f2 = 0.943 |
| Conditional Expression (6) | f1/f2 = 1.256 |
| Conditional Expression (7) | f1/(-f3) = 1.094 |
| Conditional Expression (8) | fF/fR = 0.358 |
| Conditional Expression (9) | (G1R2 + G1R1)/(G1R2 - G1R1) = -1.596 |
| Conditional Expression (10) | $\{1 - (\beta 2)^2\} \times (\beta 3)^2 = 0.914$ |
| Conditional Expression (11) | FNO × (f1/f) = 1.936 |
| Conditional Expression (12) | 2ω = 61.4 |

Figure 40A:
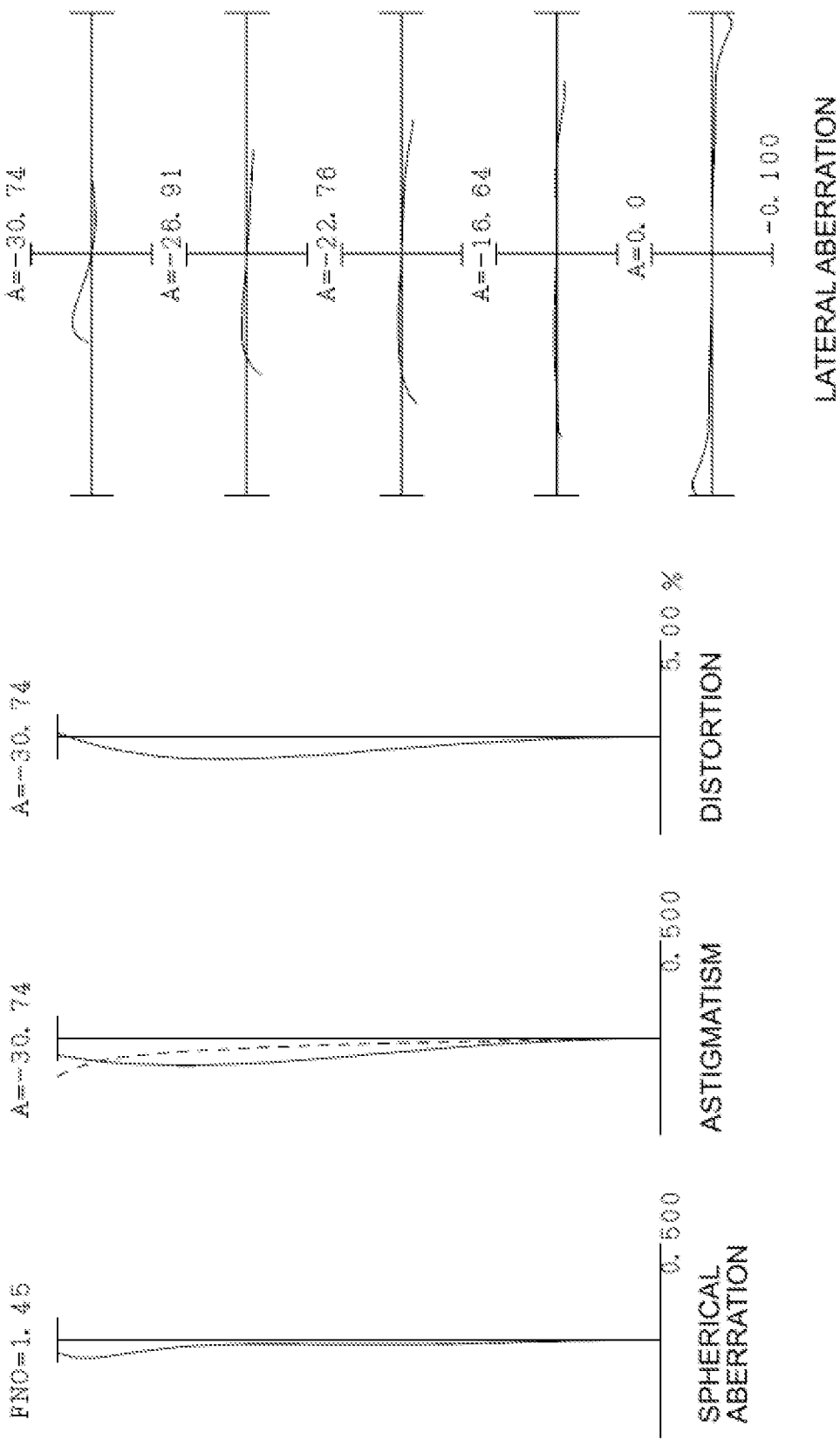
Figure 40B:
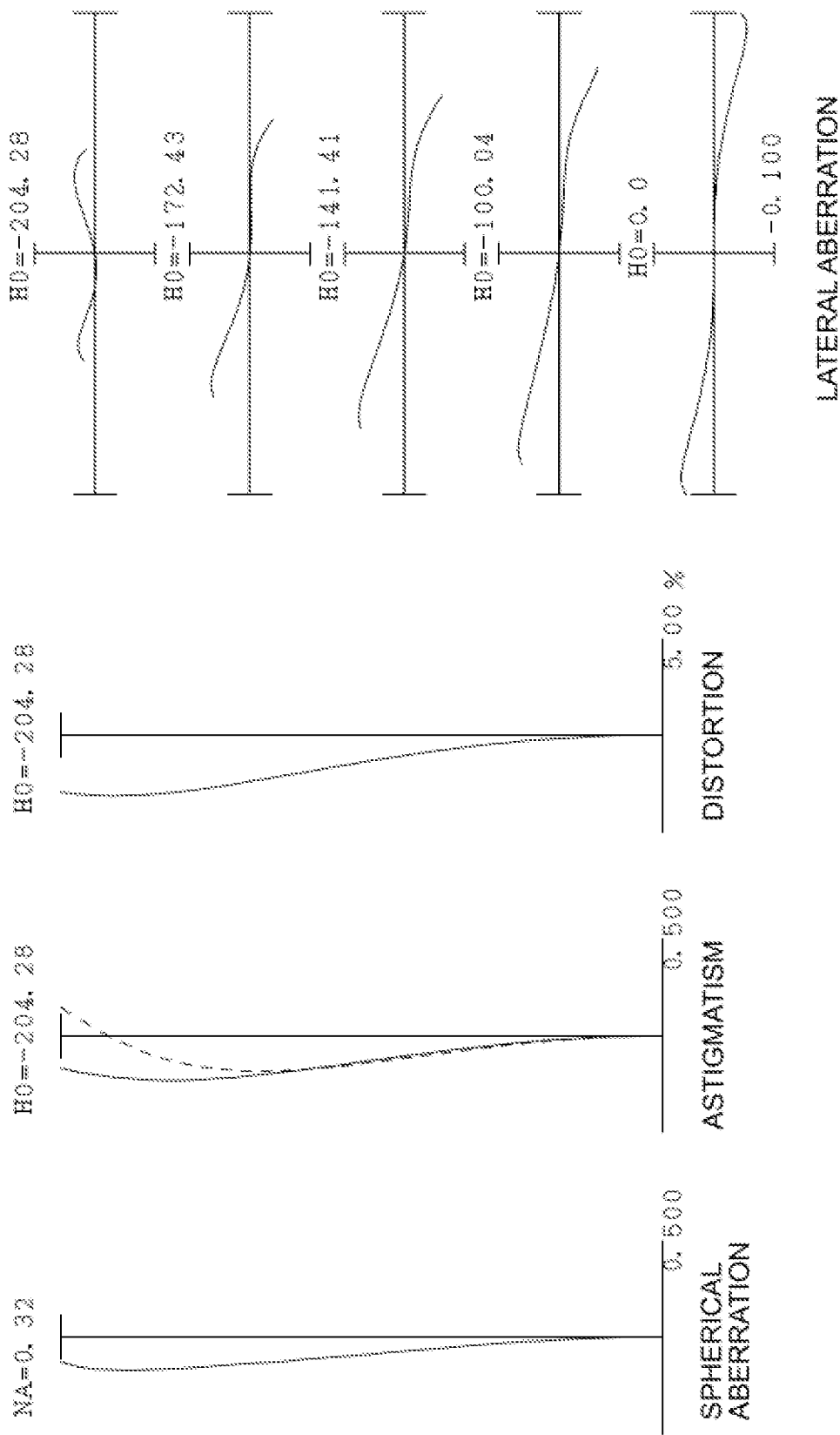
FIG. 40B illustrates various aberration graphs upon focusing on a short-distance object in the optical system according to the 20th example.

FIG. 40A illustrates various aberration graphs upon focusing on infinity in the optical system according to the 20th example. FIG. 40B illustrates various aberration graphs upon focusing on a short-distance (close-up) object in the optical system according to the 20th example. The various aberration graphs demonstrate that the optical system according to the 20th example has excellent image forming performance in which various aberrations are corrected favorably.

21st Example

Figure 41:
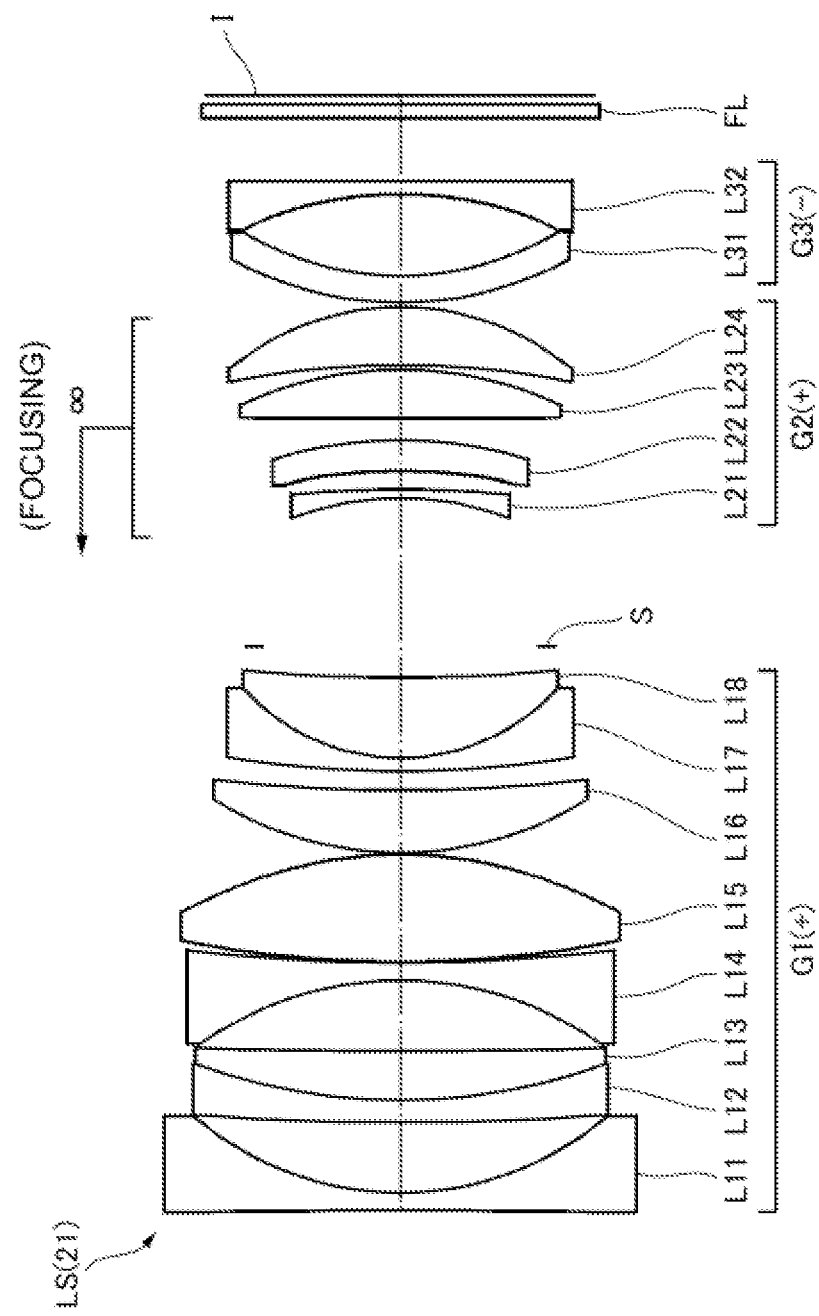
FIG. 41 is a lens configuration diagram for the state of focusing on infinity in an optical system according to a 21st example.

The 21st example will be described using FIGS. 41 and 42 and Table 21. FIG. 41 is a diagram illustrating the lens configuration for the state of focusing on infinity in the optical system according to the 21st example of the present embodiment. The optical system LS(21) according to the 21st example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a cemented lens consisting of a second negative lens L12 having a meniscus shape whose convex surface is pointed toward the object and a first positive lens L13 having a meniscus shape whose convex surface is pointed toward the object, a third negative lens L14 that is biconcave, a second positive lens L15 that is biconvex, a third positive lens L16 having a meniscus shape whose convex surface is pointed toward the object, a cemented lens consisting of a fourth negative lens L17 having a meniscus shape whose convex surface is pointed toward the object and a fourth positive lens L18 having a meniscus shape whose convex shape is pointed toward the object, and an aperture stop S, arranged in order from the object side. The lens surface on either side of the second positive lens L15 is an aspherical surface.

The second lens group G2 comprises a negative lens L21 having a meniscus shape whose concave surface is pointed toward the object, a first positive lens L22 having a meniscus shape whose concave surface is pointed toward the object, a second positive lens L23 that is biconvex, and a third positive lens L24 having a meniscus shape whose concave surface is pointed toward the object, arranged in order from the object side. The lens surface on the object side of the first positive lens L22 is an aspherical surface.

The third lens group G3 comprises a first negative lens L31 having a meniscus shape whose convex surface is pointed toward the object and a second negative lens L32 having a plano-concave shape whose concave surface is pointed toward the object, arranged in order from the object side. The lens surface on the object side of the second negative lens L32 is an aspherical surface. An image surface I is disposed on the image side of the third lens group G3. An interchangeable optical filter FL is arranged between the third lens group G3 and the image surface I.

Table 21 below lists data values regarding the optical system according to the 21st example.

TABLE 21

[General Data]

| f | 36.00 |
|---|---|
| FNO | 1.42 |
| ω | 31.2 |
| Y | 21.70 |
| TL | 125.000 |
| BF | 9.600 |
| BFa | 9.055 |

[Lens Data]

| Surface Number | R | D | nd | νd |
|---|---|---|---|---|
| 1 | -2103.91320 | 2.000 | 1.67884 | 31.5 |
| 2 | 35.70457 | 7.893 | | |
| 3 | 323.10172 | 2.500 | 1.49086 | 69.1 |
| 4 | 67.22138 | 5.500 | 1.94595 | 18.0 |
| 5 | 787.71792 | 7.911 | | |
| 6 | 39.04627 | 2.00 | 1.69166 | 30.1 |
| 7 | 213.89102 | 0.100 | | |
| 8* | 137.58827 | 12.000 | 1.85135 | 40.1 |
| 9* | -47.56574 | 0.200 | | |
| 10 | 39.72534 | 7.000 | 1.83481 | 42.7 |
| 11 | 181.94050 | 2.130 | | |
| 12 | 117.83429 | 1.500 | 1.75520 | 27.6 |
| 13 | 23.80746 | 9.000 | 1.59319 | 67.9 |
| 14 | 183.46004 | 3.500 | | |
| 15 | ∞ | D15 (Variable) | | (Aperture Stop S) |
| 16 | -34.21404 | 1.000 | 1.67270 | 32.2 |
| 17 | -122.91319 | 2.000 | | |
| 18* | -86.16442 | 3.500 | 1.77377 | 47.2 |
| 19 | -48.56224 | 2.416 | | |
| 20 | 1800.15400 | 5.500 | 1.59319 | 67.9 |
| 21 | -42.45537 | 0.500 | | |

TABLE 21-continued

| | | | | |
|---|---|---|---|---|
| 22 | −100.00000 | 6.500 | 1.59319 | 67.9 |
| 23 | −30.05033 | D23 (Variable) | | |
| 24 | 39.40559 | 3.000 | 1.94595 | 18.0 |
| 25 | 34.37457 | 9.136 | | |
| 26* | −44.57372 | 1.500 | 1.64769 | 33.7 |
| 27 | ∞ | 7.000 | | |
| 28 | ∞ | 1.600 | 1.51680 | 63.9 |
| 29 | ∞ | D29 (Variable) | | |

[Aspherical surface data]
Eighth surface k = 1.00000
A4 = 3.90875E−07, A6 = 5.99792E−10,
A8 = −1.78965E−12, A10 = 1.89102E−15

Ninth surface k = 1.00000
A4 = 5.52339E−07, A6 = 1.13820E−09,
A8 = −1.99242E−12, A10 = 2.23323E−15

Eighteenth surface k = 1.00000
A4 = −1.62045E−05, A6 = −1.75085E−08,
A8 = 3.19334E−11, A10 = −3.05989E−13

Twenty-sixth surface k = 1.00000
A4 = −1.48857E−06, A6 = −3.93600E−09,
A8 = 2.22864E−12, A10 = −4.82017E−14

[Variable distance data]

| | Upon focusing on infinity f = 36.00 | Upon focusing on a short-distance object β = −0.1086 |
|---|---|---|
| D0 | ∞ | 290.00 |
| D13 | 16.614 | 12.490 |
| D21 | 0.500 | 4.624 |
| D27 | 1.000 | 1.000 |

[lens group data]

| group | starting surface | focal length |
|---|---|---|
| G1 | 1 | 52.88 |
| G2 | 16 | 39.96 |
| G3 | 24 | −59.46 |

[Conditional Expression Corresponding Value]

| | |
|---|---|
| Conditional Expression (1) | BFa/f = 0.252 |
| Conditional Expression (2) | (−G1R1)/f = 58.442 |
| Conditional Expression (3), (3-1), (3-2) | (−G1R1)/f1 = 39.787 |
| Conditional Expression (4) | f/f1 = 0.681 |
| Conditional Expression (5) | f/f2 = 0.901 |
| Conditional Expression (6) | f1/f2 = 1.323 |
| Conditional Expression (7) | f1/(−f3) = 0.889 |
| Conditional Expression (8) | fF/fR = 0.622 |
| Conditional Expression (9) | (G1R2 + G1R1)/(G1R2 − G1R1) = −0.967 |
| Conditional Expression (10) | $\{1 - (\beta 2)^2\} \times (\beta 3)^2 = 0.867$ |
| Conditional Expression (11) | FNO × (f1/f) = 2.080 |
| Conditional Expression (12) | 2ω = 62.4 |

Figure 42B:
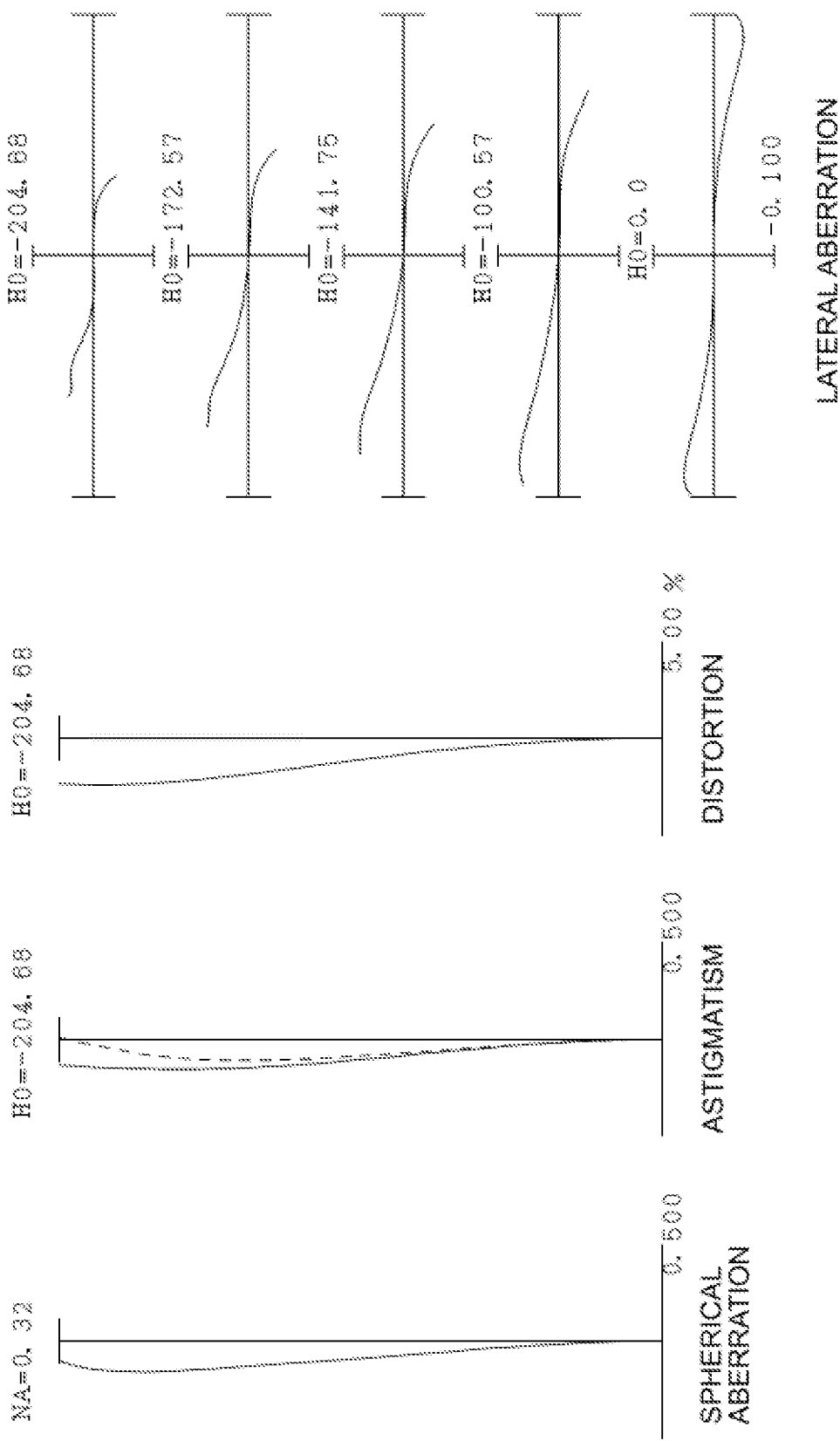
FIG. 42B illustrates various aberration graphs upon focusing on a short-distance object in the optical system according to the 21st example.

FIG. 42A illustrates various aberration graphs upon focusing on infinity in the optical system according to the 21st example. FIG. 42B illustrates various aberration graphs upon focusing on a short-distance (close-up) object in the optical system according to the 21st example. The various aberration graphs demonstrate that the optical system according to the 21st example has excellent image forming performance in which various aberrations are corrected favorably.

22nd Example

Figure 43:
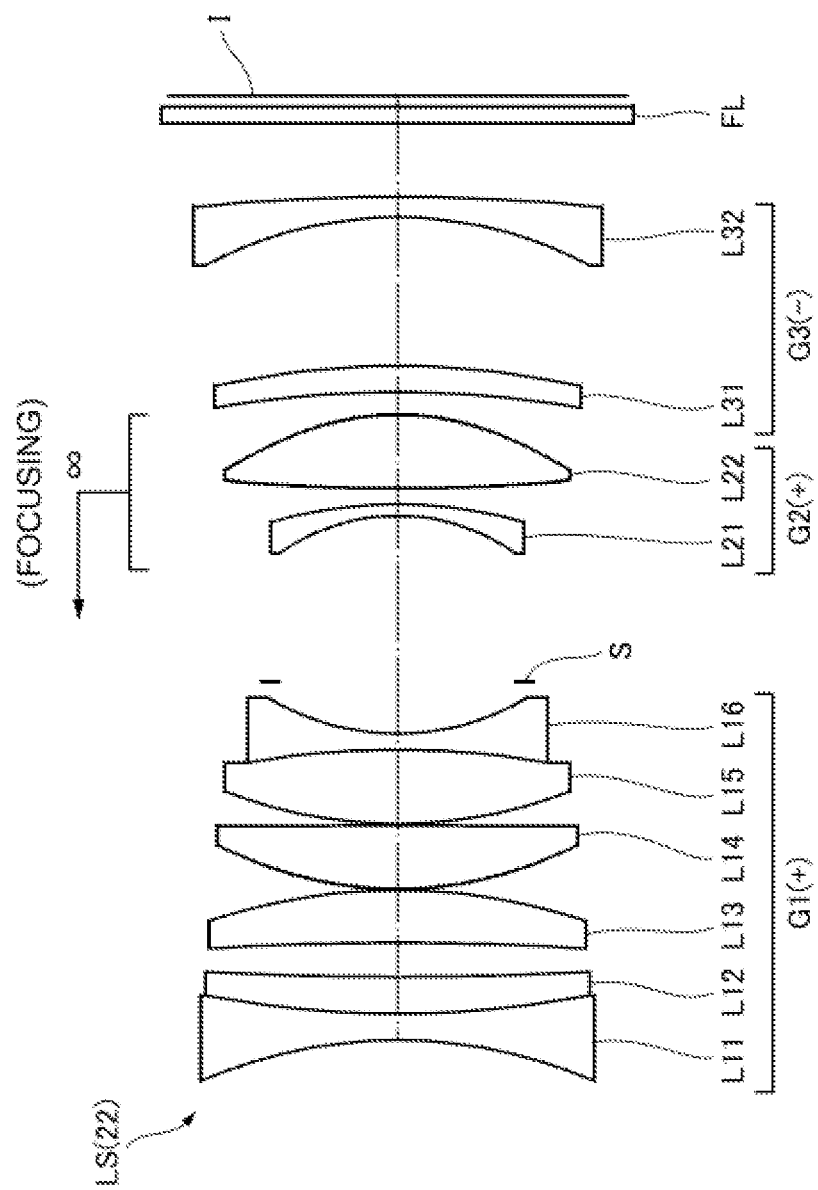
FIG. 43 is a lens configuration diagram for the state of focusing on infinity in an optical system according to a 22nd example.

The 22nd example will be described using FIGS. 43 and 44 and Table 22. FIG. 43 is a diagram illustrating the lens configuration for the state of focusing on infinity in the optical system according to the 22nd example of the present embodiment. The optical system LS(22) according to the 22nd example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a cemented lens consisting of a first negative lens L11 that is biconcave and a first positive lens L12 having a meniscus shape whose convex surface is pointed toward the object, a second positive lens L13 having a meniscus shape whose concave surface is pointed toward the object, a third positive lens L14 that is biconvex, a cemented lens consisting of a fourth positive lens L15 that is biconvex and a second negative lens L16 that is biconcave, and an aperture stop S, arranged in order from the object side. The lens surface on the object side of the third positive lens L14 is an aspherical surface.

The second lens group G2 comprises a negative lens L21 having a meniscus shape whose concave surface is pointed toward the object and a positive lens L22 that is biconvex, arranged in order from the object side. The lens surface on either side of the positive lens L22 is an aspherical surface.

The third lens group G3 comprises a positive lens L31 having a meniscus shape whose concave surface is pointed toward the object and a negative lens L32 having a meniscus shape whose concave surface is pointed toward the object, arranged in order from the object side. An image surface I is disposed on the image side of the third lens group G3. An interchangeable optical filter FL is arranged between the third lens group G3 and the image surface I.

Table 22 below lists data values regarding the optical system according to the 22nd example. Note that the 12th surface is a virtual surface.

TABLE 22

[General Data]

| | |
|---|---|
| f | 36.00 |
| FNO | 1.42 |
| ω | 31.2 |
| Y | 21.70 |
| TL | 125.000 |
| BF | 9.600 |
| BFa | 9.055 |

[Lens Data]

| Surface Number | R | D | nd | vd |
|---|---|---|---|---|
| 1 | −47.35217 | 2.500 | 1.67270 | 32.2 |
| 2 | 94.47970 | 3.500 | 1.94595 | 18.0 |
| 3 | 340.13397 | 3.236 | | |
| 4 | −287.21979 | 5.000 | 1.72916 | 54.6 |
| 5 | −56.34930 | 0.100 | | |
| 6* | 35.86692 | 6.000 | 1.80400 | 46.6 |
| 7 | −2318.43510 | 0.200 | | |
| 8 | 45.67330 | 7.000 | 1.59319 | 67.9 |
| 9 | −80.81919 | 1.500 | 1.64769 | 33.7 |
| 10 | 23.62983 | 4.933 | | |

TABLE 22-continued

| | | | | |
|---|---|---|---|---|
| 11 | ∞ | D11 (Variable) | | (Aperture Stop S) |
| 12 | ∞ | 3.000 | | |
| 13 | −19.53832 | 1.100 | 1.75520 | 27.6 |
| 14 | −43.18210 | 1.500 | | |
| 15* | 190.26772 | 7.000 | 1.75501 | 51.2 |
| 16* | −24.77289 | D16 (Variable) | | |
| 17 | −104.87147 | 2.500 | 1.94595 | 18.0 |
| 18 | −78.84438 | 14.090 | | |
| 19 | −38.56539 | 1.900 | 1.64769 | 33.7 |
| 20 | −200.67448 | 7.000 | | |
| 21 | ∞ | 1.600 | 1.51680 | 64.1 |
| 22 | ∞ | D22 (Variable) | | |

[Aspherical surface data]
Sixth surface k = 1.00000
A4 = −1.5861E−06, A6 = −8.54477E−10,
A8 = −4.09102E−13, A10 = 5.85218E−16

Fifteenth surface k = 1.00000
A4 = 4.66858E−07, A6 = −2.10629E−08,
A8 = 1.67228E−10, A10 = −2.90665E−13

Sixteenth surface k = 1.00000
A4 = 8.47233E−06, A6 = 2.18602E−10,
A8 = 2.67616E−11, A10 = 1.23427E−13

[Variable distance data]

| | Upon focusing on infinity f = 51.50 | Upon focusing on a short-distance object β = −0.1588 |
|---|---|---|
| D0 | ∞ | 305.05 |
| D11 | 12.719 | 2.695 |
| D16 | 2.111 | 12.136 |
| D22 | 1.000 | 1.000 |

[lens group data]

| group | starting surface | focal length |
|---|---|---|
| G1 | 1 | 75.53 |
| G2 | 12 | 56.74 |
| G3 | 17 | −100.37 |

[Conditional Expression Corresponding Value]

| | |
|---|---|
| Conditional Expression (1) | BFa/f = 0.176 |
| Conditional Expression (2) | (−G1R1)/f = 0.919 |
| Conditional Expression (3), (3-1), (3-2) | (−G1R1)/f1 = 0.627 |
| Conditional Expression (4) | f/f1 = 0.682 |
| Conditional Expression (5) | f/f2 = 0.908 |
| Conditional Expression (6) | f1/f2 = 1.331 |
| Conditional Expression (7) | f1/(−f3) = 0.753 |
| Conditional Expression (8) | fF/fR = 0.762 |
| Conditional Expression (9) | (G1R2 + G1R1)/(G1R2 − G1R1) = 0.756 |
| Conditional Expression (10) | {1 − (β2)$^2$} × (β3)$^2$ = 0.687 |
| Conditional Expression (11) | FNO × (f1/f) = 2.716 |
| Conditional Expression (12) | 2ω = 45.8 |

Figure 44B:
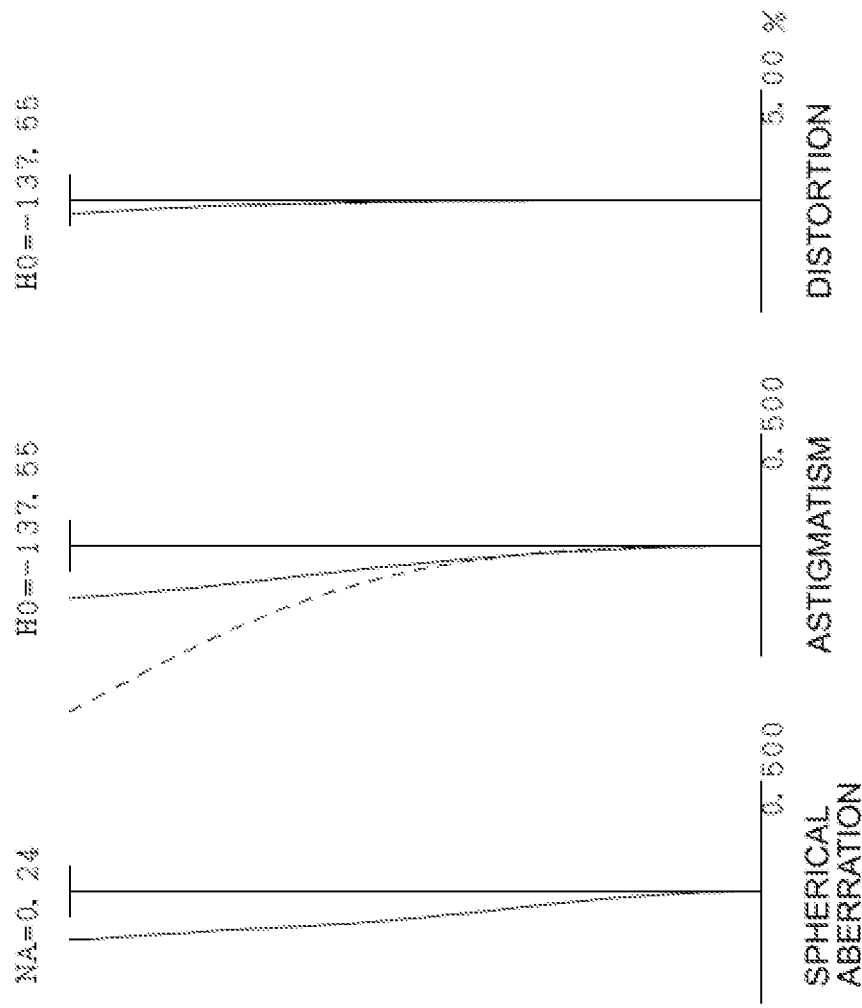
FIG. 44B illustrates various aberration graphs upon focusing on a short-distance object in the optical system according to the 22nd example.

FIG. 44A illustrates various aberration graphs upon focusing on infinity in the optical system according to the 22nd example. FIG. 44B illustrates various aberration graphs upon focusing on a short-distance (close-up) object in the optical system according to the 22nd example. The various aberration graphs demonstrate that the optical system according to the 22nd example has excellent image forming performance in which various aberrations are corrected favorably.

23rd Example

Figure 45:
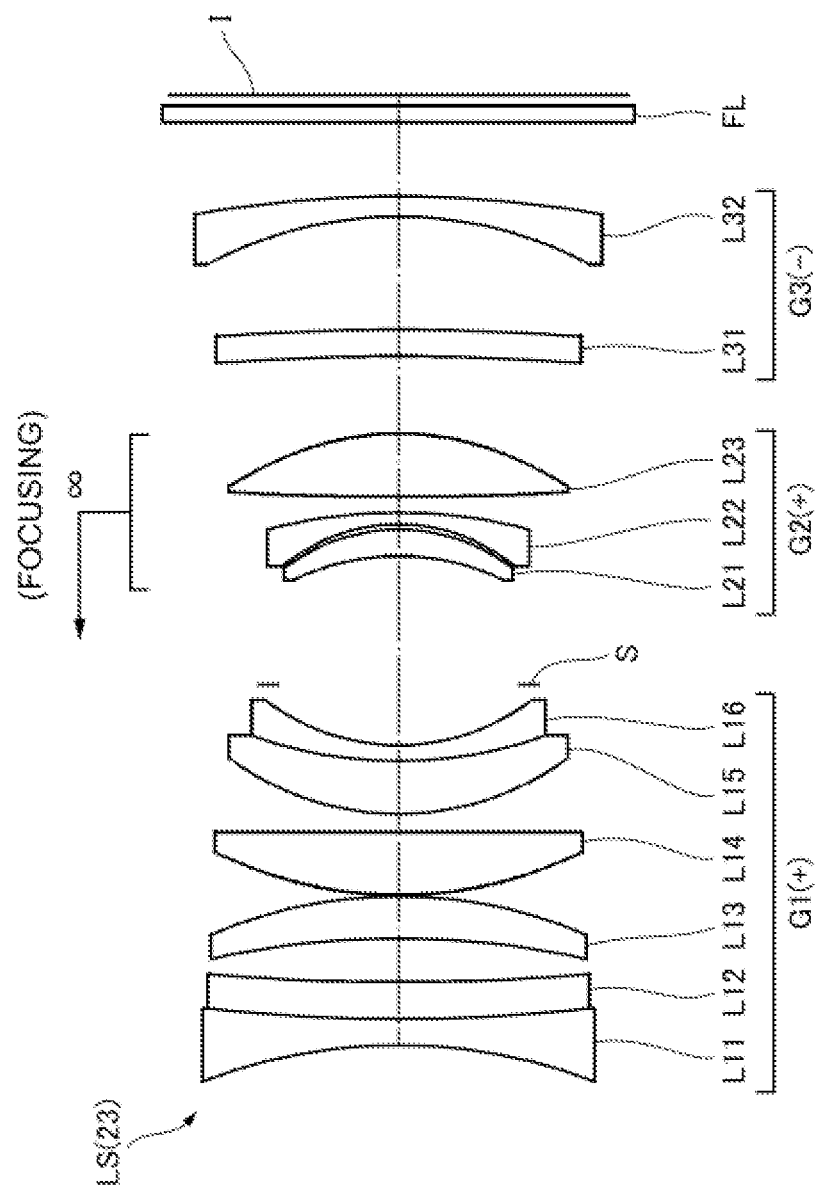
FIG. 45 is a lens configuration diagram for the state of focusing on infinity in an optical system according to a 23rd example.

The 23rd example will be described using FIGS. 45 and 46 and Table 23. FIG. 45 is a diagram illustrating the lens configuration for the state of focusing on infinity in the optical system according to the 23rd example of the present embodiment. The optical system LS(23) according to the 23rd example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a cemented lens consisting of a first negative lens L11 that is biconcave and a first positive lens L12 having a meniscus shape whose convex surface is pointed toward the object, a second positive lens L13 having a meniscus shape whose concave surface is pointed toward the object, a third positive lens L14 that is biconvex, a cemented lens consisting of a fourth positive lens L15 having a meniscus shape whose convex surface is pointed toward the object and a second negative lens L16 having a meniscus shape whose convex surface is pointed toward the object, and an aperture stop S, arranged in order from the object side. The lens surface on the object side of the third positive lens L14 is an aspherical surface.

The second lens group G2 comprises a first positive lens L21 having a meniscus shape whose concave surface is pointed toward the object, a negative lens L22 having a meniscus shape whose concave surface is pointed toward the object, and a second positive lens L23 that is biconvex, arranged in order from the object side. The lens surface on either side of the second positive lens L23 is an aspherical surface.

The third lens group G3 comprises a first negative lens L31 having a meniscus shape whose concave surface is pointed toward the object and a second negative lens L32 having a meniscus shape whose concave surface is pointed toward the object, arranged in order from the object side. An image surface I is disposed on the image side of the third lens group G3. An interchangeable optical filter FL is arranged between the third lens group G3 and the image surface I.

Table 23 below lists data values regarding the optical system according to the 23rd example. Note that the 20th surface is a virtual surface.

TABLE 23

[General Data]

| | |
|---|---|
| f | 51.08 |
| FNO | 1.86 |
| ω | 23.0 |
| Y | 21.70 |
| TL | 90.000 |
| BF | 9.600 |
| BFa | 9.055 |

TABLE 23-continued

[Lens Data]

| Surface Number | R | D | nd | vd |
|---|---|---|---|---|
| 1 | −52.31571 | 2.500 | 1.67270 | 32.2 |
| 2 | 167.47695 | 3.500 | 1.94595 | 18.0 |
| 3 | 223.17328 | 4.121 | | |
| 4 | −82.07390 | 4.000 | 1.72916 | 54.6 |
| 5 | −45.42951 | 0.100 | | |
| 6* | 38.12626 | 6.000 | 1.80400 | 46.6 |
| 7 | −3600.28350 | 1.699 | | |
| 8 | 27.04928 | 5.000 | 1.59319 | 67.9 |
| 9 | 41.33566 | 1.500 | 1.64769 | 33.7 |
| 10 | 20.68760 | 5.718 | | |
| 11 | ∞ | D11 (Variable) | | (Aperture Stop S) |
| 12 | −22.93194 | 2.500 | 1.49700 | 81.6 |
| 13 | −17.98615 | 0.500 | | |
| 14 | −17.23374 | 1.100 | 1.67270 | 32.2 |
| 15 | −49.04852 | 1.500 | | |
| 16* | 279.75740 | 6.000 | 1.75501 | 51.2 |
| 17* | −26.00590 | D17 (Variable) | | |
| 18 | −221.46549 | 2.500 | 1.94595 | 18.0 |
| 19 | −230.39803 | 0.000 | | |
| 20 | ∞ | 10.724 | | |
| 21 | −38.50025 | 1.900 | 1.64769 | 33.7 |
| 22 | −110.45885 | 7.000 | | |
| 23 | ∞ | 1.600 | 1.51680 | 63.9 |
| 24 | ∞ | D24 (Variable) | | |

[Aspherical surface data]
Sixth surface k = 1.00000
A4 = −1.19548E−06, A6 = −9.73538E−10,
A8 = 3.03150E−12, A10 = −5.31839E−15

Sixteenth surface k = 1.00000
A4 = −1.22099E−06, A6 = −9.91302E−09,
A8 = 8.68866E−11, A10 = −1.19726E−13

Seventeenth surface k = 1.00000
A4 = 5.66916E−06, A6 = 2.72450E−09,
A8 = −8.54602E−12, A10 = 1.63651E−13

[Variable distance data]

| | Upon focusing on infinity f = 51.08 | Upon focusing on a short-distance object $\beta$ = −0.1171 |
|---|---|---|
| D0 | ∞ | 413.36 |
| D11 | 12.216 | 4.956 |
| D17 | 7.322 | 14.582 |
| D24 | 1.000 | 1.000 |

[lens group data]

| group | starting surface | focal length |
|---|---|---|
| G1 | 1 | 68.94 |
| G2 | 12 | 58.61 |
| G3 | 18 | −90.38 |

[Conditional Expression Corresponding Value]

| Conditional Expression (1) | BFa/f = 0.177 |
|---|---|
| Conditional Expression (2) | (−G1R1)/f = 1.024 |
| Conditional Expression (3), (3-1), (3-2) | (−G1R1)/f1 = 0.759 |
| Conditional Expression (4) | f/f1 = 0.741 |
| Conditional Expression (5) | f/f2 = 0.872 |
| Conditional Expression (6) | f1/f2 = 1.176 |
| Conditional Expression (7) | f1/(−f3) = 0.763 |
| Conditional Expression (8) | fF/fR = 0.542 |
| Conditional Expression (9) | (G1R2 + G1R1)/(G1R2 − G1R1) = 0.620 |
| Conditional Expression (10) | $\{1 - (\beta 2)^2\} \times (\beta 3)^2$ = 0.721 |
| Conditional Expression (11) | FNO × (f1/f) = 2.508 |
| Conditional Expression (12) | 2ω = 46.0 |

FIG. 46A illustrates various aberration graphs upon focusing on infinity in the optical system according to the 23rd example. FIG. 46B illustrates various aberration graphs upon focusing on a short-distance (close-up) object in the optical system according to the 23rd example. The various aberration graphs demonstrate that the optical system according to the 23rd example has excellent image forming performance in which various aberrations are corrected favorably.

24th Example

Figure 47:
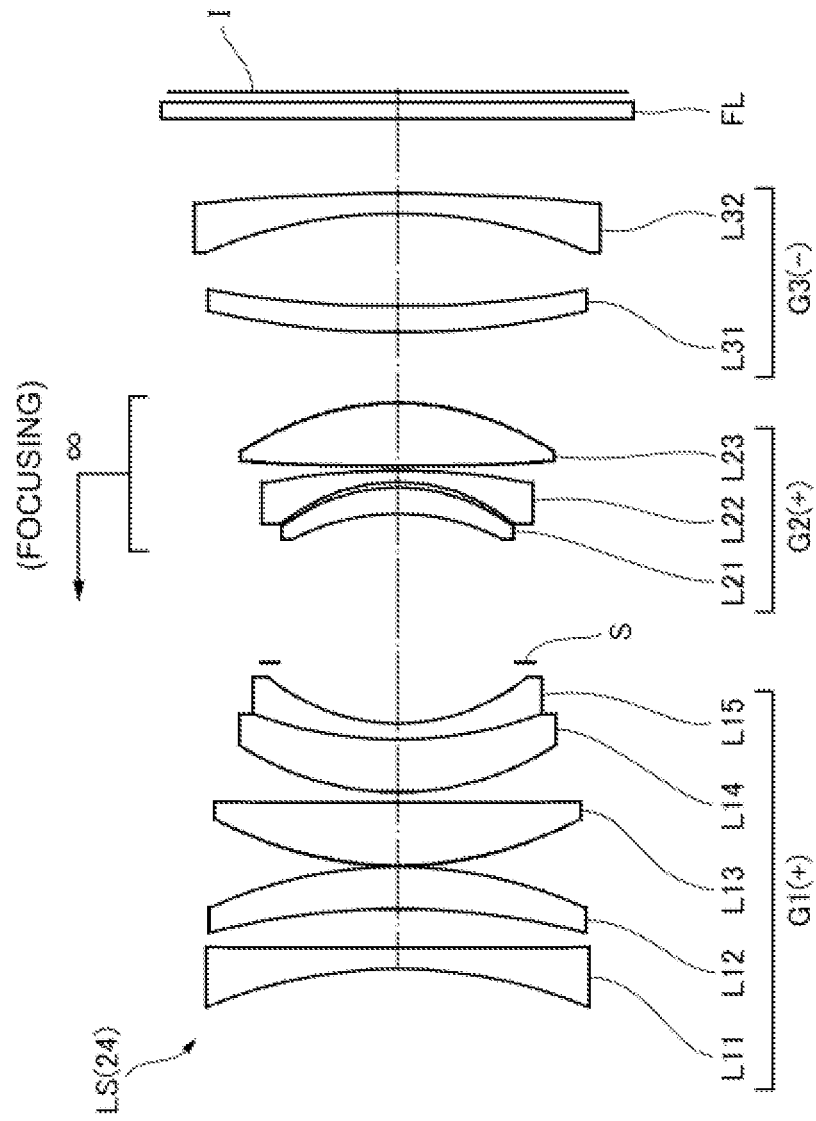
FIG. 47 is a lens configuration diagram for the state of focusing on infinity in an optical system according to a 24th example.

The 24th example will be described using FIGS. 47 and 48 and Table 24. FIG. 47 is a diagram illustrating the lens configuration for the state of focusing on infinity in the optical system according to the 24th example of the present embodiment. The optical system LS(24) according to the 24th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a first positive lens L12 having a meniscus shape whose concave surface is pointed toward the object, a second positive lens L13 having a meniscus shape whose convex surface is pointed toward the object, a cemented lens consisting of a third positive lens L14 having a meniscus shape whose convex surface is pointed toward the object and a second negative lens L15 having a meniscus shape whose convex surface is pointed toward the object, and an aperture stop S, arranged in order from the object side. The lens surface on the object side of the second positive lens L13 is an aspherical surface.

The second lens group G2 comprises a first positive lens L21 having a meniscus shape whose concave surface is pointed toward the object, a negative lens L22 having a meniscus shape whose concave surface is pointed toward the object, and a second positive lens L23 that is biconvex, arranged in order from the object side. The lens surface on either side of the second positive lens L23 is an aspherical surface.

The third lens group G3 comprises a positive lens L31 having a meniscus shape whose convex surface is pointed toward the object and a negative lens L32 having a meniscus shape whose concave surface is pointed toward the object, arranged in order from the object side. An image surface I is disposed on the image side of the third lens group G3. An interchangeable optical filter FL is arranged between the third lens group G3 and the image surface I.

Table 24 below lists data values regarding the optical system according to the 24th example.

TABLE 24

[General Data]

| | |
|---|---|
| f | 51.50 |
| FNO | 1.85 |
| ω | 22.9 |
| Y | 21.70 |
| TL | 82.941 |
| BF | 9.600 |
| BFa | 9.055 |

[Lens Data]

| Surface Number | R | D | nd | νd |
|---|---|---|---|---|
| 1 | −47.29734 | 2.000 | 1.67270 | 32.2 |
| 2 | 2331.06620 | 3.670 | | |
| 3 | −71.21945 | 4.000 | 1.72916 | 54.6 |
| 4 | −42.49265 | 0.100 | | |
| 5* | 34.70954 | 6.000 | 1.80400 | 46.6 |
| 6 | 6260.90290 | 0.947 | | |
| 7 | 27.53256 | 5.000 | 1.59319 | 67.9 |
| 8 | 40.45186 | 1.500 | 1.64769 | 33.7 |
| 9 | 19.48030 | 5.755 | | |
| 10 | ∞ | D10 (Variable) | | (Aperture Stop S) |
| 11 | −21.95759 | 2.500 | 1.49700 | 81.6 |
| 12 | −17.97990 | 0.500 | | |
| 13 | −17.33726 | 1.100 | 1.67270 | 32.2 |
| 14 | −65.42718 | 0.387 | | |
| 15* | 210.98797 | 6.000 | 1.75501 | 51.2 |
| 16* | −24.41048 | D16 (Variable) | | |
| 17 | 79.42309 | 2.500 | 1.94595 | 18.0 |
| 18 | 102.63179 | 8.767 | | |
| 19 | −46.77211 | 1.900 | 1.84666 | 23.8 |
| 20 | −182.21442 | 7.000 | | |
| 21 | ∞ | 1.600 | 1.51680 | 63.9 |
| 22 | ∞ | D22 (Variable) | | |

[Aspherical surface data]

Fifth surface k = 1.00000
A4 = −1.79931E−06, A6 = −1.35228E−09,
A8 = 1.30531E−12, A10 = −3.27717E−15

Fifteenth surface k = 1.00000
A4 = −1.14256E−06, A6 = −1.30370E−08,
A8 = 1.13854E−10, A10 = −1.79669E−13

Sixteenth surface k = 1.00000
A4 = 6.47116E−06, A6 = 6.32503E−09,
A8 = −2.44521E−11, A10 = 2.46075E−13

[Variable distance data]

| | Upon focusing on infinity f = 51.50 | Upon focusing on a short-distance object β = 0.1181 |
|---|---|---|
| D0 | ∞ | 413.36 |
| D10 | 14.069 | 5.072 |
| D16 | 6.646 | 15.643 |
| D22 | 1.000 | 1.000 |

[lens group data]

| group | starting surface | focal length |
|---|---|---|
| G1 | 1 | 68.06 |
| G2 | 11 | 64.03 |
| G3 | 17 | −99.89 |

TABLE 24-continued

[Conditional Expression Corresponding Value]

| | |
|---|---|
| Conditional Expression (1) | BFa/f = 0.176 |
| Conditional Expression (2) | (−G1R1)/f = 0.918 |
| Conditional Expression (3), (3-1), (3-2) | (−G1R1)/f1 = 0.695 |
| Conditional Expression (4) | f/f1 = 0.757 |
| Conditional Expression (5) | f/f2 = 0.804 |
| Conditional Expression (6) | f1/f2 = 1.063 |
| Conditional Expression (7) | f1/(−f3) = 0.681 |
| Conditional Expression (8) | fF/fR = 0.514 |
| Conditional Expression (9) | (G1R2 + G1R1)/(G1R2 − G1R1) = 0.960 |
| Conditional Expression (10) | $\{1 − (\beta 2)^2\} \times (\beta 3)^2 = 0.563$ |
| Conditional Expression (11) | FNO × (f1/f) = 2.445 |
| Conditional Expression (12) | 2ω = 45.8 |

Figure 48B:
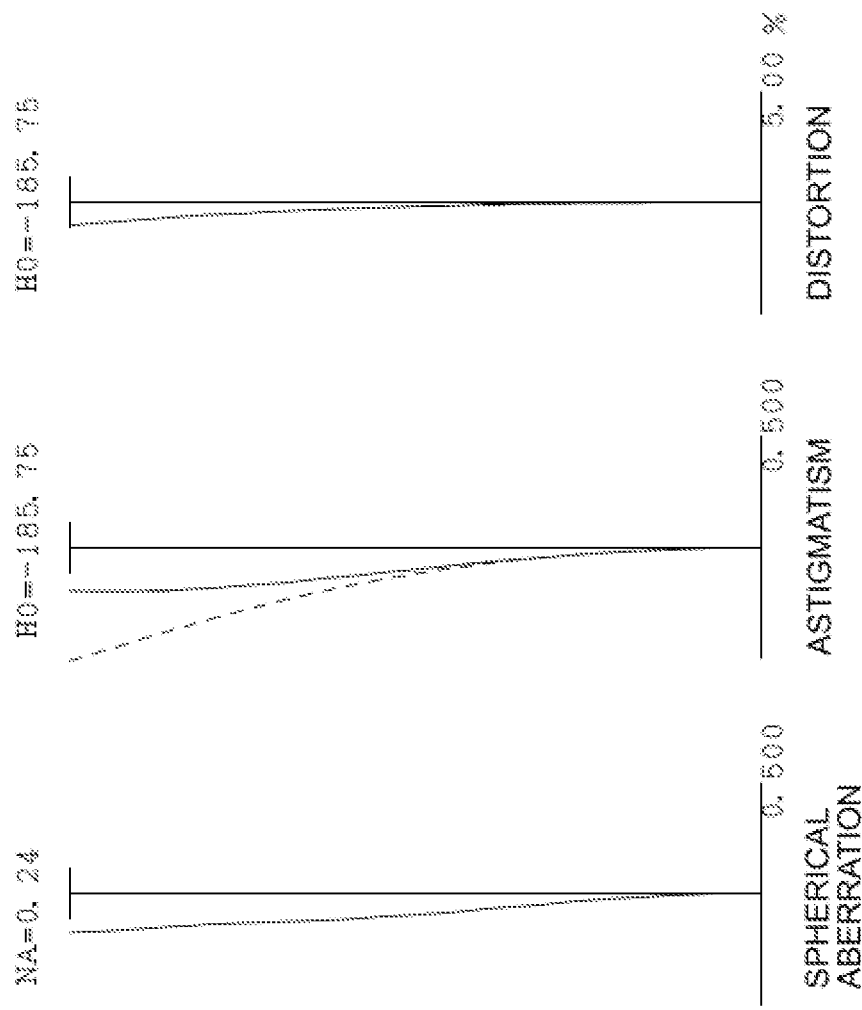
FIG. 48B illustrates various aberration graphs upon focusing on a short-distance object in the optical system according to the 24th example.

FIG. 48A illustrates various aberration graphs upon focusing on infinity in the optical system according to the 24th example. FIG. 48B illustrates various aberration graphs upon focusing on a short-distance (close-up) object in the optical system according to the 24th example. The various aberration graphs demonstrate that the optical system according to the 24th example has excellent image forming performance in which various aberrations are corrected favorably.

25th Example

The 25th example will be described using FIGS. 49 and 50 and Table 25. FIG. 49 is a diagram illustrating the lens configuration for the state of focusing on infinity in the optical system according to the 25th example of the present embodiment. The optical system LS(25) according to the 25th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a first positive lens L12 having a meniscus shape whose concave surface is pointed toward the object, a second positive lens L13 having a meniscus shape whose convex surface is pointed toward the object, a second negative lens L14 having a meniscus shape whose convex surface is pointed toward the object, and an aperture stop S, arranged in order from the object side. The lens surface on the object side of the second positive lens L13 is an aspherical surface.

The second lens group G2 comprises a first positive lens L21 having a meniscus shape whose concave surface is pointed toward the object, a negative lens L22 having a meniscus shape whose concave surface is pointed toward the object, and a second positive lens L23 that is biconvex, arranged in order from the object side. The lens surface on either side of the second positive lens L23 is an aspherical surface.

The third lens group G3 comprises a positive lens L31 having a meniscus shape whose convex surface is pointed toward the object and a negative lens L32 having a plano-concave shape whose concave surface is pointed toward the object, arranged in order from the object side. An image surface I is disposed on the image side of the third lens group G3. An interchangeable optical filter FL is arranged between the third lens group G3 and the image surface I.

Table 25 below lists data values regarding the optical system according to the 25th example.

TABLE 25

[General Data]

| | |
|---|---|
| f | 50.81 |
| FNO | 1.85 |
| ω | 23.1 |
| Y | 21.70 |
| TL | 80.000 |
| BF | 9.600 |
| BFa | 9.055 |

[Lens Data]

| Surface Number | R | D | nd | νd |
|---|---|---|---|---|
| 1 | −48.70279 | 2.000 | 1.67270 | 32.2 |
| 2 | 958.65257 | 2.567 | | |
| 3 | −87.18050 | 3.500 | 1.72916 | 54.6 |
| 4 | −45.33683 | 0.100 | | |
| 5* | 28.25675 | 6.500 | 1.77250 | 49.6 |
| 6 | 735.50092 | 0.365 | | |
| 7 | 28.50942 | 2.465 | 1.67270 | 32.2 |
| 8 | 19.47871 | 6.238 | | |
| 9 | ∞ | D9 (Variable) | | (Aperture Stop S) |
| 10 | −21.86257 | 2.000 | 1.49700 | 81.6 |
| 11 | −18.15776 | 0.500 | | |
| 12 | −17.46272 | 1.100 | 1.67270 | 32.2 |
| 13 | −78.54612 | 0.200 | | |
| 14* | 259.64263 | 6.500 | 1.75501 | 51.2 |
| 15* | −23.47358 | D15 (Variable) | | |
| 16 | 45.54867 | 2.500 | 1.94595 | 18.0 |
| 17 | 56.06952 | 6.419 | | |
| 18 | −49.21248 | 1.900 | 1.84666 | 23.8 |
| 19 | ∞ | 7.000 | | |
| 20 | ∞ | 1.600 | 1.51680 | 63.9 |
| 21 | ∞ | D21 (Variable) | | |

[Aspherical surface data]
Fifth surface k = 1.00000
A4 = −3.06009E−06, A6 = −3.83923E−09,
A8 = 3.08021E−12, A10 = −1.31813E−14

Fourteenth surface k = 1.00000
A4 = −2.38445E−06, A6 = −7.07397E−10,
A8 = 4.93804E−11, A10 = −6.99716E−14

Fifteenth surface k = 1.00000
A4 = 6.07250E−06, A6 = 1.41158E−08,
A8 = −5.03385E−11, A10 = 2.68237E−13

[Variable distance data]

| | Upon focusing on infinity f = 50.81 | Upon focusing on a short-distance object β = −0.1180 |
|---|---|---|
| D0 | ∞ | 413.36 |
| D9 | 14.286 | 5.350 |
| D15 | 11.261 | 20.197 |
| D21 | 1.000 | 1.000 |

TABLE 25-continued

[lens group data]

| group | starting surface | focal length |
|---|---|---|
| G1 | 1 | 67.37 |
| G2 | 10 | 68.93 |
| G3 | 16 | −83.91 |

[Conditional Expression Corresponding Value]

| | |
|---|---|
| Conditional Expression (1) | BFa/f = 0.178 |
| Conditional Expression (2) | (−G1R1)/f = 0.958 |
| Conditional Expression (3), (3-1), (3-2) | (−G1R1)/f1 = 0.695 |
| Conditional Expression (4) | f/f1 = 0.754 |
| Conditional Expression (5) | f/f2 = 0.737 |
| Conditional Expression (6) | f1/f2 = 0.977 |
| Conditional Expression (7) | f1/(−f3) = 0.803 |
| Conditional Expression (8) | fF/fR = 0.349 |
| Conditional Expression (9) | (G1R2 + G1R1)/(G1R2 − G1R1) = 0.903 |
| Conditional Expression (10) | $\{1 - (\beta 2)^2\} \times (\beta 3)^2 = 0.567$ |
| Conditional Expression (11) | FNO × (f1/f) = 2.456 |
| Conditional Expression (12) | 2ω = 46.2 |

Figure 50B:
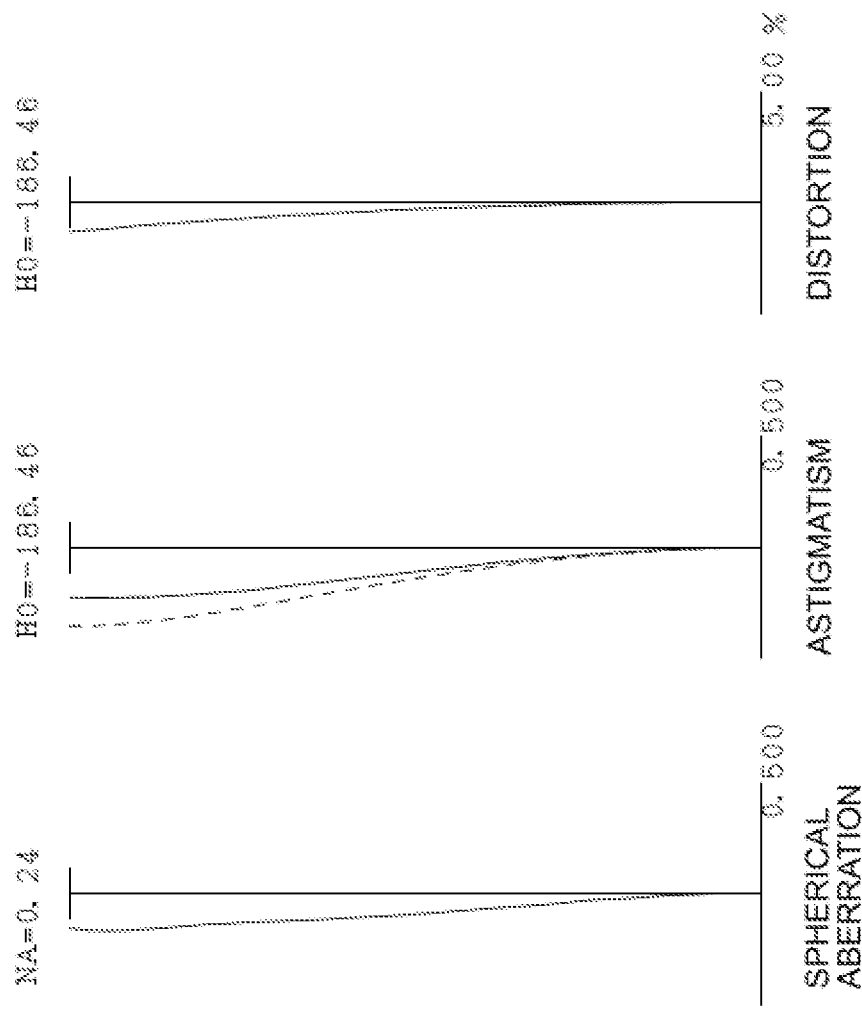
FIG. 50B illustrates various aberration graphs upon focusing on a short-distance object in the optical system according to the 25th example.

FIG. 50A illustrates various aberration graphs upon focusing on infinity in the optical system according to the 25th example. FIG. 50B illustrates various aberration graphs upon focusing on a short-distance (close-up) object in the optical system according to the 25th example. The various aberration graphs demonstrate that the optical system according to the 25th example has excellent image forming performance in which various aberrations are corrected favorably.

26th Example

The 26th example will be described using FIGS. 51 and 52 and Table 26. FIG. 51 is a diagram illustrating the lens configuration for the state of focusing on infinity in the optical system according to the 26th example of the present embodiment. The optical system LS(26) according to the 26th example comprises a first lens group G1 having positive refractive power, a second lens group G2 having positive refractive power, and a third lens group G3 having negative refractive power, arranged in order from the object side. Additionally, the second lens group G2 includes a first subgroup G2A having negative refractive power and a second subgroup G2B having positive refractive power, arranged in order from the object side. When focusing from an infinitely distant object to a short-distance (finite distance) object, the first subgroup G2A and the second subgroup G2B of the second lens group G2 move toward the object by different amounts along the optical axis, while the first lens group G1 and the third lens group G3 remain fixed in place.

The first lens group G1 comprises a cemented lens consisting of a first negative lens L11 that is biconcave and a first positive lens L12 having a meniscus shape whose convex surface is pointed toward the object, a second negative lens L13 that is biconcave, a second positive lens L14 that is biconvex, a third positive lens L15 that is biconvex, a cemented lens consisting of a fourth positive lens L16 that is biconvex and a third negative lens L17 that is biconcave, and an aperture stop S, arranged in order from the object side. The lens surface on either side of the third positive lens L15 is an aspherical surface.

The first subgroup G2A of the second lens group G2 comprises a negative lens L21 having a meniscus shape whose concave surface is pointed toward the object. The second subgroup G2B of the second lens group G2 comprises a first positive lens L22 that is biconvex and a second positive lens L23 having a meniscus shape whose concave surface is pointed toward the object, arranged in order from the object side. The lens surface on either side of the first positive lens L22 is an aspherical surface.

The third lens group G3 comprises a cemented lens consisting of a positive lens L31 having a meniscus shape whose concave surface is pointed toward the object and a first negative lens L32 that is biconcave, and a second negative lens L33 having a plano-concave shape whose concave surface is pointed toward the object, arranged in order from the object side. The lens surface on the object side of the second negative lens L33 is an aspherical surface. An image surface I is disposed on the image side of the third lens group G3. An interchangeable optical filter FL is arranged between the third lens group G3 and the image surface I.

Table 26 below lists data values regarding the optical system according to the 26th example.

TABLE 26

[General Data]

| | |
|---|---|
| f | 51.60 |
| FNO | 1.44 |
| ω | 22.7 |
| Y | 21.70 |
| TL | 113.685 |
| BF | 13.100 |
| BFa | 12.555 |

[Lens Data]

| Surface Number | R | D | nd | vd |
|---|---|---|---|---|
| 1 | −171.72474 | 2.000 | 1.62588 | 35.7 |
| 2 | 35.44631 | 5.392 | 1.94594 | 18.0 |
| 3 | 74.33039 | 6.970 | | |
| 4 | −53.50931 | 3.610 | 1.75520 | 27.6 |
| 5 | 91.70821 | 0.200 | | |
| 6 | 74.06522 | 7.512 | 1.90265 | 35.7 |
| 7 | −104.97613 | 0.100 | | |
| 8* | 56.97323 | 7.742 | 1.85135 | 40.1 |
| 9* | −173.82221 | 0.200 | | |
| 10 | 38.89486 | 12.894 | 1.59319 | 67.9 |
| 11 | −34.37837 | 1.500 | 1.74077 | 27.7 |
| 12 | 37.65571 | 4.597 | | |
| 13 | ∞ | D13 (Variable) | | (Aperture Stop S) |
| 14 | −22.59808 | 1.100 | 1.64769 | 33.7 |
| 15 | −145.29857 | D15 (Variable) | | |
| 16* | 85.83165 | 6.797 | 1.77377 | 47.2 |
| 17* | −32.92442 | 1.000 | | |
| 18 | −62.36306 | 6.400 | 1.49782 | 82.6 |
| 19 | −26.53221 | D19 (Variable) | | |
| 20 | −15532.87600 | 5.451 | 1.94594 | 18.0 |
| 21 | −42.26207 | 4.169 | 1.75520 | 27.6 |
| 22 | 1509.21760 | 3.688 | | |
| 23* | −47.39475 | 1.900 | 1.88202 | 37.2 |
| 24 | ∞ | 10.500 | | |
| 25 | ∞ | 1.600 | 1.51680 | 64.1 |
| 26 | ∞ | D26 (Variable) | | |

TABLE 26-continued

[Aspherical surface data]

Eighth surface $k = 1.00000$
$A4 = 1.10048E{-}06$, $A6 = 1.15261E{-}10$,
$A8 = 4.34134E{-}12$, $A10 = -9.02791E{-}16$ Ninth surface $k = 1.00000$
$A4 = 2.53480E{-}06$, $A6 = -1.36378E{-}09$,
$A8 = 6.90741E{-}12$, $A10 = -6.44423E{-}15$ Sixteenth surface $k = 1.00000$
$A4 = -2.74525E{-}06$, $A6 = 1.71160E{-}08$,
$A8 = -1.40699E{-}11$, $A10 = 1.45752E{-}14$ Seventeenth surface $k = 1.00000$
$A4 = 1.20601E{-}05$, $A6 = 1.19411E{-}08$,
$A8 = 3.74420E{-}11$, $A10 = -3.48136E{-}14$ Twenty-third surface $k = 1.00000$
$A4 = 1.37602E{-}06$, $A6 = -3.97295E{-}09$,
$A8 = 7.39073E{-}12$, $A10 = -9.76367E{-}15$

[Variable distance data]

| | Upon focusing on infinity $f = 51.60$ | Upon focusing on a short-distance object $\beta = -0.1471$ |
|---|---|---|
| D0 | ∞ | 314.50 |
| D13 | 13.416 | 6.329 |
| D15 | 1.447 | 1.481 |
| D19 | 2.500 | 9.547 |
| D26 | 1.000 | 1.000 |

[lens group data]

| group | starting surface | focal length |
|---|---|---|
| G1 | 1 | 81.01 |
| G2 | 14 | 42.29 |
| (G2A | 14 | −41.46) |
| (G2B | 16 | 25.11) |
| G4 | 20 | −70.49 |

[Conditional Expression Corresponding Value]

| | |
|---|---|
| Conditional Expression (1) | BFa/f = 0.243 |
| Conditional Expression (2) | (−G1R1)/f = 0.922 |
| Conditional Expression (3), (3-1), (3-2) | (−G1R1)/f1 = 0.588 |
| Conditional Expression (4) | f/f1 = 0.637 |
| Conditional Expression (5) | f/f2 = 1.192 |
| Conditional Expression (6) | f1/f2 = 1.871 |
| Conditional Expression (7) | f1/(−f3) = 1.149 |
| Conditional Expression (8) | fF/fR = 0.976 |
| Conditional Expression (9) | (G1R2 + G1R1)/(G1R2 − G1R1) = 0.219 |
| Conditional Expression (10) | $\{1 - (\beta 2)^2\} \times (\beta 3)^2 = 0.957$ |
| Conditional Expression (11) | FNO × (f1/f) = 2.263 |
| Conditional Expression (12) | 2ω = 45.4 |

Figure 52A:
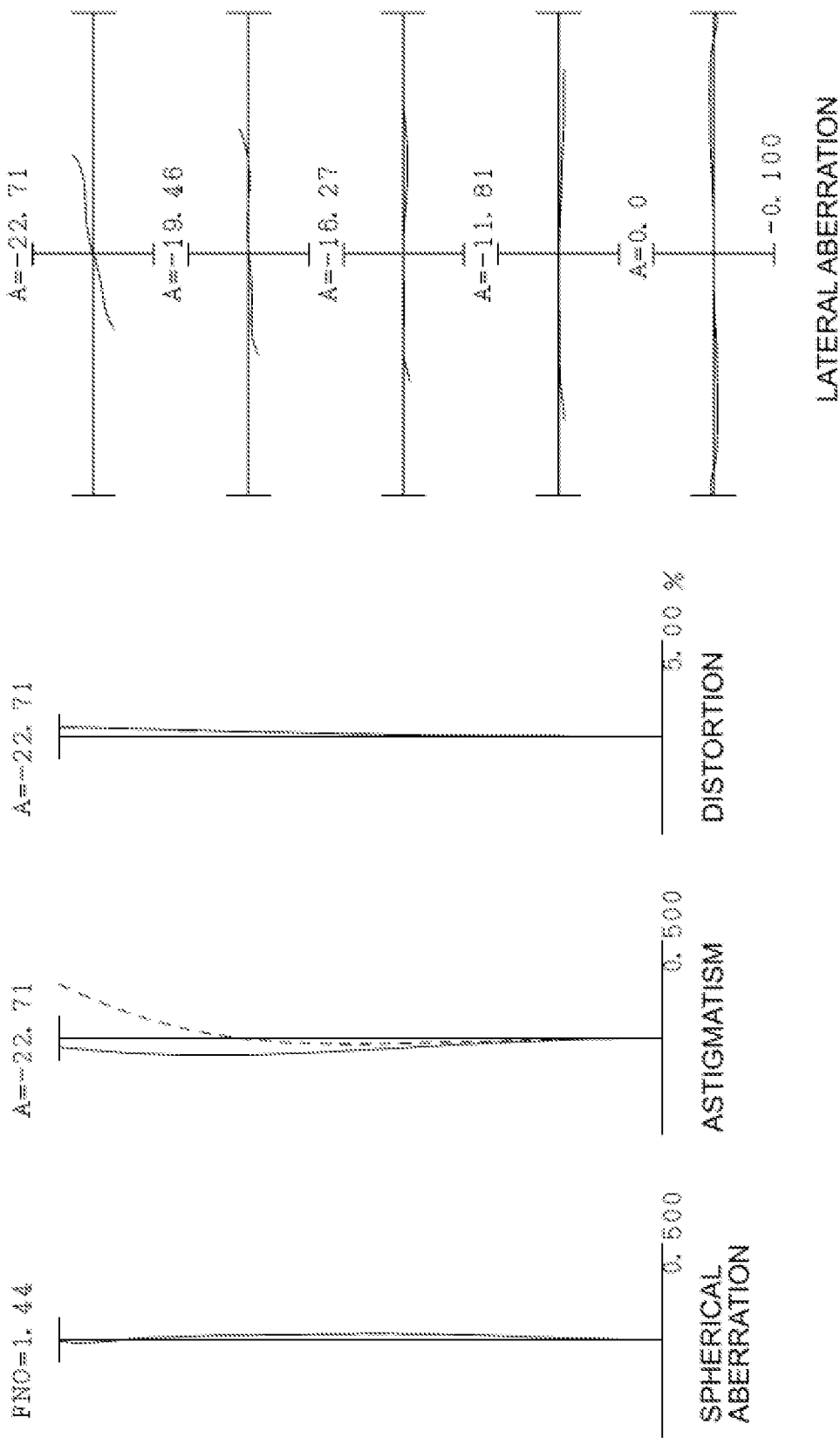

FIG. 52A illustrates various aberration graphs upon focusing on infinity in the optical system according to the 26th example. FIG. 52B illustrates various aberration graphs upon focusing on a short-distance (close-up) object in the optical system according to the 26th example. The various aberration graphs demonstrate that the optical system according to the 26th example has excellent image forming performance in which various aberrations are corrected favorably.

27th Example

The 27th example will be described using FIGS. 53 and 54 and Table 27. FIG. 53 is a diagram illustrating the lens configuration for the state of focusing on infinity in the optical system according to the 27th example of the present embodiment. The optical system LS(27) according to the 27th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 having a meniscus shape whose concave surface is pointed toward the object, a first positive lens L12 having a meniscus shape whose convex surface is pointed toward the object, a second positive lens L13 that is biconvex, a third positive lens L14 having a meniscus shape whose convex surface is pointed toward the object, a cemented lens consisting of a fourth positive lens L15 that is biconvex and a second negative lens L16 that is biconcave, and an aperture stop S, arranged in order from the object side.

The second lens group G2 comprises a negative lens L21 having a meniscus shape whose concave surface is pointed toward the object, a first positive lens L22 that is biconvex, and a second positive lens L23 having a meniscus shape whose concave surface is pointed toward the object, arranged in order from the object side. The lens surface on the image surface I side of the first positive lens L22 is an aspherical surface.

The third lens group G3 comprises a positive lens L31 having a meniscus shape whose concave surface is pointed toward the object and a negative lens L32 having a meniscus shape whose concave surface is pointed toward the object, arranged in order from the object side. An image surface I is disposed on the image side of the third lens group G3. An interchangeable optical filter FL is arranged between the third lens group G3 and the image surface I.

Table 27 below lists data values regarding the optical system according to the 27th example.

TABLE 27

[General Data]

| | |
|---|---|
| f | 85.00 |
| FNO | 1.86 |
| ω | 14.2 |
| Y | 21.70 |
| TL | 115.209 |
| BF | 21.685 |
| BFa | 21.004 |

[Lens Data]

| Surface Number | R | D | nd | vd |
|---|---|---|---|---|
| 1 | −64.83088 | | | |
| 2 | −188.98518 | 0.300 | | |
| 3 | 153.82997 | 4.500 | 1.94595 | 18.0 |
| 4 | 508.32386 | 0.300 | | |
| 5 | 420.81318 | 6.000 | 1.72916 | 54.6 |
| 6 | −110.04917 | 0.100 | | |
| 7 | 48.16622 | 7.000 | 1.72916 | 54.6 |
| 8 | 79.79724 | 0.200 | | |
| 9 | 40.00000 | 10.958 | 1.59282 | 68.7 |
| 10 | −125.87904 | 2.500 | 1.67270 | 32.2 |
| 11 | 25.51317 | 7.152 | | |
| 12 | ∞ | D12 (Variable) | | (Aperture Stop S) |
| 13 | −30.69513 | 1.500 | 1.64769 | 33.7 |
| 14 | −1583.64670 | 1.500 | | |
| 15 | 84.28063 | 5.000 | 1.77377 | 47.2 |
| 16* | −60.30181 | 1.500 | | |
| 17 | −115.77812 | 4.500 | 1.49700 | 81.6 |
| 18 | −35.95414 | D18 (Variable) | | |
| 19 | −79.69114 | 4.000 | 1.94595 | 18.0 |
| 20 | −48.89207 | 6.639 | | |
| 21 | −37.38750 | 2.000 | 1.64769 | 33.7 |
| 22 | −237.55752 | 18.685 | | |
| 23 | ∞ | 2.000 | 1.51680 | 64.1 |
| 24 | ∞ | D24 (Variable) | | |

[Aspherical surface data]
Sixteenth surface k = 1.00000
A4 = 4.07807E−06, A6 = 3.17226E−09,
A8 = −8.77566E−12, A10 = 1.60757E−14

[Variable distance data]

| | Upon focusing on infinity f = 85.00 | Upon focusing on a short-distance object β = −0.1471 |
|---|---|---|
| D0 | ∞ | 661.16 |
| D12 | 17.304 | 5.692 |
| D18 | 8.071 | 19.684 |
| D24 | 1.000 | 1.000 |

[lens group data]

| group | starting surface | focal length |
|---|---|---|
| G1 | 1 | 129.04 |
| G2 | 13 | 75.91 |
| G3 | 19 | −161.19 |

[Conditional Expression Corresponding Value]

| | |
|---|---|
| Conditional Expression (1) | BFa/f = 0.247 |
| Conditional Expression (2) | (−G1R1)/f = 0.763 |
| Conditional Expression (3), (3-1), (3-2) | (−G1R1)/f1 = 0.502 |
| Conditional Expression (4) | f/f1 = 0.659 |
| Conditional Expression (5) | f/f2 = 1.120 |
| Conditional Expression (6) | f1/f2 = 1.700 |
| Conditional Expression (7) | f1/(−f3) = 0.801 |
| Conditional Expression (8) | fF/fR = 1.054 |
| Conditional Expression (9) | (G1R2 + G1R1)/(G1R2 − G1R1) = 2.044 |
| Conditional Expression (10) | $\{1 − (\beta 2)^2\} \times (\beta 3)^2 = 0.804$ |
| Conditional Expression (11) | FNO × (f1/f) = 2.825 |
| Conditional Expression (12) | 2ω = 28.4 |

FIG. 54A illustrates various aberration graphs upon focusing on infinity in the optical system according to the 27th example. FIG. 54B illustrates various aberration graphs upon focusing on a short-distance (close-up) object in the optical system according to the 27th example. The various aberration graphs demonstrate that the optical system according to the 27th example has excellent image forming performance in which various aberrations are corrected favorably.

28th Example

The 28th example will be described using FIGS. 55 and 56 and Table 28. FIG. 55 is a diagram illustrating the lens configuration for the state of focusing on infinity in the optical system according to the 28th example of the present embodiment. The optical system LS(28) according to the 28th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 having a meniscus shape whose concave surface is pointed toward the object, a first positive lens L12 having a meniscus shape whose convex surface is pointed toward the object, a second positive lens L13 that is biconvex, a third positive lens L14 having a meniscus shape whose convex surface is pointed toward the object, a cemented lens consisting of a fourth positive lens L15 that is biconvex and a second negative lens L16 that is biconcave, and an aperture stop S, arranged in order from the object side.

The second lens group G2 comprises a negative lens L21 having a meniscus shape whose concave surface is pointed toward the object, a first positive lens L22 that is biconvex, and a second positive lens L23 having a meniscus shape whose concave surface is pointed toward the object, arranged in order from the object side. The lens surface on the image surface I side of the first positive lens L22 is an aspherical surface.

The third lens group G3 comprises a positive lens L31 that is biconvex and a negative lens L32 that is biconcave, arranged in order from the object side. An image surface I is disposed on the image side of the third lens group G3. An interchangeable optical filter FL is arranged between the third lens group G3 and the image surface I.

Table 28 below lists data values regarding the optical system according to the 28th example.

TABLE 28

[General Data]

| | |
|---|---|
| f | 85.00 |
| FNO | 1.83 |
| ω | 14.2 |
| Y | 21.70 |
| TL | 115.187 |
| BF | 19.721 |
| BFa | 19.039 |

[Lens Data]

| Surface Number | R | D | nd | vd |
|---|---|---|---|---|
| 1 | −72.98373 | 2.500 | 1.67270 | 32.2 |
| 2 | −170.26652 | 0.300 | | |
| 3 | 117.64422 | 4.500 | 1.94595 | 18.0 |
| 4 | 186.71439 | 0.436 | | |
| 5 | 189.13820 | 6.000 | 1.72916 | 54.6 |
| 6 | −151.29429 | 0.100 | | |
| 7 | 50.47764 | 7.000 | 1.72916 | 54.6 |
| 8 | 72.74698 | 0.200 | | |
| 9 | 40.25986 | 11.919 | 1.59282 | 68.7 |
| 10 | −195.06452 | 2.500 | 1.67270 | 32.2 |
| 11 | 26.55143 | 6.702 | | |
| 12 | ∞ | D12 (Variable) | | (Aperture Stop S) |
| 13 | −29.45199 | 1.500 | 1.64769 | 33.7 |
| 14 | −432.91007 | 1.500 | | |
| 15 | 95.51607 | 5.000 | 1.77377 | 47.2 |

TABLE 28-continued

| | | | | |
|---|---|---|---|---|
| 16* | −57.35798 | 1.500 | | |
| 17 | −90.11025 | 4.500 | 1.49700 | 81.6 |
| 18 | −33.31937 | D18 (Variable) | | |
| 19 | 17922.25800 | 4.000 | 1.94595 | 18.0 |
| 20 | −128.51263 | 6.878 | | |
| 21 | −63.86657 | 2.000 | 1.64769 | 33.7 |
| 22 | 153.63984 | 16.721 | | |
| 23 | ∞ | 2.000 | 1.51680 | 64.1 |
| 24 | ∞ | D24 (Variable) | | |

[Aspherical surface data]
Sixteenth surface
k = 1.00000
A4 = 4.53083E−06, A6 = 3.16311E−09,
A8 = −8.83761E−12, A10 = 1.81194E−14

[Variable distance data]

| | Upon focusing on infinity f = 85.00 | Upon focusing on a short-distance object β = −0.1247 |
|---|---|---|
| D0 | ∞ | 661.16 |
| D12 | 18.306 | 5.696 |
| D18 | 8.127 | 20.736 |
| D24 | 1.000 | 1.000 |

[lens group data]

| group | starting surface | focal length |
|---|---|---|
| G1 | 1 | 131.54 |
| G2 | 13 | 77.05 |
| G3 | 19 | −160.72 |

[Conditional Expression Corresponding Value]

| | |
|---|---|
| Conditional Expression (1) | BFa/f = 0.224 |
| Conditional Expression (2) | (−G1R1)/f = 0.859 |
| Conditional Expression (3), (3-1), (3-2) | (−G1R1)/f1 = 0.555 |
| Conditional Expression (4) | f/f1 = 0.646 |
| Conditional Expression (5) | f/f2 = 1.103 |
| Conditional Expression (6) | f1/f2 = 1.707 |
| Conditional Expression (7) | f1/(−f3) = 0.818 |
| Conditional Expression (8) | fF/fR = 1.101 |
| Conditional Expression (9) | (G1R2 + G1R1)/(G1R2 − G1R1) = 2.500 |
| Conditional Expression (10) | $\{1 - (\beta 2)^2\} \times (\beta 3)^2 = 0.727$ |
| Conditional Expression (11) | FNO × (f1/f) = 2.839 |
| Conditional Expression (12) | 2ω = 28.4 |

FIG. 56A illustrates various aberration graphs upon focusing on infinity in the optical system according to the 28th example. FIG. 56B illustrates various aberration graphs upon focusing on a short-distance (close-up) object in the optical system according to the 28th example. The various aberration graphs demonstrate that the optical system according to the 28th example has excellent image forming performance in which various aberrations are corrected favorably.

29th Example

Figure 57:
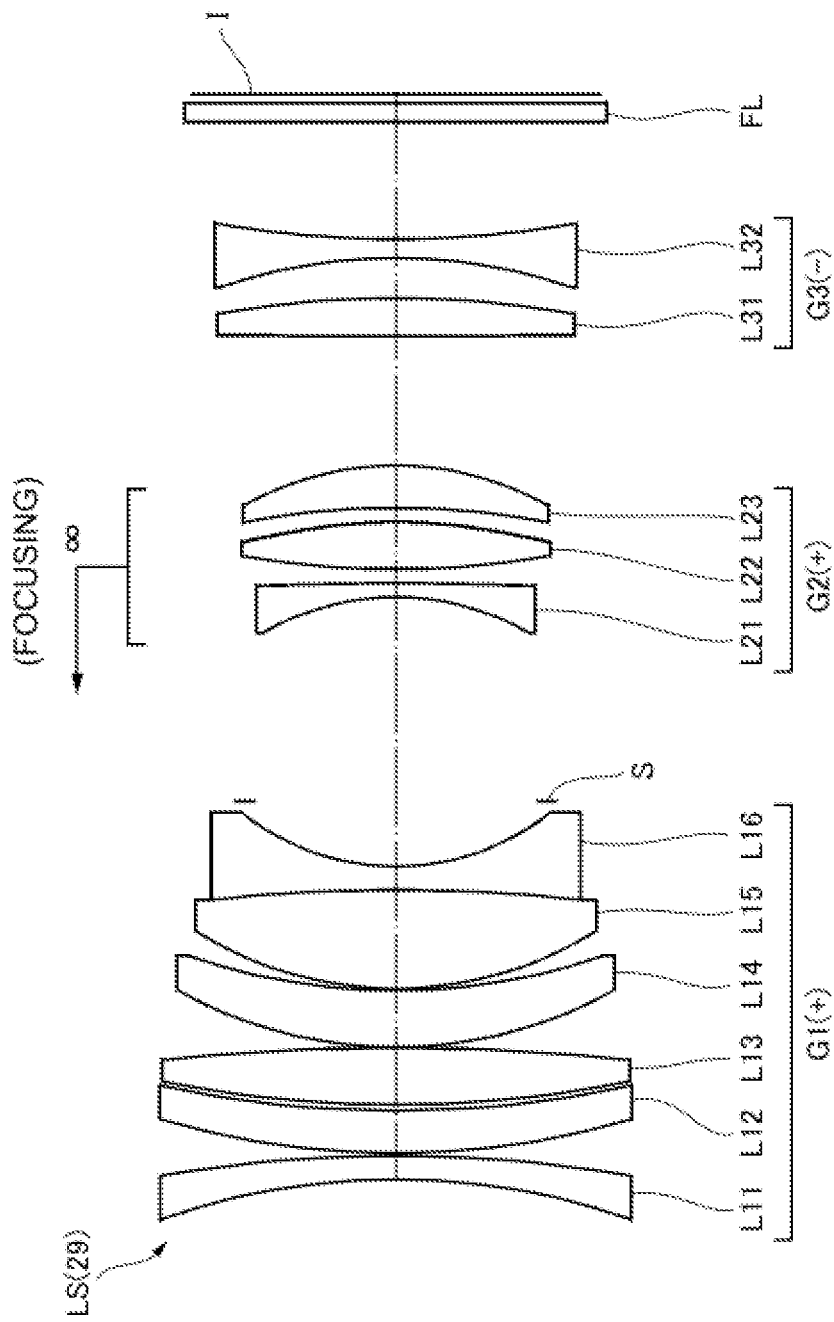
FIG. 57 is a lens configuration diagram for the state of focusing on infinity in an optical system according to a 29th example.

The 29th example will be described using FIGS. 57 and 58 and Table 29. FIG. 57 is a diagram illustrating the lens configuration for the state of focusing on infinity in the optical system according to the 29th example of the present embodiment. The optical system LS(29) according to the 29th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 having a meniscus shape whose concave surface is pointed toward the object, a first positive lens L12 having a meniscus shape whose convex surface is pointed toward the object, a second positive lens L13 that is biconvex, a third positive lens L14 having a meniscus shape whose convex surface is pointed toward the object, a cemented lens consisting of a fourth positive lens L15 that is biconvex and a second negative lens L16 that is biconcave, and an aperture stop S, arranged in order from the object side.

The second lens group G2 comprises a negative lens L21 having a meniscus shape whose concave surface is pointed toward the object, a first positive lens L22 that is biconvex, and a second positive lens L23 having a meniscus shape whose concave surface is pointed toward the object, arranged in order from the object side. The lens surface on the image surface I side of the first positive lens L22 is an aspherical surface.

The third lens group G3 comprises a positive lens L31 that is biconvex and a negative lens L32 that is biconcave, arranged in order from the object side. An image surface I is disposed on the image side of the third lens group G3. An interchangeable optical filter FL is arranged between the third lens group G3 and the image surface I.

Table 29 below lists data values regarding the optical system according to the 29th example.

TABLE 29

[General Data]

| | |
|---|---|
| f | 85.00 |
| FNO | 1.85 |
| ω | 14.2 |
| Y | 21.70 |
| TL | 115.297 |
| BF | 15.435 |
| BFa | 14.754 |

[Lens Data]

| Surface Number | R | D | nd | νd |
|---|---|---|---|---|
| 1 | −75.54007 | 2.500 | 1.67270 | 32.2 |
| 2 | −147.54550 | 0.300 | | |
| 3 | 88.89576 | 4.500 | 1.94595 | 18.0 |
| 4 | 118.01688 | 0.648 | | |
| 5 | 127.59306 | 6.000 | 1.80400 | 46.6 |
| 6 | −246.54425 | 0.100 | | |
| 7 | 47.61283 | 6.000 | 1.59282 | 68.6 |
| 8 | 67.76235 | 0.200 | | |
| 9 | 40.00000 | 10.476 | 1.59282 | 68.7 |
| 10 | −185.31557 | 2.500 | 1.67270 | 32.2 |
| 11 | 26.38137 | 6.867 | | |
| 12 | ∞ | D12 (Variable) | | (Aperture Stop S) |
| 13 | −28.70718 | 1.500 | 1.64769 | 33.7 |
| 14 | −336.87946 | 1.500 | | |
| 15 | 97.83173 | 5.000 | 1.77377 | 47.2 |
| 16* | −54.59764 | 1.500 | | |
| 17 | −87.32308 | 4.500 | 1.49700 | 81.6 |
| 18 | −32.94421 | D18 (Variable) | | |
| 19 | 3326.05740 | 4.000 | 1.94595 | 18.0 |
| 20 | −105.25167 | 4.274 | | |
| 21 | −57.51449 | 2.000 | 1.64769 | 33.7 |
| 22 | 111.93382 | 12.435 | | |

TABLE 29-continued

| | | | | |
|---|---|---|---|---|
| 23 | ∞ | 2.000 | 1.51680 | 64.1 |
| 24 | ∞ | D24 (Variable) | | |

[Aspherical surface data]
Sixteenth surface k = 1.00000
A4 = 4.61985E−06, A6 = 4.41333E−09,
A8 = −1.50995E−11, A10 = 2.98769E−14

[Variable distance data]

| | Upon focusing on infinity f = 85.00 | Upon focusing on a short-distance object β = −0.1232 |
|---|---|---|
| D0 | ∞ | 661.16 |
| D12 | 21.713 | 9.146 |
| D18 | 13.783 | 26.349 |
| D24 | 1.000 | 1.000 |

[lens group data]

| group | starting surface | focal length |
|---|---|---|
| G1 | 1 | 131.08 |
| G2 | 13 | 74.60 |
| G3 | 19 | −140.71 |

[Conditional Expression Corresponding Value]

| | |
|---|---|
| Conditional Expression (1) | BFa/f = 0.174 |
| Conditional Expression (2) | (−G1R1)/f = 0.889 |
| Conditional Expression (3), (3-1), (3-2) | (−G1R1)/f1 = 0.576 |
| Conditional Expression (4) | f/f1 = 0.648 |
| Conditional Expression (5) | f/f2 = 1.139 |
| Conditional Expression (6) | f1/f2 = 1.757 |
| Conditional Expression (7) | f1/(−f3) = 0.932 |
| Conditional Expression (8) | fF/fR = 1.081 |
| Conditional Expression (9) | (G1R2 + G1R1)/(G1R2 − G1R1) = 3.098 |
| Conditional Expression (10) | $\{1 - (\beta 2)^2\} \times (\beta 3)^2 = 0.717$ |
| Conditional Expression (11) | FNO × (f1/f) = 2.850 |
| Conditional Expression (12) | 2ω = 28.4 |

Figure 58B:
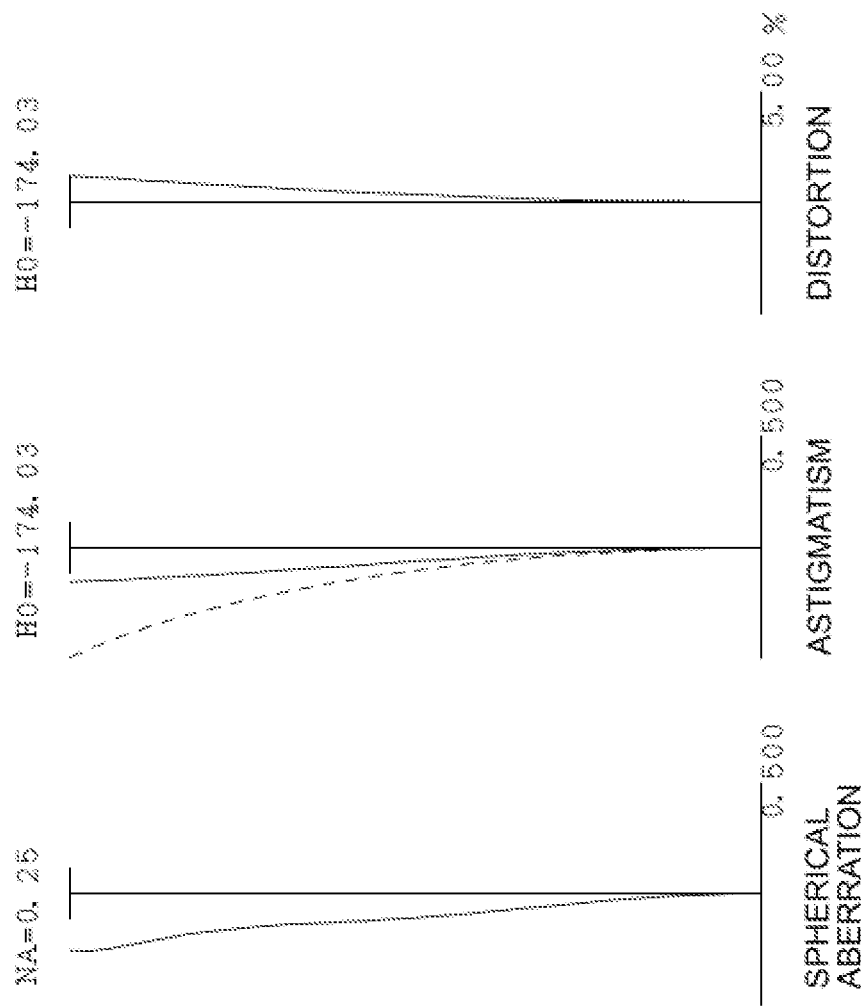
FIG. 58B illustrates various aberration graphs upon focusing on a short-distance object in the optical system according to the 29th example.

FIG. 58A illustrates various aberration graphs upon focusing on infinity in the optical system according to the 29th example. FIG. 58B illustrates various aberration graphs upon focusing on a short-distance (close-up) object in the optical system according to the 29th example. The various aberration graphs demonstrate that the optical system according to the 29th example has excellent image forming performance in which various aberrations are corrected favorably.

30th Example

Figure 59:
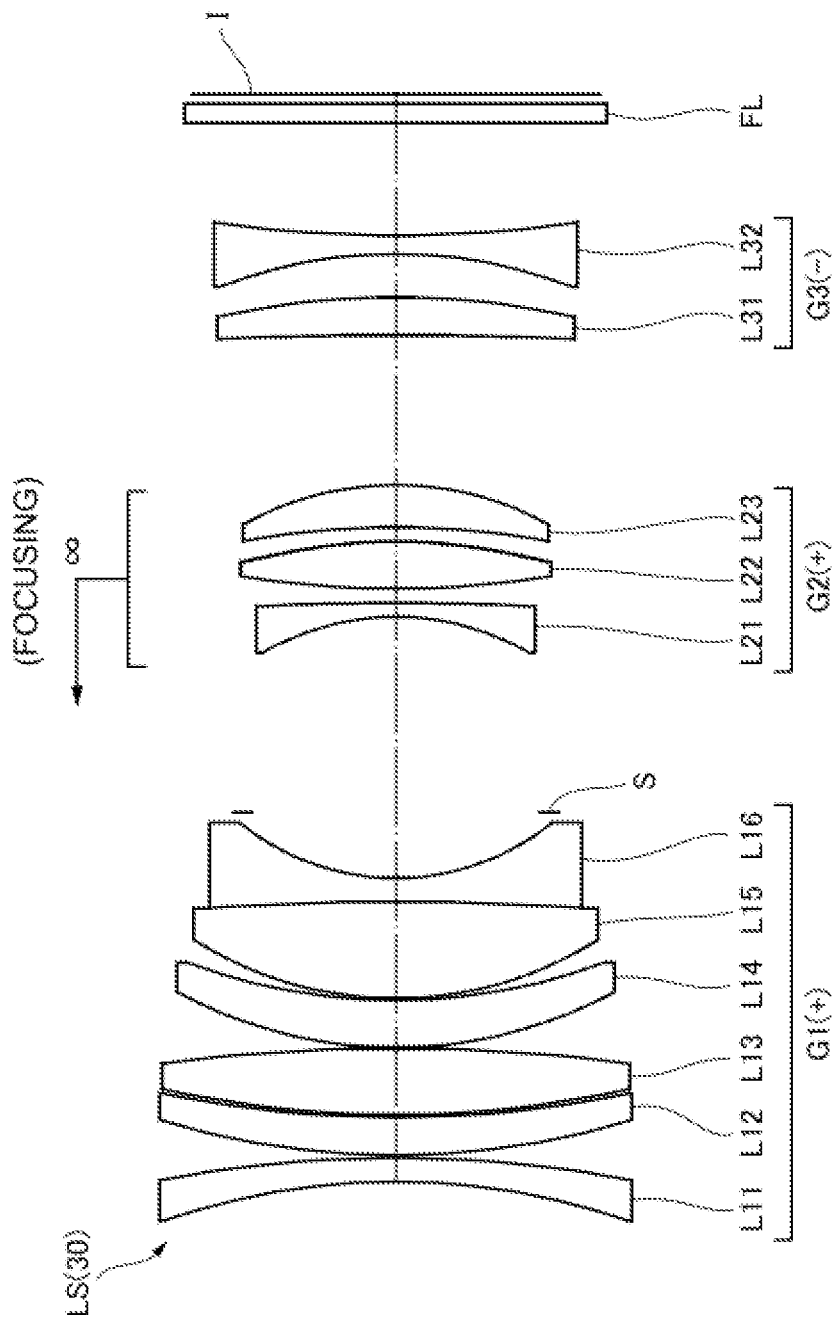
FIG. 59 is a lens configuration diagram for the state of focusing on infinity in an optical system according to a 30th example.

The 30th example will be described using FIGS. 59 and 60 and Table 30. FIG. 59 is a diagram illustrating the lens configuration for the state of focusing on infinity in the optical system according to the 30th example of the present embodiment. The optical system LS(30) according to the 30th example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 having a meniscus shape whose concave surface is pointed toward the object, a first positive lens L12 having a meniscus shape whose convex surface is pointed toward the object, a second positive lens L13 that is biconvex, a third positive lens L14 having a meniscus shape whose convex surface is pointed toward the object, a cemented lens consisting of a fourth positive lens L15 that is biconvex and a second negative lens L16 that is biconcave, and an aperture stop S, arranged in order from the object side.

The second lens group G2 comprises a negative lens L21 having a meniscus shape whose concave surface is pointed toward the object, a first positive lens L22 that is biconvex, and a second positive lens L23 having a meniscus shape whose concave surface is pointed toward the object, arranged in order from the object side. The lens surface on the image surface I side of the first positive lens L22 is an aspherical surface.

The third lens group G3 comprises a positive lens L31 having a meniscus shape whose concave surface is pointed toward the object and a negative lens L32 that is biconcave, arranged in order from the object side. An image surface I is disposed on the image side of the third lens group G3. An interchangeable optical filter FL is arranged between the third lens group G3 and the image surface I.

Table 30 below lists data values regarding the optical system according to the 30th example.

TABLE 30

[General Data]

| | |
|---|---|
| f | 85.00 |
| FNO | 1.85 |
| ω | 14.2 |
| Y | 21.70 |
| TL | 115.242 |
| BF | 14.943 |
| BFa | 14.261 |

[Lens Data]

| Surface Number | R | D | nd | vd |
|---|---|---|---|---|
| 1 | −74.95148 | 2.500 | 1.67270 | 32.2 |
| 2 | −131.91024 | 0.300 | | |
| 3 | 85.64889 | 4.000 | 1.94595 | 18.0 |
| 4 | 120.40884 | 0.300 | | |
| 5 | 115.73186 | 7.000 | 1.59282 | 68.6 |
| 6 | −191.64403 | 0.100 | | |
| 7 | 48.88487 | 5.000 | 1.80400 | 46.6 |
| 8 | 63.21824 | 0.200 | | |
| 9 | 40.00000 | 10.246 | 1.59282 | 68.7 |
| 10 | −287.51510 | 2.500 | 1.67270 | 32.2 |
| 11 | 26.35774 | 7.011 | | |
| 12 | ∞ | D12 (Variable) | | (Aperture Stop S) |
| 13 | −28.44113 | 1.500 | 1.64769 | 33.7 |
| 14 | −287.07114 | 1.500 | | |
| 15 | 102.04030 | 5.000 | 1.77377 | 47.2 |
| 16* | −53.66013 | 1.500 | | |
| 17 | −88.84311 | 4.500 | 1.49700 | 81.6 |
| 18 | −33.17367 | D18 (Variable) | | |
| 19 | −397.22387 | 4.000 | 1.94595 | 18.0 |
| 20 | −86.37143 | 4.578 | | |
| 21 | −52.43868 | 2.000 | 1.64769 | 33.7 |
| 22 | 143.09995 | 11.943 | | |
| 23 | ∞ | 2.000 | 1.51680 | 64.1 |
| 24 | ∞ | D24 (Variable) | | |

TABLE 30-continued

[Aspherical surface data]
Sixteenth surface k = 1.00000
A4 = 4.49957E−06, A6 = 4.10925E−09,
A8 = −1.26128E−11, A10 = 2.42467E−14

[Variable distance data]

| | Upon focusing on infinity $f = 85.00$ | Upon focusing on a short-distance object $\beta = -0.1242$ |
|---|---|---|
| D0 | ∞ | 661.16 |
| D12 | 20.672 | 8.633 |
| D18 | 15.892 | 27.931 |
| D24 | 1.000 | 1.000 |

[lens group data]

| group | starting surface | focal length |
|---|---|---|
| G1 | 1 | 134.72 |
| G2 | 13 | 74.30 |
| G3 | 19 | −130.08 |

[Conditional Expression Corresponding Value]

| | |
|---|---|
| Conditional Expression (1) | BFa/f = 0.168 |
| Conditional Expression (2) | (−G1R1)/f = 0.882 |
| Conditional Expression (3), (3-1), (3-2) | (−G1R1)/f1 = 0.556 |
| Conditional Expression (4) | f/f1 = 0.631 |
| Conditional Expression (5) | f/f2 = 1.144 |
| Conditional Expression (6) | f1/f2 = 1.813 |
| Conditional Expression (7) | f1/(−f3) = 1.036 |
| Conditional Expression (8) | fF/fR = 1.075 |
| Conditional Expression (9) | (G1R2 + G1R1)/(G1R2 − G1R1) = 3.632 |
| Conditional Expression (10) | $\{1 - (\beta 2)^2\} \times (\beta 3)^2 = 0.766$ |
| Conditional Expression (11) | FNO × (f1/f) = 2.929 |
| Conditional Expression (12) | 2ω = 28.4 |

Figure 60A:
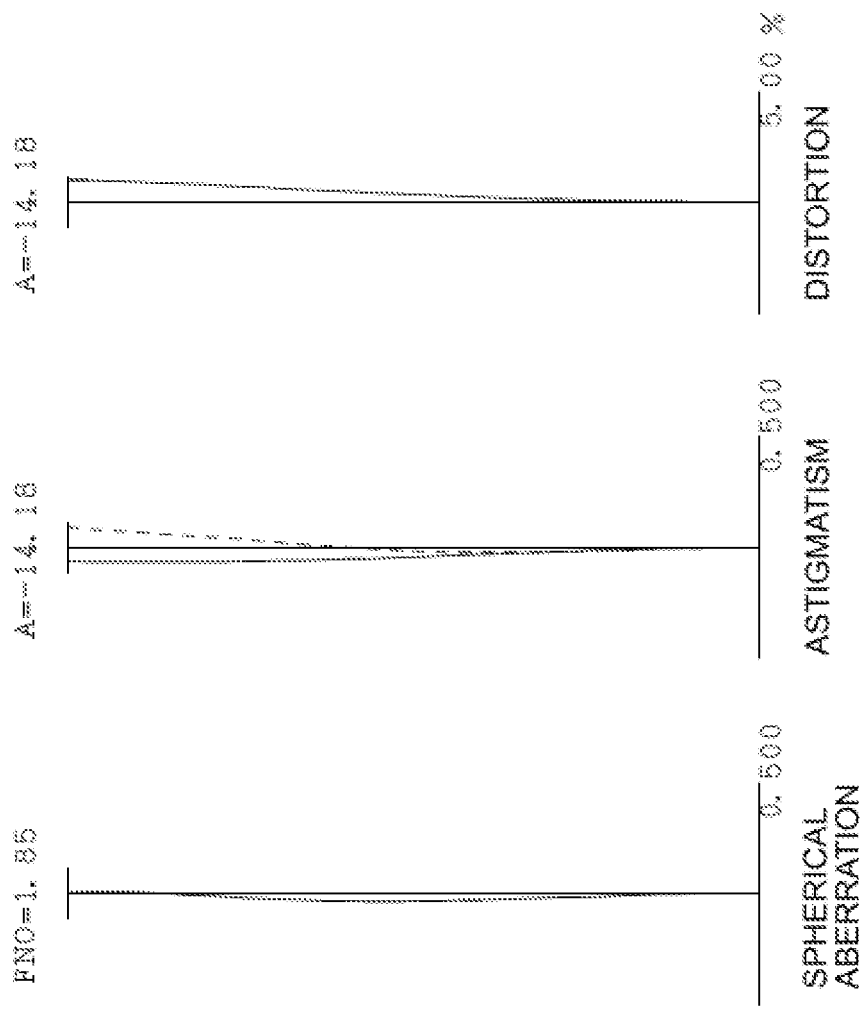

FIG. 60A illustrates various aberration graphs upon focusing on infinity in the optical system according to the 30th example. FIG. 60B illustrates various aberration graphs upon focusing on a short-distance (close-up) object in the optical system according to the 30th example. The various aberration graphs demonstrate that the optical system according to the 30th example has excellent image forming performance in which various aberrations are corrected favorably.

31st Example

Figure 61:
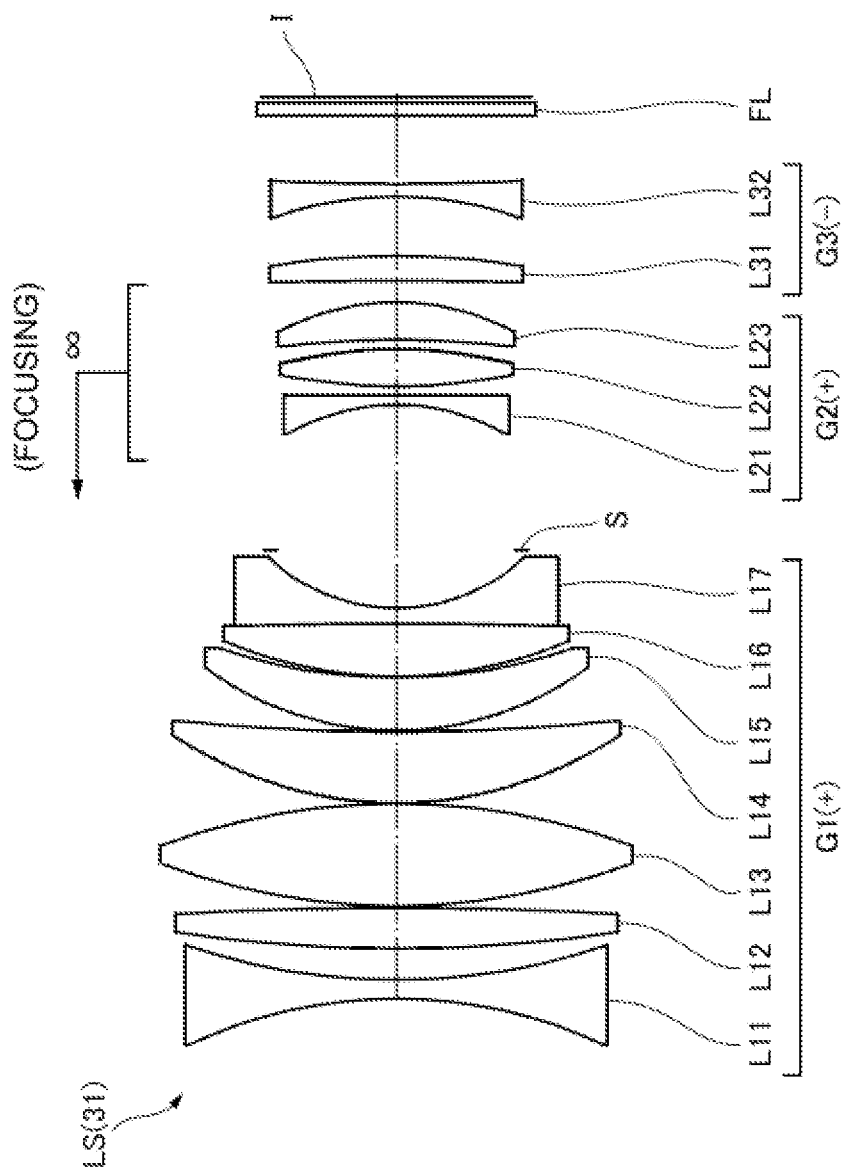
FIG. 61 is a lens configuration diagram for the state of focusing on infinity in an optical system according to a 31st example.

The 31st example will be described using FIGS. 61 and 62 and Table 31. FIG. 61 is a diagram illustrating the lens configuration for the state of focusing on infinity in the optical system according to the 31st example of the present embodiment. The optical system LS(31) according to the 31st example comprises a first lens group G1 having positive refractive power, a second lens group G2 having positive refractive power, and a third lens group G3 having negative refractive power, arranged in order from the object side. When focusing from an infinitely distant object to a short-distance (finite distance) object, the second lens group G2 moves toward the object along the optical axis, while the first lens group G1 and the third lens group G3 remain fixed in place.

The first lens group G1 comprises a first negative lens L11 that is biconcave, a first positive lens L12 that is biconvex, a second positive lens L13 that is biconvex, a third positive lens L14 having a meniscus shape whose convex surface is pointed toward the object, a fourth positive lens L15 having a meniscus shape whose convex surface is pointed toward the object, a cemented lens consisting of a fifth positive lens L16 that is biconvex and a second negative lens L17 that is biconcave, and an aperture stop S, arranged in order from the object side. The lens surface on the object side of the third positive lens L14 is an aspherical surface.

The second lens group G2 comprises a negative lens L21 having a meniscus shape whose concave surface is pointed toward the object, a first positive lens L22 that is biconvex, and a second positive lens L23 having a meniscus shape whose concave surface is pointed toward the object, arranged in order from the object side. The lens surface on the image surface I side of the first positive lens L22 is an aspherical surface.

The third lens group G3 comprises a positive lens L31 having a meniscus shape whose concave surface is pointed toward the object and a negative lens L32 that is biconcave, arranged in order from the object side. An image surface I is disposed on the image side of the third lens group G3. An interchangeable optical filter FL is arranged between the third lens group G3 and the image surface I.

Table 31 below lists data values regarding the optical system according to the 31st example.

TABLE 31

[General Data]

| | |
|---|---|
| f | 85.00 |
| FNO | 1.42 |
| ω | 14.2 |
| Y | 21.70 |
| TL | 145.265 |
| BF | 14.071 |
| BFa | 13.389 |

[Lens Data]

| Surface Number | R | D | nd | vd |
|---|---|---|---|---|
| 1 | −79.06766 | 3.000 | 1.67270 | 32.2 |
| 2 | 104.61579 | 5.110 | | |
| 3 | 243.58488 | 6.500 | 1.94595 | 18.0 |
| 4 | −628.66078 | 0.300 | | |
| 5 | 109.12437 | 16.500 | 1.59282 | 68.6 |
| 6 | −110.85187 | 0.100 | | |
| 7* | 63.25612 | 11.500 | 1.77250 | 49.6 |
| 8 | 360.60495 | 0.200 | | |
| 9 | 52.11101 | 8.500 | 1.59282 | 68.7 |
| 10 | 88.79834 | 0.200 | | |
| 11 | 71.03249 | 8.500 | 1.59282 | 68.6 |
| 12 | −790.77200 | 2.500 | 1.85025 | 30.0 |
| 13 | 30.29304 | 9.299 | | |
| 14 | ∞ | D14 (Variable) | | (Aperture Stop S) |
| 15 | −35.50553 | 1.500 | 1.67270 | 32.2 |
| 16 | −19114.07500 | 1.500 | | |
| 17 | 96.59624 | 6.000 | 1.77377 | 47.2 |
| 18* | −65.15132 | 1.500 | | |
| 19 | −154.43166 | 6.000 | 1.49700 | 81.6 |
| 20 | −40.92465 | D20 (Variable) | | |
| 21 | −793.09360 | 4.000 | 1.94595 | 18.0 |
| 22 | −123.62638 | 9.551 | | |
| 23 | −59.68219 | 2.000 | 1.64769 | 33.7 |
| 24 | 388.46258 | 11.071 | | |
| 25 | ∞ | 2.000 | 1.51680 | 63.9 |
| 26 | ∞ | D26 (Variable) | | |

TABLE 31-continued

[Aspherical surface data]
Seventh surface

A4 = −1.31502E−07, A6 = −4.69010E−11,
A8 = 1.13722E−14, A10 = −8.34540E−18

Eighteenth surface k = 1.00000
A4 = 2.96560E−06, A6 = 2.23513E−09,
A8 = −5.41262E−12, A10 = 7.26232E−15

[Variable distance data]

| | Upon focusing on infinity f = 85.00 | Upon focusing on a short-distance object β = −0.1177 |
|---|---|---|
| D0 | ∞ | 661.16 |
| D14 | 23.433 | 7.955 |
| D20 | 3.500 | 18.978 |
| D26 | 1.000 | 1.000 |

[lens group data]

| group | starting surface | focal length |
|---|---|---|
| G1 | 1 | 117.63 |
| G2 | 15 | 83.50 |
| G3 | 21 | −188.48 |

[Conditional Expression Corresponding Value]

| | |
|---|---|
| Conditional Expression (1) | BFa/f = 0.158 |
| Conditional Expression (2) | (−G1R1)/f = 0.930 |
| Conditional Expression (3), (3-1), (3-2) | (−G1R1)/f1 = 0.672 |
| Conditional Expression (4) | f/f1 = 0.723 |
| Conditional Expression (5) | f/f2 = 1.018 |
| Conditional Expression (6) | f1/f2 = 1.409 |
| Conditional Expression (7) | f1/(−f3) = 1.624 |
| Conditional Expression (8) | fF/fR = 1.943 |
| Conditional Expression (9) | (G1R2 + G1R1)/(G1R2 − G1R1) = 0.139 |
| Conditional Expression (10) | {1 − (β2)$^2$} × (β3)$^2$ = 0.510 |
| Conditional Expression (11) | FNO × (f1/f) = 1.968 |
| Conditional Expression (12) | 2ω = 28.4 |

FIG. 62A illustrates various aberration graphs upon focusing on infinity in the optical system according to the 31st example. FIG. 62B illustrates various aberration graphs upon focusing on a short-distance (close-up) object in the optical system according to the 31st example. The various aberration graphs demonstrate that the optical system according to the 31st example has excellent image forming performance in which various aberrations are corrected favorably.

According to the above examples, an optical system capable of obtaining favorable optical performance throughout the focusing range from infinity to short distances, while also restraining changes in image magnification can be achieved.

The foregoing examples illustrate concrete instances of the present disclosure, but the present disclosure is not limited to these examples.

Note that it is possible to adopt the following content appropriately within a range that does not hinder the optical performance of the optical system according to the present embodiment.

The focusing lens group refers to a portion having at least one lens separated by a distance that changes when focusing (for example, the second lens group of the present embodiment). In other words, a single lens group, a plurality of lens groups, or a partial lens group may also be treated as the focusing lens group that is moved in the optical axis direction to focus from an infinite distant object to a short-distance object. The focusing lens group can also be applied to autofocus, and is also suited to autofocus motor driving (using an ultrasonic motor or the like).

The examples of the optical system according to the present embodiment illustrate a configuration that lacks an anti-vibration function, but the present disclosure is not limited thereto and may also be configured to have an anti-vibration function.

Each lens surface may be formed as a spherical surface, a planar surface, or an aspherical surface. It is preferable for the lens surface to be spherical or planar because lens processing and assembly adjustment are easy, degraded optical performance due to errors in processing and assembly adjustment can be prevented, and also because depiction performance suffers little degradation even in a case where the image surface is displaced.

In a case where the lens surface is aspherical, the aspherical surface may be any of an aspherical surface obtained by grinding, a molded glass aspherical surface obtained by forming glass into an aspherical shape using a mold, or a composite type aspherical surface obtained by formed a resin into an aspherical shape on the surface of glass. Additionally, the lens surface may also be a diffractive surface, and the lens may also be a gradient index lens (GRIN lens) or a plastic lens.

To achieve high-contrast optical performance with reduced flaring and ghosting, an anti-reflective coating having high transmittance over a wide wavelength range may also be applied to each lens surface. With this arrangement, high-contrast high optical performance with reduced flaring and ghosting can be achieved.

EXPLANATION OF NUMERALS AND CHARACTERS

G1 first lens group
G2 second lens group
G3 third lens group
I image surface
S aperture stop

The invention claimed is:
1. An optical system comprising:
a first lens group having positive refractive power, a second lens group having positive refractive power, and a third lens group having negative refractive power, arranged in order from an object side, wherein
when focusing, the second lens group moves along an optical axis,
the first lens group is stationary when focusing, and
the optical system satisfies the following conditional expressions:

$0.100 < BFa/f < 0.350$ $0.25 < fF/fR < 3.00$ $0.50 < FNO \times (f1/f) < 3.20$ and $1.000 < (-G1R1)/f1 < 50.000$ where BFa is an air equivalent distance on the optical axis between a lens surface on an image side of a lens disposed closest to an image and the image,
f is a focal length of the optical system,
fF is a composite focal length of lenses disposed farther on the object side than a diaphragm in the optical system,
fR is a composite focal length of lenses disposed farther on the image side than the diaphragm in the optical system at a state of focusing on infinity,
FNO is an F-number of the optical system,
f1 is a focal length of the first lens group, and
G1R1 is a radius of curvature of a lens surface on the object side of a lens component disposed closest to the object in the first lens group.

2. The optical system according to claim 1, wherein the optical system satisfies the following conditional expression $1.000 < (-G1R1)/f1 < 5.000$.

3. The optical system according to claim 1, wherein the first lens group comprises a diaphragm.

4. The optical system according to claim 1, wherein the optical system satisfies the following conditional expression $0.010 < f/f1 < 5.000$.

5. The optical system according to claim 1, wherein the optical system satisfies the following conditional expression $0.010 < f/f2 < 5.000$ where f2 is a focal length of the second lens group.

6. The optical system according to claim 1, wherein the optical system satisfies the following conditional expression $0.010 < f1/f2 < 5.000$ where
f2 is a focal length of the second lens group.

7. The optical system according to claim 1, wherein the optical system satisfies the following conditional expression $0.010 < f1/(-f3) < 3.000$ where
f3 is a focal length of the third lens group.

8. The optical system according to claim 1, wherein the optical system satisfies the following conditional expression $-10.0 < (G1R2+G1R1)/(G1R2-G1R1) < 10.0$ where
G1R2 is a radius of curvature of a lens surface on the image side for a lens component disposed farthest on the object side in the first lens group.

9. The optical system according to claim 1, wherein the optical system satisfies the following conditional expression $0.30 < \{1-(\beta 2)^2\} \times (\beta 3)^2 < 2.00$ where β2 is a lateral magnification of the second lens group for a state of focusing on infinity, and
β3 is a lateral magnification of the third lens group.

10. The optical system according to claim 1, wherein the optical system satisfies the following conditional expression $15.0° < 2\omega < 85.00$ where 2ω is an angle of view of the optical system.

11. An optical apparatus comprising a lens barrel including the optical system according to claim 1.

12. A method of manufacturing an optical system including a first lens group having positive refractive power, a second lens group having positive refractive power, and a third lens group having negative refractive power, arranged in order from an object side, the method comprising:

disposing each lens within a lens barrel such that
when focusing, the second lens group moves along an optical axis,
the first lens group is stationary when focusing, and
the optical system satisfies set A or set B of conditional expressions,
wherein set A comprises:

$$0.100 < BFa/f < 0.350$$

$$0.25 < fF/fR < 3.00$$

$$0.50 < FNO \times (f1/f) < 3.20 \text{ and}$$

$$1.000 < (-G1R1)/f1 < 50.000$$

where BFa is an air equivalent distance on the optical axis between a lens surface on an image side of a lens disposed closest to an image and the image,
f is a focal length of the optical system,
fF is a composite focal length of lenses disposed farther on the object side than a diaphragm in the optical system,
fR is a composite focal length of lenses disposed farther on the image side than the diaphragm in the optical system at a state of focusing on infinity,
FNO is an F-number of the optical system,
f1 is a focal length of the first lens group, and
G1R1 is a radius of curvature of a lens surface on the object side of a lens component disposed closest to the object in the first lens group, and wherein set B comprises:

$$0.100 < BFa/f \leq 0.249$$

$$0.50 < FNO \times (f1/f) < 3.00 \text{ and}$$

$$20.0° < 2\omega < 85.0°$$

where $2\omega$ is an angle of view of the optical system.

13. An optical system comprising:
a first lens group having positive refractive power, a second lens group having positive refractive power, and a third lens group having negative refractive power, arranged in order from an object side, wherein
when focusing, the second lens group moves along an optical axis,
the first lens group is stationary when focusing, and
the optical system satisfies the following conditional expressions:

$$0.100 < BFa/f \leq 0.249 \text{ and}$$

$$0.50 < FNO \times (f1/f) < 3.00 \text{ and}$$

$$20.0° < 2\omega < 85.0°$$

where BFa is an air equivalent distance on the optical axis between a lens surface on an image side of a lens disposed closest to an image and the image,
f is a focal length of the optical system,
FNO is an F-number of the optical system,
f1 is a focal length of the first lens group, and
$2\omega$ is an angle of view of the optical system.

* * * * *